US012646038B2

(12) United States Patent
Ledford et al.

(10) Patent No.: US 12,646,038 B2
(45) Date of Patent: Jun. 2, 2026

(54) REAL-TIME PAYMENT SYSTEM, METHOD, APPARATUS, AND COMPUTER PROGRAM

(71) Applicant: The Clearing House Payments Company L.L.C., New York, NY (US)

(72) Inventors: Stephen Ledford, Alpharetta, GA (US); Irfan Ahmad, New York, NY (US)

(73) Assignee: The Clearing House Payments Company L.L.C., New York, NY (US)

( * ) Notice: Subject to any disclaimer, the term of this patent is extended or adjusted under 35 U.S.C. 154(b) by 0 days.

(21) Appl. No.: 18/317,255

(22) Filed: May 15, 2023

(65) Prior Publication Data

US 2023/0368156 A1　Nov. 16, 2023

Related U.S. Application Data

(63) Continuation of application No. 17/099,609, filed on Nov. 16, 2020, now Pat. No. 11,694,168, which is a
(Continued)

(51) Int. Cl.
　*G06Q 20/02*　　(2012.01)
　*G06Q 10/10*　　(2023.01)
　　(Continued)

(52) U.S. Cl.
　CPC ....... *G06Q 20/023* (2013.01); *G06Q 20/4037* (2013.01); *G06Q 40/03* (2023.01); *G06Q 10/10* (2013.01); *G06Q 30/0185* (2013.01)

(58) Field of Classification Search
　None
　See application file for complete search history.

(56) References Cited

U.S. PATENT DOCUMENTS

| 3,852,571 A | 12/1974 | Hal et al. |
| 4,201,978 A | 5/1980 | Nally |
| (Continued) | | |

FOREIGN PATENT DOCUMENTS

| CA | 2131667 A1 | 6/1995 |
| EP | 0 029 733 A2 | 6/1981 |
| (Continued) | | |

OTHER PUBLICATIONS

250 U.S. Banks to Use NCR, Cincinnati Bell Financial Systems, AT&T News Release, http://www.att.com/news/0593/930504.ncd.html, 2 pages (May 4, 1993).
(Continued)

*Primary Examiner* — Matthew S Gart
*Assistant Examiner* — Amit Patel
(74) *Attorney, Agent, or Firm* — Merchant & Gould P.C.

(57) ABSTRACT

Tracking account positions in a real-time payments system is provided. Each of a plurality of participants is linked to a funding agent account via an ACH network, thereby creating a plurality of linked participants. Each of the plurality of linked participants is provided access to a current prefunded position of the funding agent through the ACH network. An unsettled financial position of each of the plurality of participants is compared to the current prefunded position of the funding agent. A determination is made whether to perform a financial settlement for a corresponding one of the plurality of participants based on the comparison. The financial settlement for the corresponding participant is performed when it is determined that the unsettled financial position of the corresponding participant is not greater than the current prefunded position of the funding agent.

21 Claims, 78 Drawing Sheets

Related U.S. Application Data continuation-in-part of application No. 15/200,340, filed on Jul. 1, 2016, now Pat. No. 11,042,882.

(60) Provisional application No. 62/286,738, filed on Jan. 25, 2016, provisional application No. 62/187,406, filed on Jul. 1, 2015.

(51) Int. Cl.

| | |
|---|---|
| *G06Q 20/40* | (2012.01) |
| *G06Q 30/018* | (2023.01) |
| *G06Q 40/03* | (2023.01) |

(56) References Cited

U.S. PATENT DOCUMENTS

| | | |
|---|---|---|
| 4,205,780 A | 6/1980 | Burns et al. |
| 4,264,808 A | 4/1981 | Owens et al. |
| 4,268,715 A | 5/1981 | Atalla |
| 4,270,042 A | 5/1981 | Case |
| 4,321,672 A | 3/1982 | Braun et al. |
| 4,326,258 A | 4/1982 | de la Guardia |
| 4,404,649 A | 9/1983 | Nunley et al. |
| 4,417,136 A | 11/1983 | Rushby et al. |
| 4,457,015 A | 6/1984 | Nally et al. |
| 4,491,725 A | 1/1985 | Pritchard |
| 4,500,750 A | 2/1985 | Elander et al. |
| 4,523,330 A | 6/1985 | Cain |
| 4,555,617 A | 11/1985 | Brooks et al. |
| 4,578,530 A | 3/1986 | Zeidler |
| 4,602,936 A | 7/1986 | Topfl et al. |
| 4,617,457 A | 10/1986 | Granzow et al. |
| 4,652,990 A | 3/1987 | Pailen et al. |
| 4,672,377 A | 6/1987 | Murphy et al. |
| 4,673,802 A | 6/1987 | Ohmae et al. |
| 4,675,815 A | 6/1987 | Kuroki et al. |
| 4,680,803 A | 7/1987 | Dilella |
| 4,694,147 A | 9/1987 | Amemiya et al. |
| 4,723,283 A | 2/1988 | Nagasawa et al. |
| 4,745,267 A | 5/1988 | Davis et al. |
| 4,747,058 A | 5/1988 | Ho |
| 4,748,557 A | 5/1988 | Tamada et al. |
| 4,750,201 A | 6/1988 | Hodgson et al. |
| 4,755,940 A | 7/1988 | Brachtl et al. |
| 4,757,543 A | 7/1988 | Tamada et al. |
| 4,758,530 A | 7/1988 | Schubert |
| 4,771,460 A | 9/1988 | Tamada et al. |
| 4,799,156 A | 1/1989 | Shavit et al. |
| 4,810,866 A | 3/1989 | Lord, Jr. |
| 4,823,264 A | 4/1989 | Deming |
| 4,843,220 A | 6/1989 | Haun |
| 4,858,121 A | 8/1989 | Barber et al. |
| 4,882,779 A | 11/1989 | Rahtgen |
| 4,888,812 A | 12/1989 | Dinan et al. |
| 4,910,774 A | 3/1990 | Barakat |
| 4,912,762 A | 3/1990 | Lee et al. |
| 4,922,503 A | 5/1990 | Leone |
| 4,926,325 A | 5/1990 | Benton et al. |
| 4,941,125 A | 7/1990 | Boyne |
| 4,960,981 A | 10/1990 | Benton et al. |
| 4,961,142 A | 10/1990 | Elliott et al. |
| 4,962,531 A | 10/1990 | Sipman et al. |
| 4,977,595 A | 12/1990 | Ohta et al. |
| 4,985,921 A | 1/1991 | Schwartz |
| 5,003,594 A | 3/1991 | Shinagawa |
| 5,014,311 A | 5/1991 | Schrenk |
| 5,016,277 A | 5/1991 | Hamilton |
| 5,053,607 A | 10/1991 | Carlson et al. |
| 5,054,096 A | 10/1991 | Beizer |
| 5,081,680 A | 1/1992 | Bennett |
| 5,091,968 A | 2/1992 | Higgins et al. |
| 5,093,787 A | 3/1992 | Simmons |
| 5,095,480 A | 3/1992 | Fenner |
| 5,111,395 A | 5/1992 | Smith et al. |
| 5,122,950 A | 6/1992 | Benton et al. |
| 5,123,047 A | 6/1992 | Rosenow |
| 5,144,115 A | 9/1992 | Yoshida |
| 5,159,548 A | 10/1992 | Caslavka |
| 5,159,592 A | 10/1992 | Perkins |
| 5,163,098 A | 11/1992 | Dahbura |
| 5,168,444 A | 12/1992 | Cukor et al. |
| 5,170,466 A | 12/1992 | Rogan et al. |
| 5,173,594 A | 12/1992 | McClure |
| 5,175,682 A | 12/1992 | Higashiyama et al. |
| 5,175,766 A | 12/1992 | Hamilton |
| 5,185,798 A | 2/1993 | Hamada et al. |
| 5,187,750 A | 2/1993 | Behera |
| 5,195,133 A | 3/1993 | Kapp et al. |
| 5,198,975 A | 3/1993 | Baker et al. |
| 5,200,993 A | 4/1993 | Wheeler et al. |
| 5,204,811 A | 4/1993 | Bednar et al. |
| 5,214,697 A | 5/1993 | Saito |
| 5,220,501 A | 6/1993 | Lawlor et al. |
| 5,231,569 A | 7/1993 | Myatt et al. |
| 5,233,547 A | 8/1993 | Kapp et al. |
| 5,233,656 A | 8/1993 | Langrand et al. |
| 5,235,433 A | 8/1993 | Clarkson et al. |
| 5,237,158 A | 8/1993 | Kern et al. |
| 5,237,159 A | 8/1993 | Stephens et al. |
| 5,237,620 A | 8/1993 | Deaton et al. |
| 5,241,600 A | 8/1993 | Hillis |
| 5,256,863 A | 10/1993 | Ferguson et al. |
| 5,259,025 A | 11/1993 | Monroe et al. |
| 5,262,942 A | 11/1993 | Earle |
| 5,265,007 A | 11/1993 | Barnhard, Jr. et al. |
| 5,274,567 A | 12/1993 | Kallin et al. |
| 5,283,829 A | 2/1994 | Anderson |
| 5,287,497 A | 2/1994 | Behera |
| 5,317,637 A | 5/1994 | Pichlmaier et al. |
| 5,321,238 A | 6/1994 | Kamata et al. |
| 5,321,751 A | 6/1994 | Ray et al. |
| 5,321,816 A | 6/1994 | Rogan et al. |
| 5,326,959 A | 7/1994 | Perazza |
| 5,329,589 A | 7/1994 | Fraser et al. |
| 5,337,358 A | 8/1994 | Axelrod et al. |
| 5,341,428 A | 8/1994 | Schatz |
| 5,343,529 A | 8/1994 | Goldfine et al. |
| 5,345,090 A | 9/1994 | Hludzinski |
| 5,373,550 A | 12/1994 | Campbell et al. |
| 5,383,113 A | 1/1995 | Kight et al. |
| 5,396,558 A | 3/1995 | Ishiguro et al. |
| 5,408,531 A | 4/1995 | Nakajima |
| 5,412,190 A | 5/1995 | Josephson et al. |
| 5,426,281 A | 6/1995 | Abecassis |
| 5,434,928 A | 7/1995 | Wagner et al. |
| 5,436,970 A | 7/1995 | Ray et al. |
| 5,440,634 A | 8/1995 | Jones et al. |
| 5,444,794 A | 8/1995 | Uhland, Sr. |
| 5,446,796 A | 8/1995 | Ishiguro et al. |
| 5,453,601 A | 9/1995 | Rosen |
| 5,454,575 A | 10/1995 | Del Buono |
| 5,455,407 A | 10/1995 | Rosen |
| 5,457,747 A | 10/1995 | Drexler et al. |
| 5,465,206 A | 11/1995 | Hilt et al. |
| 5,473,143 A | 12/1995 | Vak et al. |
| 5,479,510 A | 12/1995 | Olsen et al. |
| 5,484,988 A | 1/1996 | Hills et al. |
| 5,497,317 A | 3/1996 | Hawkins et al. |
| 5,502,765 A | 3/1996 | Ishiguro et al. |
| 5,506,691 A | 4/1996 | Bednar et al. |
| 5,523,167 A | 6/1996 | Hunt et al. |
| 5,524,073 A | 6/1996 | Stambler |
| 5,528,705 A | 6/1996 | Reasoner, Jr. et al. |
| 5,532,464 A | 7/1996 | Josephson et al. |
| 5,539,822 A | 7/1996 | Lett |
| 5,539,825 A | 7/1996 | Akiyama et al. |
| 5,544,043 A | 8/1996 | Miki et al. |
| 5,544,255 A | 8/1996 | Smithies et al. |
| 5,557,518 A | 9/1996 | Rosen |
| 5,577,121 A | 11/1996 | Davis et al. |
| 5,590,038 A | 12/1996 | Pitroda |
| 5,594,226 A | 1/1997 | Steger |
| 5,596,642 A | 1/1997 | Davis et al. |
| 5,602,933 A | 2/1997 | Blackwell et al. |

(56) References Cited

U.S. PATENT DOCUMENTS

| | | | |
|---|---|---|---|
| 5,602,936 | A | 2/1997 | Green et al. |
| 5,604,640 | A | 2/1997 | Zipf et al. |
| 5,604,802 | A | 2/1997 | Holloway |
| 5,608,800 | A | 3/1997 | Hoffmann et al. |
| 5,613,001 | A | 3/1997 | Bakhoum |
| 5,615,269 | A | 3/1997 | Micali |
| 5,621,796 | A | 4/1997 | Davis et al. |
| 5,621,797 | A | 4/1997 | Rosen |
| 5,623,547 | A | 4/1997 | Jones et al. |
| 5,625,694 | A | 4/1997 | Lee et al. |
| 5,629,981 | A | 5/1997 | Nerlikar |
| 5,633,930 | A | 5/1997 | Davis et al. |
| 5,642,419 | A | 6/1997 | Rosen |
| 5,647,017 | A | 7/1997 | Smithies et al. |
| 5,649,116 | A | 7/1997 | McCoy et al. |
| 5,649,117 | A | 7/1997 | Landry |
| 5,652,786 | A | 7/1997 | Rogers |
| 5,657,389 | A | 8/1997 | Houvener |
| 5,657,396 | A | 8/1997 | Rudolph et al. |
| 5,659,616 | A | 8/1997 | Sudia |
| 5,668,897 | A | 9/1997 | Stolfo |
| 5,673,333 | A | 9/1997 | Johnston |
| 5,677,955 | A | 10/1997 | Doggett et al. |
| 5,682,549 | A | 10/1997 | Tanaka et al. |
| 5,684,965 | A | 11/1997 | Pickering |
| 5,691,524 | A | 11/1997 | Josephson |
| 5,699,528 | A | 12/1997 | Hogan |
| 5,703,344 | A | 12/1997 | Bezy et al. |
| 5,708,810 | A | 1/1998 | Kern et al. |
| 5,710,887 | A | 1/1998 | Chelliah et al. |
| 5,715,298 | A | 2/1998 | Rogers |
| 5,717,868 | A | 2/1998 | James |
| 5,732,400 | A | 3/1998 | Mandler et al. |
| 5,742,668 | A | 4/1998 | Pepe et al. |
| 5,742,888 | A | 4/1998 | Fuchiwaki et al. |
| 5,751,842 | A | 5/1998 | Riach et al. |
| 5,754,673 | A | 5/1998 | Brooks et al. |
| 5,760,916 | A | 6/1998 | Dellert et al. |
| 5,778,178 | A | 7/1998 | Arunachalam |
| 5,781,654 | A | 7/1998 | Carney |
| 5,783,808 | A | 7/1998 | Josephson |
| 5,784,503 | A | 7/1998 | Bleecker, III et al. |
| 5,784,610 | A | 7/1998 | Copeland, III et al. |
| 5,787,403 | A | 7/1998 | Randle |
| 5,790,260 | A | 8/1998 | Myers |
| 5,790,790 | A | 8/1998 | Smith et al. |
| 5,793,869 | A | 8/1998 | Claflin, Jr. |
| 5,832,460 | A | 11/1998 | Bednar et al. |
| 5,832,463 | A | 11/1998 | Funk |
| 5,832,464 | A | 11/1998 | Houvener et al. |
| 5,848,400 | A | 12/1998 | Chang |
| 5,857,034 | A | 1/1999 | Tsuchiya et al. |
| 5,870,456 | A | 2/1999 | Rogers |
| 5,870,724 | A | 2/1999 | Lawlor et al. |
| 5,870,725 | A | 2/1999 | Bellinger et al. |
| 5,873,072 | A | 2/1999 | Kight et al. |
| 5,884,271 | A | 3/1999 | Pitroda |
| 5,893,080 | A | 4/1999 | McGurl et al. |
| 5,903,874 | A | 5/1999 | Leonard et al. |
| 5,903,880 | A | 5/1999 | Biffar |
| 5,903,881 | A | 5/1999 | Schrader et al. |
| 5,910,988 | A | 6/1999 | Ballard |
| 5,915,023 | A | 6/1999 | Bernstein |
| 5,917,965 | A | 6/1999 | Cahill et al. |
| 5,920,847 | A | 7/1999 | Kolling et al. |
| 5,925,865 | A | 7/1999 | Steger |
| 5,926,288 | A | 7/1999 | Dellert et al. |
| 5,930,778 | A | 7/1999 | Geer |
| 5,937,396 | A | 8/1999 | Konya |
| 5,940,844 | A | 8/1999 | Cahill et al. |
| 5,956,700 | A | 9/1999 | Landry |
| 5,963,647 | A | 10/1999 | Downing et al. |
| 5,963,925 | A | 10/1999 | Kolling et al. |
| 5,973,731 | A | 10/1999 | Schwab |
| 5,978,780 | A | 11/1999 | Watson |
| 5,987,500 | A | 11/1999 | Arunachalam |
| 5,999,625 | A | 12/1999 | Bellare et al. |
| 6,006,208 | A | 12/1999 | Forst et al. |
| 6,021,202 | A | 2/2000 | Anderson et al. |
| 6,029,150 | A | 2/2000 | Kravitz |
| 6,029,151 | A | 2/2000 | Nikander |
| 6,032,133 | A | 2/2000 | Hilt et al. |
| 6,032,137 | A | 2/2000 | Ballard |
| 6,036,344 | A | 3/2000 | Goldenberg |
| 6,047,051 | A | 4/2000 | Ginzboorg et al. |
| 6,049,785 | A | 4/2000 | Gifford |
| 6,049,786 | A | 4/2000 | Smorodinsky |
| 6,055,567 | A | 4/2000 | Ganesan et al. |
| 6,058,382 | A | 5/2000 | Kasai et al. |
| 6,069,896 | A | 5/2000 | Borgstahl et al. |
| 6,070,150 | A | 5/2000 | Remington et al. |
| 6,076,068 | A | 6/2000 | DeLapa et al. |
| 6,076,074 | A | 6/2000 | Cotton et al. |
| 6,108,104 | A | 8/2000 | Tesavis |
| 6,115,509 | A | 9/2000 | Yeskel |
| 6,138,107 | A | 10/2000 | Elgamal |
| 6,145,738 | A | 11/2000 | Stinson et al. |
| 6,173,272 | B1 | 1/2001 | Thomas et al. |
| 6,181,837 | B1 | 1/2001 | Cahill et al. |
| 6,189,785 | B1 | 2/2001 | Lowery |
| 6,192,142 | B1 | 2/2001 | Pare, Jr. et al. |
| 6,192,407 | B1 | 2/2001 | Smith et al. |
| 6,199,077 | B1 | 3/2001 | Inala et al. |
| 6,202,054 | B1 | 3/2001 | Lawlor et al. |
| 6,209,095 | B1 | 3/2001 | Anderson et al. |
| 6,212,556 | B1 | 4/2001 | Arunachalam |
| 6,223,168 | B1 | 4/2001 | McGurl et al. |
| 6,230,148 | B1 | 5/2001 | Pare, Jr. et al. |
| 6,243,689 | B1 | 6/2001 | Norton |
| 6,260,024 | B1 | 7/2001 | Shkedy |
| 6,269,348 | B1 | 7/2001 | Pare, Jr. et al. |
| 6,278,993 | B1 | 8/2001 | Kumar et al. |
| 6,282,523 | B1 | 8/2001 | Tedesco et al. |
| 6,283,366 | B1 | 9/2001 | Hills et al. |
| 6,285,991 | B1 | 9/2001 | Powar |
| 6,289,322 | B1 | 9/2001 | Kitchen et al. |
| 6,292,789 | B1 | 9/2001 | Schutzer |
| 6,301,379 | B1 | 10/2001 | Thompson et al. |
| 6,304,857 | B1 | 10/2001 | Heindel et al. |
| 6,317,745 | B1 | 11/2001 | Thomas et al. |
| 6,317,783 | B1 | 11/2001 | Freishtat et al. |
| 6,324,525 | B1 | 11/2001 | Kramer et al. |
| 6,324,526 | B1 | 11/2001 | D'Agostino |
| 6,327,577 | B1 | 12/2001 | Garrison et al. |
| 6,330,544 | B1 | 12/2001 | Walker et al. |
| 6,334,116 | B1 | 12/2001 | Ganesan et al. |
| 6,338,050 | B1 | 1/2002 | Conklin et al. |
| 6,351,553 | B1 | 2/2002 | Hayosh |
| 6,353,811 | B1 | 3/2002 | Weissman |
| 6,363,362 | B1 | 3/2002 | Burfield et al. |
| 6,385,595 | B1 | 5/2002 | Kolling et al. |
| 6,385,652 | B1 | 5/2002 | Brown et al. |
| 6,405,245 | B1 | 6/2002 | Burson et al. |
| 6,408,284 | B1 | 6/2002 | Hilt et al. |
| 6,411,939 | B1 | 6/2002 | Parsons |
| 6,412,073 | B1 | 6/2002 | Rangan |
| 6,438,527 | B1 | 8/2002 | Powar |
| 6,442,590 | B1 | 8/2002 | Inala et al. |
| 6,477,565 | B1 | 11/2002 | Daswani et al. |
| 6,493,685 | B1 | 12/2002 | Ensel et al. |
| 6,510,451 | B2 | 1/2003 | Wu et al. |
| 6,517,587 | B2 | 2/2003 | Satyavolu et al. |
| 6,553,346 | B1 | 4/2003 | Walker et al. |
| 6,567,850 | B1 | 5/2003 | Freishtat et al. |
| 6,574,377 | B1 | 6/2003 | Cahill et al. |
| 6,578,015 | B1 | 6/2003 | Haseltine et al. |
| 6,594,647 | B1 | 7/2003 | Randle et al. |
| 6,594,766 | B2 | 7/2003 | Rangan et al. |
| 6,633,910 | B1 | 10/2003 | Rajan et al. |
| 6,647,376 | B1 | 11/2003 | Farrar et al. |
| 6,678,664 | B1 | 1/2004 | Ganesan |
| 6,694,300 | B1 | 2/2004 | Walker et al. |
| 6,725,425 | B1 | 4/2004 | Rajan et al. |
| 6,738,804 | B1 | 5/2004 | Lo |

(56)          References Cited

U.S. PATENT DOCUMENTS

| | | | |
|---|---|---|---|
| 6,748,367 B1 | 6/2004 | Lee | |
| 6,769,606 B1 | 8/2004 | Blosser et al. | |
| 6,802,042 B2 | 10/2004 | Rangan et al. | |
| 6,826,545 B2 | 11/2004 | Kawashima et al. | |
| 6,842,782 B1 | 1/2005 | Malik et al. | |
| 6,856,974 B1 | 2/2005 | Ganesan et al. | |
| 6,856,975 B1 | 2/2005 | Inglis | |
| 6,859,212 B2 | 2/2005 | Kumar et al. | |
| 6,863,214 B2 | 3/2005 | Garner, IV et al. | |
| 6,865,680 B1 | 3/2005 | Wu et al. | |
| 6,871,220 B1 | 3/2005 | Rajan et al. | |
| 6,910,023 B1 | 6/2005 | Schibi | |
| 6,932,268 B1 | 8/2005 | McCoy et al. | |
| 6,934,691 B1 | 8/2005 | Simpson et al. | |
| 6,945,453 B1 | 9/2005 | Schwarz, Jr. | |
| 6,948,063 B1 | 9/2005 | Ganesan et al. | |
| 6,968,319 B1 | 11/2005 | Remington et al. | |
| 6,980,973 B1 | 12/2005 | Karpenko | |
| 6,996,542 B1 | 2/2006 | Landry | |
| 7,004,382 B2 | 2/2006 | Sandru | |
| 7,013,310 B2 | 3/2006 | Messing et al. | |
| 7,028,008 B2 | 4/2006 | Powar | |
| 7,028,886 B1 | 4/2006 | Maloney | |
| 7,039,656 B1 | 5/2006 | Tsai et al. | |
| 7,076,458 B2 | 7/2006 | Lawlor et al. | |
| 7,085,997 B1 | 8/2006 | Wu et al. | |
| 7,089,208 B1 | 8/2006 | Levchin et al. | |
| 7,099,845 B2 | 8/2006 | Higgins et al. | |
| 7,107,244 B2 | 9/2006 | Kight et al. | |
| 7,110,969 B1 | 9/2006 | Bennett et al. | |
| 7,110,993 B2 | 9/2006 | Soulanille et al. | |
| 7,120,602 B2 | 10/2006 | Kitchen et al. | |
| 7,146,338 B2 | 12/2006 | Kight et al. | |
| 7,155,508 B2 | 12/2006 | Sankuratripati et al. | |
| 7,158,955 B2 | 1/2007 | Diveley et al. | |
| 7,165,052 B2 | 1/2007 | Diveley et al. | |
| 7,165,723 B2 | 1/2007 | McGlamery et al. | |
| 7,167,711 B1 | 1/2007 | Dennis | |
| 7,175,074 B2 | 2/2007 | Mejias et al. | |
| 7,177,846 B2 | 2/2007 | Moenickheim et al. | |
| 7,178,096 B2 | 2/2007 | Rangan et al. | |
| 7,181,430 B1 | 2/2007 | Buchanan et al. | |
| 7,191,150 B1 | 3/2007 | Shao et al. | |
| 7,191,151 B1 | 3/2007 | Nosek | |
| 7,200,551 B1 | 4/2007 | Senez | |
| 7,200,804 B1 | 4/2007 | Khavari et al. | |
| 7,203,845 B2 | 4/2007 | Sokolic et al. | |
| 7,213,003 B1 | 5/2007 | Kight et al. | |
| 7,225,156 B2 | 5/2007 | Fisher et al. | |
| 7,225,464 B2 | 5/2007 | Satyavolu et al. | |
| 7,236,950 B2 | 6/2007 | Savage et al. | |
| 7,240,031 B1 | 7/2007 | Kight et al. | |
| 7,249,080 B1 | 7/2007 | Hoffman et al. | |
| 7,249,094 B2 | 7/2007 | Levchin et al. | |
| 7,251,656 B2 | 7/2007 | Keown et al. | |
| 7,263,548 B2 | 8/2007 | Daswani et al. | |
| 7,296,004 B1 | 11/2007 | Garrison et al. | |
| 7,302,408 B2 | 11/2007 | Engdahl et al. | |
| 7,302,411 B2 | 11/2007 | Ganesan et al. | |
| 7,308,426 B1 | 12/2007 | Pitroda | |
| 7,313,813 B2 | 12/2007 | Rangan et al. | |
| 7,321,874 B2 | 1/2008 | Dilip et al. | |
| 7,321,875 B2 | 1/2008 | Dilip et al. | |
| 7,330,831 B2 | 2/2008 | Biondi et al. | |
| 7,334,128 B2 | 2/2008 | Ganesan et al. | |
| 7,356,502 B1 | 4/2008 | LaBadie et al. | |
| 7,366,696 B1 | 4/2008 | Ganesan et al. | |
| 7,366,697 B2 | 4/2008 | Kitchen et al. | |
| 7,370,014 B1 | 5/2008 | Vasavada et al. | |
| 7,383,223 B1 | 6/2008 | Dilip et al. | |
| 7,383,226 B2 | 6/2008 | Kight et al. | |
| 7,392,223 B1 | 6/2008 | Ganesan et al. | |
| 7,395,319 B2 | 7/2008 | Harris et al. | |
| 7,415,610 B2 | 8/2008 | Ganesan et al. | |
| 7,424,520 B2 | 9/2008 | Daswani et al. | |
| 7,426,638 B2 | 9/2008 | Ganesan et al. | |
| 7,447,347 B2 | 11/2008 | Weber | |
| 7,474,779 B2 | 1/2009 | Duncan | |
| 7,490,063 B2 | 2/2009 | Garrison et al. | |
| 7,502,749 B2 | 3/2009 | Ganesan et al. | |
| 7,505,937 B2 | 3/2009 | Dilip et al. | |
| 7,526,448 B2 | 4/2009 | Zielke et al. | |
| 7,533,058 B2 | 5/2009 | Kulakowski | |
| 7,536,340 B2 | 5/2009 | Dheer et al. | |
| 7,558,795 B2 | 7/2009 | Malik et al. | |
| 7,606,752 B2 | 10/2009 | Hazlehurst et al. | |
| 7,606,787 B2 | 10/2009 | Keown et al. | |
| 7,610,245 B2 | 10/2009 | Dent et al. | |
| 7,636,686 B2 | 12/2009 | Pierdinock et al. | |
| 7,636,688 B2 | 12/2009 | Kitchen et al. | |
| 7,640,197 B1 | 12/2009 | Gentry et al. | |
| 7,644,023 B2 | 1/2010 | Kumar et al. | |
| 7,644,036 B2 | 1/2010 | McCoy et al. | |
| 7,653,598 B1 | 1/2010 | Hamilton et al. | |
| 7,657,484 B2 | 2/2010 | Ganesan et al. | |
| 7,660,766 B1 | 2/2010 | Lawson et al. | |
| 7,672,879 B1 | 3/2010 | Kumar et al. | |
| 7,685,525 B2 | 3/2010 | Kumar et al. | |
| 7,693,790 B2 | 4/2010 | Lawlor et al. | |
| 7,702,583 B1 | 4/2010 | Hamilton et al. | |
| 7,702,585 B2 | 4/2010 | Lyda et al. | |
| 7,711,626 B2 | 5/2010 | Nanjundamoorthy et al. | |
| 7,711,690 B1 | 5/2010 | Garrison et al. | |
| 7,725,389 B1 | 5/2010 | D'Aquisto et al. | |
| 7,729,283 B2 | 6/2010 | Ferguson et al. | |
| 7,729,969 B1 | 6/2010 | Smith, III et al. | |
| 7,729,996 B2 | 6/2010 | Zito | |
| 7,734,541 B2 | 6/2010 | Kumar et al. | |
| 7,752,130 B2 | 7/2010 | Byrd et al. | |
| 7,752,535 B2 | 7/2010 | Satyavolu | |
| 7,778,901 B2 | 8/2010 | Ganesan et al. | |
| 7,788,172 B2 | 8/2010 | Kight et al. | |
| 7,792,749 B2 | 9/2010 | Ganesan | |
| 7,886,156 B2 | 2/2011 | Franchi | |
| 7,979,348 B2 | 7/2011 | Thomas et al. | |
| 8,032,932 B2 | 10/2011 | Speyer et al. | |
| 8,073,772 B2 | 12/2011 | Bishop et al. | |
| 8,327,429 B2 | 12/2012 | Speyer et al. | |
| 8,369,601 B2 | 2/2013 | Lugg | |
| 8,423,453 B1 | 4/2013 | Elliott | |
| 8,504,477 B1 | 8/2013 | Copes | |
| 8,688,580 B1 | 4/2014 | Guenther et al. | |
| 8,725,607 B2 | 5/2014 | Dunn et al. | |
| 8,725,609 B2 | 5/2014 | Pawelczyk et al. | |
| 9,135,620 B2 | 9/2015 | Chen et al. | |
| 9,195,984 B1 | 11/2015 | Spector et al. | |
| 9,264,902 B1 | 2/2016 | Ward et al. | |
| 9,600,817 B2 | 3/2017 | Bondesen et al. | |
| 9,693,234 B2 | 6/2017 | Cook | |
| 9,715,689 B1 | 7/2017 | Ellis et al. | |
| 9,741,037 B2 | 8/2017 | Garlick et al. | |
| 9,799,011 B2 | 10/2017 | Dunn et al. | |
| 10,262,306 B2 | 4/2019 | Pawelczyk et al. | |
| 10,387,879 B2 | 8/2019 | Thomas et al. | |
| 10,636,018 B2 | 4/2020 | Dunn et al. | |
| 10,643,190 B2 | 5/2020 | Dunn et al. | |
| 10,685,337 B2 | 6/2020 | Dunn et al. | |
| 11,042,882 B2 | 6/2021 | Ledford et al. | |
| 11,295,308 B1 | 4/2022 | Fortney et al. | |
| 11,301,824 B2 | 4/2022 | Dunn et al. | |
| 11,436,577 B2 | 9/2022 | Davey et al. | |
| 11,694,168 B2 | 7/2023 | Ledford et al. | |
| 11,816,666 B2 | 11/2023 | Fortney et al. | |
| 11,829,967 B2 | 11/2023 | Davey et al. | |
| 12,106,301 B2 | 10/2024 | Fortney et al. | |
| 2001/0000537 A1 | 4/2001 | Inala et al. | |
| 2001/0016034 A1 | 8/2001 | Singh et al. | |
| 2001/0023414 A1 | 9/2001 | Kumar et al. | |
| 2001/0024157 A1 | 9/2001 | Hansmann et al. | |
| 2001/0032182 A1 | 10/2001 | Kumar et al. | |
| 2001/0032183 A1 | 10/2001 | Landry | |
| 2001/0051907 A1 | 12/2001 | Kumar et al. | |
| 2002/0002536 A1 | 1/2002 | Braco | |
| 2002/0007323 A1 | 1/2002 | Tamatsu | |

(56) References Cited

U.S. PATENT DOCUMENTS

| | | |
|---|---|---|
| 2002/0010612 A1 | 1/2002 | Smith et al. |
| 2002/0010677 A1 | 1/2002 | Kitchen et al. |
| 2002/0015480 A1 | 2/2002 | Daswani et al. |
| 2002/0019808 A1 | 2/2002 | Sharma |
| 2002/0019809 A1 | 2/2002 | Kitchen et al. |
| 2002/0023108 A1 | 2/2002 | Daswani et al. |
| 2002/0046167 A1 | 4/2002 | Kitchen et al. |
| 2002/0046168 A1 | 4/2002 | Kitchen et al. |
| 2002/0049671 A1 | 4/2002 | Trende et al. |
| 2002/0049672 A1 | 4/2002 | Kitchen et al. |
| 2002/0052840 A1 | 5/2002 | Kitchen et al. |
| 2002/0059139 A1 | 5/2002 | Evans |
| 2002/0059369 A1 | 5/2002 | Kern et al. |
| 2002/0062282 A1 | 5/2002 | Kight et al. |
| 2002/0065773 A1 | 5/2002 | Kight et al. |
| 2002/0069161 A1 | 6/2002 | Eckert et al. |
| 2002/0077952 A1 | 6/2002 | Eckert et al. |
| 2002/0077961 A1 | 6/2002 | Eckert et al. |
| 2002/0077978 A1 | 6/2002 | O'Leary et al. |
| 2002/0087454 A1 | 7/2002 | Calo et al. |
| 2002/0087455 A1 | 7/2002 | Tsagarakis et al. |
| 2002/0087461 A1 | 7/2002 | Ganesan et al. |
| 2002/0087465 A1 | 7/2002 | Ganesan et al. |
| 2002/0091635 A1 | 7/2002 | Dilip et al. |
| 2002/0111886 A1 | 8/2002 | Chenevich et al. |
| 2002/0128964 A1 | 9/2002 | Baker et al. |
| 2002/0128968 A1 | 9/2002 | Kitchen et al. |
| 2002/0143655 A1 | 10/2002 | Elston et al. |
| 2002/0174048 A1 | 11/2002 | Dheer et al. |
| 2002/0184144 A1 | 12/2002 | Byrd et al. |
| 2002/0194137 A1 | 12/2002 | Park et al. |
| 2003/0014489 A1 | 1/2003 | Inala et al. |
| 2003/0018571 A1 | 1/2003 | Eckert et al. |
| 2003/0023552 A1 | 1/2003 | Kight et al. |
| 2003/0037002 A1 | 2/2003 | Higgins et al. |
| 2003/0089768 A1 | 5/2003 | Page |
| 2003/0120774 A1 | 6/2003 | Satyavolu et al. |
| 2003/0126075 A1 | 7/2003 | Mascavage, III et al. |
| 2003/0158811 A1 | 8/2003 | Sanders et al. |
| 2003/0182206 A1 | 9/2003 | Hendrix et al. |
| 2003/0187925 A1 | 10/2003 | Inala et al. |
| 2003/0191701 A1 | 10/2003 | Haseltine et al. |
| 2003/0191711 A1 | 10/2003 | Jamison et al. |
| 2003/0191832 A1 | 10/2003 | Satyavolu et al. |
| 2003/0195844 A1 | 10/2003 | Hogan |
| 2003/0208411 A1 | 11/2003 | Estes et al. |
| 2003/0208421 A1 | 11/2003 | Vicknair et al. |
| 2003/0208441 A1 | 11/2003 | Poplawski et al. |
| 2003/0225705 A1 | 12/2003 | Park et al. |
| 2003/0236728 A1 | 12/2003 | Sunderji et al. |
| 2004/0034594 A1 | 2/2004 | Thomas et al. |
| 2004/0039701 A1 | 2/2004 | Nakamura et al. |
| 2004/0059671 A1 | 3/2004 | Nozaki et al. |
| 2004/0059672 A1 | 3/2004 | Baig et al. |
| 2004/0059673 A1 | 3/2004 | Kitchen et al. |
| 2004/0064407 A1 | 4/2004 | Kight et al. |
| 2004/0064408 A1 | 4/2004 | Kight et al. |
| 2004/0064409 A1 | 4/2004 | Kight et al. |
| 2004/0064410 A1 | 4/2004 | Kight et al. |
| 2004/0071333 A1 | 4/2004 | Douglas et al. |
| 2004/0078423 A1 | 4/2004 | Satyavolu et al. |
| 2004/0078464 A1 | 4/2004 | Rajan et al. |
| 2004/0083167 A1 | 4/2004 | Kight et al. |
| 2004/0083171 A1 | 4/2004 | Kight et al. |
| 2004/0088235 A1 | 5/2004 | Ziekle et al. |
| 2004/0093305 A1 | 5/2004 | Kight et al. |
| 2004/0133515 A1 | 7/2004 | McCoy et al. |
| 2004/0139005 A1 | 7/2004 | Ganesan |
| 2004/0139009 A1 | 7/2004 | Kozee et al. |
| 2004/0139010 A1 | 7/2004 | McMichael et al. |
| 2004/0139011 A1 | 7/2004 | Kozee et al. |
| 2004/0143552 A1 | 7/2004 | Weichert et al. |
| 2004/0148235 A1 | 7/2004 | Craig et al. |
| 2004/0148252 A1 | 7/2004 | Fleishman |
| 2004/0215543 A1 | 10/2004 | Betz et al. |
| 2004/0225609 A1 | 11/2004 | Greene |
| 2004/0236653 A1 | 11/2004 | Sokolic et al. |
| 2004/0236681 A1 | 11/2004 | Modigliani et al. |
| 2005/0010483 A1 | 1/2005 | Ling |
| 2005/0010523 A1 | 1/2005 | Myklebust et al. |
| 2005/0086136 A1 | 4/2005 | Love et al. |
| 2005/0086165 A1 | 4/2005 | Pawelczyk et al. |
| 2005/0119971 A1 | 6/2005 | Zito |
| 2005/0137960 A1 | 6/2005 | Brann et al. |
| 2005/0137978 A1 | 6/2005 | Ganesan et al. |
| 2005/0149439 A1 | 7/2005 | Suisa |
| 2005/0154923 A1 | 7/2005 | Lok et al. |
| 2005/0165695 A1 | 7/2005 | Berardi et al. |
| 2005/0171899 A1 | 8/2005 | Dunn et al. |
| 2005/0171900 A1 | 8/2005 | Onneken |
| 2005/0177505 A1 | 8/2005 | Keeling et al. |
| 2005/0182720 A1 | 8/2005 | Willard et al. |
| 2005/0187867 A1 | 8/2005 | Sokolic et al. |
| 2005/0192901 A1 | 9/2005 | McCoy et al. |
| 2005/0198377 A1 | 9/2005 | Ferguson et al. |
| 2005/0203835 A1 | 9/2005 | Nhaissi et al. |
| 2005/0203844 A1 | 9/2005 | Ferguson et al. |
| 2005/0210297 A1 | 9/2005 | Wu et al. |
| 2005/0222954 A1 | 10/2005 | Keown et al. |
| 2006/0047724 A1 | 3/2006 | Messing et al. |
| 2006/0106717 A1 | 5/2006 | Randle et al. |
| 2006/0136595 A1 | 6/2006 | Satyavolu |
| 2006/0184451 A1 | 8/2006 | Ganesan et al. |
| 2006/0195398 A1 | 8/2006 | Dheer et al. |
| 2006/0206425 A1 | 9/2006 | Sharma |
| 2006/0230343 A1 | 10/2006 | Armandpour et al. |
| 2006/0253340 A1 | 11/2006 | Levchin et al. |
| 2006/0253463 A1 | 11/2006 | Wu et al. |
| 2006/0282381 A1 | 12/2006 | Ritchie |
| 2007/0011090 A1 | 1/2007 | Baker et al. |
| 2007/0067239 A1 | 3/2007 | Dheer et al. |
| 2007/0088821 A1 | 4/2007 | Sankuratripati et al. |
| 2007/0094151 A1 | 4/2007 | Moenickheim et al. |
| 2007/0100748 A1 | 5/2007 | Dheer et al. |
| 2007/0106612 A1 | 5/2007 | O'Brien et al. |
| 2007/0121840 A1 | 5/2007 | Ganesan et al. |
| 2007/0125840 A1 | 6/2007 | Law et al. |
| 2007/0130347 A1 | 6/2007 | Rangan et al. |
| 2007/0131758 A1 | 6/2007 | Mejias et al. |
| 2007/0156584 A1 | 7/2007 | Barnes et al. |
| 2007/0162769 A1 | 7/2007 | Sokolic et al. |
| 2007/0179885 A1 | 8/2007 | Bird et al. |
| 2007/0180380 A1 | 8/2007 | Khavari et al. |
| 2007/0208645 A1 | 9/2007 | Hoffman et al. |
| 2007/0230371 A1 | 10/2007 | Tumminaro |
| 2007/0233615 A1 | 10/2007 | Tumminaro |
| 2007/0239601 A1 | 10/2007 | Ganesan et al. |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2008/0015982 A1 | 1/2008 | Sokolic et al. |
| 2008/0027874 A1 | 1/2008 | Monseignat et al. |
| 2008/0032741 A1 | 2/2008 | Tumminaro |
| 2008/0033878 A1 | 2/2008 | Krikorian et al. |
| 2008/0052226 A1 | 2/2008 | Agarwal et al. |
| 2008/0082454 A1 | 4/2008 | Dilip et al. |
| 2008/0086403 A1 | 4/2008 | Dilip et al. |
| 2008/0086426 A1 | 4/2008 | Dilip et al. |
| 2008/0091663 A1 | 4/2008 | Inala et al. |
| 2008/0097899 A1 | 4/2008 | Jackson et al. |
| 2008/0133407 A1 | 6/2008 | Guillory et al. |
| 2008/0263069 A1 | 10/2008 | Harris et al. |
| 2008/0275816 A1 | 11/2008 | Hazlehurst |
| 2008/0288376 A1 | 11/2008 | Panthaki et al. |
| 2008/0288400 A1 | 11/2008 | Panthaki et al. |
| 2008/0301022 A1 | 12/2008 | Patel et al. |
| 2008/0301023 A1 | 12/2008 | Patel et al. |
| 2008/0306846 A1 | 12/2008 | Ferguson |
| 2008/0319880 A1 | 12/2008 | D'Aquisto et al. |
| 2009/0006205 A1 | 1/2009 | Bixler et al. |
| 2009/0006582 A1 | 1/2009 | Daswani et al. |
| 2009/0024505 A1 | 1/2009 | Patel et al. |

(56)                References Cited

U.S. PATENT DOCUMENTS

| | | |
|---|---|---|
| 2009/0055913 A1 | 2/2009 | Fajardo |
| 2009/0063197 A1 | 3/2009 | Lisle |
| 2009/0076950 A1 | 3/2009 | Chang et al. |
| 2009/0119190 A1 | 5/2009 | Realini |
| 2009/0125446 A1 | 5/2009 | Saunders et al. |
| 2009/0132289 A1 | 5/2009 | Stenman et al. |
| 2009/0138394 A1 | 5/2009 | Garrison et al. |
| 2009/0222369 A1* | 9/2009 | Zoldi ............... G06Q 20/4016 |
| | | 705/35 |
| 2009/0265241 A1 | 10/2009 | Bishop et al. |
| 2009/0265774 A1 | 10/2009 | Malik et al. |
| 2009/0271854 A1 | 10/2009 | Hazlehurst et al. |
| 2009/0287601 A1 | 11/2009 | Tumminaro et al. |
| 2009/0287613 A1 | 11/2009 | Pierdinock et al. |
| 2009/0319410 A1 | 12/2009 | Kight et al. |
| 2009/0319425 A1 | 12/2009 | Tumminaro et al. |
| 2010/0004990 A1 | 1/2010 | Hazlehurst et al. |
| 2010/0005025 A1 | 1/2010 | Kumar et al. |
| 2010/0017332 A1 | 1/2010 | Kight et al. |
| 2010/0030687 A1 | 2/2010 | Panthaki et al. |
| 2010/0100462 A1 | 4/2010 | Lyda et al. |
| 2010/0100466 A1 | 4/2010 | Garrison et al. |
| 2010/0100467 A1 | 4/2010 | McCoy et al. |
| 2010/0138243 A1 | 6/2010 | Carroll |
| 2010/0198645 A1 | 8/2010 | Heiss et al. |
| 2010/0257612 A1 | 10/2010 | McGuire et al. |
| 2011/0125613 A1 | 5/2011 | Franchi |
| 2011/0145152 A1 | 6/2011 | McCown |
| 2011/0202415 A1 | 8/2011 | Casares et al. |
| 2011/0295746 A1 | 12/2011 | Thomas et al. |
| 2011/0307710 A1 | 12/2011 | McGuire et al. |
| 2012/0047075 A1 | 2/2012 | Balistierri et al. |
| 2012/0226582 A1 | 9/2012 | Hammad |
| 2012/0284175 A1 | 11/2012 | Wilson et al. |
| 2013/0018793 A1 | 1/2013 | Wong et al. |
| 2013/0144783 A1 | 6/2013 | Bishop |
| 2013/0159070 A1 | 6/2013 | Salamone |
| 2013/0262296 A1 | 10/2013 | Thomas et al. |
| 2013/0268839 A1 | 10/2013 | Lefebvre et al. |
| 2013/0293363 A1 | 11/2013 | Plymouth et al. |
| 2013/0297501 A1 | 11/2013 | Monk et al. |
| 2014/0052553 A1 | 2/2014 | Uzo |
| 2014/0067677 A1 | 3/2014 | Ali et al. |
| 2014/0089182 A1 | 3/2014 | Short et al. |
| 2014/0114838 A1 | 4/2014 | Nunes |
| 2014/0164246 A1 | 6/2014 | Thomas et al. |
| 2014/0188728 A1 | 7/2014 | Dheer et al. |
| 2014/0289106 A1 | 9/2014 | Pawelczyk et al. |
| 2015/0046319 A1 | 2/2015 | Thomas et al. |
| 2015/0161597 A1 | 6/2015 | Subramanian et al. |
| 2015/0254665 A1 | 9/2015 | Bondesen et al. |
| 2015/0324801 A1 | 11/2015 | Thomas et al. |
| 2016/0019536 A1 | 1/2016 | Ortiz et al. |
| 2016/0092872 A1 | 3/2016 | Prakash et al. |
| 2016/0300226 A1 | 10/2016 | Novac et al. |
| 2016/0358163 A1 | 12/2016 | Kumar et al. |
| 2016/0359829 A1 | 12/2016 | Gulledge |
| 2017/0221066 A1 | 8/2017 | Ledford et al. |
| 2017/0344960 A1 | 11/2017 | Garlick et al. |
| 2017/0344964 A1 | 11/2017 | Garlick et al. |
| 2017/0353420 A1 | 12/2017 | Garlick et al. |
| 2017/0372319 A1 | 12/2017 | Garlick et al. |
| 2018/0012199 A1 | 1/2018 | Dunn et al. |
| 2018/0012200 A1 | 1/2018 | Dunn et al. |
| 2018/0012201 A1 | 1/2018 | Dunn et al. |
| 2018/0174140 A1 | 6/2018 | Garlick et al. |
| 2018/0308070 A1 | 10/2018 | Raina |
| 2019/0043052 A1 | 2/2019 | Ledford et al. |
| 2019/0163790 A1 | 5/2019 | Jennings et al. |
| 2019/0220833 A1 | 7/2019 | Pawelczyk et al. |
| 2019/0333068 A1 | 10/2019 | Thomas et al. |
| 2019/0340590 A1 | 11/2019 | Davey et al. |
| 2020/0327515 A1 | 10/2020 | McCarley |
| 2022/0188825 A1 | 6/2022 | Fortney et al. |

FOREIGN PATENT DOCUMENTS

| | | |
|---|---|---|
| EP | 0 593 209 A2 | 4/1994 |
| EP | 0 661 654 A2 | 7/1995 |
| GB | 2 328 310 A | 2/1999 |
| GB | 2533379 A | 6/2016 |
| GB | 2533380 A | 6/2016 |
| GB | 2533432 A | 6/2016 |
| GB | 2533562 A | 6/2016 |
| GB | 2537087 A | 10/2016 |
| WO | 90/04837 A1 | 5/1990 |
| WO | 91/06058 A1 | 5/1991 |
| WO | 93/02424 A1 | 2/1993 |
| WO | 95/12859 A1 | 5/1995 |
| WO | 97/07468 A1 | 2/1997 |
| WO | 97/22060 A1 | 6/1997 |
| WO | 98/18095 A1 | 4/1998 |
| WO | 98/47100 A1 | 10/1998 |
| WO | 98/58356 A2 | 12/1998 |
| WO | 99/56219 A1 | 11/1999 |
| WO | 02/17196 A1 | 2/2002 |
| WO | 03/060749 A1 | 7/2003 |
| WO | 2007/053123 A2 | 5/2007 |
| WO | 2007/056274 A2 | 5/2007 |
| WO | 2008/027620 A1 | 3/2008 |
| WO | 2008/027621 A1 | 3/2008 |
| WO | 2008/060725 A2 | 5/2008 |
| WO | 2009/114876 A2 | 9/2009 |
| WO | 2009/152184 A1 | 12/2009 |
| WO | 2016/097672 A1 | 6/2016 |
| WO | 2016/097673 A1 | 6/2016 |
| WO | 2016/097674 A1 | 6/2016 |
| WO | 2016/097675 A1 | 6/2016 |

OTHER PUBLICATIONS

"3174 Configuration," http://www.commercecomputer.com/3174. html, Commerce Computer Corporation, 3 pages (Downloaded Oct. 7, 2002).

3174 Network Processor, Specification Sheet, http://ecc400.com/ ibm/controllers/314.prod.htm, Downloaded Oct. 7, 2002.

7780 Mid-Range Item Processing—Product Overview, NCR Corporation, http://www.ncr.com/products/hardware/hw_7780_ts_product. htm, 4 pages (Downloaded Nov. 15, 2002).

7780 Mid-Range Item Processing—Technical Specifications, NCR Corporation, http://www.ncr.com/products/hardware/hw_7780_ts_ product.htm, 1 page (Downloaded Nov. 15, 2002).

7780—The Robust, Reliable Solution . . . for Processing Varying Volumes in any Environment, NCR Corporation, 8 pages (1998).

"820 Payment Order/Remittance Advice" Version: X12-4010, pp. 1-61, Sep. 2005.

"835 Health Care Claim Payment/Advice" Version: 1.0 Final, pp. 1-70, Jul. 20, 2011.

"A Primer on HIPAA and the ACH Network," Banking Industry HIPAA Task Force, pp. 1-34.

About FSTC, Financial Services Technology Consortium, http:// www.fstc.org/about/history.cfm, 2 pages (Downloaded Feb. 27, 2003).

"ACI Proactive Risk Manager™ for Enterprise Risk—Product Flyer," ACI Universal Payments, www.aciworldwide.com, 4 pages, 2016.

Addink et al., "AS/400 ImagePlus System View," IBM Systems Journal, vol. 29, No. 3, pp. 451-466 (1990).

"American National Standard for Financial Image Interchange: Architecture, Overview and System Design Specification," American Bankers Association, American National Standards Institute, Inc., pp. 1-202 (1994).

Anderson, Re: Electronic Check and Check Law, Letter to Robert Ballen, 2 pages (Apr. 8, 1996).

Anderson et al., "ImagePlus Workstation Program," IBM Systems Journal, vol. 29, No. 3, pp. 398-407 (1990).

"ANSI/ABA X9.46-1995, Draft version 0.13, American National Standard for Financial Image Interchange: Architecture, Overview and System Design Specification," American Bankers Association, American National Standards Institute, Inc., 229 pages (1995).

(56) References Cited

OTHER PUBLICATIONS

"ANSI/ABA X9.46-1997, American National Standard for Financial Image Interchange: Architecture, Overview and System Design Specification," American Banker Association, American National Standards Institute, Inc., 245 pages (Jan. 21, 1997).

Arnold B. et al., "Increasing eBilling in the Healthcare Industry Without Running Afoul of Privacy Laws," 2011 Payments, pp. 1-29, Apr. 3-6, 2011.

AT&T Global Offers One-Step Imaging. (AT&T Global Information Solutions) (Brief Article), American Banker, vol. 159, No. 39, p. 14A(1), 1 page (Feb. 28, 1994).

AT&T Partners with Fiserv to Form Single Source Provider for Leading Image Item Processing Solutions, PR Newswire, p. 913C1011, 2 pages (Sep. 13, 1995).

Atzel, Article Order, Email to Marshall J. Hambro, 1 page (Oct. 9, 2001).

"Authentication in an Internet Banking Environment," Federal Financial Institutions Examination Council, http://www.ffiec.gov/pdf/authentication_guidance.pdf, pp. 1-14, published 2005.

Avers et al., "ImagePlus as a Model for Application Solution Development," IBM Systems Journal, vol. 29, No. 3, pp. 356-370 {1990}.

Baby Boomers, Generation X are Both Addicted to the ATM, AT&T News Release, http://www.att.com/news/0295/950228.nca.html, 3 pages (Feb. 28, 1995).

Banctec Inc. has Received Another Order for Its Image Statement Processing Product. (First National Bank of Chicago Orders ImageFirst), Financial Services Report, vol. 8, No. 22, p. 5(2) (Nov. 13, 1991).

Banet, Document Image Processing, 1991: The Imaging Edge, Seybold Report on Publishing Systems, vol. 20, No. 19, p. 22(8), 10 pages (Jun. 24, 1991).

Bank Automation News, Phillips Business Information, vol. 9, Issue 6, 2 pages (Apr. 2, 1997).

Banks to Check Out Imaging (Solutions), Communicationsweek International, No. 093, p. 46, 2 pages (Oct. 19, 1992).

Barhel, "NCR and Unisys Exchange Check Images in a Pivotal Test. (Computer Makers Test Compatibility of Check Imaging Systems)," American Banker, vol. 158, No. 67, p. 3(1), 2 pages (Apr. 8, 1993).

Barthel, "Unisys, Banctec Offer PC-based Imaging: High-tech Check Statements Produced; Community Banks are Market, (Banctec Systems Inc.)," American Banker, vol. 157, No. 195, p. 3(1) (Oct. 8, 1992).

Bartholomew, "More Checks on Checks—Bank of America Plans to Convert to an IBM Imaging System that Screens Checks Faster and More Thoroughly (Spotlight)," Informationweek, No. 504, p. 32 (Dec. 5, 1994).

Bartimo et al., "Fine Tuning the Terminal Picture," ComputerWorld, Special Report, vol. XVII, No. 35, 48 pages (Aug. 29, 1983).

Beckett, P., "Credit-card Firms Get Into Web Game," Asian Wall Street Journal, p. N1, 1 page (Apr. 3, 2001).

Behnke, "NSSDC's Mass Storage System Evolves," NSSDC, http://nssdc.gsfc.gov/nssdc_news/march95/09_j_behnke_0395.html, 2 pages (Mar. 1995).

Bill Processing: US West Re-engineers with $7.2 Million Unisys Image-based Remittance Processing Solution, Edge, On & About AT&T, vol. 10, No. 378, 3 pages (Oct. 23, 1995).

Blankenhorn, "Cincinnati Bell and Unisys Go Into Bank Imaging. (Cincinnati Bell Information Systems, Inc.)", Newsbytes, p. NEW10240020, 1 page (Oct. 24, 1990).

Block, USAA Federal Gets Imaging System. (USAA Federal Savings Bank, Cincinatti Bell Information Systems Inc.) (Brief Article), American Banker, vol. 159, No. 49, p. 6A(1), page (Mar. 14, 1994).

Booker, "Bank to Test Scalable NCR Imaging for Check Processing," Computerworld, p. 66, 2 pages (Dec. 14, 1992).

Broadway & Seymour Announces Client/Server Product for Item and Image Processing, Business Wire, p. 03201186, 2 pages (Mar. 20, 1995).

Broadway & Seymore Announces New VisualImpact Release, Business Wire, p. 3291274, 2 pages (Mar. 29, 1996).

Broadway & Seymour to Invest in Two Strategic Initiatives, Business Wire, p. 03151248, 2 pages (Mar. 15, 1995).

Brooks, A., "Still Waiting for the E-Mail and Faxes to Start Coming in?", The New York Times, (East Coast Late Edition), New York, NY, Dec. 19, 1996, p. C7, 2 pages.

Brown, "Imaging May Dramatically Alter Bank Data Networks," Network World, vol. 6, No. 19, p. 6(2), 1 page (May 15, 1989).

Brown, R.J., ANSI X9.46, Data Structure Reference, IBM Corporations, 16 pages (Jul. 31, 1995).

Brown, R.J., "FSTC Image Interchange Project: Pilot Phase-1A Preliminary Architecture and Project Plan," 34 pages (Jun. 30, 1995).

Buchok, "OCR Gets Processing Credit," Computing Canada, vol. 19, No. 26, p. 30(1), 1 page (Dec. 20, 1993).

"By-law No. 7 Respecting the Large Value Transfer System," Canada Gazette, Part I, vol. 132, No. 16 (Canadian Government Publishing, online: Archive 1998, Part I, http://canadagazette.gc.ca/part1/1998/19980418/pdf/g1-13216.pdf, Apr. 18, 1998, 71 pages.

Cahill, T.P., "Image Processing Applications at the Chase Manhattan Bank," 2 pages (date unknown).

Cantwell, Data Compression Over Frame Relay Implementation Agreement FRF.9, Frame Relay Forum Technical Committee, 38 pages (Jan. 22, 1996).

"CAQH Committee on Operating Rules for Information Exchange (CORE), Phase III CORE EFT & ERA Operating Rule Set," pp. 1-138, Jun. 2012.

Carey, T.W., "Quicken versus Money," PC World, vol. 14, No. 4, p. 162(6), 8 pages (Apr. 1996).

Casey et al., "Intelligent Forms Processing," IBM Systems Journal, vol. 29, No. 3, pp. 435-450 (1990).

CashFlex Selects NCR Item Processing Systems for Lockbox, AT&T News Release, http://www.att.com/news/0793/930712.ncd.html, 2 pages (Jul. 12, 1993).

Chase's New Image (Chase Manhattan Awards 12-yrs Image-processing Contract to Flserv; Contract Could Generate $40 mil/yr in Revenue for Flserv), Information Week, No. 517, p. 14, 1 page (Mar. 6, 1995).

"Check Adjustment Quick Reference Guide," Federal Reserve System, 10 pages (Jul. 1996).

Check Adjustment Request Federal Reserve■Bank, Form FRBADJ, 1 page (Sep. 1993).

"Check Clearing for the 21st Century Act: Frequently Asked Questions about Check 21," http://www.federalreserve.gov/paymentsystems/truncation/faqs.htm, The Federal Reserve Board, 2 pages (Jan. 27, 2005).

Check Image Exchange Project—Project Participants, FSTC Projects, FSTC, http://www.fstc.org/projects/imaging/participants.cfm, 1 page (Downloaded Oct. 30, 2002).

Check-Image Interchange Inches Closer (New York Clearing House, Chase Manhattan Bank and Federal Reserve Bank of Boston All Launch Check-image Interchange Program), Bank Technology News, vol. 10, No. 1, p. 19+, 2 pages (Jan. 1997).

"Check Image Processing Archive and Retrieval System Proposal: Technical Volume—Total System Solution Overview," BancTec, Incorporated, 128 pages (Jul. 8, 1994).

Check Image Processing Delivers Truncation Benefits Today, NCR Reports—Financial Services Trends & Technologies, NCR Corporation, vol. 1, Iss. 8, 13 pages (1997).

Check Technology Case Stays in Texas, IP Law Bulletin, 4 pages (Oct. 13, 2005).

Checks & Checking: Check Imaging at the Teller Station, Bank Technology News, vol. 9, No. 10, p. 37 (Oct. 1996).

Chemical Chooses IBM Check Imaging (Chemical Banking Corp to Install IBM's ImagePlus High Performance Transaction System to Process 9 Mil Checks Daily), Bank Technology News, vol. 8, No. 9, p. 11 (Sep. 1995).

Cincinnati Bell: CBIS & Unisys in Major Imaging Agreement, Edge, On & About AT&T, vol. 5, No. 118, 1 page (Oct. 29, 1990).

Cincinnati Bell Information Systems (Integrator Briefs), Computer Reseller News, No. 534, p. 129 (Jul. 12, 1993).

Cisco Partners with AT&T CMS on Network Switch Manufacturing, Lucent Technologies, http://www.lucent.com/press/0995/950926.mma.html, 2 pages (Sep. 26, 1995).

(56) References Cited

OTHER PUBLICATIONS

Citibank, New Castle Installation, one page (no date available).

Cooney,"*Frame* *Relay* Comes to Computerm Extenders," Network World, p. 14, 2 pages (Jun. 28, 1993).

Company Background and Product Guide, MagTek, 42 pages (no date available).

Computerm Announces Remote Check Imaging Support for VMC 8200 High-speed Channel Extension System, PR Newswire, p. 408LAM012, 2 pages (Apr. 8, 1996).

Computerm Earns MCI "Level 1" Approval; Computerm's Industry Exclusive Native *Frame * *Relay* Interface Passes Test for Interoperability with MCI's *Frame* *Relay* Services, Business Wire, p. 4121139, 2 pages (Apr. 12, 1995).

Computerm Eases Remote Imaging, (Introduces Remote Image Solution) Brief Article, American Banker, vol. 158, No. 156, p. 13A(1), 1 page (Aug. 16, 1993).

Computerm Enables Boatmen's Bancshares to Execute Remote Check Imaging, PR Newswire, p. 408LAM013 (Apr. 8, 1996).

Cortese, Image Yields Interest at Banks, Collaboration Results in Imaging System to Automate Check Processing, Computerworld, p. 6, 2 pages (Mar. 19, 1990).

Costanzo, "As Banks Cling to the Conventional, Check-imaging Struts Its Stuff," Bank Technology News, p. 1, 5 pages (Mar. 1994).

Crockett, Systematics to Use Deposited-check Imaging; Installation at Firm's N.J. Center Would Be the First by an Outsourcer, Systematics Financial Services Inc., Unisys Corp., American Banker, vol. 158, No. 95, p. 3(1), 2 pages (May 19, 1993).

Crone, Reducing Data Processing Costs with a Remote Item Processing System, Bank Administration, vol. 62, No. 10, pp. 44-46 (Oct. 1986).

Cummings, S., "Home Banking with Quicken," New York: MIS Press, 15 pages (1996).

Current Check Flow, PowerPoint Presentation, Check[1].ppt, pp. 1-4.

"Declaration of Richard Jesmajian," In re Claudio R. Ballard for Remote Image Capture with Centralized Processing and Storage, 3 pages (Nov. 18, 2005).

Department of Health and Human Services, Federal Register, vol. 77, No. 6, pp. 1556-1590, Jan. 10, 2012.

Depompa, "IBM Adds Image-based Processing," MIS Week, vol. 11, No. 12, p. 12(1), 2 pages (Mar. 19, 1990).

Dinan et al., "ImagePlus High Performance Transaction System," IBM Systems Journal, vol. 29, No. 3, pp. 421-434 (1990).

Dowdell, "Security," Email to fstc-imagE, 2 pages (Apr. 27, 1996).

ECheck: Homepage, http://www.echeck.org, Downloaded Feb. 27, 2003, 1 page.

"Electronic Check Adjustments: Are You Using FedLine?", The Federal Reserve Bank of St. Louis, http://www.stlouisfed.com/publications/pq/1998/a/pq1998a5.html, 3 pages (Spring 1998).

"Electronic Imaging '88—International Electronic Imaging Exposition & Conference," (Advance Printing of Paper Summaries), Anaheim, California, Mar. 28-31, 1988, 26 pages.

Electronic Payment Systems Support/Check Processing Control System: Program Reference and Operations Manual, IBM Corporation, 6 pages (Jun. 1986).

Encryption and Digital Signature Explained, Northern Telecom Inc., 4 pages (no date available).

European Search Report for Application No. 03728532.7 mailed Feb. 15, 2008, 3 pages.

Evans, "The End of Paper Wait: Document Imaging. (includes related articles on successful document imaging implementations at Borgess Medical Center, the Huntington Internal Medicine Group, the University of Alabama Health Services Foundation and Quest Diagnostics)(Industry Trend or Event)," Health Management Technology, vol. 18, No. 2, p. 16(5), 7 pages (Feb. 1997).

Fassett, "Impact of Imaging," Bank Management, vol. 67, No. 11, p. 56, 1 page (Nov. 1991).

"Financial EDI over the Internet, A pilot conducted by BankAmerica and Lawrence Livermore National Laboratory," Bank of America, 1996. http://www.bofa.com/batoday/edi_briefing.html, 7 pages (Copyright 1996).

"Financial Services Technology Consortium—Interbank Check Imaging Project—White Paper (Draft)," FSTC, pp. 1-29 (Jun. 20, 1994).

Fisher, "IBM, Customers Continue Work on Document Image Processor," Datamation, vol. 34, No. 19, 3 pages (Oct. 1, 1988).

Fitch, "Check Image Capture Speeds up Positive Pay Reconcilement," Corporate Cashflow, pp. 7 & 11 (Feb. 1995).

Fitch, "Digital Image Systems Speed Return Items, Exceptions," Corporate Cashflow, pp. 8 & 10 (May 1996).

Frequently Asked Questions on Drive Space Issues, Drive Space FAQ, 1 page (date unknown).

Fricke, "PACES Paperless Automated Check Exchange & Settlement Next Steps," Chase Manhattan Bank, 10 pages (Aug. 12, 1997).

Frost National Bank Selects NCR Over Old Mainframe Environment, AT&T News Release, http://www.aft.com/news/0493/930428.nca.html, 2 pages (Apr. 28, 1993).

"FSTC Check Image Interchange Project—Archive Storage and Retrieval Component Decomposition," 20 pages (May 25, 1995).

FSTC Demonstrates Interbank Check Image Pilot; Multi-vendor System Speeds Check Clearing, Cuts Fraud, FSTC Projects—Check Image Exchange Project, Press Release, http://www.fstc.orq/projects/imaging/public/information.cfm, 2 pages (Dec. 12, 1995).

FSTC Financial Services Technology Consortium, PowerPoint Presentation, Ansi6v4[1].ppt, pp. 1-27 (no date available).

FSTC Interbank Check Imaging Unisys Monthly Status Report, pp. 1-7 (Jun. 26, 1996).

FSTC Interbank Check Imaging Unisys Monthly Status Report, pp. 1-9 (Jul. 22, 1996).

FSTC Projects, Check Image Exchange Project (a.k.a Interbank Check Imaging Project), Financial Services Technology Consortium, http://www.fstc.org/projects/imaging/index.cfm, 6 pages (Downloaded Oct. 30, 2002).

Garvey, "Check Processing Goes Digital—Chase Manhattan Bank to Store Checks Electronically, Saving Time and Money," Informationweek, No. 648, p. 20, 1 page (Sep. 15, 1997).

Gawen, "PC Based Document Image Processing and Signature Verification," OIS IMC91 Document Imaging, Proceedings of the Information & Image Management Conference, London, pp. 389-391 (Jul. 1991).

Global Concepts—Payment Systems Consulting, Global Concepts, Inc., http://www.global-concepts.com/image_archive.htm, 1 page (Downloaded Nov. 20, 2002).

Graf, R.F., "Modern Dictionary of Electronics," 6th Edition, 5 pages (1997).

"Guardian Analytics FraudDESK," Guardian Analytics, www.guardiananalytics.com, 2 pages, 2016.

Gullo, "NCR, Unisys Plan Check Imaging for IBM Systems," American Banker, vol. 156, No. 249, p. 1(2), 2 pages (Dec. 30, 1991).

Gwendolyn Lohse et al., "Federal Operating Rules for Healthcare Administrative Simplification," 2011 Payments, NACHA—The Electronic Payments Association, pp. 1-32, Apr. 3-6, 2011.

Hakeda, "The Image Object Content Architecture," IBM Systems Journal, vol. 29, No. 3, pp. 333-342 (1990).

Hanna, FSTC Image Exchange, POS Image Capture Pilot—Reader-Scanner Study, RDM Corp, 1 page (May 21, 1996).

Harding et al., "Object Storage Hierarchy Management," IBM Systems Journal, vol. 29, No. 3, pp. 384-397 (1990).

"Healthcare in the Electronic Environment, Payment, Information and Communication Within the Revenue Cycle," Alacriti Clearwave, 2011 Payments, pp. 1-30, Apr. 3-6, 2011.

Helm, "Banks Check Into Image Processing," Computers in Banking, vol. 7, No. 3, p. 25(7), 8 pages (Mar. 1990).

Helm, "Who's Doing What in Image Processing. (includes definition of image processing)," ABA Banking Journal, vol. 83, No. 1, p. 31(3), 6 pages (Jan. 1991).

Helms, "Introduction to Image Technology," IBM Systems Journal, vol. 29, No. 3, pp. 313-332 (1990).

(56) References Cited

OTHER PUBLICATIONS

Henry Ijams et al., "Evaluating ePayables Opportunities to Improve A/P Efficiencies," pp. 1-28, Jun. 22, 2011.

High-Volume Data Capture Sans the Paper, Bank Systems & Technology, p. 35 (May 1996).

Horine, "AT&T and Fiserv Team to Offer Imaging Solutions," AT&T News Release, http://www.att.com/news/0995/950913.nca. html, 2 pages (Sep. 13, 1995).

Huntington Bancshares in the Forefront of Technology with Purchase of Unisys Check Imaging System, PR Newswire, p. 1 (Oct. 11, 1989).

IBM 3898 Image Processor, Product Announcement, IBM, 3 pages (Mar. 19, 1990).

"IBM 3995 Optical Library Dataserver—Economical, high-capacity, removable optical storage," IBM Corporation, 4 pages (1991).

"IBM Proposal for FRB Phase Four: Image Archive System," IBM Financial Document Processing, IBM, 175 pages (Nov. 7, 1991).

"IBM lmagePlus Fact Sheet," IBM Corporation, 2 pages (1991).

"IBM's lmagePlus eases transformation of the Worker's Compensation Board," IBM Corporation, 2 pages (1991).

"IBM's lmagePlus key to improving Royal Trust's customer service," IBM Corporation, 2 pages (1991).

"IBM's lmagePlus: Making USAA 's 'Impossible Dream' a reality," IBM Corporation, 3 pages (1991).

IBM X9.46 Pilot Status—Summary, 3 pages (no date available).

"Ibnamed, A Load Balancing Name Server Written in Perl," http:// www.standford. edu/-schemers/docs/lbnamed/lbnamed.html, 5 pages (Sep. 17, 1995).

"ICI Project Security Work Session, Agenda," 3 pages (May 10, 1996).

IdeaCopTM OpenOpposition Prior Art Report for U.S. Pat. No. 5,910,988 by PatenTrakkerTM, Email regarding Reexam. C.N. U.S. Appl. No. 90/007,829, Requested Date: Nov. 25, 2005, from "PT" <admin@patentrakker.com>, pp. 1-13 (May 10, 2006).

"Image Archive Forum—Payments Systems Task Force— Economic Framework," 33 pages (Jan. 27, 1998).

"Image Archive Forum—Payments System Task Force— Introduction," 52 pages (1998).

Image Can Be . . . Everything!, At Your Service, A Newsletter from the Federal Reserve Bank of Kansas City, pp. 1-6 (Special Edition— Summer 1995).

Image Processing Survival Guide, vol. II—Sure-Fire Strategies for Implementing Image-Remittance, Phillips Business Information, Inc., 40 pages (1996).

"Image systems garner NOAC spotlight (American Bankers' Association's National Operations and Automation Conference)," Computer in Banking, vol. 6, No. 7, p. 8(4), 9 pages (Jul. 1989).

"Image Quality Functional Requirements," FSTC, Chase Manhattan Bank, 19 pages (Jul. 26, 1995).

Imaging Products, United States Banker, vol. 100, No. 8, p. 23(3), 6 pages (Aug. 1990).

Imaging Technology: Generating New Bank Revenues in the Age of the Consumer, NCR Reports—Financial Services Trends & Technologies, NCR Corporation, Issue 1, 4 pages (Jan. 1997).

Imaging Vendors Shape Processing, Banking Management, vol. 69, No. 4, p. 29, 1 page (Apr. 1993).

Implementing Imaging Payment Systems: Managing Change to Achieve Results, NCR Reports—Financial Services Trends & Technologies, NCR Corporation, Issue 2, 3 pages (Feb. 1997).

Implementing National Electronic Payment System in Emerging Economies, NCR Reports—Financial Services Trends & Technologies, NCR Corporation, vol. 1, lssue 7, 12 pages (1997).

"Industry Security Leader Racal Supports Visa/Mastercard Proposal for Internet," PR Newswire, 2 pages (Apr. 17, 1996).

Information Technology Outsourcing: Sharpening Management Focus in Financial Institutions, NCR Reports—Financial Services Trends & Technologies, NCR Corporation, Issue 5, 6 pages (1997).

Integrated, Customer-Focused Banking Architecture: Tomorrow's Competitive Edge, NCR Reports—Financial Services Trends & Technologies, NCR Corporation, Issue 3, 6 pages (Mar. 1997).

Interbank Check Image Project, FSTC, PowerPoint Presentation, No. 1016V4[1].ppt, 18 pages (no date available).

Interbank Check Imaging, FSTC General Meeting—Orlando, Florida, 5 pages (Apr. 17, 1997).

International Search Report for Application No. PCT/US00/33010 mailed Jun. 21, 2002, 4 pages.

Introducing the Age of Document-Image Processing, FileNetTM Brochure, FileNet Corporation, 13 pages (1984).

Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-6, Nov. 15, 2010.

Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-5, Nov. 18, 2011.

Item Processing Leaps Ahead with VisualImpact and Windows NT. (Sponsored Supplement: Unlock Your Back Office with Microsoft BackOffice), US Banker, vol. 105, No. 6, p. S4(3), 4 pages (Jun. 1995).

J. Estep, "Ninth National Medical Banking Institute, The Growing Collaboration of eHealth and Medical Banking, Banks Engaging in Healthcare Reform," pp. 1-20, Feb. 21, 2011.

J. Steven Stone et al., "Healthcare Reform: What Does It Really Mean for Banks?," NACHA, pp. 1-37, 2011.

J.P. Morgan, "Addressing the Administrative Cost Trajectory in a New Environment," Post-Reform Opportunities for Healthcare Payments, pp. 1-14, Apr. 27, 2010.

Janusky, FSTC Interbank Check Imaging, 6 pages (Apr. 29, 1996).

Janusky, FSTC Interbank Check Imaging, 7 pages (May 22, 1996).

Jim St. Clair et al., "Ninth National Medical Banking Institute, The Growing Collaboration of eHealth and Medical Banking, Banking Platforms: Creating Programs to Speed Innovation in Healthcare," pp. 1-28, Feb. 11, 2011.

Joint Marketing & Referral Agreement Between ACS Image Solutions, Inc. and JPMorgan Chase Bank, 27 pages (Mar. 15, 2002).

JPMorgan Chase and DataTreasury Settle Patent Dispute, Company Announcement, DataTreasury Corporation, http://www.finextra.com/ fullpr.asp?pf=y&id=4989, 1 page (Jul. 6, 2005).

Kingman III et al., "Operational Image Systems: A New Opportunity," IBM Systems Journal, vol. 29, No. 3, pp. 304-312 (1990).

Kingson et al., "E-Processing by Banks: Idea Gains Ground," American Banker, 2 pages (Apr. 26, 2001).

Kniskern, "Engineering a Visionary Solution," Datamation, vol. 36, No. 8, pp. 1-3 (Apr. 15, 1990).

Kniskern, J.M., "Strategic Rethinking," 6 pages (date unknown).

Kutler, "AT&T, IBM and Unisys Join Bank Research Group. (Financial Services Technology Consortium)," American Banker, vol. 159, No. 124, p. 14(1), 3 pages (Jun. 29, 1994).

Lee et al., NOVAHID: A Novel Architecture for Asynchronous Hierarchical, International, Distributed, Real-Time Payments Processing, IEEE Journal on Selected Areas in Communications, vol. 12, No. 6, pp. 1072-1087 (Aug. 1994).

MagTek Adds Enhanced Reading to MICRImageTM—New Reading Capability Supports Check Conversion with Higher Reliability, MagTek Press Release, 3 pages (Jan. 9, 2003).

MagTek Unveils Excella, a Dual-side Scanner for Check 21 Applications, 1 page (May 10, 2004).

MagTek Upgrades Its MICRImageTM Check Reader/Scanner—V. 34 Modem Supports High-Speed Image Archiving for Check Conversion, MagTek Press Release, 3 pages (Jun. 12, 2002).

MagTek's MICRlmage Transmits Check Images at Speed of Ethernet, MagTek Press Release, 2 pages (Feb. 14, 2002).

Mantel, "Notes Gets in the Picture," Datamation, pp. 87 & 88 (Jul. 15, 1992).

(56) References Cited

OTHER PUBLICATIONS

Marjanovic, "Home Loan Bank to Offer Check-image Statements to Members' Customers. (Federal Home Loan Bank of Pittsburgh)(Brief Article)," American Banker, vol. 159, No. 248, p. 14(1), 2 pages (Dec. 29, 1994).

Marjanovic, "Mich. National Streamlines Imaging with IBM System. (check imaging)," American Banker, vol. 160, No. 176, pp. 1-2 (Sep. 13, 1995).

Marjanovic, "Payment Groups Square Off Over Electronic Check Plan," American Banker, 1 page (May 8, 1996).

Matt Brodis et al., "Best Practices for Migrating Healthcare Payments to ACH," pp. 1-39, Apr. 3-6, 2011.

Matthew Smith and Victoria Terekhova, "Electronic Payments in Healthcare: Overcoming the Challenges," pp. 1-25, Apr. 3-6, 2011.

McGinn, "IBM ImagePlus High Performance Transaction System. (IBM Harnesses Image Processing to Make its 389x/XP Cheque Processors More Efficient)(Product Announcement)," Computergram International, No. 1389, p. CG103210008, 2 pages (Mar. 21, 1990).

Messmer, "Hurdles Stand in Way of Electronic Checking," Network World, p. 33, 1 page (Sep. 4, 1995).

Messmer, E., "Banks Turn to Web for Check Processing," Network World, Framingham, vol. 17, Issue 25, 3 pages (Jun. 19, 2000).

Methodology and Value, Image Archive Forum, 20 pages (Sep. 19, 1997).

Meyerson, "PACES Redeposit Processing," pp. 1-60 (no date available).

MICR Technology Helps Eliminate POS Check Fraud, Chain Store Age Executive, p. 79 (Sep. 1991).

"Microsoft Introduces SNA Server Version 3.0, Begins Beta Testing," Microsoft Press Release, http://www.microsoft.com/presspass/press/1996/jun96/sna30pr.mspx, 4 pages (Jun. 17, 1996).

Minoli, D., "Imaging in Corporate Environments Technology and Communication," McGraw-Hill, Inc., 315 pages (1994).

Moore, "IBM, Unisys Test Check Systems for Fed Reserve," Federal Computer Week, vol. 6, No. 21, p. 6(2), 1 page (Jul. 27, 1992).

Moreau, "Payment by Authenticated Facsimile Transmission a Check Replacement Technology for Small and Medium Enterprises—Payment Processing Overview," CONNOTECH, http://connotech.com/PAYPROC.HTM, 23 pages (Downloaded Nov. 25, 2006).

Morris et al., "Image System Communications," IBM Systems Journal, vol. 29, No. 3, pp. 371-383 (1990).

Morton, W., "E-Commerce (A Special Report): A Consumer's Guide—Payments—Check It Out: The Web is suddenly crowded with online-payment services; Here's how they compare," The Wall Street Journal, New York, NY, p. R13, 4 pages (Dec. 10, 2001).

Murphy, POD Check Imaging Faces New Challenges (In 1995 vs 1996, banks raised investment in check imaging by 9% from $198 mil and $215 mil; new low cost POD technology keeps it down), Bank Technology News, vol. 10, No. 3, p. 23, 3 pages (Mar. 1997).

National City, NCR Form Strategic Imaging Partnership, AT&T News Release, http://www.att.com/news/1192/921109.nca.html, 3 pages (Nov. 9, 1992).

NCR, CKI to Market Image-based Credit Card Chargeback System, AT&T News Release, http://www.att.com/news/0193/930106.ncb.html, 2 pages (Jan. 6, 1993).

NCR and Arkansas Systems Announce Strategic Alliance, AT&T News Release, http://www.att.com/news/0793/930712.ncb.html, 2 pages (Jul. 12, 1993).

NCR and Cincinnati Bell Offer Image Processing Service, AT&T News Release, http://www.att.com/news/0194/940111.nca.html, 2 pages (Jan. 11, 1994).

NCR and NYCH to Develop Image-based Check Notification System, AT&T News Release, http://www.att.com/news/0892/920824.ncb.html, 2 pages (Aug. 14, 1992).

NCR and Signet Banking to Provide Item Processing Services, AT&T News Release, http://www.att.com/news/0793/930713.ncb.html, 2 pages (Jul. 13, 1993).

NCR Demonstrates Full Line of Retail Products at NFR Conference, AT&T News Release, http://www.att.com/news/0193/930118.ncd.html, 3 pages (Jan. 18, 1993).

NCR Demonstrates Systems for Insurance and Accounting Industry, AT&T News Release, http://www.att.com/news/0592/920531.nca.html, 3 pages (May 31, 1992).

NCR Deposit Processing Technology Speeds Banking Operations, AT&T News Release, http://www.att.com/news/1292/921207.ncc.html, 3 pages (Dec. 7, 1992).

NCR Document Management System Includes Kodak, Ricoh Products, AT&T News Release, http://www.att.com/news/0493/930406.ncc.html. 3 pages (Apr. 6, 1993).

NCR Introduces Scalable Image Item Processing Solution, AT&T News Release, http://www.att.com/news/0196/960119.nca.html, 3 pages (Jan. 19, 1996).

NCR Offers New Image-Based Document Management System, AT&T News Release, http://www.att.com/news/0692/920623.ncb.html 3 pages (Jun. 23, 1992).

NCR Reports—Financial Services Trends & Technologies, NCR Corporation, Issue 4, 6 pages (1997).

NCR Signs DSI Alliance for Imaging Statement Processing, AT&T News Release, http://www.att.com/news/0792/920720.nca.html, 2 pages (Jul. 20, 1992).

NCR Unveils Client-Server Check Imaging (NCR introduced NCR Scalable Image Item Processing Solution, a client-server based system for image-based check processing), Bank Technology News, vol. 9, No. 3, p. 23, 1 page (Mar. 1996).

New ATM from AT&T GIS Features Automated Document Processing, AT&T News Release, http://www.att.com/news/1194/941129.ucb.html, 4 pages (Nov. 29, 1994).

New Mexico Uses NCR Imaging Systems for Tax, Revenue Processing, AT&T News Release, http://www.att.com/news/0793/930712.ncc.html, 2 pages (Jul. 12, 1993).

"New Universal Payment Identification Code Will Become Industry Standard for I-Enabled Payments," The Clearing House Press Release, 2 pages (Apr. 24, 2001).

"New York Clearing House—A Proposal for an Image-based Return Item Processing System," Unisys, Document No. PDC 1010-16, 126 pages (Jun. 1991).

News Release, Retail Banking Solution Enhanced, AT&T News Release, http://www.att.com/news/0590/900521.nca.html, 2 pages (May 21, 1990).

"Ninth National Medical Banking Institute, The Growing Collaboration of eHealth and Medical Banking, HIMSS G7 Operating Rules in Healthcare," pp. 1-11, Feb. 15, 2011.

Nixdorf Computer Introduces DCPA Image—A Sophisticated Document Image Processing System with Unglue Capabilities, PR Newswire, 3 pages (Aug. 15, 1989).

Nixon, "Is Check Imaging for You? (automation in banking)(includes related articles)," Savings & Community Banker, vol. 2, No. 10, p. 28(6), 6 pages (Oct. 1993).

Norwest Bank Selects NCR Image-based Processing Systems, AT&T News Release, http://www.att.com/news/0893/930802.nca.html, 3 pages (Aug. 2, 1993).

Nugent, W.R., "Specifications for a Stack Droid: Robotics Required for Large Libraries of Digitized Images on Optical Disk," 1 page (date unknown).

"NYCH Project Shows Promise for Facilitating E-Payments," AFP Pulse, The News Source for Financial Professionals, 2 pages (Mar. 2002).

O'Heney, Prepare for the Image Revolution. (Bankers and Vendors)(image processing; includes related article listing image processing products)(buyers guide), Computers in Banking, vol. 6, No. 10, p. 24(6), 8 pages (Oct. 1989).

On the ImagingTechnology Front (Unisys Corp is in an accord to Remarket Broadway & Seymore Inc's VisualImpact software, a midrange check-imaging system), American Banker, vol. CLXI, No. 68, p. 26, 1 page (Apr. 10, 1996).

"PACES—Paperless Automated Check Exchange & Settlement—Business Requirements," FSTC, PACESBusReq3[1].doc, 7 pages (Apr. 3, 1998).

(56) References Cited

OTHER PUBLICATIONS

PACES—Paperless Automated Check Exchange & Settlement—Project Proposal, FSTC, PACESPRO[1].doc, 25 pages (Apr. 23, 1998).

PACES—Paperless Automated Check Exchange & Settlement—Requirements Document, FSTC, PACESRequirements[1].doc, 25 pages (Apr. 3, 1998).

Padgett, T., "Melville, N. Y.-Based DataTreasury Fights J.P. Morgan Chase over Patent," Newsday, 4 pages (Oct. 22, 2003).

Paperless Automated Check Exchange and Settlement (PACES), FSTC Projects, http://www.fstc.org/projects/paces/projstatus.cfm, 2 pages (Jun. 22, 2000).

"Payment Trends in the Healthcare Industry," A Survey of Healthcare Providers, pp. 5-38, Fall 2010.

Perry et al., "Experience Gained in Implementing ImagePlus," IBM Systems Journal, vol. 29, No. 3, pp. 467-488 (1990).

Plesums et al., "Large-Scale Image Systems: USAA Case Study," IBM Systems Journal, vol. 29, No. 3, pp. 343-355 (1990).

Priya Malhotra, "Clearing House Enumerates e-Payment Ills," American Banker, 4 pages (Aug. 13, 2002).

"Real-Time Gross Settlement Systems," Bank for International Settlements, 66 pages (Mar. 1997).

Regions Bank Selects ImageSoft to Provide Imaging Solution, Business Wire, p. 9161220, 2 pages(Sep. 16, 1997).

"Request for Proposal for Check Image Processing and Archival and Retrieval Systems for the Federal Reserve," Federal Reserve Bank of Boston, Version 1.0, 246 pages (Apr. 21, 1994).

Richard D. Marks, "Ninth National Medical Banking Institute, The Growing Collaboration of eHealth and Medical Banking, Health Record Banking: Changing the Game for Healthcare Information Technology, An Analysis of Checking Accounts for Health Information," pp. 1-13, Feb. 10, 2011.

Rivest et al., "A Method for Obtaining Digital Signatures and Public-Key Cryptosystems," 15 pages (Feb. 1978).

Robert Hunter, "Letter Re: CMS-0024-IFC, Adoption of Standards for Health Care EFTs and Remittance Advice," pp. 1-10, Mar. 12, 2012.

Roldan, Jr., "Image Quality White Paper," FSTC PACES Project Document, Chase Manhattan Bank, pp. 1-18 (Feb. 18, 1999).

Roldan, PACES—Paces Models—FSTC Project, Chase Manhattan Bank, 19 pages (Jul. 17, 1997).

Roldan, "Project Overview—PACES Planning Meeting", New York City, FSTC, PacesOverview40[1].ppt, 28 pages (Dec. 19, 1997).

Roth, A., "Banks Fund B2B Payment System Effort," American Banker, 1 page (Apr. 24, 2001).

Russ Waterhouse, "Administrative Simplification under the Patient Protection and Affordable Care Act Standards and Operating Rules for Electronic Funds Transfer (EFT) and Remittance Advice (RA)," National Committee of Vital and Health Statistics (NCVHS) Subcommittee on Standards, pp. 1-11, Dec. 3, 2010.

Russ Waterhouse, "National Committee on Vital and Health Statistics (NCVHS) Subcommittee on Standards, Administrative Simplification Under the Patient Protection and Affordable Care Act, Standards and Operating Rules for Electronic Funds Transfer (EFT) and Remittances Advice (RA)," The Clearing House, pp. 1-5, Dec. 3, 2010.

Russ Waterhouse et al., "The Healthcare Payments Solution: What's in It for the Banking Industry," NACHA Payments 2011, pp. 1-17, Apr. 5, 2011.

Ryman, "Personal Systems Image Application Architecture: Lessons Learned from the ImagEdit Proaram," IBM Systems Journal, vol. 29, No. 3, pp. 408-420 (1990).

"SAS® Fraud Management—Real-time scoring of all transactions for fast, accurate fraud detection," Product Brief, SAS, www.sas.com, 6 pages, 2015.

Scheschuk, B., "Pay it on the Net," CMA Management, vol. 75, Issue 4, pp. 30-34, 4 pages (Jun. 2001).

Schwartz, "Banks to Test Imaging for Clearing Checks," CommunicationsWeek, p. 35, 2 pages (Sep. 14, 1992).

Signet Bank Processes Over 2,500 Documents/Hour in Unisys Check Imaging Tests, PR Newswire, p. 0409P8428, 2 pages (Apr. 9, 1991).

"Simplify Reconciliation Using Trace Reassociation Number (TRN) Segment," Emdeon; Jun. 15, 2012. This reference was previously provided under U.S. Appl. No. 14/166,423.

Softchec Licenses 'Envision' Image Solution to West Suburban Bank, PR Newswire, p. 116SETU002, 2 pages (Jan. 16, 1996).

Spencer, "Scanning Goes Vertical: A Big Future for Specialized Check Scanning; Check Scanning Technology," Advanced Imaging, pp. 42-44 (Oct. 1997).

Stanley, P., "Pilot Overview," 8 pages (Apr. 3, 1995).

"Supplement to Authentication in an Internet Banking Environment," Federal Financial Institutions Examination Council, http://www.ffiec.gov/pdf/auth-its-final%206-22-11%20(ffiec%20formated).pdf, pp. 1-12, published 2011.

"SurePOS ACE Electronic Payment Support PRPQ for 4690 OS User's Guide," Version 1, Release 5, IBM, 281 pages (Mar. 2002).

"Suspicious Activity Monitoring—Anti-Money Laundering Solutions," NICE-Actimize, www.niceactimize.com, 4 pages, Mar. 15, 2014.

Technical Volume—Check Image Processing Archive and Retrieval System—Proposal, BancTec, Inc., 469 pages (Jul. 8, 1994).

Ten Dyke, R.P., "Books," IBM Systems Journal, vol. 29, No. 1, pp. 489-490, 2 pages (1990).

Terminal Data to Supply NCR with Document Microfilmers, AT&T News Release, http://www.att.com/news/1093/931013.nca.html, 2 pages (Oct. 13, 1993).

"The Bank Internet Payment System (BIPS): Leading the Way to Electronic Commerce," FSTC, http://www.fstc.org/projects/bips/index.cfm, 3 pages (Downloaded Feb. 27, 2003).

The Check Information Age, Vision Executive Summary Image Archive Forum, Payment System Task Force, 10 pages (Jan. 27, 1998).

The Clearing House, "Healthcare EFT Enrollment, Mar. 25, 2011 Stakeholder Meeting Minutes & Wrap-Up," NACHA—The Electronic Payments Association, pp. 1-22, Apr. 20, 2011.

The Clearing House, "Healthcare EFT Enrollment, Stakeholder Meeting Materials," NACHA—The Electronic Payments Association, pp. 1-43, Mar. 25, 2011.

The Clearing House, "Healthcare EFT Enrollment, Stakeholder Meeting: Pre-read Materials," NACHA—The Electronic Payments Association, pp. 1-21, Mar. 25, 2011.

The Clearing House, "Mayo Clinic Interview," Healthcare EFT Enrollment, NACHA—The Electronic Payments Association, Healthcare EFT Enrollment, pp. 1-6, Mar. 14, 2011.

The New Era of Check Scanning Technology—Introducing Excella, Specifically Designed to Meet the Processing Requirements of Check21, MagTek, Inc., 22 pages (2005).

"The Remaining Barriers to ePayments and Straight-through Processing," Research Conducted Oct. 2001-Mar. 2002 by the Clearing House, the Clearing House, 24 pages.

The Wachovia Story, RDM Corporation, 1 page (Oct. 1993).

Tracey, "IBM Unveils First Stage of Image-check System (product announcement)," Computers in Banking, vol. 7, No. 4, p. 13(3), 3 pages (Apr. 1990).

Tucker, "Broadway Rolls Out Check Imaging System for Community Banks (Broadway & Seymour Inc.)," American Banker, vol. 160, No. 61, p. 14(1), 2 pages (Mar. 30, 1995).

Understanding EDI, 2 pages (Mar. 2, 1996).

Unisys Acquires VisualImpact Solution for Check Processing, Archive & Image Delivery, Business Wire, p. 9181204, 3 pages (Sep. 19, 1997).

Unisys Enhances Check Imager (Unisys Corp. Makes Effort to Appeal to Wider Range of Financial Institutions), American Baker, vol. CLIX, No. 205, p. 15A, 1 page (Oct. 24, 1994).

Unisys Enters Image Processing Market with Two New Products and Major Financial and Industrial Customers. (product announcement), PR Newswire, p. 1011PH009, 3 pages (Oct. 11, 1989).

Unisys Integrates Retail/Wholesale Lockbox Solution for Remittance Processors, Business Wire, p. 03251075, 4 pages (Mar. 25, 1997).

(56) References Cited

OTHER PUBLICATIONS

Unisys Provides Services to Bank of the West to Support Retail Banking, Business Wire, p. 9180098, 2 pages (Sep. 19, 1995).

Unisys Solution will Support Check Processing at Vermont Federal, Business Wire, p. 5201185, 3 pages (May 20, 1996).

Unisys Wins Contract to Supply Imaging Solution to Chase Manhattan/FISERV Check Processing Alliance, Business Wire, p. 6121175, 2 pages (Jun. 12, 1995).

Unix-based lmge Statement Software (Cincinnati Bell Information Systems Inc. introduces lmageBanc II computer software)(Brief Article), ABA Banking Journal, vol. 85, No. 2, p. 80(1), 1 page (Feb. 1993).

Universal Card Purchases BancTec lmageFIRST System, AT&T News Release, http://www.att.com/news/1292/921222.uca.html, 2 pages (Dec. 22, 1992).

U.S. Office Action for U.S. Appl. No. 15/488,848 mailed Aug. 7, 2019.

U.S. Appl. No. 14/926,112, filed Oct. 29, 2015 entitled "Secure Payment Processing".

U.S. Appl. No. 15/970,058, filed May 3, 2018 entitled "Bill Pay Service With Federated Directory Model Support".

Verifone Software Links PCs to the Point of Sale (Brief Article), American Banker, vol. 158, No. 156, p. 13A(1), 2 pages (Aug. 16, 1993).

Vermeire, D.R., "Prosecution of Check Image Patent," letter to Peter Hanna, 1 page (Jul. 11, 1997).

Wachovia Tests NCR's New Imaging Item Processing System, AT&T News Release, http://www.att.com/news/1091/911015.nca.html, 2 pages (Oct. 15, 1991).

Wagner, "Banc One Checks Out Web," Computerworld, vol. 30, No. 35, p. 69, 2 pages (Aug. 26, 1996).

Walter, G. "Making Optical Disk Based Systems Pay," Electronic Imaging '88—Advanced Printing of Paper Summaries, vol. 1, Oct. 3-6, 1988, Boston, MA, 11 pages.

Western Bank Purchases NCR's Document Managing System, AT&T News Release, http://www.att.com/news/0893/930831.nca.html, 3 pages (Aug. 31, 1993).

What Is a Financial Transaction Switch?, NCR Reports—Financial Services Trends & Technologies, NCR Corporation, vol. 1, Issue 6, 6 pages (1997).

Winig, E., "Cracking the Code," Washington Business Journal, vol. 20. No. 11, 2 pages (Jul. 20-26, 2001).

Wong et al., FSTC Check Image Quality Subproject Status and Project Plan Update, 6 pages (May 22, 1996).

You Have Requested Data From 32 Answers—Continue? Y/(N): Y, INSPEC, pp. 175-198 (2001).

"Proposal to Faster Payments Task Force," Faster Payments Qiat, The Clearing House and FIS, Feb. 21, 2017, 170 pages.

Caron, in "The Evolving Payments Landscape," in IEEEE Compute Society, 2018 (Year: 2018).

"TCH Real-Time Payments BAFT/ABA Global Payments Symposium," The ClearingHouse, Jul. 14, 2016, 6 pages.

Davey, Peter, "Real-Time Payments: Addressing Decades-Old Chalenges Facing Treasury Professionals," The ClearingHouse, Mar. 2017, 28 pages.

"Information Interchange 2016—Hit it Out of the Park with Payments!", EastPay, Mar. 2, 2016, 6 pages.

"TCH Real-Time Payments," The ClearingHouse, Mar. 9, 2016, 18 pages.

"TCH Real-Time Payments," The ClearingHouse, Feb. 17, 2016, 12 pages.

"TCH Real-Time Payments Briefing for the OCC," The ClearingHouse, Mar. 18, 2016, 6 pages.

"TCH Real-Time Payments," The ClearingHouse, Oct. 7, 2016, 13 pages.

Ledford, Steve, "Real-time Payments Overview," The ClearingHouse, Oct. 3, 2016, 9 pages.

"Real-Time Payments Operations Playbook, Version 1.01," The ClearingHouse, May 2016, 48 pages.

"TCH Real-Time Payments," The ClearingHouse, Aug. 19, 2016, 17 pages.

"Appendix: Payment Opportunities Detail," The ClearingHouse, Real-time Payments Stockholder Engagement Session, New York, Jun. 14-15, 2016, 46 pages.

"U.S. Real-Time Payments Business Playbook, Version 1.03," The ClearingHouse, Mar. 2016, 45 pages.

"U.S. Real-Time Payments Technology Playbook, Version 1.0," The ClearingHouse, Nov. 2016, 35 pages.

Alan Charles Raul, "Law Business the Privacy, Data Protection and Cybersecurity Law Review," Nov. 2014, 41 pages. Available at: https://www.sidley.com/-/media/files/publications/2014/11/the-privacy-data-protection-and-cybersecurity-la_/files/ united-states/fileattachment/united-states. pdf. (Year: 2014).

Security Standards Council, "Information Supplement: PCI DSS Tokenization Guidelines," Aug. 2011, 23 pages. Available at: https:// listings.pcisecuritystandards.org/documents/Tokenization_ Guidelines_ Info_ Supplement.pdf. (Year: 2011).

* cited by examiner

100

110

END USERS (DEBTOR)

INDIVIDUAL     BUSINESS     GOVERNMENT

DEBTOR FINANCIAL
INSTITUTION

PAYMENTS

TREASURY

111

PAYMENT SERVICE PROVIDERS

114

PACS.008
PAYMENT INSTRUCTION

TO
FIG. 1
CONT. 1

PACS.002
PAYMENT STATUS
(SUCCESS, REJECTED,
PENDING, TIMEOUT)

TO
FIG. 1
CONT. 1

PAIN.013
REQUEST FOR
PAYMENT

TO
FIG. 1
CONT. 1

PAIN.014
RESPONSE TO REQUEST
FOR PAYMENT

TO
FIG. 1
CONT. 1

CAMT.056
REQUEST FOR RETURN
OF FUNDS

TO
FIG. 1
CONT. 1

CAMT.029
RESPONSE TO REQUEST
FOR RETURN OF FUNDS

TO
FIG. 1
CONT. 1

CAMT.027
REQUEST FOR
INFORMATION

TO
FIG. 1
CONT. 1

CAMT.028
RESPONSE TO REQUEST
FOR INFORMATION

TO
FIG. 1
CONT. 1

REMT.001
REMITTANCE ADVICE

TO
FIG. 1
CONT. 1

TBD
SETTLEMENT MESSAGES

TO
FIG. 1
CONT. 1

TBD
SYSTEM & ADMIN
MESSAGES

TO
FIG. 1
CONT. 1

TBD
SETTLEMENT MESSAGES

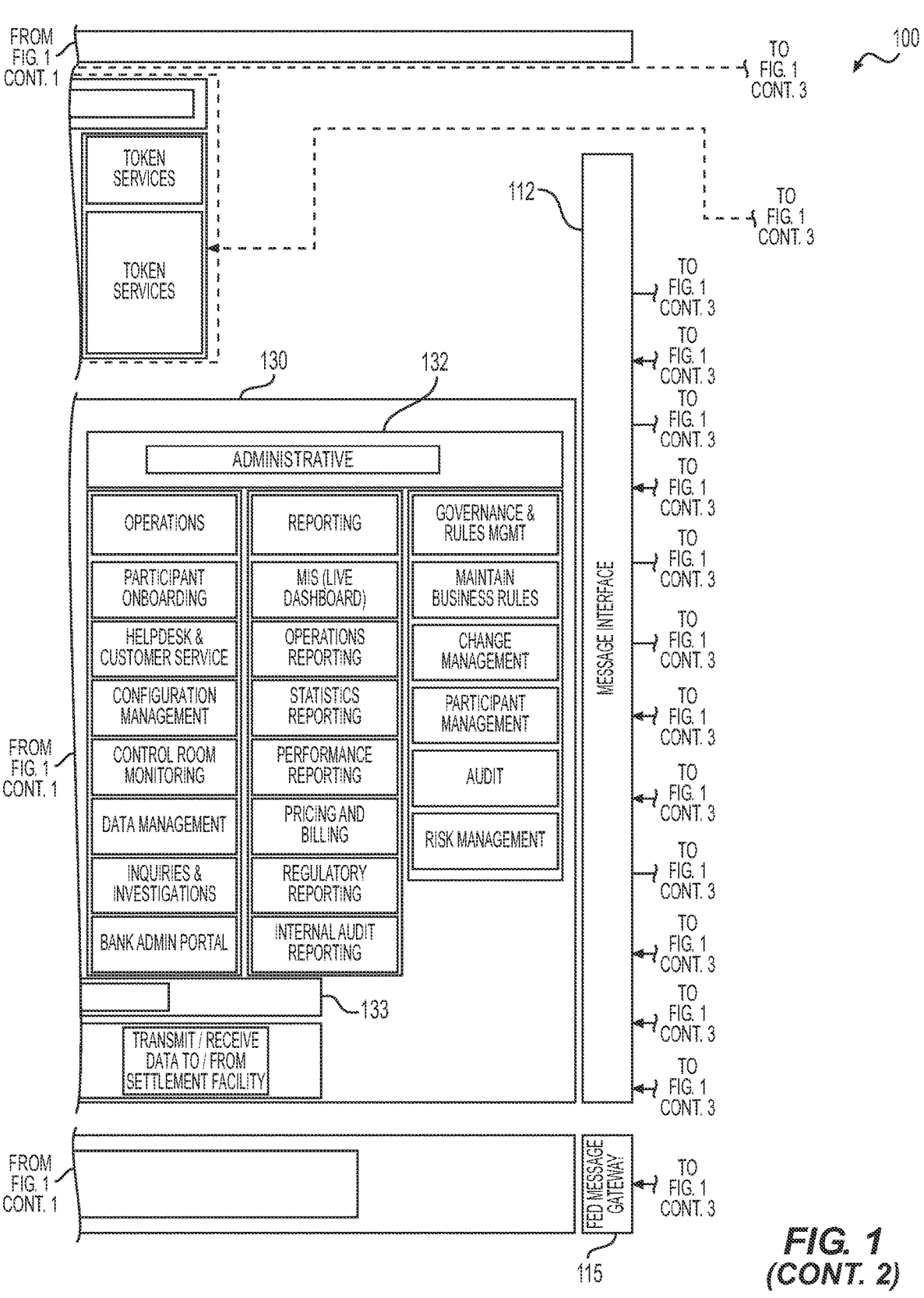

FROM
FIG. 1
CONT. 1

TOKEN
SERVICES

TOKEN
SERVICES

ADMINISTRATIVE

TO
FIG. 1
CONT. 3

| OPERATIONS | REPORTING | GOVERNANCE & RULES MGMT |

TO
FIG. 1
CONT. 3

| PARTICIPANT ONBOARDING | MIS (LIVE DASHBOARD) | MAINTAIN BUSINESS RULES |

TO
FIG. 1
CONT. 3

| HELPDESK & CUSTOMER SERVICE | OPERATIONS REPORTING | CHANGE MANAGEMENT |

TO
FIG. 1
CONT. 3

| CONFIGURATION MANAGEMENT | STATISTICS REPORTING | PARTICIPANT MANAGEMENT |

FROM
FIG. 1
CONT. 1

| CONTROL ROOM MONITORING | PERFORMANCE REPORTING | AUDIT |

TO
FIG. 1
CONT. 3

| DATA MANAGEMENT | PRICING AND BILLING | RISK MANAGEMENT |

TO
FIG. 1
CONT. 3

| INQUIRIES & INVESTIGATIONS | REGULATORY REPORTING | |

TO
FIG. 1
CONT. 3

| BANK ADMIN PORTAL | INTERNAL AUDIT REPORTING | |

MESSAGE INTERFACE

TRANSMIT / RECEIVE
DATA TO / FROM
SETTLEMENT FACILITY

TO
FIG. 1
CONT. 3

FROM
FIG. 1
CONT. 1

FED MESSAGE GATEWAY

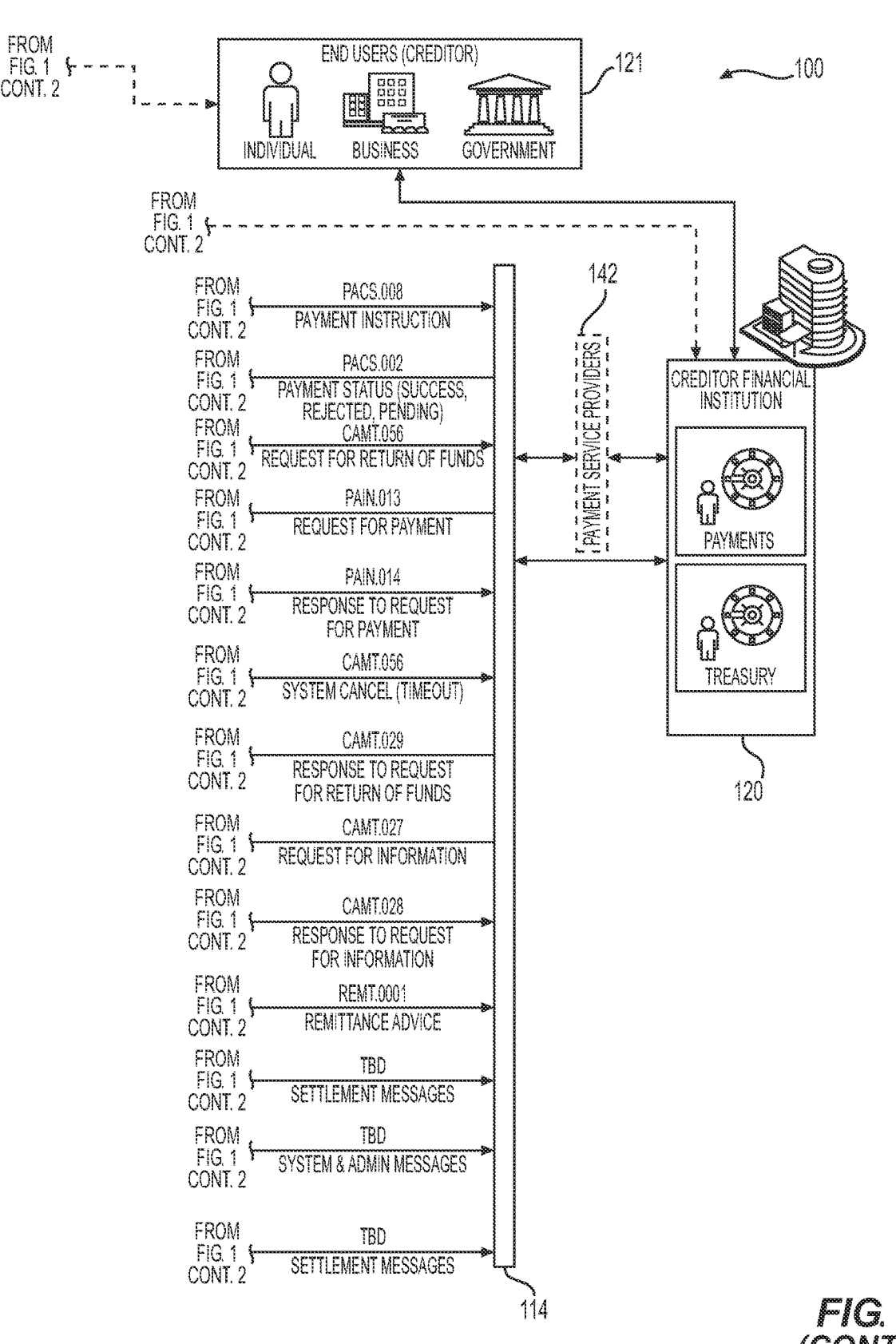

FROM
FIG. 1
CONT. 2

END USERS (CREDITOR)

INDIVIDUAL    BUSINESS    GOVERNMENT

121

100

FROM
FIG. 1
CONT. 2

142

FROM FIG. 1 CONT. 2   PACS.008   PAYMENT INSTRUCTION

FROM FIG. 1 CONT. 2   PACS.002   PAYMENT STATUS (SUCCESS, REJECTED, PENDING)

FROM FIG. 1 CONT. 2   CAMT.056   REQUEST FOR RETURN OF FUNDS

FROM FIG. 1 CONT. 2   PAIN.013   REQUEST FOR PAYMENT

FROM FIG. 1 CONT. 2   PAIN.014   RESPONSE TO REQUEST FOR PAYMENT

FROM FIG. 1 CONT. 2   CAMT.056   SYSTEM CANCEL (TIMEOUT)

FROM FIG. 1 CONT. 2   CAMT.029   RESPONSE TO REQUEST FOR RETURN OF FUNDS

FROM FIG. 1 CONT. 2   CAMT.027   REQUEST FOR INFORMATION

FROM FIG. 1 CONT. 2   CAMT.028   RESPONSE TO REQUEST FOR INFORMATION

FROM FIG. 1 CONT. 2   REMT.0001   REMITTANCE ADVICE

FROM FIG. 1 CONT. 2   TBD   SETTLEMENT MESSAGES

FROM FIG. 1 CONT. 2   TBD   SYSTEM & ADMIN MESSAGES

FROM FIG. 1 CONT. 2   TBD   SETTLEMENT MESSAGES

PAYMENT SERVICE PROVIDERS

CREDITOR FINANCIAL INSTITUTION

PAYMENTS

TREASURY

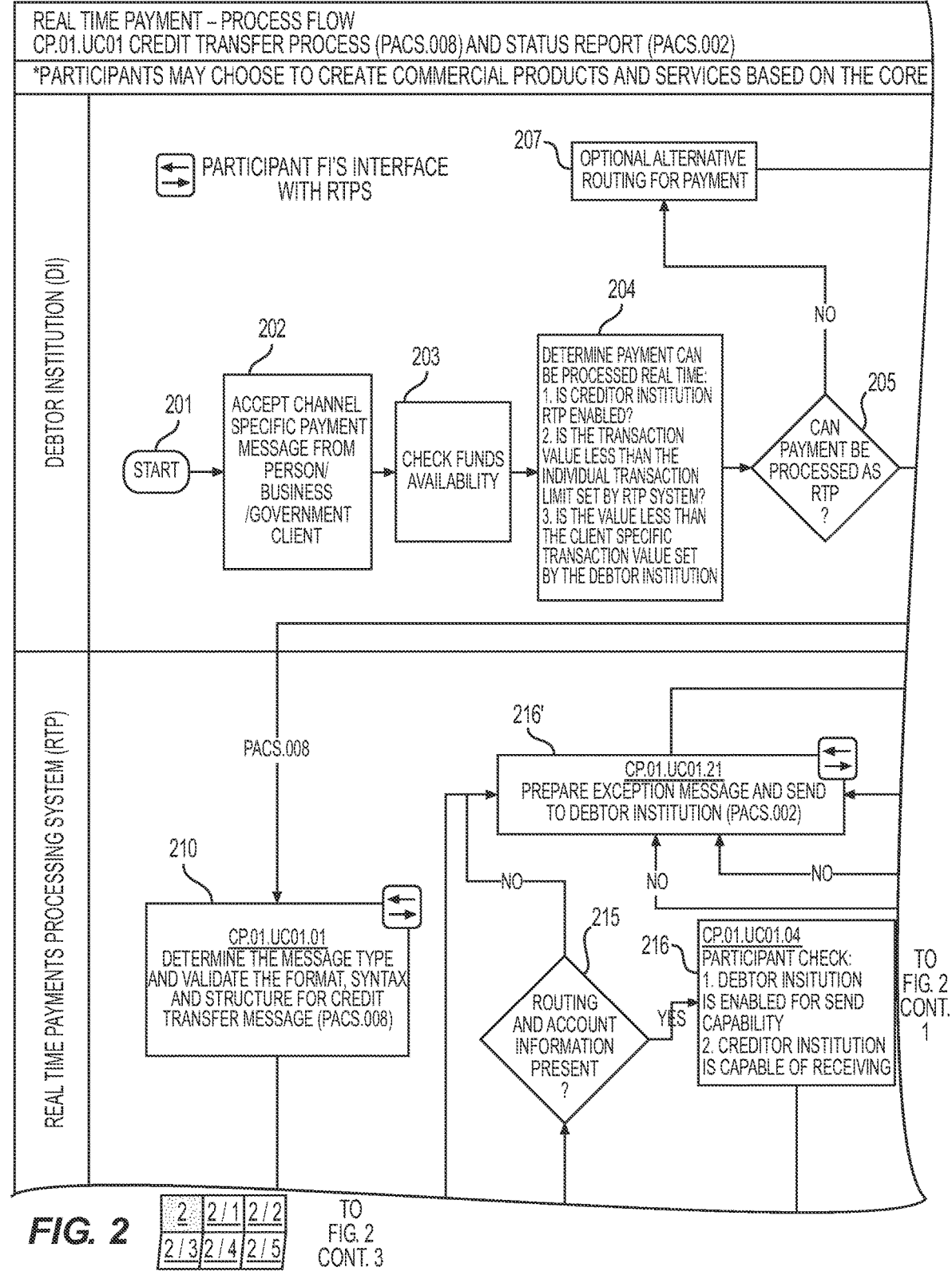

REAL TIME PAYMENT – PROCESS FLOW
CP.01.UC01 CREDIT TRANSFER PROCESS (PACS.008) AND STATUS REPORT (PACS.002)

*PARTICIPANTS MAY CHOOSE TO CREATE COMMERCIAL PRODUCTS AND SERVICES BASED ON THE CORE

PARTICIPANT FI'S INTERFACE WITH RTPS

DEBTOR INSTITUTION (DI)

207 — OPTIONAL ALTERNATIVE ROUTING FOR PAYMENT

201 START

202 ACCEPT CHANNEL SPECIFIC PAYMENT MESSAGE FROM PERSON/ BUSINESS /GOVERNMENT CLIENT

203 CHECK FUNDS AVAILABILITY

204 DETERMINE PAYMENT CAN BE PROCESSED REAL TIME:
1. IS CREDITOR INSTITUTION RTP ENABLED?
2. IS THE TRANSACTION VALUE LESS THAN THE INDIVIDUAL TRANSACTION LIMIT SET BY RTP SYSTEM?
3. IS THE VALUE LESS THAN THE CLIENT SPECIFIC TRANSACTION VALUE SET BY THE DEBTOR INSTITUTION

205 CAN PAYMENT BE PROCESSED AS RTP ?

NO

REAL TIME PAYMENTS PROCESSING SYSTEM (RTP)

PACS.008

210 CP.01.UC01.01 DETERMINE THE MESSAGE TYPE AND VALIDATE THE FORMAT, SYNTAX AND STRUCTURE FOR CREDIT TRANSFER MESSAGE (PACS.008)

216' CP.01.UC01.21 PREPARE EXCEPTION MESSAGE AND SEND TO DEBTOR INSTITUTION (PACS.002)

NO    NO    NO

215 ROUTING AND ACCOUNT INFORMATION PRESENT ?

NO

216 CP.01.UC01.04 PARTICIPANT CHECK:
1. DEBTOR INSITUTION IS ENABLED FOR SEND CAPABILITY
2. CREDITOR INSTITUTION IS CAPABLE OF RECEIVING

YES

TO FIG. 2 CONT. 1

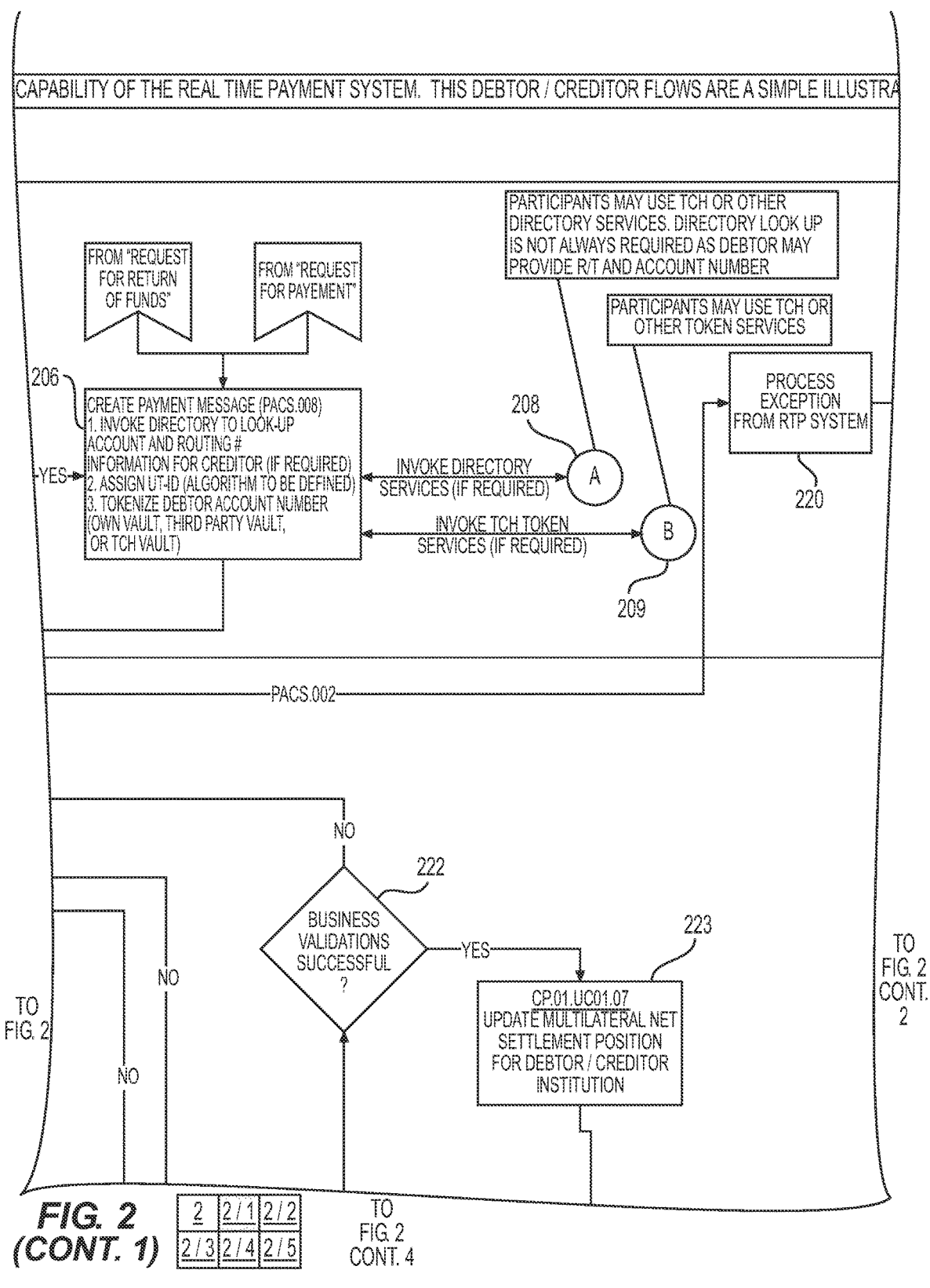
FIG. 2 (CONT. 1)

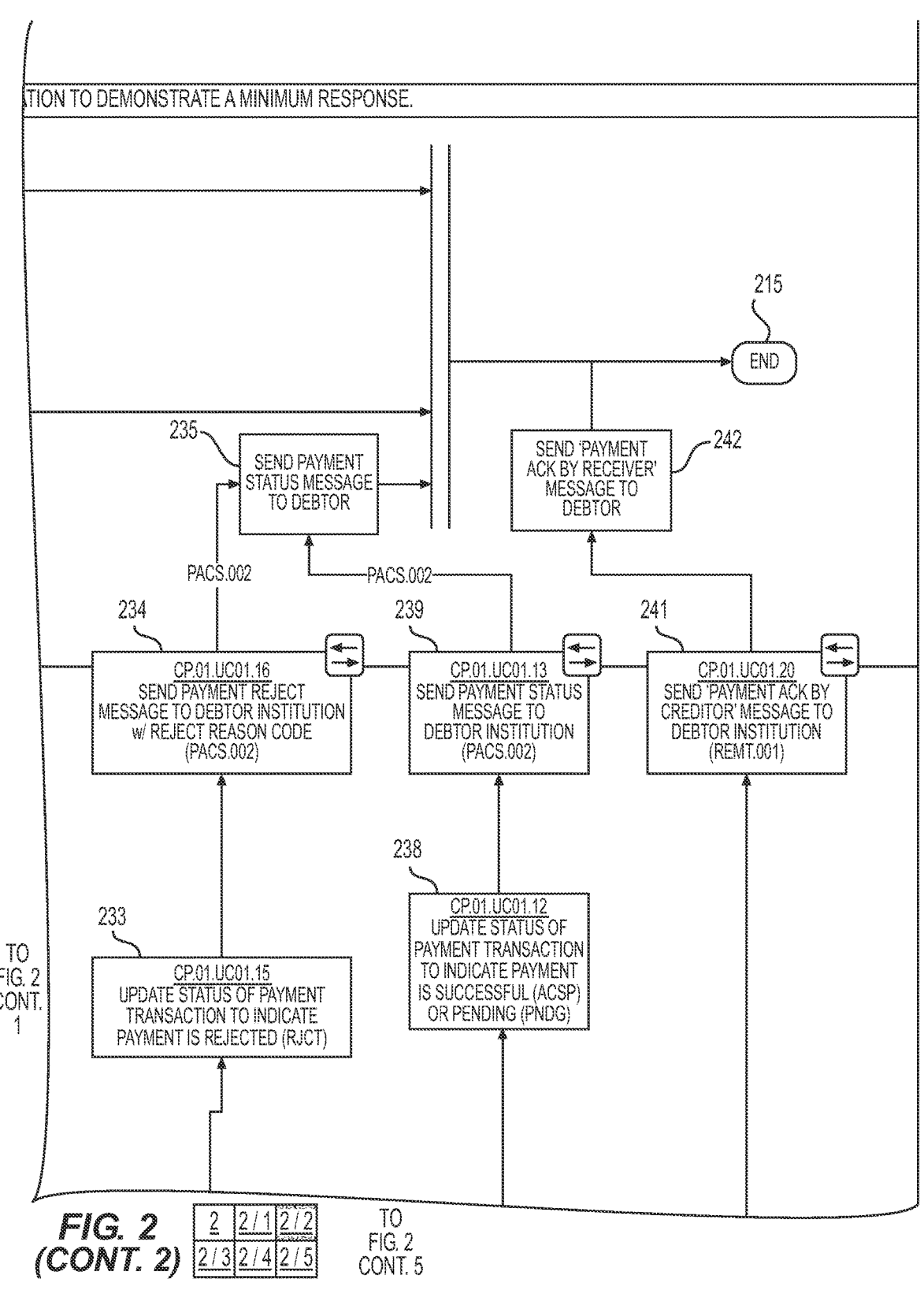

ΓΙΟΝ TO DEMONSTRATE A MINIMUM RESPONSE.

215
END

235
SEND PAYMENT
STATUS MESSAGE
TO DEBTOR

242
SEND 'PAYMENT
ACK BY RECEIVER'
MESSAGE TO
DEBTOR

PACS.002                    PACS.002

234
CP.01.UC01.16
SEND PAYMENT REJECT
MESSAGE TO DEBTOR INSTITUTION
w/ REJECT REASON CODE
(PACS.002)

239
CP.01.UC01.13
SEND PAYMENT STATUS
MESSAGE TO
DEBTOR INSTITUTION
(PACS.002)

241
CP.01.UC01.20
SEND 'PAYMENT ACK BY
CREDITOR' MESSAGE TO
DEBTOR INSTITUTION
(REMT.001)

238
CP.01.UC01.12
UPDATE STATUS OF
PAYMENT TRANSACTION
TO INDICATE PAYMENT
IS SUCCESSFUL (ACSP)
OR PENDING (PNDG)

233
CP.01.UC01.15
UPDATE STATUS OF PAYMENT
TRANSACTION TO INDICATE
PAYMENT IS REJECTED (RJCT)

| 2 | 2/1 | 2/2 |
|---|-----|-----|
| 2/3 | 2/4 | 2/5 |

| 2 | 2 / 1 | 2 / 2 |
|---|---|---|
| 2 / 3 | 2 / 4 | 2 / 5 |

(CONT. 4)**

| 2 | 2/1 | 2/2 |
|---|-----|-----|
| 2/3 | 2/4 | 2/5 |

(CONT. 5)

| 2 | 2/1 | 2/2 |
|---|-----|-----|
| 2/3 | 2/4 | 2/5 |

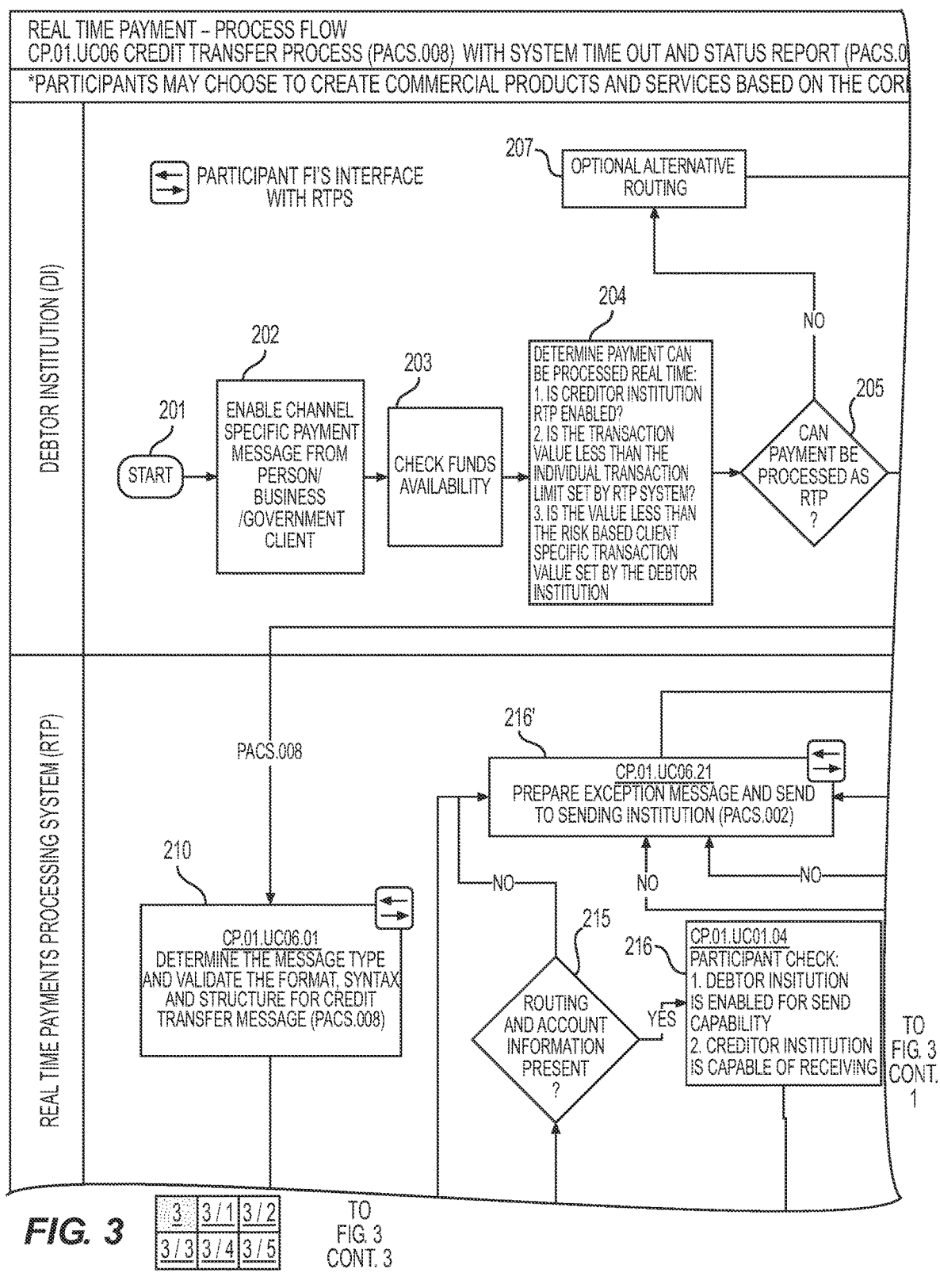

REAL TIME PAYMENT – PROCESS FLOW
CP.01.UC06 CREDIT TRANSFER PROCESS (PACS.008) WITH SYSTEM TIME OUT AND STATUS REPORT (PACS.0

*PARTICIPANTS MAY CHOOSE TO CREATE COMMERCIAL PRODUCTS AND SERVICES BASED ON THE COR

PARTICIPANT FI'S INTERFACE WITH RTPS

207 — OPTIONAL ALTERNATIVE ROUTING

DEBTOR INSTITUTION (DI)

201 — START

202 — ENABLE CHANNEL SPECIFIC PAYMENT MESSAGE FROM PERSON/ BUSINESS /GOVERNMENT CLIENT

203 — CHECK FUNDS AVAILABILITY

204 — DETERMINE PAYMENT CAN BE PROCESSED REAL TIME:
1. IS CREDITOR INSTITUTION RTP ENABLED?
2. IS THE TRANSACTION VALUE LESS THAN THE INDIVIDUAL TRANSACTION LIMIT SET BY RTP SYSTEM?
3. IS THE VALUE LESS THAN THE RISK BASED CLIENT SPECIFIC TRANSACTION VALUE SET BY THE DEBTOR INSTITUTION

205 — CAN PAYMENT BE PROCESSED AS RTP?

NO

REAL TIME PAYMENTS PROCESSING SYSTEM (RTP)

PACS.008

210 — CP.01.UC06.01 DETERMINE THE MESSAGE TYPE AND VALIDATE THE FORMAT, SYNTAX AND STRUCTURE FOR CREDIT TRANSFER MESSAGE (PACS.008)

216' — CP.01.UC06.21 PREPARE EXCEPTION MESSAGE AND SEND TO SENDING INSTITUTION (PACS.002)

215 — ROUTING AND ACCOUNT INFORMATION PRESENT?

NO

NO

NO

216 — CP.01.UC01.04 PARTICIPANT CHECK:
1. DEBTOR INSITUTION IS ENABLED FOR SEND CAPABILITY
2. CREDITOR INSTITUTION IS CAPABLE OF RECEIVING

YES

| 3 | 3/1 | 3/2 |
|---|-----|-----|
| 3/3 | 3/4 | 3/5 |

(CONT. 1)

| 3 | 3 / 1 | 3 / 2 |
|---|---|---|
| 3 / 3 | 3 / 4 | 3 / 5 |

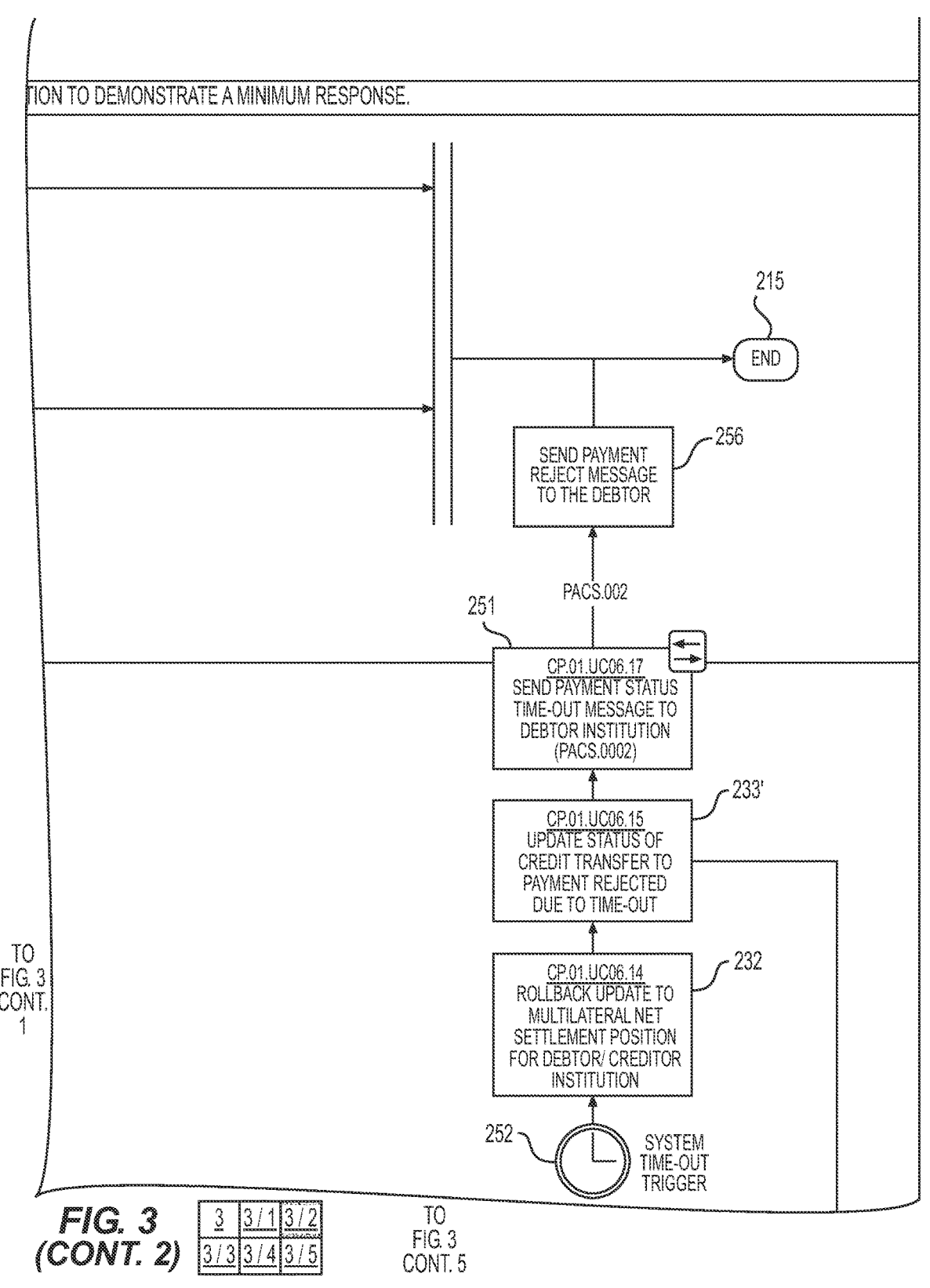

TION TO DEMONSTRATE A MINIMUM RESPONSE.

215

END

256

SEND PAYMENT
REJECT MESSAGE
TO THE DEBTOR

PACS.002

251

CP.01.UC06.17
SEND PAYMENT STATUS
TIME-OUT MESSAGE TO
DEBTOR INSTITUTION
(PACS.0002)

233'

CP.01.UC06.15
UPDATE STATUS OF
CREDIT TRANSFER TO
PAYMENT REJECTED
DUE TO TIME-OUT

232

CP.01.UC06.14
ROLLBACK UPDATE TO
MULTILATERAL NET
SETTLEMENT POSITION
FOR DEBTOR/ CREDITOR
INSTITUTION

252    SYSTEM
TIME-OUT
TRIGGER

| 3 | 3/1 | 3/2 |
|---|-----|-----|
| 3/3 | 3/4 | 3/5 |

| 3 | 3 / 1 | 3 / 2 |
|---|---|---|
| 3 / 3 | 3 / 4 | 3 / 5 |

(CONT. 4)

| 3 | 3/1 | 3/2 |
|---|-----|-----|
| 3/3 | 3/4 | 3/5 |

(CONT. 5)

| 3 | 3/1 | 3/2 |
|---|-----|-----|
| 3/3 | 3/4 | 3/5 |

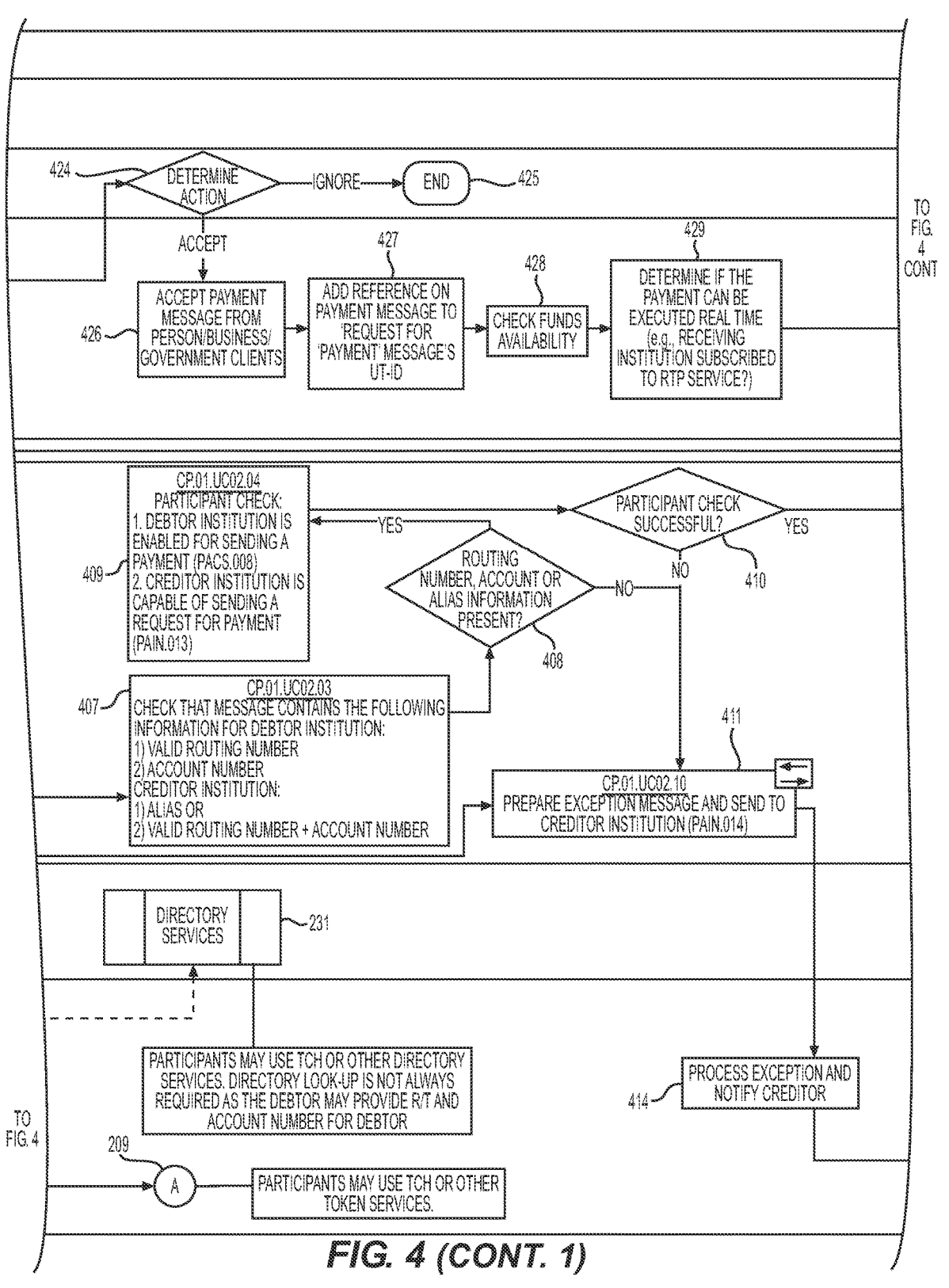
FIG. 4 (CONT. 1)

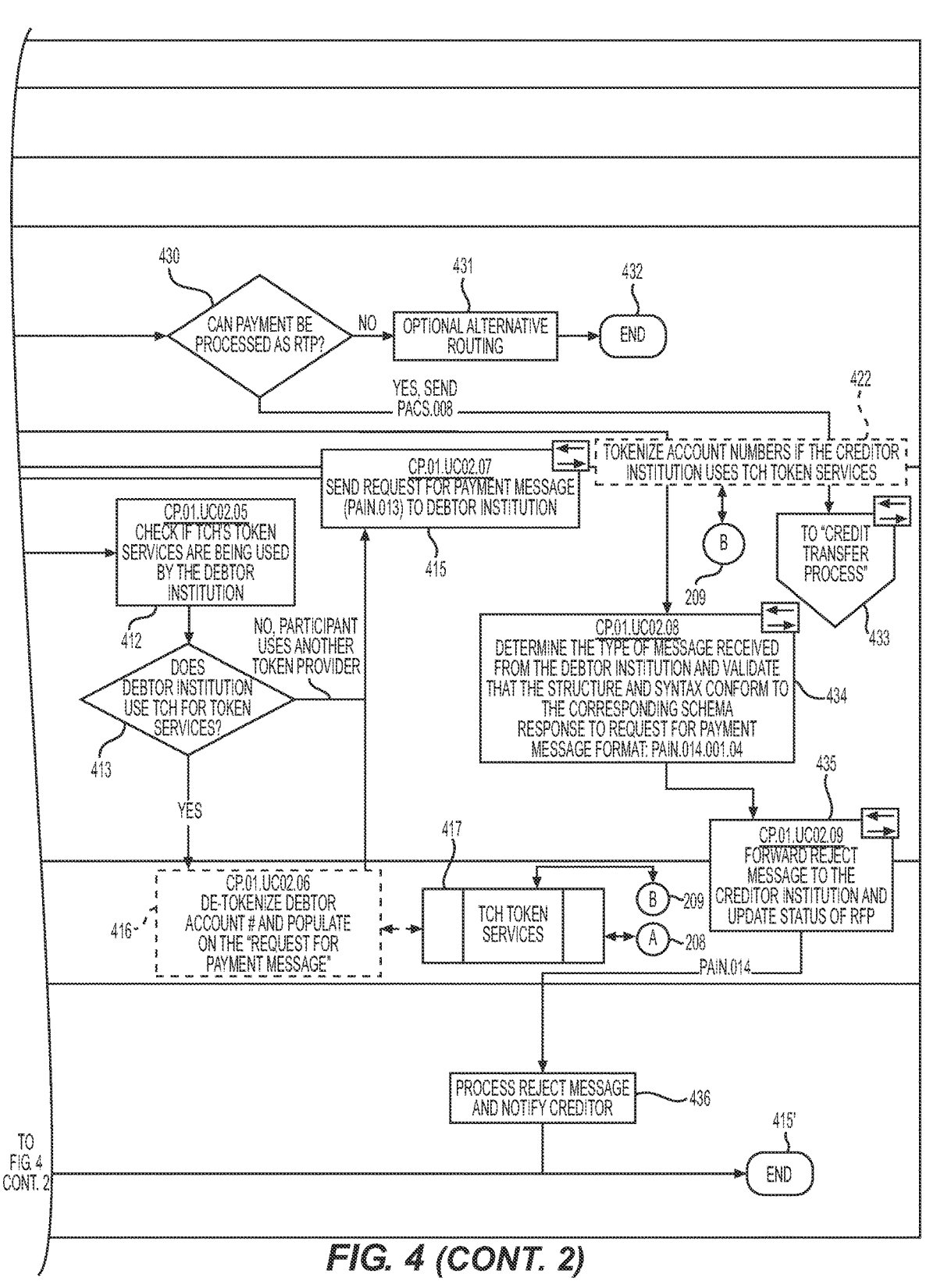
FIG. 4 (CONT. 2)

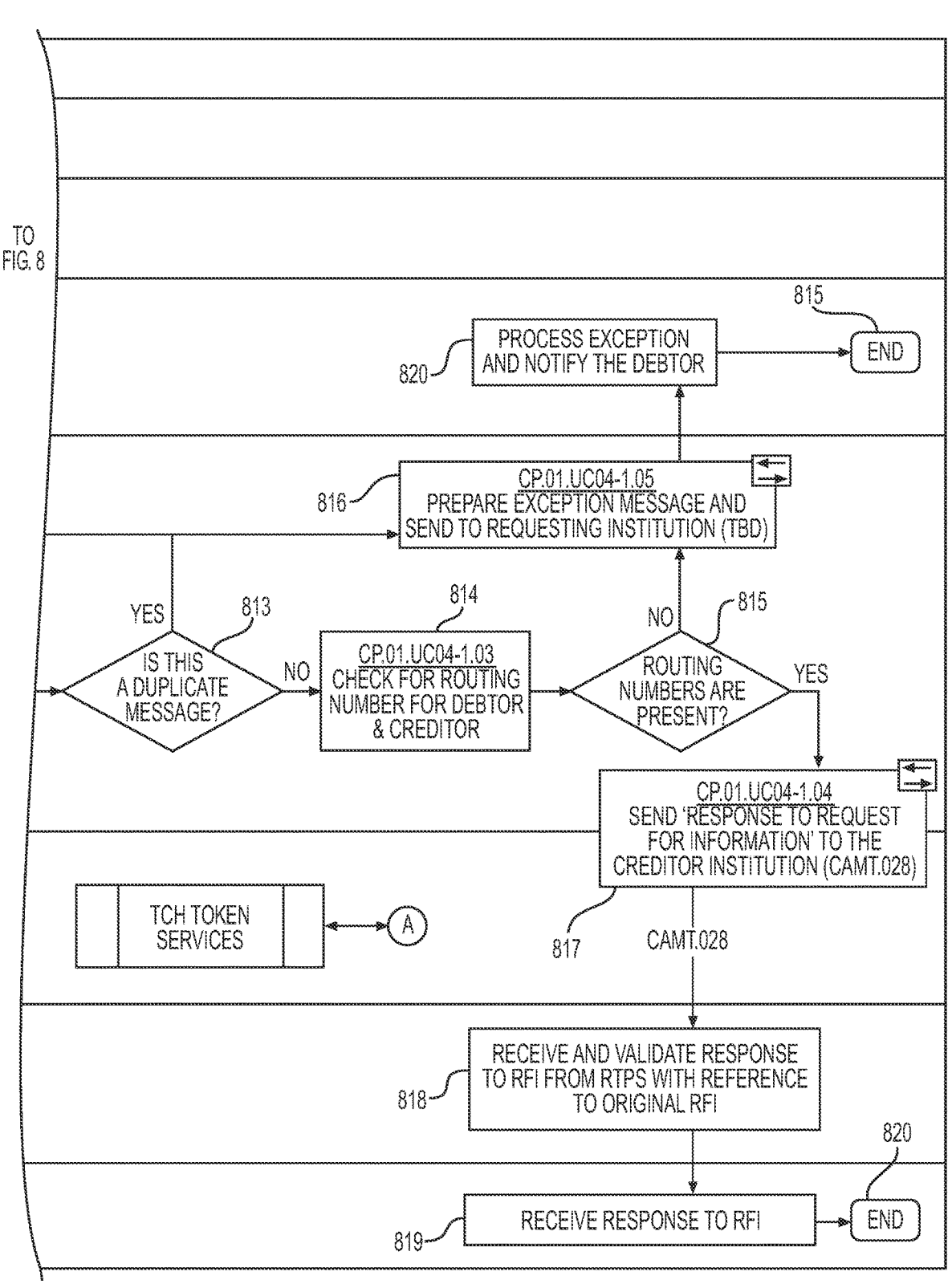

820 — | PROCESS EXCEPTION
AND NOTIFY THE DEBTOR | → ( END )

816 — | CP.01.UC04-1.05
PREPARE EXCEPTION MESSAGE AND
SEND TO REQUESTING INSTITUTION (TBD) |

YES    813

IS THIS
A DUPLICATE
MESSAGE?

814

NO → | CP.01.UC04-1.03
CHECK FOR ROUTING
NUMBER FOR DEBTOR
& CREDITOR | →

NO    815

ROUTING
NUMBERS ARE
PRESENT?

YES

| CP.01.UC04-1.04
SEND 'RESPONSE TO REQUEST
FOR INFORMATION' TO THE
CREDITOR INSTITUTION (CAMT.028) |

817    CAMT.028

TCH TOKEN
SERVICES    ← → ( A )

818 — | RECEIVE AND VALIDATE RESPONSE
TO RFI FROM RTPS WITH REFERENCE
TO ORIGINAL RFI |

820

819 — | RECEIVE RESPONSE TO RFI | → ( END )

FIG. 8 (CONT.)

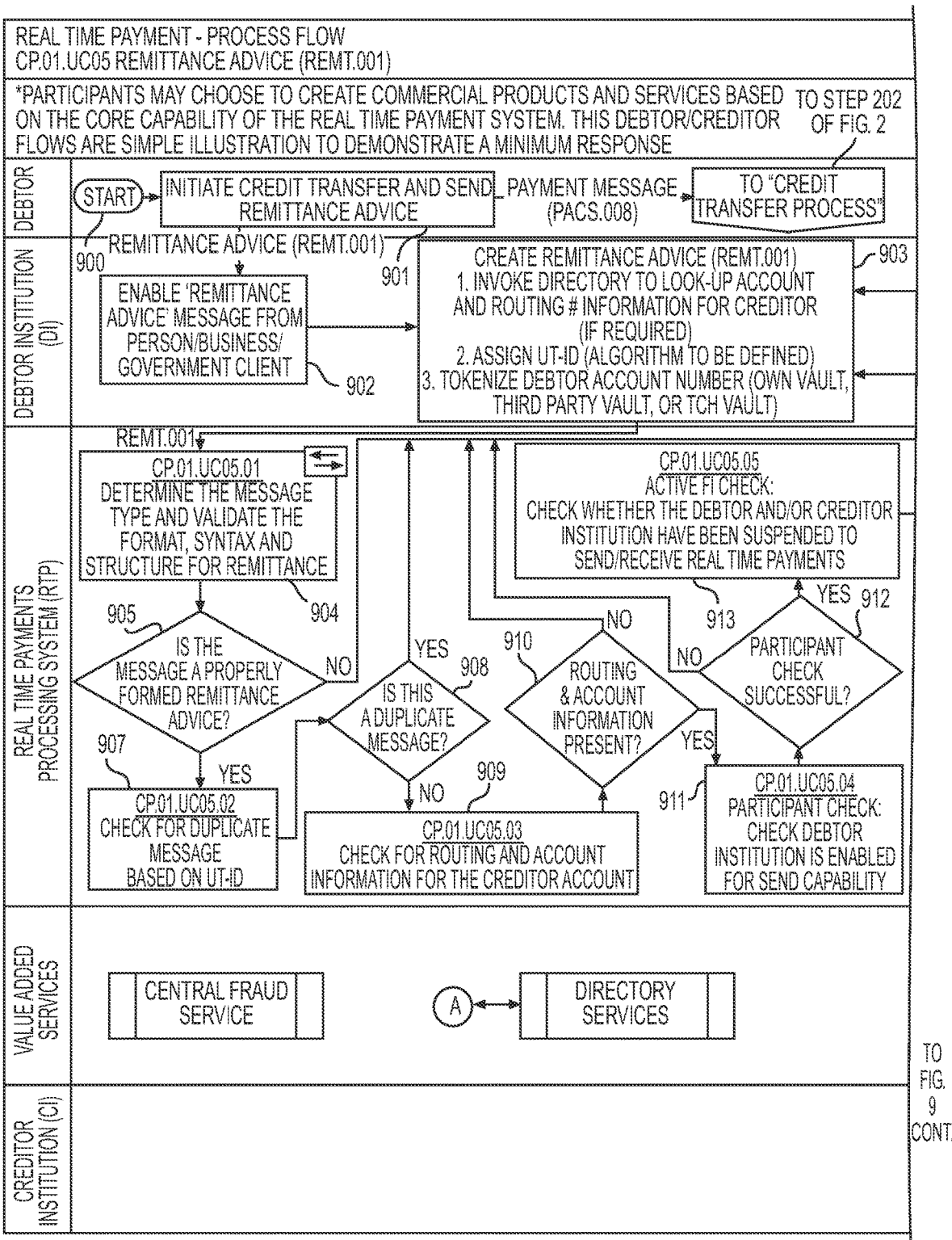

REAL TIME PAYMENT - PROCESS FLOW
CP.01.UC05 REMITTANCE ADVICE (REMT.001)

*PARTICIPANTS MAY CHOOSE TO CREATE COMMERCIAL PRODUCTS AND SERVICES BASED ON THE CORE CAPABILITY OF THE REAL TIME PAYMENT SYSTEM. THIS DEBTOR/CREDITOR FLOWS ARE SIMPLE ILLUSTRATION TO DEMONSTRATE A MINIMUM RESPONSE

TO STEP 202 OF FIG. 2

DEBTOR

START → INITIATE CREDIT TRANSFER AND SEND REMITTANCE ADVICE → PAYMENT MESSAGE (PACS.008) → TO "CREDIT TRANSFER PROCESS"

DEBTOR INSTITUTION (DI)

900 REMITTANCE ADVICE (REMT.001)

ENABLE 'REMITTANCE ADVICE' MESSAGE FROM PERSON/BUSINESS/ GOVERNMENT CLIENT

901

902

CREATE REMITTANCE ADVICE (REMT.001)
1. INVOKE DIRECTORY TO LOOK-UP ACCOUNT AND ROUTING # INFORMATION FOR CREDITOR (IF REQUIRED)
2. ASSIGN UT-ID (ALGORITHM TO BE DEFINED)
3. TOKENIZE DEBTOR ACCOUNT NUMBER (OWN VAULT, THIRD PARTY VAULT, OR TCH VAULT)

903

REAL TIME PAYMENTS PROCESSING SYSTEM (RTP)

REMT.001

CP.01.UC05.01
DETERMINE THE MESSAGE TYPE AND VALIDATE THE FORMAT, SYNTAX AND STRUCTURE FOR REMITTANCE

904

905

IS THE MESSAGE A PROPERLY FORMED REMITTANCE ADVICE?   NO

907   YES

CP.01.UC05.02
CHECK FOR DUPLICATE MESSAGE BASED ON UT-ID

908   YES

IS THIS A DUPLICATE MESSAGE?

909   NO

CP.01.UC05.03
CHECK FOR ROUTING AND ACCOUNT INFORMATION FOR THE CREDITOR ACCOUNT

910   NO

ROUTING & ACCOUNT INFORMATION PRESENT?   YES

911

CP.01.UC05.04
PARTICIPANT CHECK:
CHECK DEBTOR INSTITUTION IS ENABLED FOR SEND CAPABILITY

912   YES

PARTICIPANT CHECK SUCCESSFUL?   NO

913   NO

CP.01.UC05.05
ACTIVE FI CHECK:
CHECK WHETHER THE DEBTOR AND/OR CREDITOR INSTITUTION HAVE BEEN SUSPENDED TO SEND/RECEIVE REAL TIME PAYMENTS

VALUE ADDED SERVICES

CENTRAL FRAUD SERVICE

A   DIRECTORY SERVICES

CREDITOR INSTITUTION (CI)

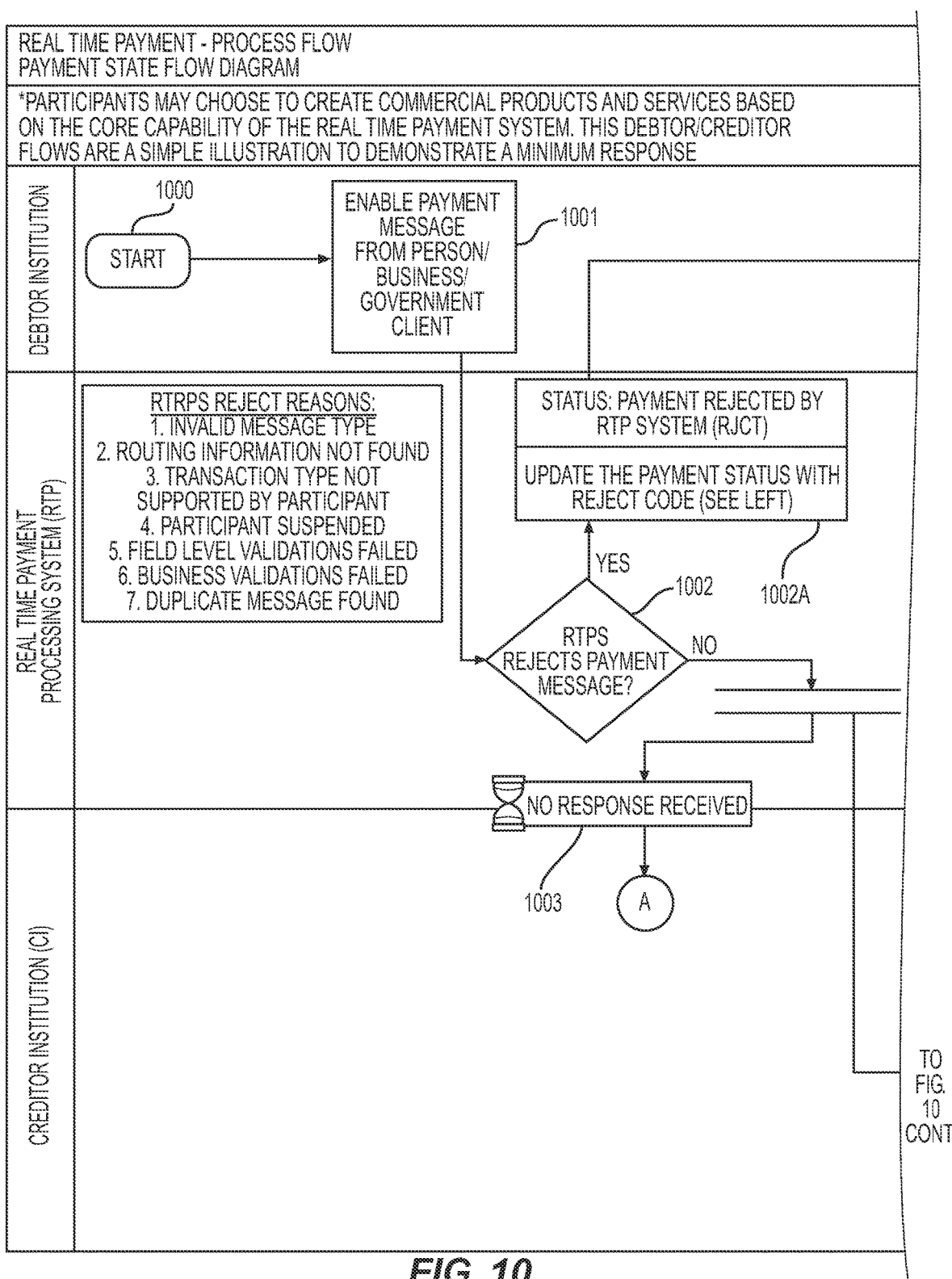

REAL TIME PAYMENT - PROCESS FLOW
PAYMENT STATE FLOW DIAGRAM

*PARTICIPANTS MAY CHOOSE TO CREATE COMMERCIAL PRODUCTS AND SERVICES BASED
ON THE CORE CAPABILITY OF THE REAL TIME PAYMENT SYSTEM. THIS DEBTOR/CREDITOR
FLOWS ARE A SIMPLE ILLUSTRATION TO DEMONSTRATE A MINIMUM RESPONSE

DEBTOR INSTITUTION

1000
START

ENABLE PAYMENT
MESSAGE
FROM PERSON/
BUSINESS/
GOVERNMENT
CLIENT
1001

REAL TIME PAYMENT PROCESSING SYSTEM (RTP)

RTRPS REJECT REASONS:
1. INVALID MESSAGE TYPE
2. ROUTING INFORMATION NOT FOUND
3. TRANSACTION TYPE NOT
SUPPORTED BY PARTICIPANT
4. PARTICIPANT SUSPENDED
5. FIELD LEVEL VALIDATIONS FAILED
6. BUSINESS VALIDATIONS FAILED
7. DUPLICATE MESSAGE FOUND

STATUS: PAYMENT REJECTED BY
RTP SYSTEM (RJCT)

UPDATE THE PAYMENT STATUS WITH
REJECT CODE (SEE LEFT)
1002A

YES

RTPS
REJECTS PAYMENT
MESSAGE?
1002

NO

NO RESPONSE RECEIVED

1003

A

CREDITOR INSTITUTION (CI)

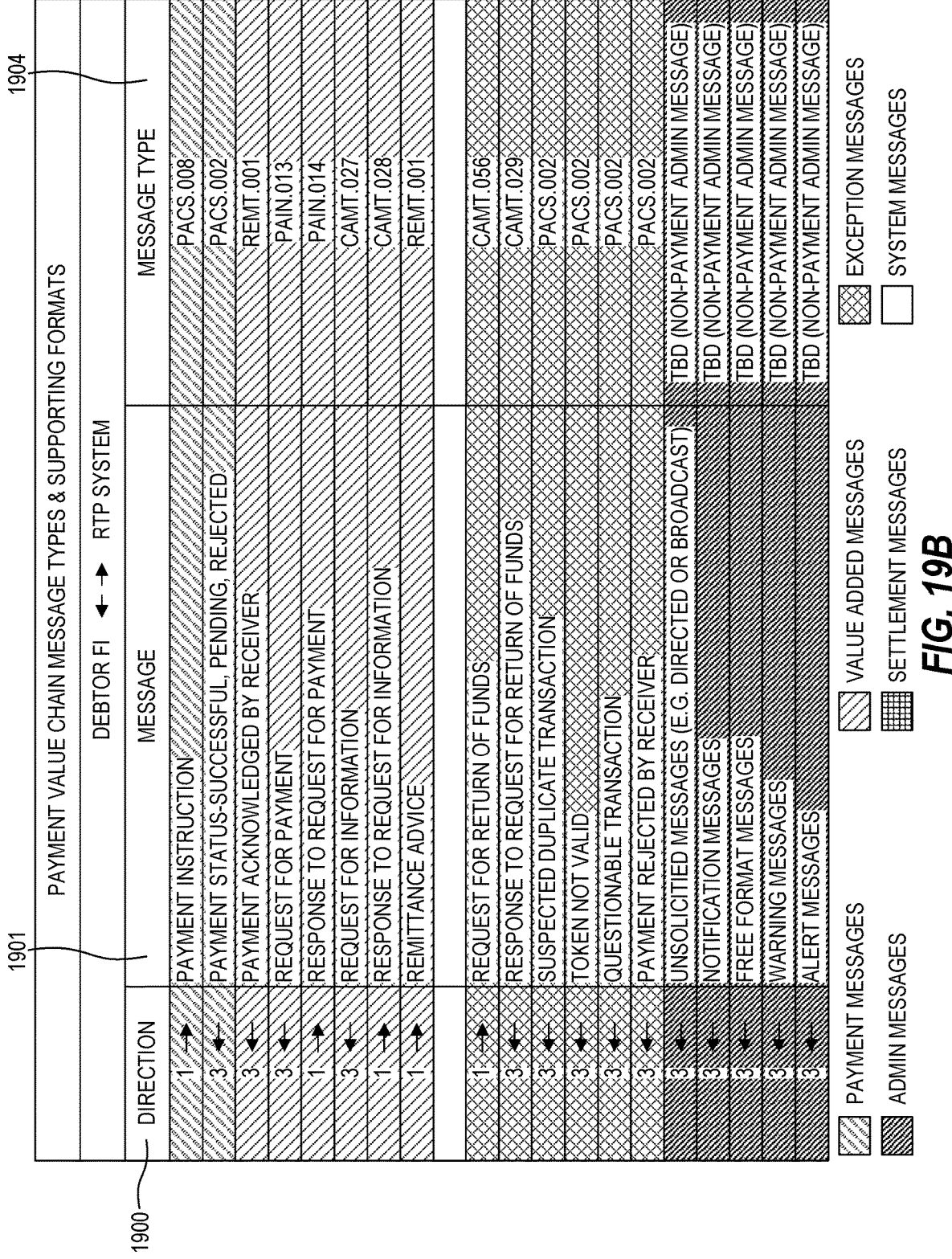

PAYMENT VALUE CHAIN MESSAGE TYPES & SUPPORTING FORMATS

DEBTOR FI　←→　RTP SYSTEM

| DIRECTION | MESSAGE | MESSAGE TYPE |
|---|---|---|
| ↑ 1 | PAYMENT INSTRUCTION | PACS.008 |
| ↓ 3 | PAYMENT STATUS-SUCCESSFUL, PENDING, REJECTED | PACS.002 |
| ↓ 3 | PAYMENT ACKNOWLEDGED BY RECEIVER | REMT.001 |
| ↑ 3 | REQUEST FOR PAYMENT | PAIN.013 |
| ↑ 1 | RESPONSE TO REQUEST FOR PAYMENT | PAIN.014 |
| ↓ 3 | REQUEST FOR INFORMATION | CAMT.027 |
| ↑ 1 | RESPONSE TO REQUEST FOR INFORMATION | CAMT.028 |
| ↑ 1 | REMITTANCE ADVICE | REMT.001 |
| ↑ 1 | REQUEST FOR RETURN OF FUNDS | CAMT.056 |
| ↓ 3 | RESPONSE TO REQUEST FOR RETURN OF FUNDS | CAMT.029 |
| ↓ 3 | SUSPECTED DUPLICATE TRANSACTION | PACS.002 |
| ↓ 3 | TOKEN NOT VALID | PACS.002 |
| ↓ 3 | QUESTIONABLE TRANSACTION | PACS.002 |
| ↓ 3 | PAYMENT REJECTED BY RECEIVER | PACS.002 |
| ↓ 3 | UNSOLICITIED MESSAGES (E.G. DIRECTED OR BROADCAST) | TBD (NON-PAYMENT ADMIN MESSAGE) |
| ↓ 3 | NOTIFICATION MESSAGES | TBD (NON-PAYMENT ADMIN MESSAGE) |
| ↓ 3 | FREE FORMAT MESSAGES | TBD (NON-PAYMENT ADMIN MESSAGE) |
| ↓ 3 | WARNING MESSAGES | TBD (NON-PAYMENT ADMIN MESSAGE) |
| ↓ 3 | ALERT MESSAGES | TBD (NON-PAYMENT ADMIN MESSAGE) |

PAYMENT MESSAGES
ADMIN MESSAGES
VALUE ADDED MESSAGES
SETTLEMENT MESSAGES
EXCEPTION MESSAGES
SYSTEM MESSAGES

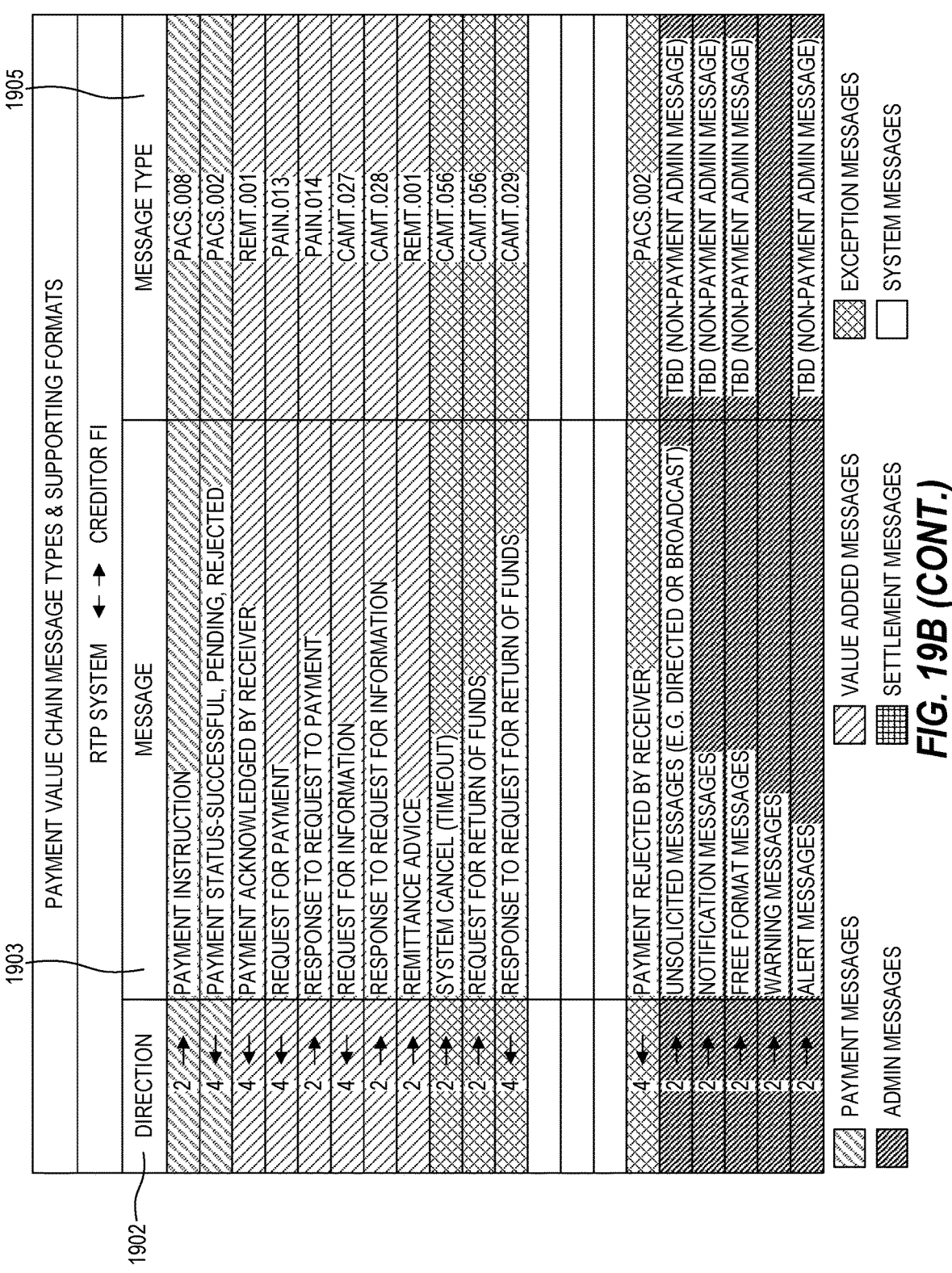

PAYMENT VALUE CHAIN MESSAGE TYPES & SUPPORTING FORMATS

RTP SYSTEM    ← →    CREDITOR FI

| DIRECTION | MESSAGE | MESSAGE TYPE |
|---|---|---|
| 2 → | PAYMENT INSTRUCTION | PACS.008 |
| 4 ← | PAYMENT STATUS-SUCCESSFUL, PENDING, REJECTED | PACS.002 |
| 4 ← | PAYMENT ACKNOWLEDGED BY RECEIVER | REMT.001 |
| 4 ← | REQUEST FOR PAYMENT | PAIN.013 |
| 2 → | RESPONSE TO REQUEST TO PAYMENT | PAIN.014 |
| 4 ← | REQUEST FOR INFORMATION | CAMT.027 |
| 2 → | RESPONSE TO REQUEST FOR INFORMATION | CAMT.028 |
| 2 → | REMITTANCE ADVICE | REMT.001 |
| 2 → | SYSTEM CANCEL (TIMEOUT) | CAMT.056 |
| 2 → | REQUEST FOR RETURN OF FUNDS | CAMT.056 |
| 4 ← | RESPONSE TO REQUEST FOR RETURN OF FUNDS | CAMT.029 |
| 4 ← | PAYMENT REJECTED BY RECEIVER | PACS.002 |
| 2 → | UNSOLICITED MESSAGES (E.G. DIRECTED OR BROADCAST) | TBD (NON-PAYMENT ADMIN MESSAGE) |
| 2 → | NOTIFICATION MESSAGES | TBD (NON-PAYMENT ADMIN MESSAGE) |
| 2 → | FREE FORMAT MESSAGES | TBD (NON-PAYMENT ADMIN MESSAGE) |
| 2 → | WARNING MESSAGES | |
| 2 → | ALERT MESSAGES | TBD (NON-PAYMENT ADMIN MESSAGE) |

PAYMENT MESSAGES

ADMIN MESSAGES

VALUE ADDED MESSAGES

SETTLEMENT MESSAGES

EXCEPTION MESSAGES

SYSTEM MESSAGES

*FIG. 19B (CONT.)*

REAL TIME PAYMENTS
EXTERNAL STATUS REASON CODES

| # | MESSAGE TYPE | ISO CODE | NAME | DEFINITION | BANK OR RTP |
|---|---|---|---|---|---|
| 1 | PACS.002.001.06 | AC01 | INCORRECTACCOUNTNUMBER | ACCOUNT NUMBER IS INVALID OR MISSING | BOTH |
| 2 | PACS.002.001.06 | AC02 | INVALIDDEBTORACCOUNTNUMBER | DEBTOR ACCOUNT NUMBER INVALID OR MISSING | BOTH |
| 3 | PACS.002.001.06 | AC03 | INVALIDCREDITORACCOUNTNUMBER | CREDITOR ACCOUNT NUMBER INVALID OR MISSING | BOTH |
| 4 | PACS.002.001.06 | AC04 | CLOSEDACCOUNTNUMBER | ACCOUNT NUMBER SPECIFIED HAS BEEN CLOSED ON THE BANK OF ACCOUNT'S BOOKS | BANK |
| 5 | PACS.002.001.06 | AC06 | BLOCKEDACCOUNT | ACCOUNT SPECIFIED IS BLOCKED, PROHIBITING POSTING OF TRANSACTIONS AGAINST IT | BANK |
| 6 | PACS.002.001.06 | AC07 | CLOSEDCREDITORACCOUNTNUMBER | CREDITOR ACCOUNT NUMBER CLOSED | BANK |
| 7 | PACS.002.001.06 | AC08 | INVALIDBRANCHCODE | BRANCH CODE IS INVALID OR MISSING | BANK |
| 8 | PACS.002.001.06 | AC10 | INVALIDDEBTORACCOUNTCURRENCY | DEBTOR ACCOUNT CURRENCY IS INVALID OR MISSING | BANK |
| 9 | PACS.002.001.06 | AC11 | INVALIDCREDITORACCOUNTCURRENCY | CREDITOR ACCOUNT CURRENCY IS INVALID OR MISSING | BANK |
| 10 | PACS.002.001.06 | AC13 | INVALIDDEBTORACCOUNTTYPE | DEBTOR ACCOUNT TYPE IS MISSING OR INVALID | BOTH |
| 11 | PACS.002.001.06 | AC14 | INVALIDCREDITORACCOUNTTYPE | CREDITOR ACCOUNT TYPE IS MISSING OR INVALID | BOTH |
| 12 | PACS.002.001.06 | AG01 | TRANSACTIONFORBIDDEN | TRANSACTION FORBIDDEN ON THIS TYPE OF ACCOUNT (FORMERLY NOAGREEMENT) | TCH |
| 13 | PACS.002.001.06 | AG03 | TRANSACTIONNOTSUPPORTED | TRANSACTION TYPE NOT SUPPORTED/AUTHORIZED ON THIS ACCOUNT | BANK |
| 14 | PACS.002.001.06 | AG05 | INVALIDDEBTORAGENTCOUNTRY | DEBTOR AGENT COUNTRY CODE IS MISSING OR INVALID | TCH |
| 15 | PACS.002.001.06 | AG06 | INVALIDCREDITORAGENTCOUNTRY | CREDITOR AGENT COUNTRY CODE IS MISSING OR INVALID | TCH |
| 16 | PACS.002.001.06 | AM01 | ZEROAMOUNT | SPECIFIED MESSAGE AMOUNT IS EQUAL TO ZERO | TBD |
| 17 | PACS.002.001.06 | AM02 | NOTALLOWEDAMOUNT | SPECIFIC TRANSACTION/MESSAGE AMOUNT IS GREATER THAN ALLOWED MAXIMUM | TCH |
| 18 | PACS.002.001.06 | AM04 | INSUFFICIENTFUNDS | AMOUNT OF FUNDS AVAILABLE TO COVER SPECIFIED MESSAGE AMOUNT IS INSUFFICIENT | BOTH |
| 19 | PACS.002.001.06 | AM09 | WRONGAMOUNT | AMOUNT RECEIVED IS NOT THE AMOUNT AGREED OR EXPECTED | BANK |
| 20 | PACS.002.001.06 | AM11 | INVALIDTRANSACTIONCURRENCY | TRANSACTION CURRENCY IS INVALID OR MISSING | BANK |
| 21 | PACS.002.001.06 | AM12 | INVALIDAMOUNT | AMOUNT IS INVALID OR MISSING | BOTH |
| 22 | PACS.002.001.06 | AM13 | AMOUNTEXCEEDSCLEARINGSYSTEMLIMIT | TRANSACTION AMOUNT EXCEEDS LIMITS SET BY CLEARING SYSTEM | BOTH |
| 23 | PACS.002.001.06 | AM14 | AMOUNTEXCEEDSAGREEDLIMIT | TRANSACTION AMOUNT EXCEEDS LIMITS AGREED BETWEEN BANK AND CLIENT | TCH |
| 24 | PACS.002.001.06 | BE04 | MISSINGCREDITORADDRESS | SPECIFICATION OF CREDITOR'S ADDRESS, WHICH IS REQUIRED FOR PAYMENT, IS MISSING/NOT CORRECT (FORMERLY INCORRECTCREDITORADDRESS) | BOTH |
| 25 | PACS.002.001.06 | BE06 | UNKNOWNENDCUSTOMER | END CUSTOMER SPECIFIED IS NOT KNOWN AT ASSOCIATED SORT/NATIONAL BANK CODE OR DOES NO LONGER EXIST IN THE BOOKS | BANK |

REAL TIME PAYMENTS
EXTERNAL STATUS REASON CODES

| # | MESSAGE TYPE | ISO CODE | NAME | DEFINITION | BANK OR RTP |
|---|---|---|---|---|---|
| 26 | PACS.002.001.06 | BE07 | MISSINGDEBTORADDRESS | SPECIFICATION OF DEBTOR'S ADDRESS, WHICH IS REQUIRED FOR PAYMENT IS MISSING/NOT CORRECT | BOTH |
| 27 | PACS.002.001.06 | BE08 | MISSINGDEBTORNAME | DEBTORS NAME IS MISSING | BOTH |
| 28 | PACS.002.001.06 | BE10 | INVALIDDEBTORCOUNTRY | DEBTOR COUNTRY CODE IS MISSING OR INVALID | BOTH |
| 29 | PACS.002.001.06 | BE11 | INVALIDCREDITORCOUNTRY | CREDITOR COUNTRY CODE IS MISSING OR INVALID | BOTH |
| 30 | PACS.002.001.06 | BE13 | INVALIDDEBTORCOUNTRYOFRESIDENCE | COUNTRY CODE OF DEBTORS RESIDENCE IS MISSING OR INVALID | BOTH |
| 31 | PACS.002.001.06 | BE14 | INVALIDCREDITORCOUNTRYOFRESIDENCE | COUNTRY CODE OF CREDITOR'S RESIDENCE IS MISSING OR INVALID | BOTH |
| 32 | PACS.002.001.06 | BE16 | INVALIDDEBTORIDENTIFICATIONCODE | DEBTOR OR ULTIMATE DEBTOR IDENTIFICATION CODE MISSING OR INVALID | BOTH |
| 33 | PACS.002.001.06 | BE17 | INVALIDCREDITORIDENTIFICATIONCODE | CREDITOR OR ULTIMATE CREDITOR IDENTIFICATION CODE MISSING OR INVALID | BOTH |
| 34 | PACS.002.001.06 | BE22 | MISSINGCREDITORNAME | CREDITOR NAME IS MISSING | BOTH |
| 35 | PACS.002.001.06 | CH15 | ELEMENTCONTENTINCLUDESMORETHAN140CHARACTERS | CONTENT REMITTANCE INFORMATION/STRUCTURED INCLUDES MORE THAN 140 CHARACTERS | BOTH |
| 36 | PACS.002.001.06 | DS24 | WAITINGTIMEEXPIRED | WAITING TIME EXPIRED DUE TO INCOMPLETE ORDER | TCH |
| 37 | PACS.002.001.06 | DT02 | INVALIDCREATIONDATE | INVALID CREATION DATE AND TIME IN GROUP HEADER (EG. HISTORIC DATE) | BOTH |
| 38 | PACS.002.001.06 | DT03 | INVALIDNONPROCESSINGDATE | INVALID NON BANK PROCESSING DATE (EG. WEEKEND OR LOCAL PUBLIC HOLIDAY) | TCH |
| 39 | PACS.002.001.06 | DT04 | FUTUREDATENOTSUPPORTED | FUTURE DATE NOT SUPPORTED | TCH |
| 40 | PACS.002.001.06 | DU01 | DUPLICATEMESSAGEID | MESSAGE IDENTIFICATION IS NOT UNIQUE | TCH |
| 41 | PACS.002.001.06 | DU02 | DUPLICATEPAYMENTINFORMATIONID | PAYMENT INFORMATION BLOCK IS NOT UNIQUE. | TCH |
| 42 | PACS.002.001.06 | DU03 | DUPLICATETRANSACTION | TRANSACTION IS NOT UNIQUE | TCH |
| 43 | PACS.002.001.06 | DU04 | DUPLICATEENDTOEND | END TO END ID IS NOT UNIQUE | TCH |
| 44 | PACS.002.001.06 | DU05 | DUPLICATEINSTRUCTIONID | INSTRUCTION ID IS NOT UNIQUE. | TCH |
| 45 | PACS.002.001.06 | DUPL | DUPLICATEPAYMENT | PAYMENT IS A DUPLICATE OF ANOTHER PAYMENT | TCH |
| 46 | PACS.002.001.06 | FF02 | SYNTAXERROR | SYNTAX ERROR REASON IS PROVIDED AS NARRATIVE INFORMATION IN THE ADDITIONAL REASON INFORMATION. | TCH |
| 47 | PACS.002.001.06 | FF03 | INVALIDPAYMENTTYPEINFORMATION | PAYMENT TYPE INFORMATION IS MISSING OR INVALID. | TCH |
| 48 | PACS.002.001.06 | FF04 | SYNTAXERROR | SYNTAX ERROR REASON IS PROVIDED AS NARRATIVE INFORMATION IN THE ADDITIONAL REASON INFORMATION. | TCH |
| 49 | PACS.002.001.06 | FF06 | INVALIDCATEGORYPURPOSECODE | CATEGORY PURPOSE CODE IS MISSING OR INVALID | TCH |
| 50 | PACS.002.001.06 | FF07 | INVALIDPURPOSE | PURPOSE IS MISSING OR INVALID | TCH |
| 51 | PACS.002.001.06 | FF08 | INVALIDENDTOENDID | END TO END ID MISSING OR INVALID | TCH |
| 52 | PACS.002.001.06 | MD07 | ENDCUSTOMERDECEASED | END CUSTOMER IS DECEASED | BANK |

REAL TIME PAYMENTS 2000
EXTERNAL STATUS REASON CODES

| # | MESSAGE TYPE | ISO CODE | NAME | DEFINITION | BANK OR RTP |
|---|---|---|---|---|---|
| 53 | PACS.002.001.06 | NARR | NARRATIVE | REASON IS PROVIDED AS NARRATIVE INFORMATION IN THE ADDITIONAL REASON INFORMATION | BOTH |
| 54 | PACS.002.001.06 | RC03 | INVALIDDEBTORBANKIDENTIFIER | DEBTOR BANK IDENTIFIER IS INVALID OR MISSING | TCH |
| 55 | PACS.002.001.06 | RC04 | INVALIDCREDITORBANKIDENTIFIER | CREDITOR BANK IDENTIFIER IS INVALID OR MISSING | TCH |
| 56 | PACS.002.001.06 | RR02 | MISSING DEBTOR NAME OR ADDRESS | SPECIFICATION OF THE DEBTOR'S NAME AND/OR ADDRESS NEEDED FOR REGULATORY REQUIREMENTS IS INSUFFICIENT OR MISSING. | BOTH |
| 57 | PACS.002.001.06 | RR03 | MISSING CREDITOR NAME OR ADDRESS | SPECIFICATION OF THE CREDITOR'S NAME AND/OR ADDRESS NEEDED FOR REGULATORY REQUIREMENTS IS INSUFFICIENT OR MISSING. | BOTH |
| 58 | PACS.002.001.06 | RR07 | REMITTANCEINFORMATIONINVALID | REMITTANCE INFORMATION STRUCTURE DOES NOT COMPLY WITH RULES FOR PAYMENT TYPE. | TCH |
| 59 | PACS.002.001.06 | RR10 | INVALIDCHARACTERSET | CHARACTER SET SUPPLIED NOT VALID FOR THE COUNTRY AND PAYMENT TYPE. | TCH |
| 60 | PACS.002.001.06 | TS01 | TRANSMISSIONSUCCESSFUL | THE (TECHNICAL) TRANSMISSION OF THE FILE WAS SUCCESSFUL. | BOTH |

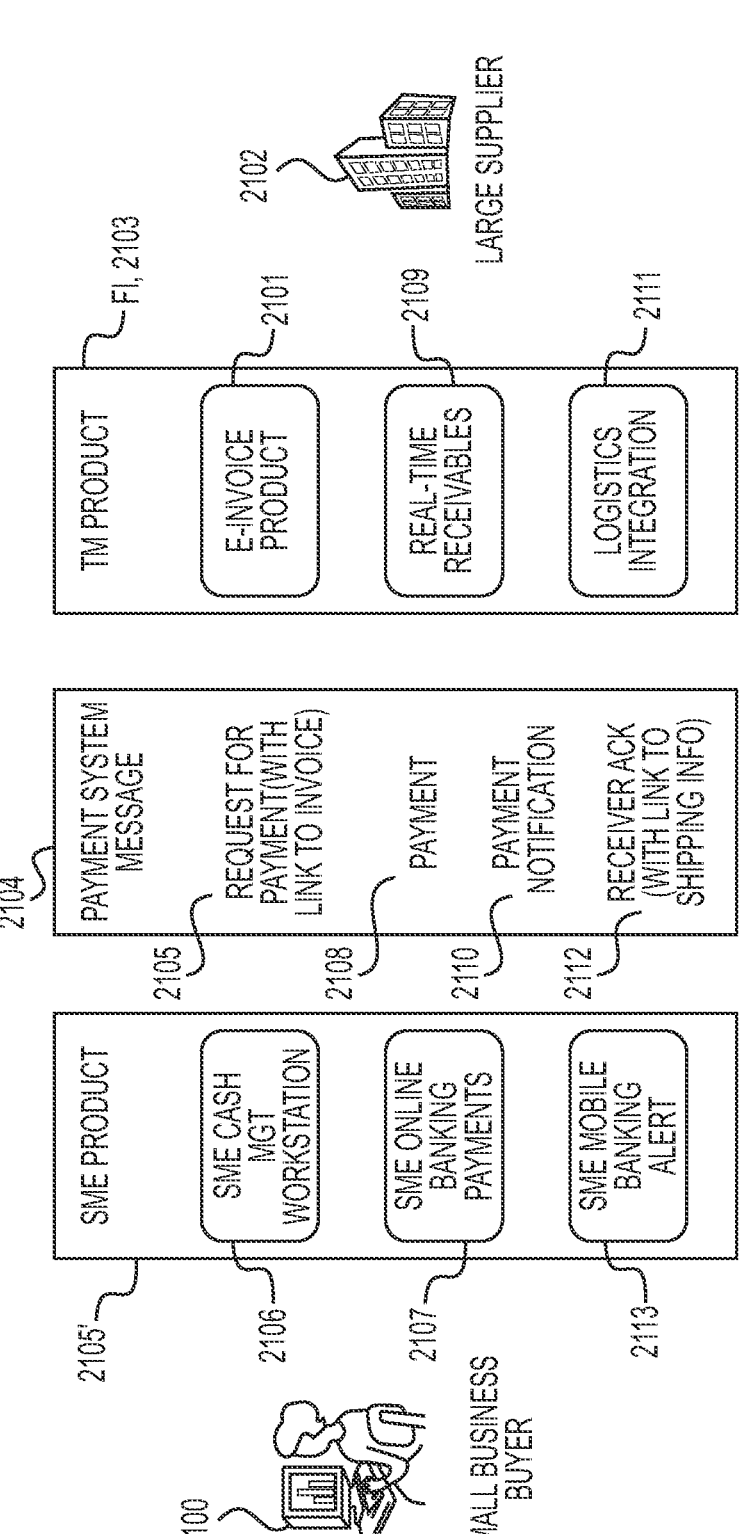

EXAMPLE OF A MULTIPLE-MESSAGE TRANSACTION FLOW:
B2B E-COMMERCE

PROCESS BEGINS WHEN A SMALL BUSINESS BUYER ORDERS GOODS FROM A SUPPLIER. THE SUPPLIER
REQUIRES PAYMENT BEFORE SHIPMENT. SENDER AND RECEIVER FIS TAILOR PRODUCTS TO THEIR CUSTOMERS' NEEDS.

LARGE SUPPLIER

2102

FI, 2103

TM PRODUCT

E-INVOICE PRODUCT    2101

REAL-TIME RECEIVABLES    2109

LOGISTICS INTEGRATION    2111

PAYMENT SYSTEM MESSAGE    2104

REQUEST FOR PAYMENT (WITH LINK TO INVOICE)    2105

PAYMENT    2108

PAYMENT NOTIFICATION    2110

RECEIVER ACK (WITH LINK TO SHIPPING INFO)    2112

SME PRODUCT

SME CASH MGT WORKSTATION    2106

SME ONLINE BANKING PAYMENTS    2107

SME MOBILE BANKING ALERT    2113

2105'

SMALL BUSINESS BUYER

HYBRID REAL-TIME/ACH PAYMENT SERVICE (CONCEPT)

TRANSITIONAL SERVICE THAT SUPPORTS ABILITY TO REACH ANY RECIPIENT BEFORE ALL FIS ARE REAL-TIME ENABLED

2206

REAL-TIME FI

NON-RT FI

2204 REAL-TIME PAYMENT

2205 SAME-DAY ACH

2203

2207

YES

IS RECEIVING FIRT ENABLED

NO

2208 ACH HYBRID OPTION

2201 INITIATE PAYMENT

2209 OK TO SEND ACH?

YES, ACH OK? 2210

2202

2200

SENDER

REAL-TIME PAYMENTS WILL BE DESIGNED TO ADDRESS MANY USE CASES
 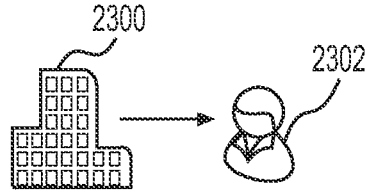
FIG. 23
BUSINESS TO PERSON
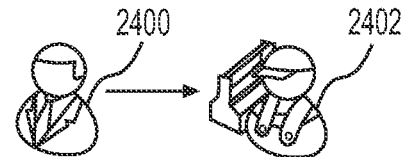
FIG. 24
PERSON TO PERSON
FIG. 25
PERSON TO BUSINESS
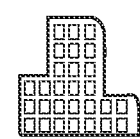
FIG. 26
BUSINESS TO BUSINESS

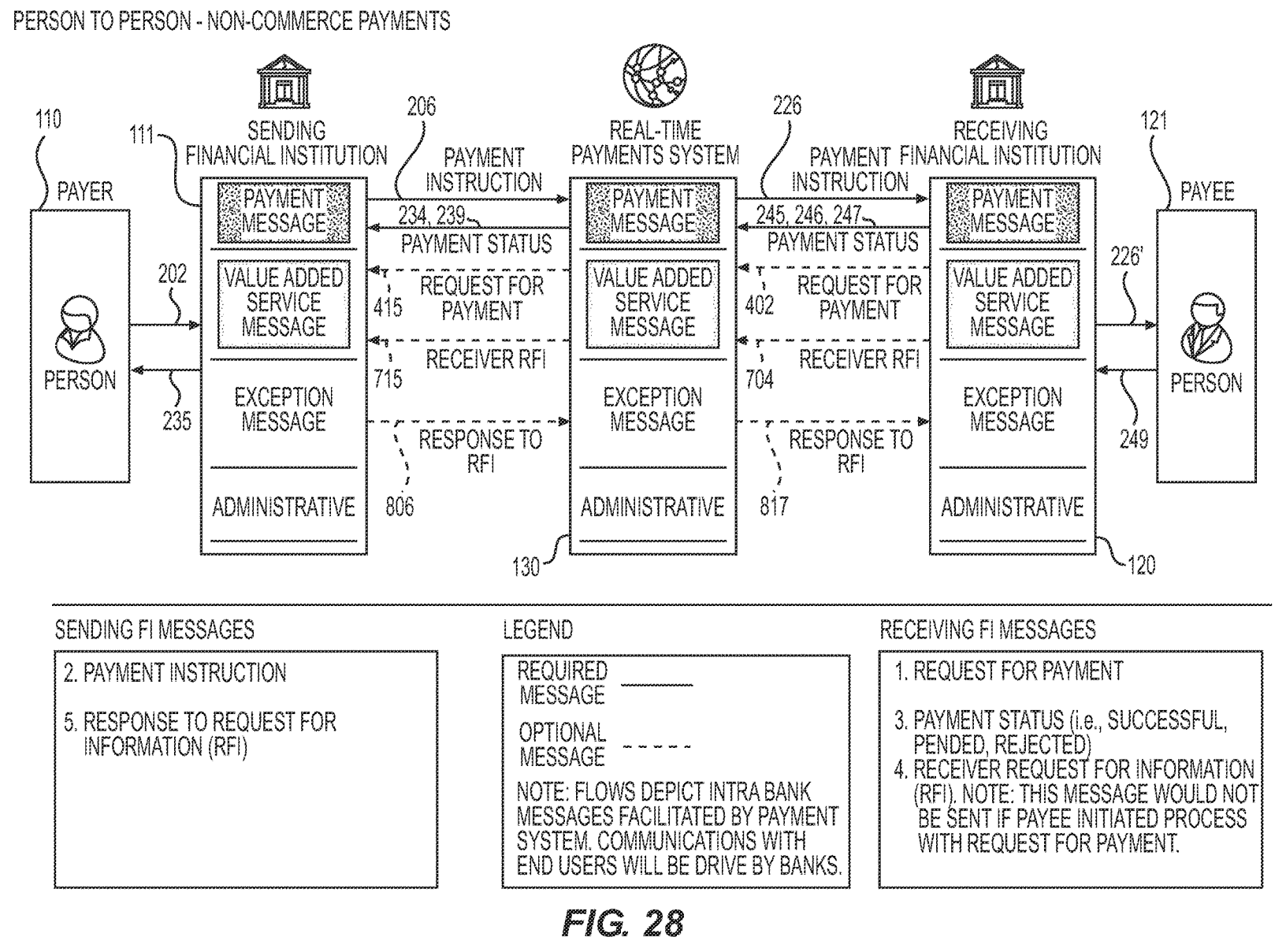

PERSON TO PERSON - NON-COMMERCE PAYMENTS

*FIG. 28*

LEGEND

REQUIRED MESSAGE ———
OPTIONAL MESSAGE — - — - —

NOTE: FLOWS DEPICT INTRA-BANK MESSAGES FACILITATED BY PAYMENT SYSTEM. COMMUNICATIONS WITH END USERS WILL BE DRIVE BY BANKS.

SENDING FI MESSAGES

2. PAYMENT INSTRUCTION
5. RESPONSE TO REQUEST FOR INFORMATION (RFI)

RECEIVING FI MESSAGES

1. REQUEST FOR PAYMENT
3. PAYMENT STATUS (i.e., SUCCESSFUL, PENDED, REJECTED)
4. RECEIVER REQUEST FOR INFORMATION (RFI). NOTE: THIS MESSAGE WOULD NOT BE SENT IF PAYEE INITIATED PROCESS WITH REQUEST FOR PAYMENT.

*FIG. 34*

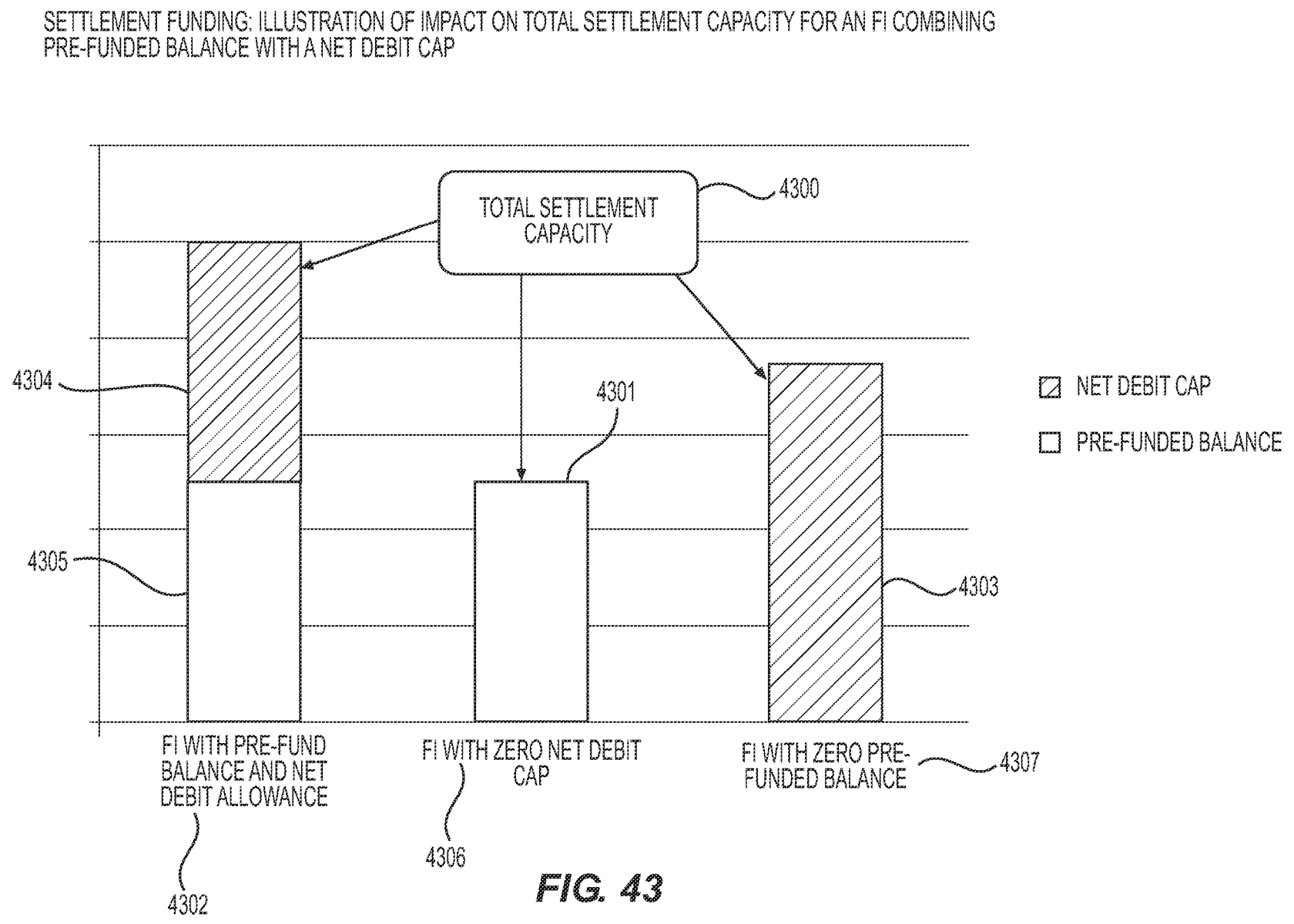

SETTLEMENT FUNDING: ILLUSTRATION OF IMPACT ON TOTAL SETTLEMENT CAPACITY FOR AN FI COMBINING PRE-FUNDED BALANCE WITH A NET DEBIT CAP

☒ NET DEBIT CAP

☐ PRE-FUNDED BALANCE

4300  TOTAL SETTLEMENT CAPACITY

4303

4307

FI WITH ZERO PRE-FUNDED BALANCE

4301

4306

FI WITH ZERO NET DEBIT CAP

4304

4305

4302

FI WITH PRE-FUND BALANCE AND NET DEBIT ALLOWANCE

*FIG. 43*

THE REAL-TIME PAYMENT SYSTEM WILL USE NET SETTLEMENT, WITH MULTIPLE SETTLEMENTS PER DAY TO MITIGATE THE BUILD-UP OF UNSETTLED POSITIONS

LEAST SETTLEMENT RISK/ HIGHER COST & COMPLEXITY ←——————→ HIGHER SETTLEMENT RISK/ LOWER COST & COMPLEXITY

| | REAL-TIME GROSS SETTLEMENT | CONTINUOUS NETTING | SECONDS/ MINUTES | MULTIPLE TIME | LATE EVENING | NEXT DAY |
|---|---|---|---|---|---|---|
| DESCRIPTION | IMMEDIATE SETTLEMENT OF THE GROSS AMOUNT | IMMEDIATE NETTING OF OFFSETTING POSITIONS | CLOSE-TO-IMMEDIATE NET SETTLEMENT | FREQUENT NET SETTLEMENT | SETTLEMENT AFTER NORMAL BUSINESS HOURS | NEXT DAY SETTLEMENT OF NET AMOUNT |
| PROBLEMS ADDRESSED | | | | | | |
| SINGLE-PAYMENT DEFAULT | X | X | | | | |
| SHORT-TERM SETTLEMENT RISK | X | X | X | | | |
| LARGE UNFUNDED POSITIONS | X | X | X | X | | |
| OVERNIGHT SETTLEMENT RISK | X | X | X | X | X | |
| LIQUIDITY EFFICIENCY | | X | X | X | X | X |
| COST OF SETTLEMENT | | | | X | X | X |

*FIG. 44*

MESSAGING: TOOL BOX

| PAYMENT | VALUE-ADDED SERVICES | EXCEPTIONS |
|---|---|---|
| PAYMENT INSTRUCTION<br>• INCLUDES REMITTANCE FIELDS<br>  • ~140 CHARACTERS<br>  • CAN REFER TO EXTERNAL SOURCE FOR MORE EXTENSIVE, STRUCTURED OR NON-TEXT REMITTANCE DATA | REQUEST FOR PAYMENT<br>• MESSAGE REQUESTING THAT THE RECIPIENT SEND PAYMENT TO THE REQUESTOR<br>• NOT A DEBIT TRANSACTION; RECIPIENT CHOOSES WHETHER TO INITIATE A PAYMENT<br>• REQUEST FOR PAYMENT MAY INCLUDE REFERENCE OR LINKS TO A BILL, INVOICE OR OTHER DOCUMENTATION, AND INCLUDES REMITTANCE DATA TO BE INCLUDED IN PAYMENT<br>• PAYMENT SYSTEM AND OPERATING RULES INCORPORATE ANTI-SPAMMING FEATURES (e.g., VELOCITY CHECKS, FEES, DIRECTORY REGISTRATION) | REQUEST FOR RETURN OF FUNDS<br>• SEND BY SENDING FI TO REQUEST RETURN OF FUNDS SENT BY CUSTOMER IN ERROR<br>• NOT A REVERSAL - THIS IS A COURTESY REQUEST FOR THE RECEIVING FI TO ASSIST IN RECOVERY OF FUNDS FROM ITS CUSTOMER |
| PAYMENT STATUS<br>• ACCEPTED<br>• REJECTED (WITH REASON CODES, e.g., CLOSED ACCOUNT, TOKEN NOT RECOGNIZED, ETC.)<br>• PENDING (FOR ANTI-FRAUD, AML, OFAC, ETC.) | REQUEST FOR PAYMENT STATUS<br>• DELIVERY STATUS OF REQUEST FOR PAYMENT<br>• ONE STATUS IS THAT RECIPIENT IS A CUSTOMER THAT HAS ASKED FI NOT TO DELIVER REQUESTS FOR PAYMENT (FIS MUST PROVIDE WAY FOR CUSTOMERS TO BLOCK REQUESTS FOR PAYMENT) | RESPONSE TO REQUEST FOR RETURN OF FUNDS<br>• RECEIVING FI RESPONDS TO REQUEST WITH INFORMATION ABOUT DISPOSITION<br>• NOT A RETURNED PAYMENT - IF THE RECEIVER OR RECEIVING FI RETURNS FUNDS, IT IS VIA A NEW, SEPARATE CREDIT TRANSFER |
| | PAYMENT ACKNOWLEDGMENT BY RECEIVER<br>• RESPONSE BY RECEIVER INDICATING THAT THEY HAVE RECEIVED PAYMENT, INCLUDING OPTIONAL ADDITION INFORMATION FOR SENDER e.g., "THANKS MOM" OR "CREDITED TO INVOICE # 12345" | INTERBANK INQUIRY REGARDING TRANSACTION<br>• GENERAL INTERBANK MESSAGE REFERENCING SPECIFIC PAYMENT |

*FIG. 45*

| PAYMENT | VALUE-ADDED SERVICES | EXCEPTIONS |
|---|---|---|
| | REMITTANCE ADVICE<br>• ALLOWS THE INCLUSION OF REMITTANCE DATA THAT EXCEEDS CAPACITY OF PAYMENT INSTRUCTION | QUESTIONABLE TRANSACTION<br>• POTENTIAL FRAUDULENT TRANSACTION |
| | RECEIVER REQUEST FOR INFORMATION (RFI)<br>• MESSAGE FROM RECEIVER TO SENDER REQUESTING ADDITIONAL INFORMATION REGARDING PAYMENT e.g., "WHAT IS THIS PAYMENT FOR?" OR "PLEASE PROVIDE INVOICE NUMBER" | |
| | RESPONSE TO RFI<br>• MESSAGE SENT BY SENDER OF PAYMENT IN RESPONSE TO RFI e.g., "PAYING FOR BET I LOST" OR "INVOICE #12345" | |

MOST AUTOMATED FRAUD DETECTION SYSTEMS OPERATE IN REAL-TIME

| VENDOR | CAPABILITIES | EXAMPLE |
|---|---|---|
| NICE·ACTIMIZE <br> MARKET LEADER IN FINANCIAL CRIME, RISK AND COMPLIANCE | • ANALYTICAL MODELS DETECT AND PREVENT FRAUD WITH HIGH-VOLUME, REAL-TIME, CROSS-CHANNEL TRANSACTIONAL MONITORING <br><br> • USES PROFILING, RELATIONSHIP DISCOVERY, AND WATCH LIST MANAGEMENT <br><br> • BLOCKS TRANSACTIONS IN REAL-TIME | • TOP-5 BANK USED ACTIMIZE'S REAL-TIME PAYMENT FRAUD PREVENTION SOLUTION <br> - 73% DETECTION RATE - UNCOVERED 3 OUT OF 4 FRAUD ATTEMPTS USING WIRE TRANSFER INFO <br> - 1:15 FALSE POSITIVE COMPARED TO 1:50 INDUSTRY AVERAGE |
| ACI <br> payment systems | • FLEXIBLE DATA ARCHITECTURE <br><br> • COMBINES PREDICTIVE ANALYTICS WITH DEFINED RULES FOR FAST, ACCURATE, AND FLEXIBLE RESPONSE TO FRAUD <br><br> • OPERATES IN REAL-TIME OR IN NEAR-REAL-TIME, SO FINANCIAL INSTITUTIONS CAN PREVENT CROSS-CHANNEL FRAUD | • MEDIUM-SIZED BANK IN NORTH AMERICA USED ACI'S RISK MANAGER FOR FRAUD PREVENTION ACROSS CARDS, ONLINE BANKING, WIRES, ACH, MOBILE <br> - REALIZED > 50% DECREASE IN FRAUD RATE <br> - SAW INCREASED EFFICIENCY IN FIRST 10 DAYS |
| Guardian Analytics | • REAL-TIME FRAUD PREVENTION USING BEHAVIOUR BASED ANALYTICS <br><br> • FOCUSES EFFORTS OF BANKS ON HIGH RISK TRANSACTIONS AND CAN AUTOMATICALLY RELEASE LOW RISK TRANSACTIONS <br><br> • REAL-TIME SCORING OF 100% OF TRANSACTIONS | • $11BN WEST COAST COMMUNITY BANK SELECTED GUARDIAN FOR FRAUD PREVENTION <br> - REDUCED SCOPE OF MANUAL MONITORING <br> - PROACTIVE FRAUD MANAGEMENT BEFORE FUNDS ARE TRANSFERED |
| sas. <br> THE POWER TO KNOW | • ASSESSES FRAUD RISK USING CUSTOMER BEHAVIOUR PROFILING AND SCORING MODELS <br><br> • APPLIES PREDICTIVE MODELLING USING INSTITUTION AND CONSORTIUM DATA | • HSBC SELECTED SAS TO PROTECT U.S., EUROPE, AND ASIA CARD TRANSACTIONS IN REAL-TIME <br> - LOWERED FRAUD ACROSS CARD ACCOUNTS <br> - DECREASED FALSE POSITIVES |

FIG. 47

PRIOR ART

REAL-TIME PAYMENT SYSTEM, METHOD, APPARATUS, AND COMPUTER PROGRAM

CROSS REFERENCE TO RELATED APPLICATIONS

This application claims priority to and is a continuation of U.S. patent application Ser. No. 17/099,609, filed Nov. 16, 2020, now U.S. Pat. No. 11,694,168, issued on Jul. 4, 2023, which is a continuation-in-part of U.S. patent application Ser. No. 15/200,340, filed Jul. 1, 2016, now U.S. Pat. No. 11,042,882, issued on Jun. 22, 2021, which claims priority to U.S. Provisional Patent Application No. 62/187,406 filed on Jul. 1, 2015, and U.S. Provisional Patent Application No. 62/286,738 filed on Jan. 25, 2016, the contents of which are hereby fully incorporated by reference in their entirety.

BACKGROUND

Field

Example aspects herein relate generally to electronic transactions and, more specifically, to electronic real-time payment transactions.

Description of the Related Art

The average banking customer interacts with his or her bank or financial institution at least twice a day for payment-related matters, such as buying a financial product, checking on a payment, or paying a bill. These interactions represent more than 80 percent of customer interactions with banks, making payments a superb platform, or beachhead, for cross-selling other financial services. Indeed, payment revenue is increasingly targeted by non-banks, and, missing out on these fees could detrimentally impact the capture of all possible banking related revenue.

However, the competition for the beachhead is intensifying, particularly in the area of mobile payments and digital payments.

Financial transfers today take place more quickly than before, but consumers are still burdened with needing to review their accounts to identify unauthorized or false transactions, and disputing such transactions with their financial institutions. Faster payment capabilities, along with robust consumer protections against fraud, unauthorized transactions, and erroneous debits, can help to alleviate these limitations at least somewhat.

Indeed, the Federal Reserve itself has developed a roadmap for a "near real time" payments system, and has noted that the financial services industry has a sense of urgency in pursuing this objective. The Federal Reserve has created task forces charged with advisory roles focused on defining faster payments capabilities, and payment security.

Various countries (e.g., Singapore, South Africa, Sweden, Switzerland, and the United Kingdom (UK)) offer a real-time credit push and a debit capability not in real-time (i.e., a transaction cleared on deferred basis). A so-called Fast Payment service exists in the United Kingdom (UK), as does a FAST service in Singapore. Both follow a typical model for providing immediate funds availability. For example, 97% of payment transactions are made available to a recipient within 60 seconds of receipt. For transactions not posted within 60 seconds, the payer is informed that transaction is under review.

To meet this standard, a receiving financial institution (FI) must have real-time screening for suspected fraud, AML, and sanctions (FIG. 47 represents known automated fraud detection systems and their capabilities). The remaining 3% of transactions are reviewed within 2 hours and are either ultimately rejected or posted.

Swish and PayM mobile P2P in Sweden and the UK purportedly provide immediate notification and credit, ClearXchange and PopMoney in the U.S. purportedly provide immediate notification with deferred credit, and Venmo and Square Cash purportedly provide immediate notification and immediate/or deferred credit. However, none of those services actually provide a service with a real-time crediting and settlement capability (i.e., posting of funds immediately to a creditor's account).

Instead, settlement often occurs within hours of a payment initiation. The UK Faster Payments service moved to full cash pre-funding of net settlement liabilities in November of 2014, effectively using a central bank balance as a net debit cap (i.e., a defaulter pays). Prior to that date, a multilateral debit cap was employed.

In a credit push scenario, a sending FI can verify and secure good funds. By not having debits, the risk of a reversal due to fraudulent and/or unauthorized debits is removed.

The Clearing House Interbank Payments System (CHIPS) addresses the risk of unsettled debit positions for wholesale wire transfers by requiring participants to prefund a settlement pool, while using an algorithm that continuously nets positions to reduce a funding requirement.

Also, currently, in the case of a payment error, existing processes for returning funds are manual, costly, and unsatisfying for consumers. PayM purportedly has features to reduce sending errors. For example, a payer can enter payment instructions and an alias account, and PayM looks up payee information in a database of registered users based on an account alias provided. Payer confirms the name of the payee presented by PayM prior to executing a transaction. Also, PopMoney services enable users to send funds using an email address. PayM and Swish in Sweden enable users to send payments to registered payees by providing a telephone number.

Typical real-time payment systems are designed to be a ubiquitous, industry-scaled solution that allow financial institutions to meet the real-time payment and contextual commerce needs of consumers and businesses. As the number of participants in a real-time payment system network increases, however, increasing ubiquity and efficient, faster payments across the payment network becomes technically challenging.

There exists a need, therefore, to support a greater number of participants that are transacting in a real-time payment system network, such as ACH network 130. One technical problem with supporting a greater number of participants transacting involves liquidity efficiency. Obtaining liquidity efficiency is not merely a scaling problem in which more processor power could be incorporated into the system, but rather an issue related to aggregate optimization. Aggregating multiple transactions for multiple institutions would reduce the liquidity requirements of each individual participant.

There presently does not exist a technical mechanism that enables a real-time payment system to manage and aggregate the liquidity of individual participants to back up the positions of the various individual participants based on a larger pool of transactions. Nor does there exist a technical mechanism enables the reduction of the liquidity requirements of individual participants based on the larger pool of transactions for which liquidity is being provided.

In view of the foregoing, there is a need to develop and implement an actual real-time payment system with real-time settlement to better meet consumers' and businesses' expectations in an increasingly digital economy, while minimizing or substantially reducing fraudulent or unauthorized transactions and the like, and streamlining processes for returning funds and correcting errors. There is also a need to develop and implement a mechanism for tracking account positions in the real-time payments system.

BRIEF SUMMARY

The example embodiments discussed herein address the challenges in the art discussed above, by providing methods, and systems, apparatuses, computer-readable media, and computer programs that operate in accordance with the methods for tracking account positions in a real-time payments system.

In one embodiment a method for tracking account positions in a real-time payments system performs the steps of linking each of a plurality of participants to a funding agent account via an ACH network, thereby creating a plurality of linked participants; providing each of the plurality of linked participants access to a current prefunded position of the funding agent through the ACH network; comparing an unsettled financial position of each of the plurality of participants to the current prefunded position of the funding agent; determining whether to perform a financial settlement for a corresponding one of the plurality of participants based on a result of the comparing; and performing the financial settlement for the corresponding participant when it is determined that the unsettled financial position of the corresponding participant is not greater than the current prefunded position of the funding agent.

In some embodiments, the method includes updating the current prefunded position of the funding agent, by: debiting from the current prefunded position each successful transaction sent by a participant, and crediting the current prefunded position of the funding agent for each successful transaction received by the funding agent; and tracking the position of each of the plurality of participants against the current prefunded position of the funding agent.

In some embodiments, at least one of the plurality of participants is a non-funding participant.

In some embodiments, calculating the current prefunded position of the funding agent includes: determining an opening prefunded position; determining a net position; determining a supplemental funding amount; determining a plurality of disbursements; and calculating the current prefunded position according to: opening prefunded position+net position+supplemental funding+disbursements.

In some embodiments, the method further comprises calculating the net position by summing of all credit transfers sent and accepted or accepted without posting and all credit transfers received and accepted or accepted without posting by a participant.

In some embodiments the method further includes calculating an individual tracking position for each of the plurality of participants.

In yet other embodiments, the method further includes receiving, from the ACH network, a prefunded balance change notification system notification message (SNM) from the funding agent indicating a change in the tracking position of a participant; and communicating, to the participant, an SNM notifying the participant that the tracking position of the participant has changed.

In another embodiment there is provided a computer-readable medium storing instructions which, when executed by a computer processor, cause the computer processor to perform the methods disclosed herein.

In another embodiment a system for conducting financial settlement is provided. The system includes at least one memory for storing instructions and one or more computer processors arranged to execute the instructions to perform: linking each of a plurality of participants to a funding agent account via an ACH network, thereby creating a plurality of linked participants; providing each of the plurality of linked participants access to a current prefunded position of the funding agent through the ACH network; comparing an unsettled financial position of each of the plurality of participants to the current prefunded position of the funding agent; determining whether to perform a financial settlement for a corresponding one of the plurality of participants based on a result of the comparing; and performing the financial settlement for the corresponding participant when it is determined that the unsettled financial position of the corresponding participant is not greater than the current prefunded position of the funding agent.

In some embodiments, the one or more computer processors arranged to execute the instructions to further perform: updating the current prefunded position of the funding agent, by: debiting from the current prefunded position each successful transaction sent by a participant, and crediting the current prefunded position of the funding agent for each successful transaction received by the funding agent; tracking the position of each of the plurality of participants against the current prefunded position of the funding agent.

In some embodiments, at least one of the plurality of participants is a non-funding participant.

In some embodiments, calculating the current prefunded position of the funding agent includes: determining an opening prefunded position; determining a net position; determining a supplemental funding amount; determining a plurality of disbursements; and calculating the current prefunded position according to: opening prefunded position+net position+supplemental funding+disbursements.

In some embodiments, the one or more computer processors arranged to execute the instructions to further perform: calculating the net position by summing of all credit transfers sent and accepted or accepted without posting and all credit transfers received and accepted or accepted without posting by a participant.

In some embodiments, the one or more computer processors arranged to execute the instructions to further perform: calculating an individual tracking position for each of the plurality of participants.

In some embodiments, the one or more computer processors arranged to execute the instructions to further perform: receiving, from the ACH network, a prefunded balance change notification system notification message (SNM) from the funding agent indicating a change in the tracking position of a participant; and communicating, to the participant, an SNM notifying the participant that the tracking position of the participant has changed.

The real-time payments system herein is a safe, sustainable, standards-based retail real-time payment system that has an ability to reach financial institutions and position them to be pre-eminent providers of innovative payment services to their customers, by providing a fully featured product platform with extensible messaging and robust security.

Further features and advantages, as well as the structure and operation, of various example embodiments are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings. Like reference numbers between two or more drawings can denote identical or functionally similar elements unless the description indicates otherwise.

FIGS. 19b and 19d show examples of various messages that can be used in the procedures described herein, according to example embodiments herein.

FIGS. 20a-20c show various message types, IDS codes, message names, and definitions of message types, for messages that can be employed in the procedures herein, according to example embodiments herein.

FIG. 21 shows an example of a multiple message process flow for a business to business transaction scenario herein.

FIG. 23 shows an example of a business to person transaction scenario.

FIG. 24 shows an example of a person to person transaction scenario.

FIG. 25 shows an example of a person to business transaction scenario.

FIG. 26 shows an example of a business to business transaction scenario.

FIG. 28 represents a person to person context for non-commerce payments, according to an example embodiment herein.

FIG. 34 represents a business to business scenario, such as a just in time payment to a supplier, according to an example embodiment herein.

FIG. 43 represents an example of the impact on a total settlement capacity a financial institution, in a case where pre-funding is employed in conjunction with a net debit cap, or where only one of those is employed.

FIG. 44 represents example types of financial settlement procedures that can be employed herein.

FIG. 45 shows examples of various types of messages and certain characteristics thereof.

FIG. 47 represents known automated fraud detection systems and their capabilities.

Again, identical portions of the various figures have been identified with the same reference numerals in order to simplify the descriptions thereof, and a detailed description may not be provided with respect to each figure.

DETAILED DESCRIPTION

Figure 1:
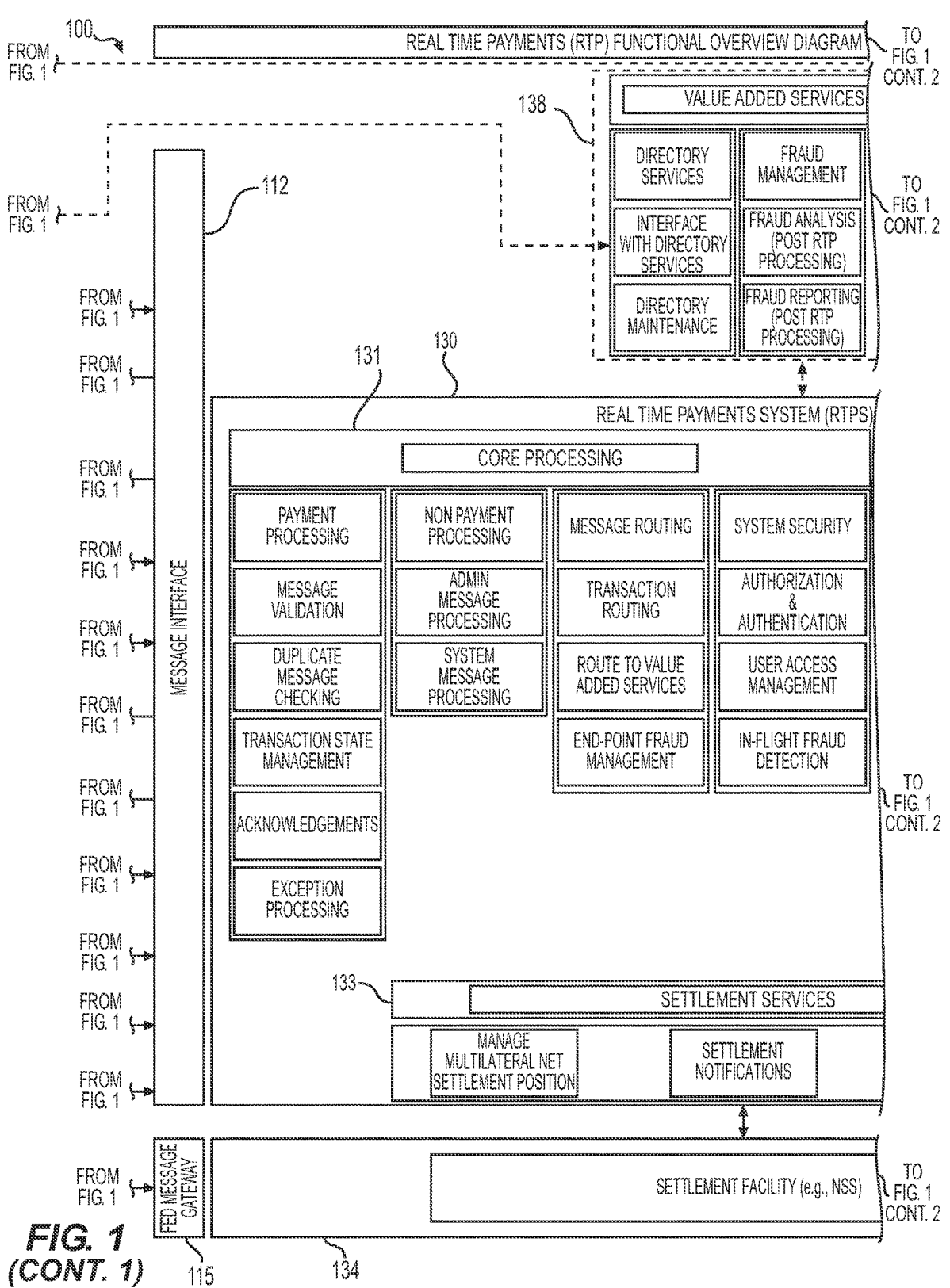
FIG. 1 is a diagram of an example real time payments system according to an example embodiment herein.

FIG. 1 is a diagram of a system 100 configured in accordance with an example embodiment herein. System 100 includes user stations 110 and 121. In an example embodiment, user station 110 is operated by, under the authorization of, or on behalf of a debtor (e.g., an individual, business, government, etc.), and user station 121 is operated by, under the authorization of, or on behalf of a creditor (e.g., an individual, business, government, etc.). In this example, the debtor may owe one or more debts to the creditor. Accordingly, user station 110 can be referred to as a "debtor station," and user station 121 can be referred to as a "creditor station." Each user station may be, for example, a personal computer, a tablet computer, a smartphone, a standalone computer terminal such as a kiosk or ATM, or any other suitable type of electronic device for receiving, transmitting, storing, and/or processing information.

System 100 also includes financial institutions (FIs) 111 and 120. In an example embodiment, a user associated with station 110 can receive banking services (e.g., account services such as access to demand deposit accounts and savings accounts, brokerage services, and electronic bill payment and present services and the like) from FI 111. Similarly, a user associated with station 121 receives banking services from FI 120. Accordingly, FI 111 can be referred to as a "debtor FI," and FI 120 can be referred to as a "creditor FI." Each FI includes one or more computers and/or servers, such as, for example, the system of FIG. 1A, which are configured to handle electronic financial transactions.

Debtor station 110 is connected to (e.g., can electronically communicate with) debtor FI 111. Accordingly, the debtor may use station 110 to access banking services provided by FI 111 through, for example, an online banking portal available through a web browser running on station 110, banking software loaded on to station 110, or any other banking service provided by FI 111 on station 110. Similarly, creditor station 121 is connected to creditor FI 120. Station 110 and 121 also may connect to other elements as well, such as other elements of system 100.

Debtor FI 111 and creditor FI 120 are connected to each other by an Automated Clearinghouse (ACH) network 130 (e.g., such as, without limitation, one or more of the Electronic Payments Network (EPN) and the FedACH). ACH network 130 can route (e.g., receive and transmit) electronic transactions and various types of messages between FIs via message interfaces 112 and 114, as described hereinbelow. ACH network 130 can include one or more computers and/or servers (such as, for example, the system shown in FIG. 1A) which are configured to handle electronic financial transactions. ACH network 130 also can include one or more databases. The ACH network 130 also is referred to as a system 130 or real-time payments system 130 herein.

Each connection (as indicated by a dual-headed arrow) illustrated in FIG. 1 can be any suitable type of existing or later-developed connection between one or more computers (or computing devices). In one example, at least part of one or more of such connections may include a network such as a local-area network (LAN), wide-area network (WAN), or the Internet. For example, station 110 may be a computing device (e.g., a PC or smartphone) that connects, via the Internet, to one or more web pages maintained or hosted by or on behalf of FI 111.

In one example embodiment, stations 110 and 121 can be connected by a secure communication channel (as indicated by the dashed arrow) on which communications may proceed after a single sign-on (SSO) procedure is performed in which a member using station 110 logs in to an online banking service provided by FI 111, although this example is neither limiting nor exclusive. In such a procedure, debtor FI 111 can be configured as a SAML identity provider, and station 121 can be configured as a SAML service provider. Accordingly, through communication between FI 111 (as the SAML identity provider) and station 121 (as the SAML service provider), a secure communication channel between station 110 and 121 can be established. In one example embodiment, such a secure communication channel is provided by way of network 130, which enables the SSO procedure to be effected.

Network 130 also includes a core processing system 131, an administrative system 132, a settlement system 133. Network 130 also can include one or more databases. Generally, core processing system 131 performs processes such as payment processing, message validation, duplicate message checking, transaction state management, acknowledgements, non-payment processing, administrative message processing, and system message processing. The core processing system 131 also performs processes such as message routing, transaction routing, routing to a value added service system (to be described below), and end-point fraud management. The system 131 also performs processes such as system security processes, authorization and authentication, user access management, and fraud detection.

The administrative system 132 performs administrative processes such as operations processing, participant onboarding, helpdesk and customer service, control room system monitoring, data management, conducting inquiries and investigations, and bank administration. Additionally, system 132 performs reporting processes such as dashboard processing, operations reporting, statistics reporting, performance reporting, pricing and billing, regulatory reporting, and internal audit reporting. System 132 also performs government and rules management processing, maintains business rules, effects change management, participant management, audits, and risk management. The settlement service system 133 performs settlement processing to enable financial transactions to be settled, manages multilateral net settlement positions, settlement notifications, and transmits/receives data to/from at least one settlement facility 134. That facility 134 also can communicate with the FIs 111 and 120 by way of gateways 115 and interfaces 114.

The system 100 also can include a value added service system 138 connected to (or within) the network 130 and the FIs 111 and 120. The system 138 performs various valued-added services such as, for example, directory services and maintenance, fraud management, analysis, and reporting, and token services. The system 100 can include one or more computers and/or servers, such as, for example, the system shown in FIG. 1A.

System 100 further can include third party service providers 142 which can be, for example, payment service providers, a biller or a clearinghouse. In the system 100, the third party can receive bills and payments from FIs and send them to other FIs 111. Third party 142 can include one or more computers and/or servers, such as, for example, the system shown in FIG. 1A.

In the illustrated example, the systems 138 and 134 are represented as being separate from ACH network 130, and at least some parts of the below description is made in the context of that example embodiment. However, it should be understood that the scope of the invention is not limited to that example only. For example, it is also within the scope of the invention for the systems 138 and 134 to be included in, operated by, or otherwise be a part of ACH network 130, and one skilled in the art would understand in view of this description how to adapt the functionalities described herein where needed to accommodate such an embodiment.

Elements of system 100 can be configured to perform one or more of the steps or functions associated with any of the processes discussed herein, including those illustrated in the flow diagrams shown in the Figures and those discussed in connection therewith.

Example Computer Systems

Figure 1A:
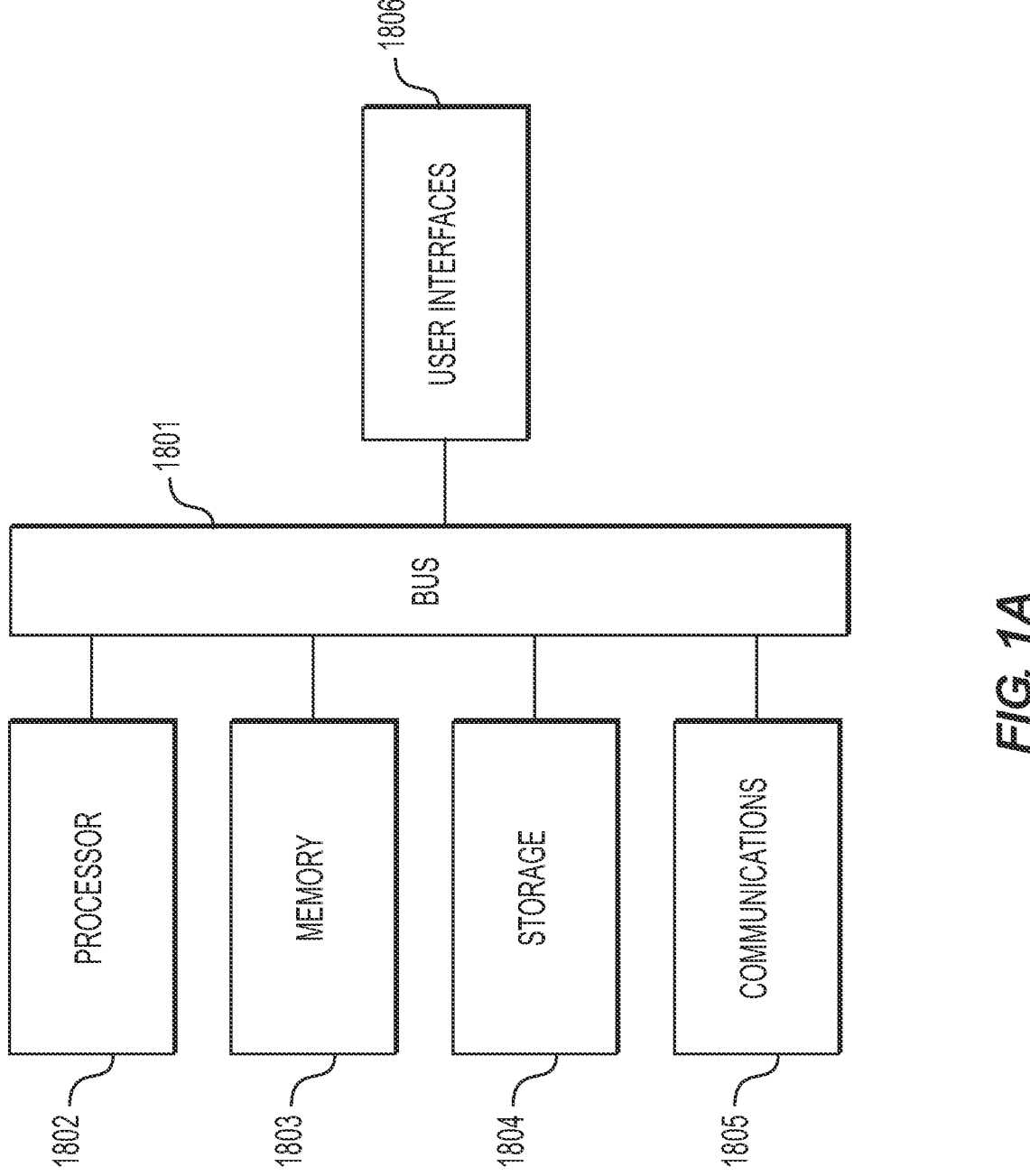
FIG. 1A is an example computer system configured in accordance with example embodiments herein.

FIG. 1A is a diagram of an example computer system. In example embodiments, the computer system may form at least part of one or more of the components illustrated in FIG. 1, and may be configured to perform one or more steps of the processes illustrated in the Figures. For example, a debtor FI and creditor FI can include one or more servers, each which can include one or more computer systems like that of FIG. 1A. As another example, a user station (e.g., stations 110 and/or 121) can include one or more computer systems.

The system of FIG. 1A includes a processor 1802, a memory 1803, a storage device 1804, a communications device 1805, and one or more user interfaces 1806, all of which are coupled to a bus 1801.

Processor 1802 can communicate with the other components of the computer system through bus 1801. Storage device 1804 includes one or more computer-readable media. Storage device 1804 can be configured to read and write data including program instructions that may be executed by processor 1802 and operating systems (e.g., a general-purpose operating system, such as Microsoft Windows and UNIX, or a custom operating system) that allow processor 1802 to control the operation of the other components. Communications device 1805 can be configured to enable processor 1802 to communicate with, for example, a network and the internet. User interface(s) 1806 can include input devices (e.g., keyboards, mice, joysticks, trackpads, stylus tablets, microphones, and cameras), output devices (e.g., video displays, printers, and speakers), and input/output devices (e.g., touch screens). User interface(s) 1806 can form at least part of any of the devices, components, and/or systems discussed herein.

Processor 1802 is configured to perform part (or all) of any of the processes described herein, depending on which component(s) of FIG. 1 the computer system forms a part of. For example, processes such as all or part of those of the flow diagrams described herein can be stored on storage device 1804 in the form of computer-readable program instructions. To execute a process, the processor loads the appropriate instructions, as stored on storage device 1804, into memory 1803, and then executes the loaded instructions to perform electronic transaction services, such as to, for example, generate, transmit, and/or receive a request for enrollment in the delivery of electronic information, or generate, transmit, and/or receive an electronic EOB, EOP, bill, and/or bill summary, and/or generate, receive, or otherwise process a payment transaction as described above.

Example Real-Time Payment Procedures

Figure 2:
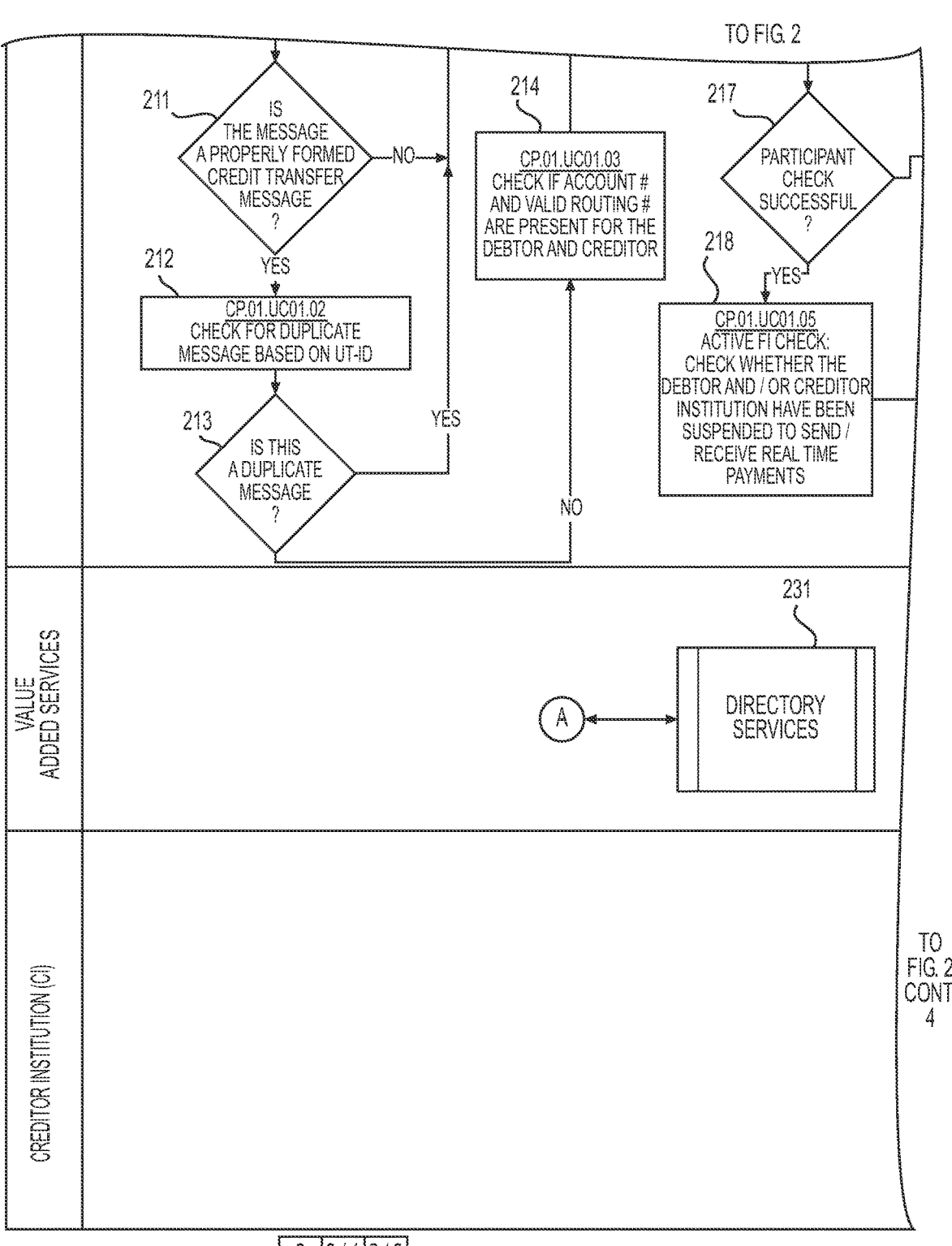
FIG. 2 illustrates a flow diagram of a process for effecting a real time payment, according to an example embodiment herein.
Figure 2:
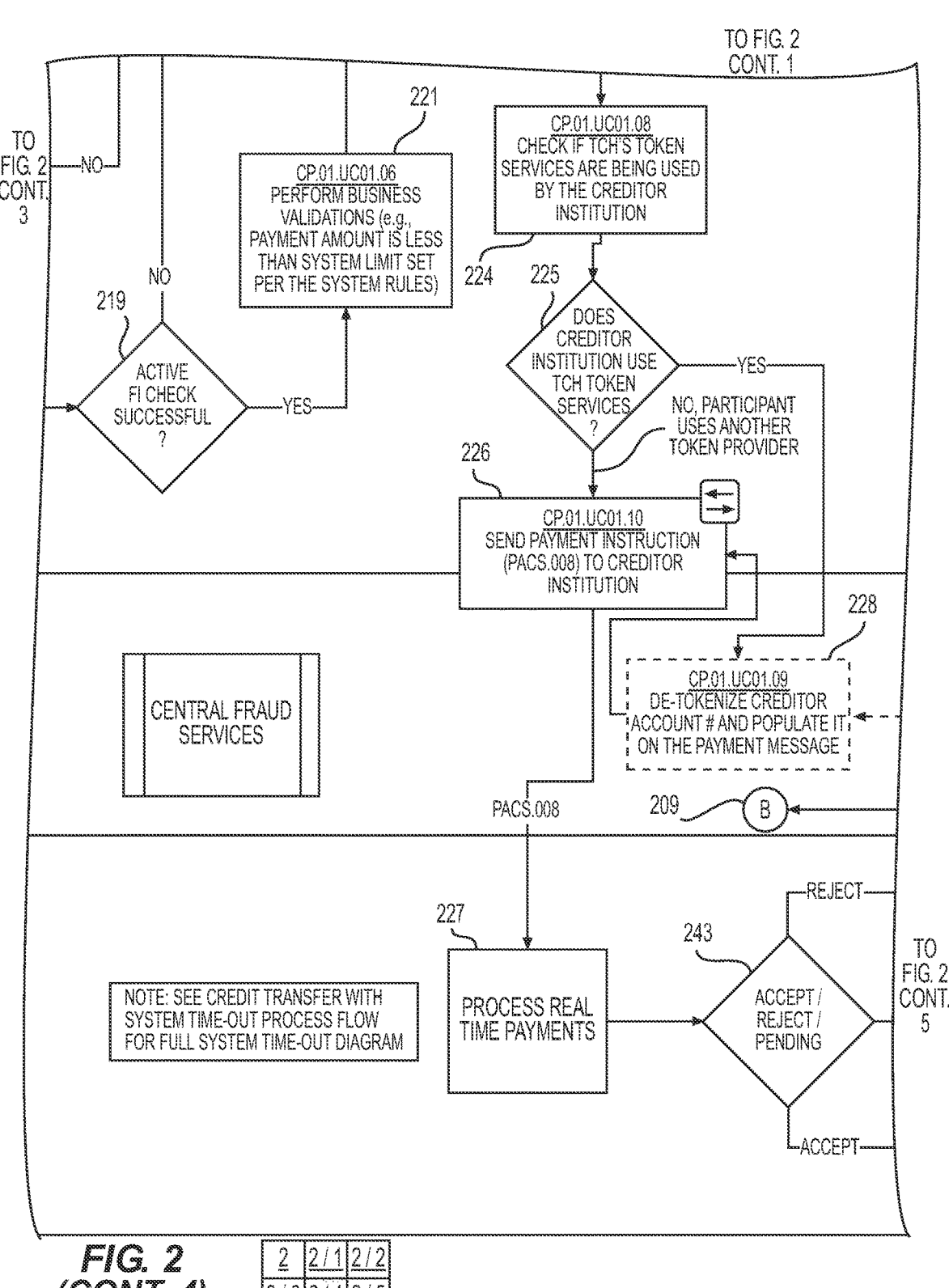
Figure 2:
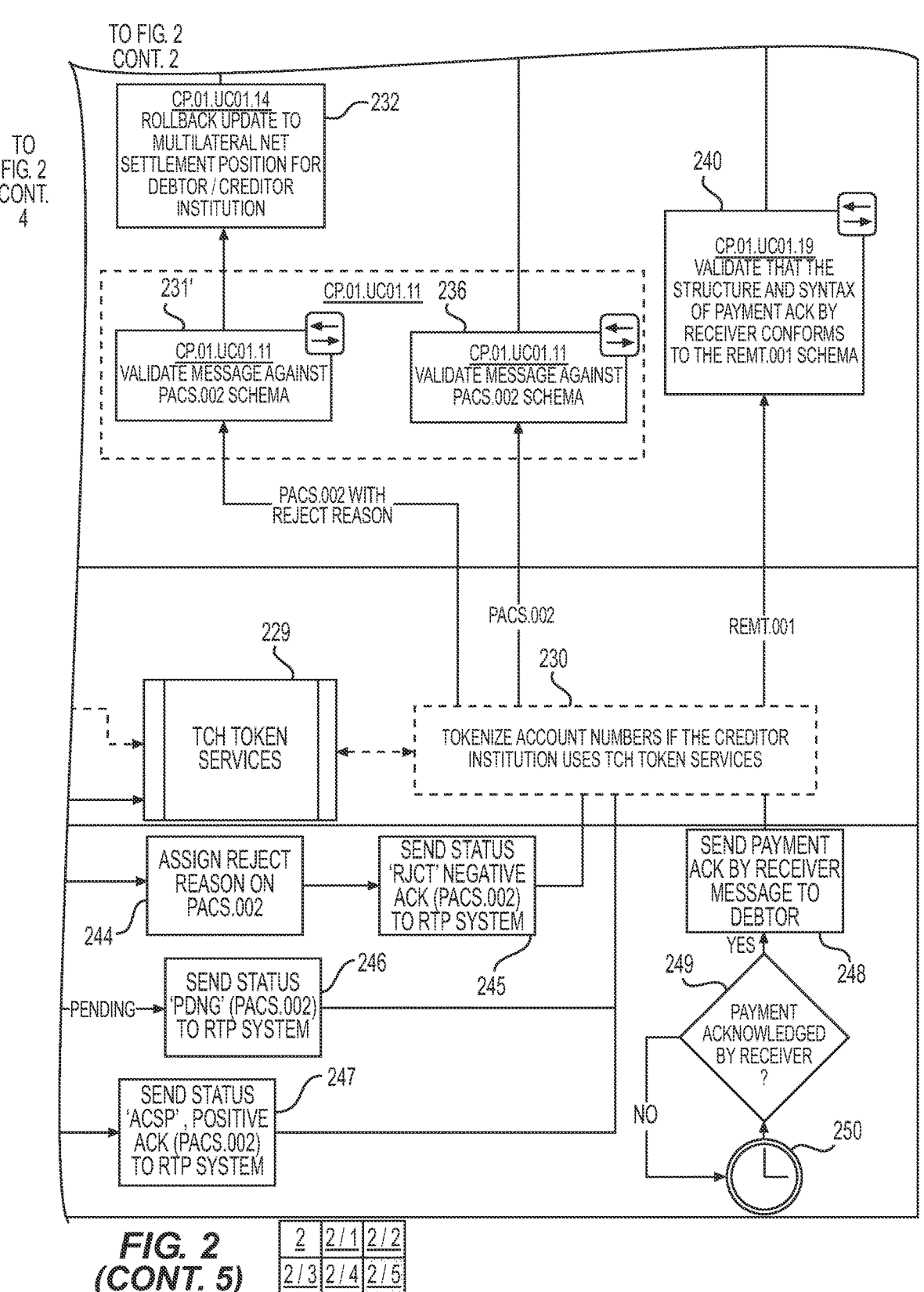
Figure 11:
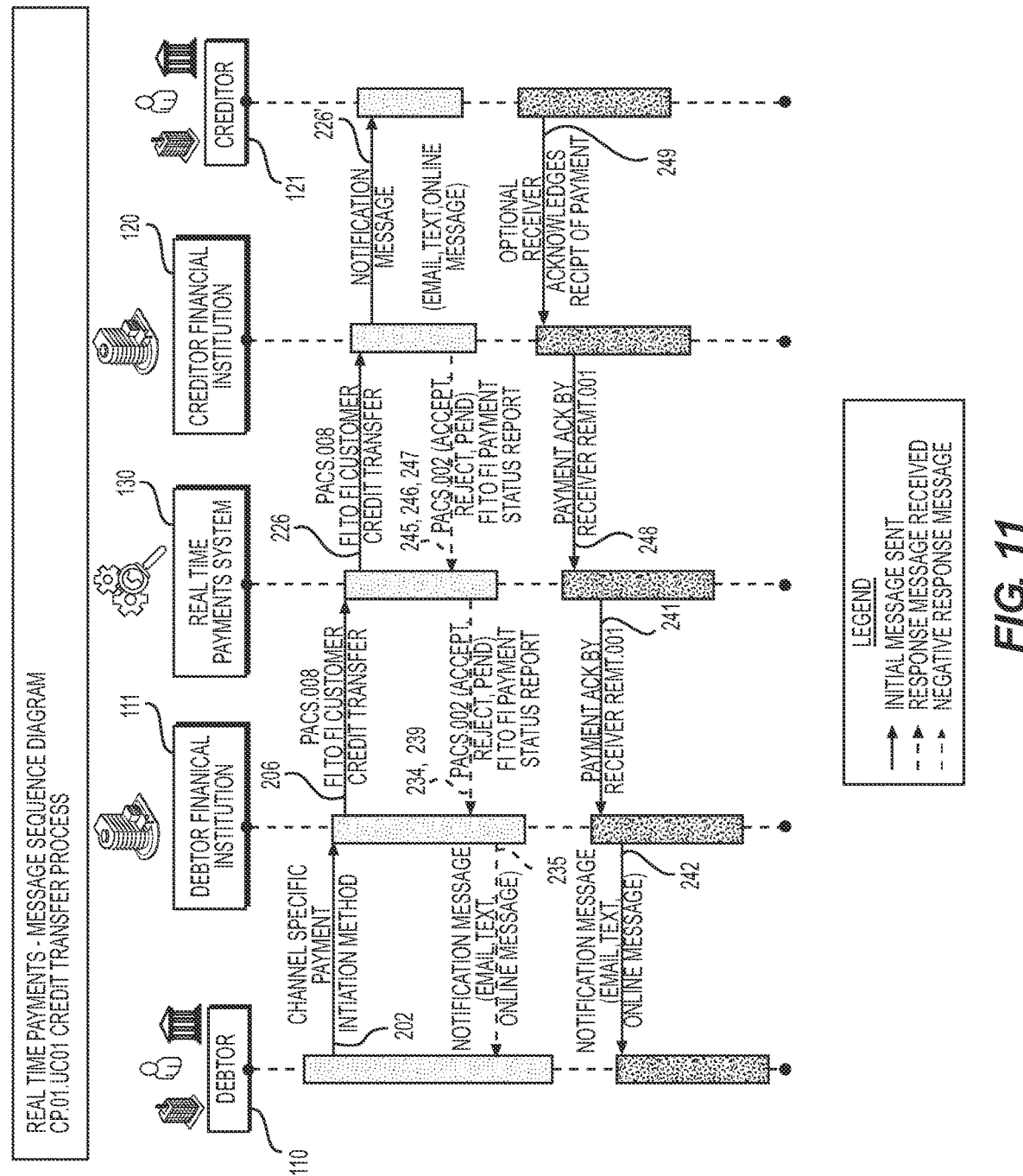
FIG. 11 illustrates a process flow for a credit transfer process, according to an example embodiment herein.

An example real-time payments procedure according to an example embodiment herein will now be described. Referring now to FIG. 2 (and FIG. 11), in addition to being able to obtain access to and view, summary and detailed bills, a user (e.g., associated with station 110) can connect to their FIs' (e.g., via an on-line banking website) to authorize a payment of an amount from the user's account with a debtor FI (e.g., FI 111) to creditors, billers, and the like (e.g., associated with station 121), creditor FIs (e.g., FI 120), or other entities, based on the accessed item(s) (step 201). After receiving payment authorization (e.g., a payment authorization message) from a consumer (step 202), such as, for example, via a channel specific message, a FI (e.g., FI 111) checks the account associated with the user to determine whether the account has a sufficient amount of funds available to cover the payment amount (step 203). Where sufficient funds are determined to be available, the debtor FI 111 then determines whether the requested payment can be processed in real time (step 204). In one example embodiment, step 204 is performed by the FI 111 determining (i) whether the creditor FI 120 identified in the payment authorization has a capability to receive real time payments (i.e., is "real time enabled"), (ii) determining whether the payment amount is less than a predetermined individual transaction limit of the system 100, and (iii) determining whether the payment amount is less than a predetermined client specific transaction value set by the FI 111. For example, determination (i) can involve the FI 111 associating an identifier of the creditor FI 121 included in the payment authorization with associated predetermined information stored in the debtor FI 111 indicating whether or not the creditor FI 121 supports real time payment capability. In another example embodiment, the ACH network 130 stores the predetermined information, and the determination is made by the debtor FI 111 communicating with the ACH network 130 to determine whether the predetermined information indicates that the creditor FI 120 supports real time payment capability. In still another example embodiment, the predetermined information is stored elsewhere, in another element, of the system 100, such as in the creditor FI 120, and the determination is made by the debtor FI 111 communicating with that element to determine whether the predetermined information indicates that the creditor FI 121 supports real time payment capability. The determination (ii) similarly can involve similar procedures for determining whether the payment amount is less than a predetermined transaction limit of the system 100 (i.e., the amount included in the payment authorization is checked against a limit that may be included in the FI 111 or 120, the ACH network 130, or in another element of the system 100).

If any of the determinations (i), (ii), and (iii) results in a determination of "No" ("No" in step 205), then control passes to step 207, where the user of station 110 may elect to make the payment via another payment alternative, and then the method ends (step 215). On the other hand, if each of the determinations (i), (ii), and (iii) results in a determination of "yes" ("Yes" in step 205), then control passes to step 206, where a payment transaction message (e.g., a pacs.008 message) is generated by the debtor FI 111. The payment transaction message includes, for example, a transaction identifier (e.g., a UT-ID generated by an algorithm), a biller's or creditor's name, the biller's account number at the biller's FI (e.g., FI 120), the routing number of the biller's FI (e.g., FI 120), the consumer's name, the payment amount, and a biller remittance identifier (i.e., consumer's account number with the biller) so that the biller can associate the payment with the consumer for posting purposes. Payments made for bills obtained by the consumer may be initiated, where the FI 111 can initiate a payment transaction message for each payment, enabling the consumer to pay bills such as, for example and without limitation, bills for debts owed by the consumer (e.g., user of station 110) to the debtor (e.g., associated with station 121).

In traditional (i.e., non-pseudo-identifier) payment transactions, biller routing numbers are used to determine which biller FI should receive a payment transaction message, and billers' account numbers are used to determine which biller's account at the biller FI should receive the payment, and those numbers, in one example, can be obtained by correlating an identifier of the biller to those numbers maintained in a directory (steps 208, 231). The directory may be included in the ACH network 130 (or value added services 138), in one example embodiment, or in another example, it can be included elsewhere in the system 100, such as at a third party or another element.

As an alternative to traditional payment transactions, the ACH network 130 enables a biller to use a bank account number pseudo-code (BANPC) and a bank routing number pseudo-code (BRNPC) as described below, for an added level of security. Similar functionality also is described in U.S. Pat. Nos. 6,173,272 and 6,317,745, both to Thomas et al. These two patents are hereby incorporated by reference in their entireties, as if set forth fully herein. In the example embodiments herein, the BANPC can be used in effecting credit-only transactions, or both credit and debit transactions.

A BRNPC is an alias for a biller FI's routing number which indicates to the ACH network that a BANPC transaction is present. A BANPC is an account identifier alias for a biller's account number at its biller FI (e.g., FI 120). Each alias also is referred to herein as a "token". For a BANPC transaction, when an electronic payment is specified to be made by a consumer by way of its FI (e.g., FI 111), instead of using the biller's actual account number and a biller FI's actual routing number (whether obtained in the payment authorization message or obtained from the directory), a BANPC identifier corresponding to that account number and a BRNPC are obtained and inserted by the FI (e.g., FI 111) in the payment transaction message, in step 206 (see also steps 208 and 209). As such, "tokenization" is thereby performed. For security, in one example embodiment, FIs such as FI 111 are provided with BRNPCs and corresponding BANPCs, but not with the biller's actual account and routing numbers. The BANPC and BRNPC collectively protect the biller's banking information and mitigate the opportunity for fraud.

In one example embodiment herein, the BANPC identifier and BRNPC are obtained by the FI 111 by accessing the directory to correlate information identifying the biller (creditor) included in the payment authorization to a corresponding BANPC identifier and BRNPC included in the directory (step 208, 209). (In one example embodiment herein, the information identifying the creditor can be any suitable type of identifier, such as, for example, a name, email address, phone number, or the like). As pointed out above, the directory may be included in the ACH network 130, in one example embodiment, or in another example, it can be included elsewhere in the system 100, such as at a third party or another element.

After step 206 is performed, control passes to step 210 where, in one example embodiment, the network 130 receives the payment transaction from the debtor FI 111 (e.g., in a pacs.008 credit transfer message) and determines whether the transaction is correctly formatted. For example, the network 130 checks the message type of the transaction, and validates the format, syntax, and/or structure of the message. That step can be performed in accordance with any suitable techniques. If it is determined that the message is not properly formatted ("No" in step 211), then control passes to step 216' which will be described below. If it is determined that the message is properly formatted ("Yes" in step 211), then control passes to step 212 where the network 130 checks to determine whether the message is duplicative of one already received, based on, for example, whether a UT-ID included in the message was already received. If it is determined that the message is duplicative ("Yes" in step 213), then control passes to step 216', which will be described below. If, on the other hand, the message is determined to not be duplicative ("No" in step 213), then control passes to step 214 where the network 130 checks the message to determine whether it includes valid account and routing numbers (e.g., whether tokens or actual account and routing numbers). If not ("No" in step 215), then control passes to step 216' which is performed in a manner to be described below. If "Yes" in step 215, then in step 216 the network 130 makes a determination as to whether the debtor FI 111 is enabled for sending payment transactions, and whether the creditor FI 120 is enabled to receive payment transactions. For example, this step can include the network 130 checking a look-up table to determine whether information in the table indicates that those FIs have such respective capabilities.

If the FIs are determined not to be enabled (No" in step 217), then control passes to step 216' which will be described below. If, on the other hand, the FIs are determined to be enabled ("Yes" in step 217), then the network 130 makes a determination as to whether the debtor FI 111 or creditor FI 120 have been suspended to participate in electronic payment transactions (step 218). If either of those FIs are determined to be suspended (and thus the check is determined not to be successful ("No" in step 219)), then control passes to step 216'. That step 216' will now be described. In step 216', the network 130 generates an exception message (e.g., a pacs.002 message) and forwards it to the debtor FI 111, and then, in step 220 the debtor FI 111 responds by processing the exception, whereafter the method then ends in step 215.

If, on the other hand, either of the FIs 111 or 120 is determined not to be suspended (and thus the check is determined to be successful ("Yes" in step 219)), then control passes to step 221 where the network 130 performs various business validations. As an example, the validations can include determining whether the payment amount of the payment transaction is less than a predetermined individual transaction limit of the system 100. If the validation(s) performed in step 221 are determined not to be successful ("No" in step 222), then control passes to step 216' which is performed in the manner described above.

If the validation(s) performed in step 221 are determined to be successful ("Yes" in step 222), then control passes to step 223 where the network 130 updates a multilateral net settlement position for at least one of the debtor FI 111 and the creditor FI 120. Then, in step 224 the network 130 checks to determine whether a token service is being employed in the payment transaction (i.e., the network 130 detects whether a BANPC transaction or a traditional transaction is present). The presence of a BANPC transaction is detected based on the ACH network comparing the BRNPC of the consumer's payment request to a list of routing numbers designated by the ACH network for BANPC transactions. If no match exists ("No" in step 225), then traditional processing proceeds where the network 130 sends the payment transaction to the creditor FI 120 (step 226) to attempt effecting a payment based on the routing number and account number included in the payment transaction message (a pacs.008 message), whereafter the creditor FI 120 begins processing the payment transaction (step 227). That FI 120 determines whether to accept or reject the payment (step 243) based on predetermined criteria, or whether the payment is pending (e.g., perhaps owing to an anti-fraud, AML, or OFAC investigation, etc.). In the case where the payment is rejected (e.g., perhaps a relevant account is closed, a token is not recognized, etc.), the FI 120 assigns a reason for rejecting the payment (step 244) and then sends a status "RJCT" negative ACK (e.g., a pacs.002 message) to the network 110 in step 245. Control then passes to step 230 which performs a tokenizing procedure, and then control passes to step 231' which will be described below. In the case where the FI 120 determines that the payment is pending in step 243, then in step 246 the FI 120 sends a status "PDNG" (e.g., a pacs.002 message) to the network 110. The pending status message may also be, in one embodiment, an accepted without posting message. Control then passes to step 230 which performs a tokenizing procedure, and control then passes to step 236 which will be described below. In the case where the FI 120 determines that the payment is accepted in step 243, then in step 247 the FI 120 sends a status "ACSP" positive ACK message (e.g., a pacs.002 message) to the network 110. Control then passes to step 230 which performs a tokenizing procedure, and control then passes to step 236 which will be described below. In one example embodiment, the FI 120 also can notify the station 121 of the status of the payment (e.g., via text message, email, an online message or other form of communication) (see step 226' of FIG. 11).

Referring back again to step 225, a case where token services are determined to have been used in the payment transaction will now be described. If a match is determined to exist in step 225 (i.e., if the routing number is a BRNPC in the list), and thus token services are determined to have been used in the transaction (i.e., "Yes" in step 225), then a BANPC transaction is deemed present and the ACH network 130 in step 228 (and involving step 229) performs a detokenization procedure. In this particular example, the detokenization procedure includes a reversal of the tokenization procedure performed in step 206, and thus includes a translation from the BANPC included in the payment transaction to (1) a biller's account number at their biller FI (e.g., FI 120) and (2) a routing number for the biller's FI (e.g., FI 120). To perform this translation, the ACH network 130 and/or value added services 138, maintains a BANPC database that associates each biller's BANPC with that biller's account number at their FI (e.g., FI 120) and the routing number to the biller's FI (e.g., FI 120). Using the directory (also referred to as a BANPC database, which may be maintained by the ACH network 130 or value added service 138 or another element) and the BANPC included in the payment transaction, the ACH network 130 correlates the BANPC included in the transaction to a corresponding BANPC included in the directory, and to that latter BANPC's associated biller account number and routing number of the biller's FI (e.g., FI 120), in the directory (step 229).

The BANPC's associated biller account number and routing number of the biller's FI (e.g., FI 120) are inserted into the payment transaction, and the BANPC and BRNPC are removed from the transaction. Then the ACH network 130 routes the payment transaction, including the inserted account number and routing number, to the biller's FI (e.g., FI 120) based on the inserted routing number, in step 226. Control then passes to step 227 where the process proceeds in the above described manner. It is noted that, when a payment is accepted (in step 243), the biller FI (e.g., FI 120) posts the credit to the biller's account (corresponding to the biller account number) to complete payment.

In accordance with another example embodiment herein, the above translation (de-tokenization) is performed by a FI, such as FI 111, for at least some payment transactions, instead of by the ACH network 130.

Referring now to step 250, in that step the creditor FI 120 awaits an acknowledgement from the creditor station 121 that it has received the payment (see step 250, and "No" in step 249). In response to receive such an acknowledgement from the creditor station 121 ("Yes" in step 249), the creditor FI 120 forwards a payment acknowledgement message towards the debtor FI 111 and/or the debtor station 110 in step 248, via the network 130. Control then passes to step 230, which tokenizes that message, and control then passes to step 240 which will be described below.

Step 231' will now be described. In step 231' the network 130 validates the payment message with reason for rejection to determine that it is in a correct format (e.g., in accordance with pacs.002 schema). Then, in step 232, the network 130 conducts a reversal of the update to the multilateral net settlement position of the debtor FI 111 and/or creditor FI 120 (i.e., a reversal of step 223), and then in step 233 the network 130 updates the status of the payment transaction to indicate that the payment has been rejected. In step 234 the network 130 sends a payment reject message (e.g., pacs.002) to the debtor FI 111, including the reason for the rejection, the message is provided from the FI 111 to the station 110, and then the method then terminates (step 215).

Step 236 will now be described. In step 236, the network 130 validates the (a pacs.002 message) from step 246 or 247 to determine that it is in a correct format (e.g., in accordance with pacs.002 schema). Then, in step 238, the network 130 updates the status of the payment transaction as successful (in the case of step 247) or pending (in the case of step 246). In step 239 the network 130 sends a payment status message (e.g., pacs.002) to the debtor FI 111, indicating that the payment was successful or pending, and control then passes to step 235 where the FI 111 sends a message (e.g., a text message, email, online message or other form of communication) to the user station 110 indicating that the payment was successful or pending. Then the method ends at step 215.

Step 240 will now be described. In one example embodiment, in step 240 the network 130 determines whether a payment acknowledgement (e.g., an ACK message) received by the network 130 from the creditor FI 120 is correctly formatted. For example, the network 130 checks the message type of the transaction, and validates the format, syntax, and/or structure of the ACK message. That step can be performed in accordance with any suitable techniques. Then, in step 241 the network 130 forwards the ACK message to the debtor FI 111, which then responds in step 242 by providing a message to the station 110 indicating that the creditor FI 120 has acknowledged receipt of the payment. The method then ends in step 215.

Time Out and Status Reporting

Figure 3:
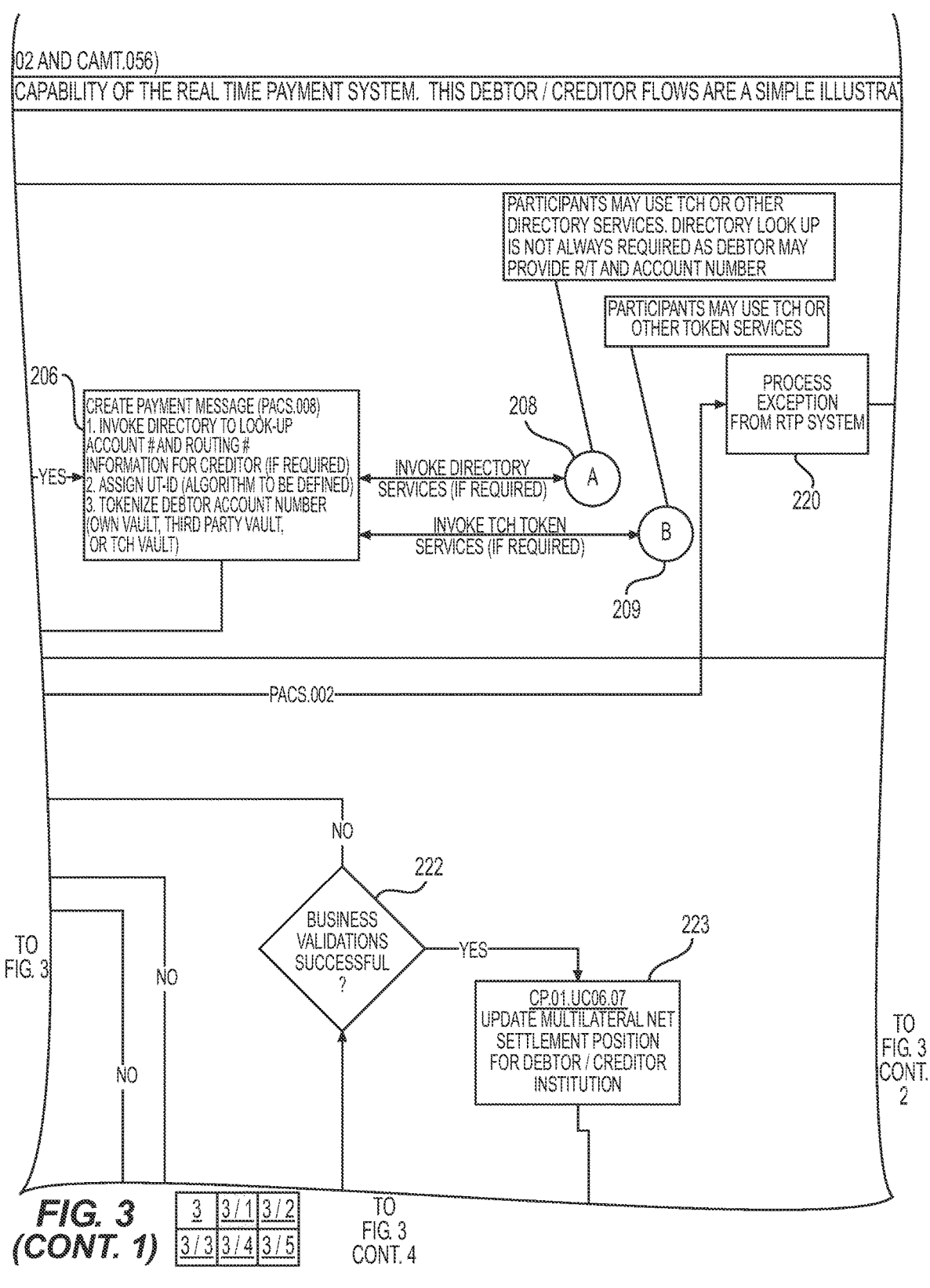
FIG. 3 illustrates a flow diagram of a process for conducting a system time out and generating a status report, according to another example embodiment herein.
Figure 3:
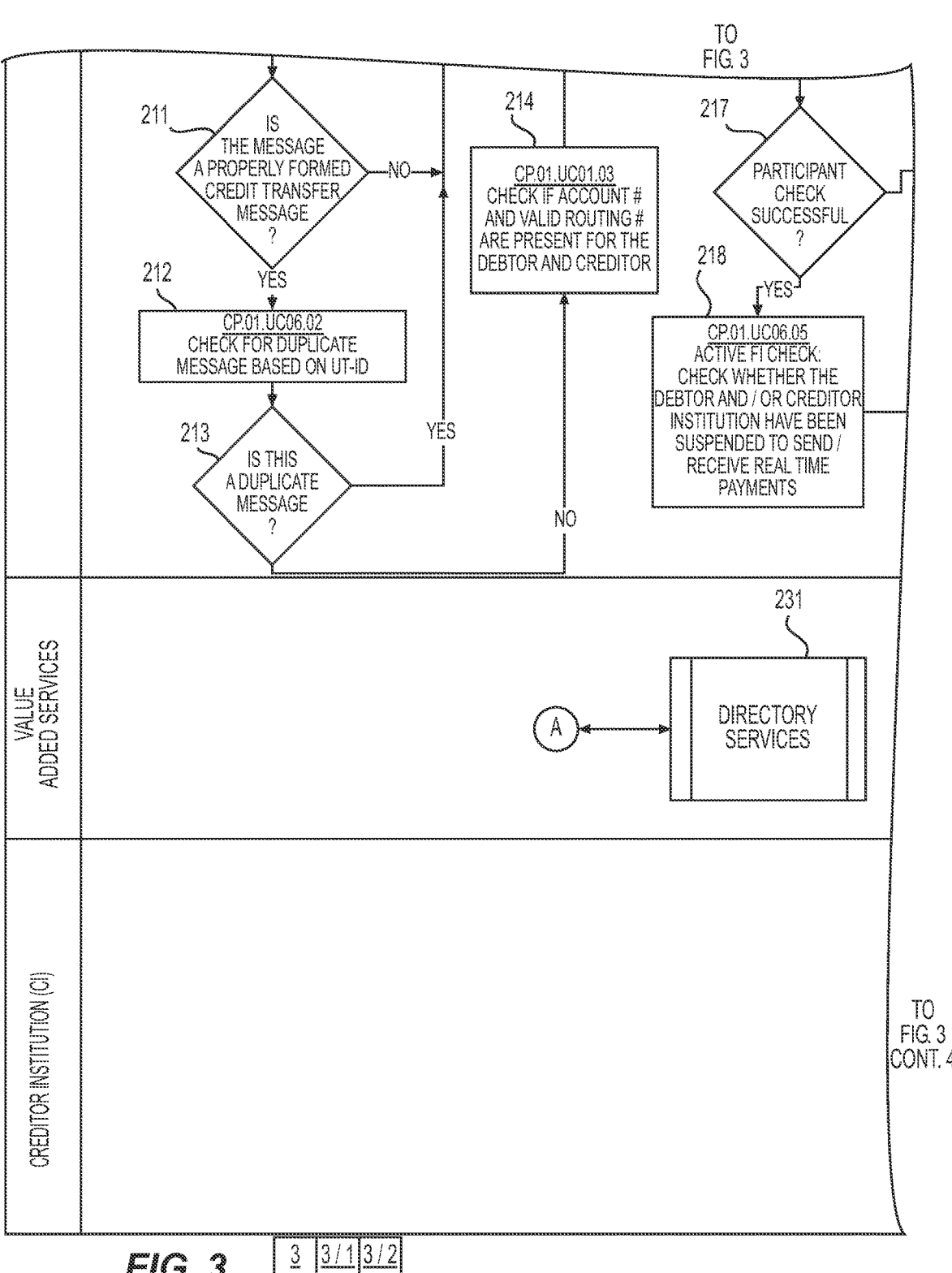
Figure 3:
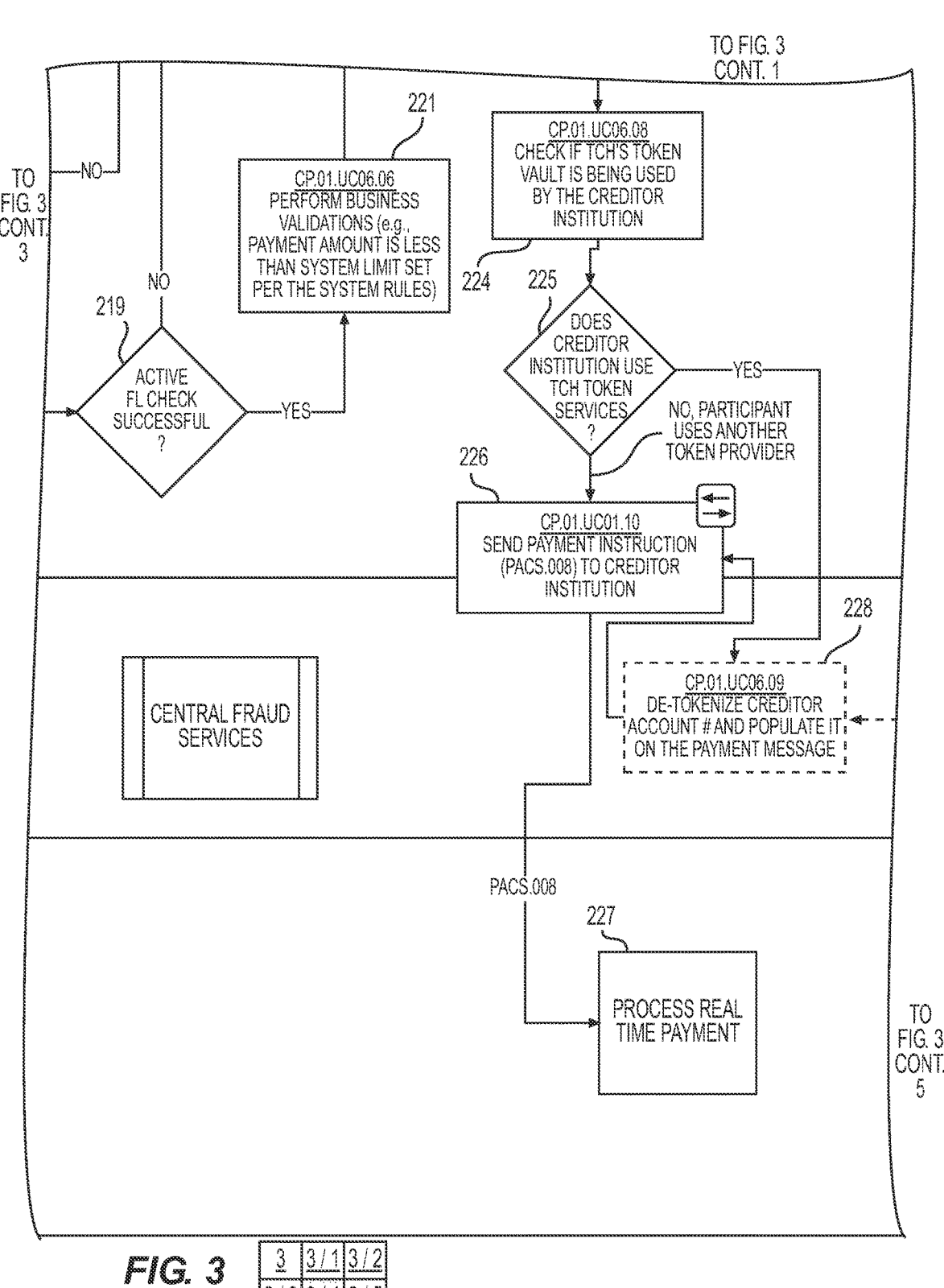
Figure 3:
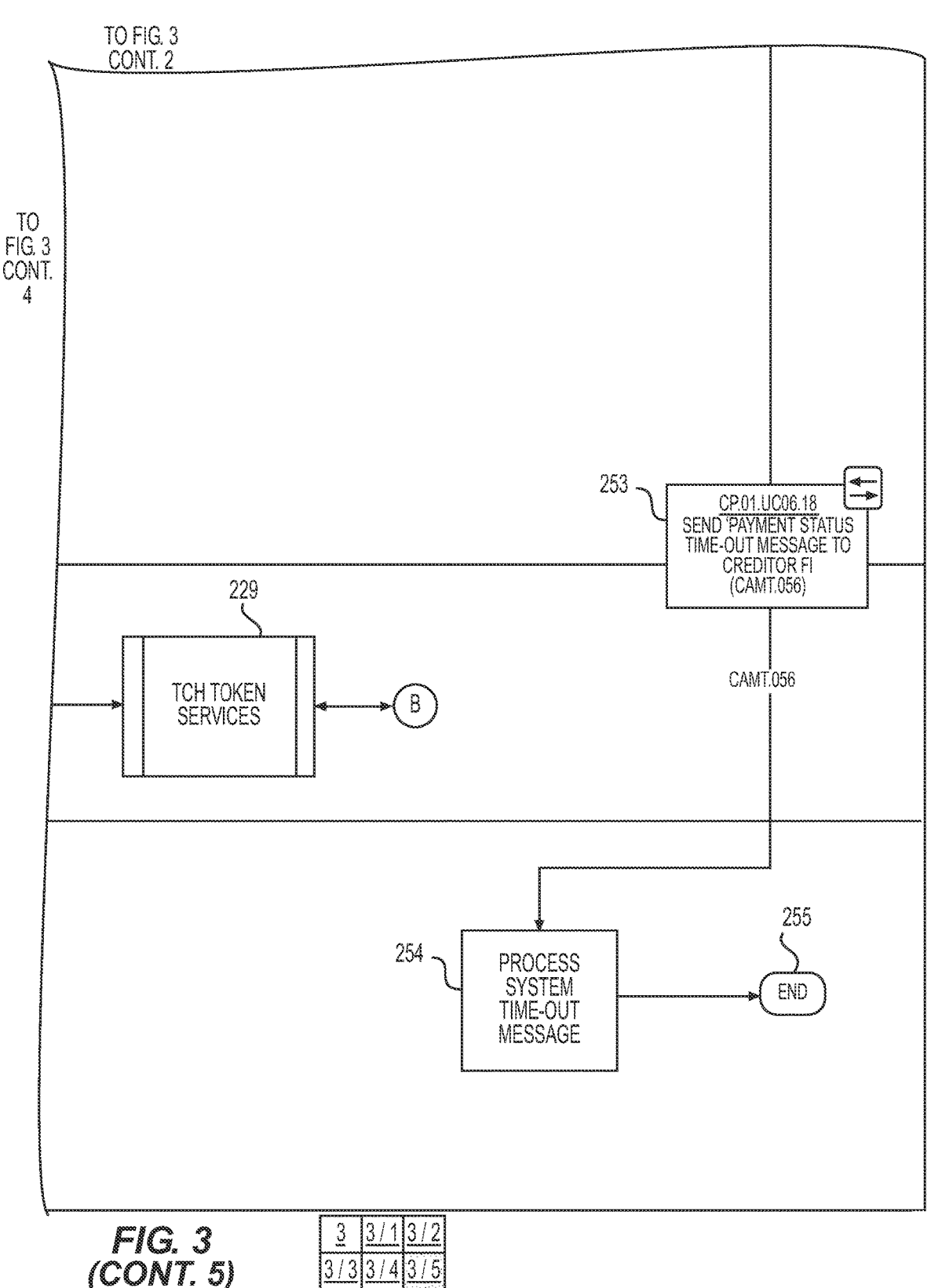
Figure 12:
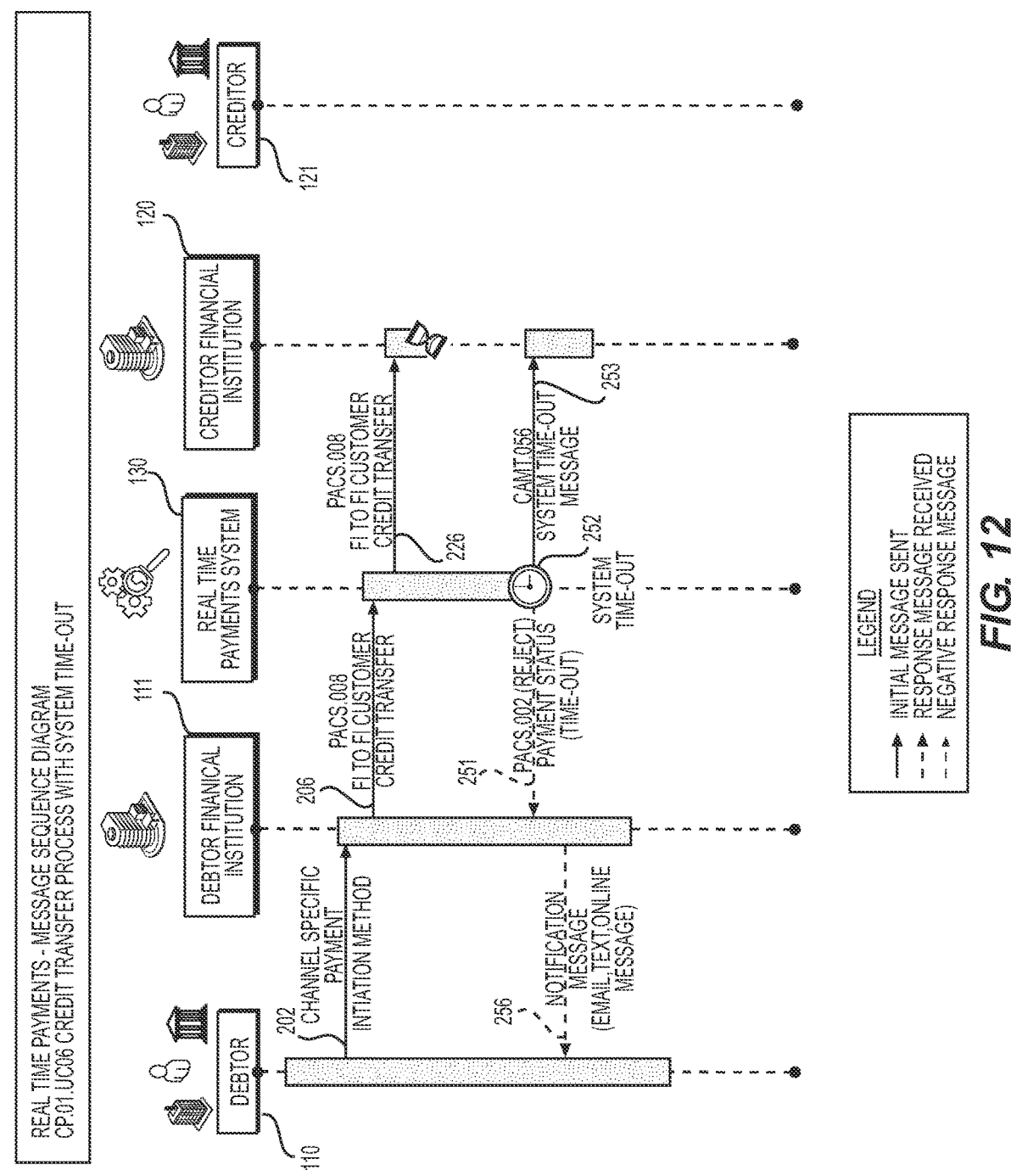
FIG. 12 illustrates a process flow for a credit transfer and system timeout, according to an example embodiment herein.

The system 100 also can perform time out and status report processing. Referring now to FIGS. 3 and 12, the manner in which system time out and status report processing are performed will now be described. The procedure of FIG. 3 includes steps similar to those of FIG. 2 (for convenience, those steps will not be further described), but after sending the payment instruction in step 226, the ACH network 130 determines that it has not received a response (e.g., such as a pacs.002 or remt.001 message) thereto within a predetermined time period (step 252). As a result, control passes to step 232 which is performed in the same manner as described above for FIG. 2, and then, in step 233', the network 130 updates the status of the payment transaction to "Payment Rejected due to Time-Out". Thereafter, in step 251 the network 130 forwards a payment status time-out message to the debtor FI 111, which then provides a payment reject message to the debtor station 110 (step 256). The method then terminates in step 215.

Figure 4:
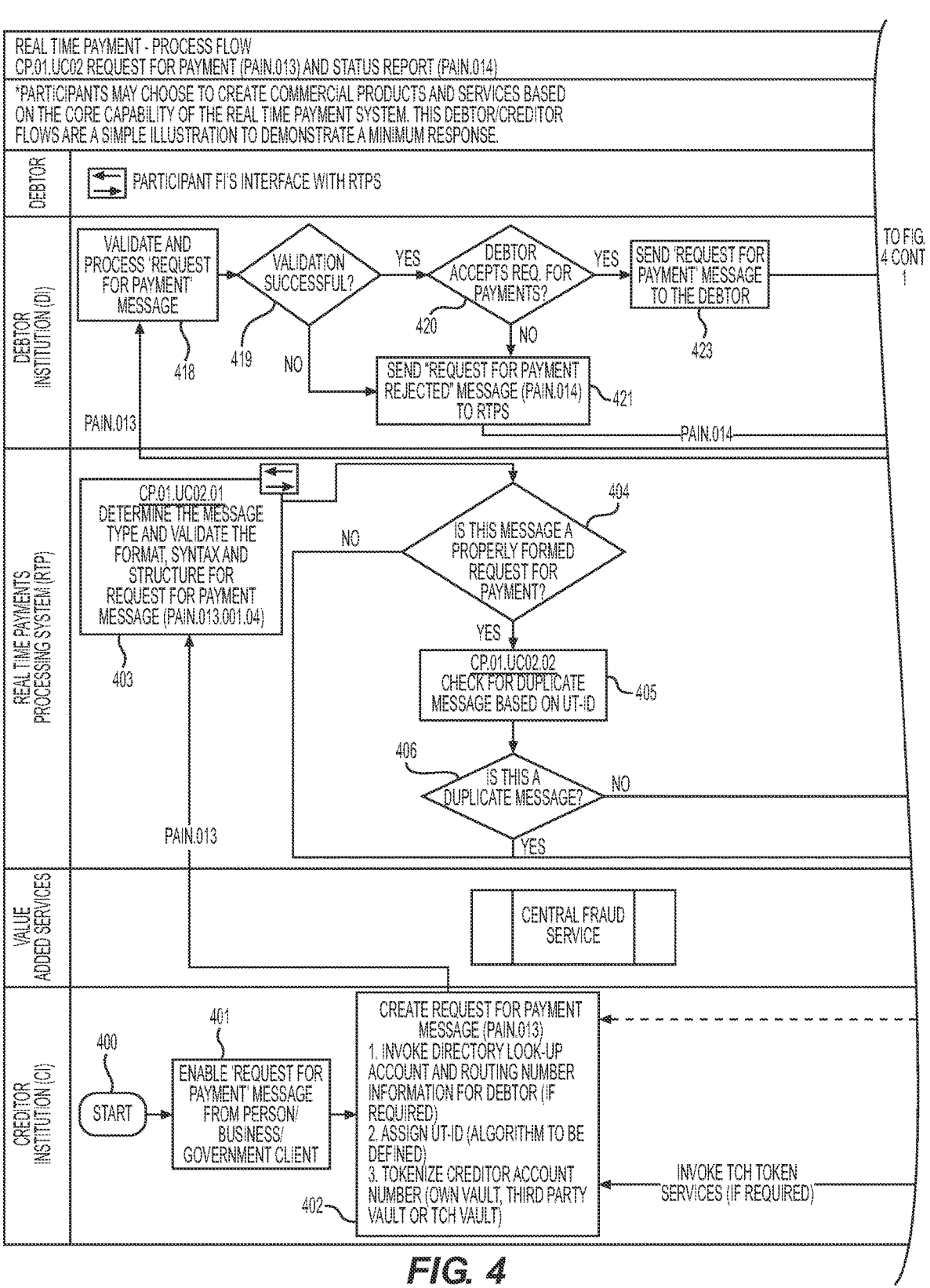
FIG. 4 illustrates a flow diagram of a process for requesting payment, according to an example embodiment herein.

According to another example aspect of the present application, a party, such as, for example, a creditor, can request a payment from another party. Referring now to FIG. 4 (and also FIGS. 13 and 14), a method according to this example aspect will now be described.

In step 400 the creditor station 121 sends a request to the creditor FI 120, requesting that payment be made to a creditor associated with the station 121, from another party, such as a party associated with debtor station 110. The creditor FI 120 then generates a request for payment message in step 401. Thereafter, step 402 is performed is the same manner as step 206 of FIG. 2, except that it is performed by the FI 120 to create a request for payment message (also referred to as a "payment request message") instead of a payment message itself. Also, in step 402 tokenization is performed to tokenize an identifier associated with station 110 and/or FI 111, with tokens.

After step 402, step 403 is performed wherein, in one example embodiment, the network 130 receives the payment request message from the creditor FI 120 (e.g., in a pain.013 message) and determines whether the message is correctly formatted. For example, the network 130 checks the message type, and validates the format, syntax, and/or structure of the message. That step can be performed in accordance with any suitable techniques. If it is determined that the message is not properly formatted ("No" in step 404), then control passes to step 411 which will be described below. If it is determined that the message is properly formatted ("Yes" in step 404), then control passes to step 405 where the network 130 checks to determine whether the message is duplicative of one already received, based on, for example, whether a UT-ID included in the message was already received in a previous message. If it is determined that the message is duplicative ("Yes" in step 406), then control passes to step 411, which will be described below. If, on the other hand, the message is determined to not be duplicative ("No" in step 406), then control passes to step 407 where the network 130 checks the message to determine whether it includes valid account and routing numbers for the debtor FI 111, or a valid alias (token). If not ("No" in step 408), then control passes to step 411 which is performed in a manner to be described below. If "Yes" in step 408, then in step 409 the network 130 makes a determination as to whether the debtor FI 111 is enabled for sending payment transactions, and whether the creditor FI 120 is enabled for sending a request for payment. For example, this step can include the network 130 checking a look-up table to determine whether information in the table indicates that those FIs have such respective capabilities.

If the FIs are determined not to be enabled (No" in step 410), then control passes to step 411 which will be described below. If, on the other hand, the FIs are determined to be enabled ("Yes" in step 410), then the network 130 makes a determination as to whether a token service is being employed by the debtor FI 111 (e.g., in one embodiment by checking a look-up table that includes such information) (step 412). In one example embodiment herein that step can be performed like step 224 of FIG. 2, but for the debtor FI 111. If the performance of step 412 results in a determination of "No" ("No" in step 413), then control passes to step 415. In step 415, the network 130 forwards the request for payment (e.g., a pain.013) to the debtor FI 111, and then step 418 is performed in a manner to be described below.

Referring back to step 411, that step includes the network 103 generating an exception message (e.g., a pain.014 message) and providing it to the creditor FI 120. Then, in step 414, the creditor FI 120 receives that message and notifies the creditor station 121 of the message, and then the method ends in step 415'.

Referring back again to step 412, a case where token services are determined to be employed by the debtor FI 111 will now be described. In such a case ("Yes" in step 413), control passes to step 416 where the payment request message is de-tokenized. For example, the ACH network 130 (and/or value added services 138) performs a translation from the BANPC included in the request to (1) a debtor's account number with their debtor FI (e.g., FI 111) and (2) a routing number for the debtor's FI (e.g., FI 111). To perform this translation, the ACH network 130 and/or value added services 138, maintains the BANPC database that associates each debtor's BANPC with that debtor's account number at their FI (e.g., FI 111) and the routing number to the debtor's FI (e.g., FI 111). Using the directory and the BANPC included in the payment request, the BANPC included in the transaction is correlated to a corresponding BANPC included in the directory, and to that latter BANPC's associated account number and routing number of the debtor's FI (e.g., FI 111), in the directory (step 417).

The BANPC's associated account number and routing number of the debtor's FI (e.g., FI 111) are inserted into the payment request, and the BANPC and BRNPC are removed from the request. Then the payment request, including the inserted account number and routing number, is routed to the debtor's FI (e.g., FI 111) based on the inserted routing number, in step 415.

After step 415 the payment request is validated in step 418 to confirm that it is in the correct format (step 418). In the case where the validation is not successful ("No" in step 419), then in step 421 the debtor FI 111 sends a "request for payment rejected" message to the ACH network 130 and control passes to step 422 which will be described below. In the case where the validation performed in step 419 is successful ("Yes" in step 419), then the debtor FI 111 determines whether the debtor associated with the debtor station 110 (or the station itself 110) accepts request for payment messages (step 420). If not ("No" in step 420), then control passes to step 421 which is performed in the above-described manner. If step 420 results in a determination of "Yes" ("Yes" in step 420, then control passes to step 423 where the debtor FI 111 forwards a request for payment message to the debtor station 110, where a decision is made (step 424) to accept or ignore the request for payment message. If it is decided the ignore the message, the method ends in step 425. On the other hand, if the message is accepted ("Yes" in step 424), then the station 110 sends a payment transaction message to the debtor FI 111 requesting that the payment be made. The debtor FI 111 then receives the message (step 426) and adds to the message an indication that the payment transaction is in response to a request for payment message (step 427) (e.g., the indication is added to the UT-ID). Then, in step 428 the debtor FI 111 checks the account of the party associated with the debtor station 110 to determine whether it holds sufficient funds for being able to cover the payment transaction amount indicated in the payment message. Where there are sufficient funds, then in step 429 the FI 111 determines whether the payment can be executed in real time (e.g., whether the receiving institution, such as creditor FI 120, has subscribed to the real time payments service). If it is determined that the payment cannot be executed in real time ("No" in step 430), then the payment can be effected using an alternate routing method (step 431), and the method ends in step 432. If it is determined that the payment can be executed in real time ("Yes" in step 430), then the payment transaction message is sent (e.g., in a pacs.003 message) to the ACH network 130.

Referring now to step 422, the step includes tokenizing the account/routing numbers of the creditor in a similar manner as tokenization is performed in step 206 of FIG. 2. After step 422 for the case where the message was provided from step 430, control passes to step 433 where a credit transfer process is performed. In one example, that process is performed by performing steps that are the same as those starting at step 210 of FIG. 2 (e.g., the process includes all steps of FIG. 2 except for those preceding step 210).

Figure 13:
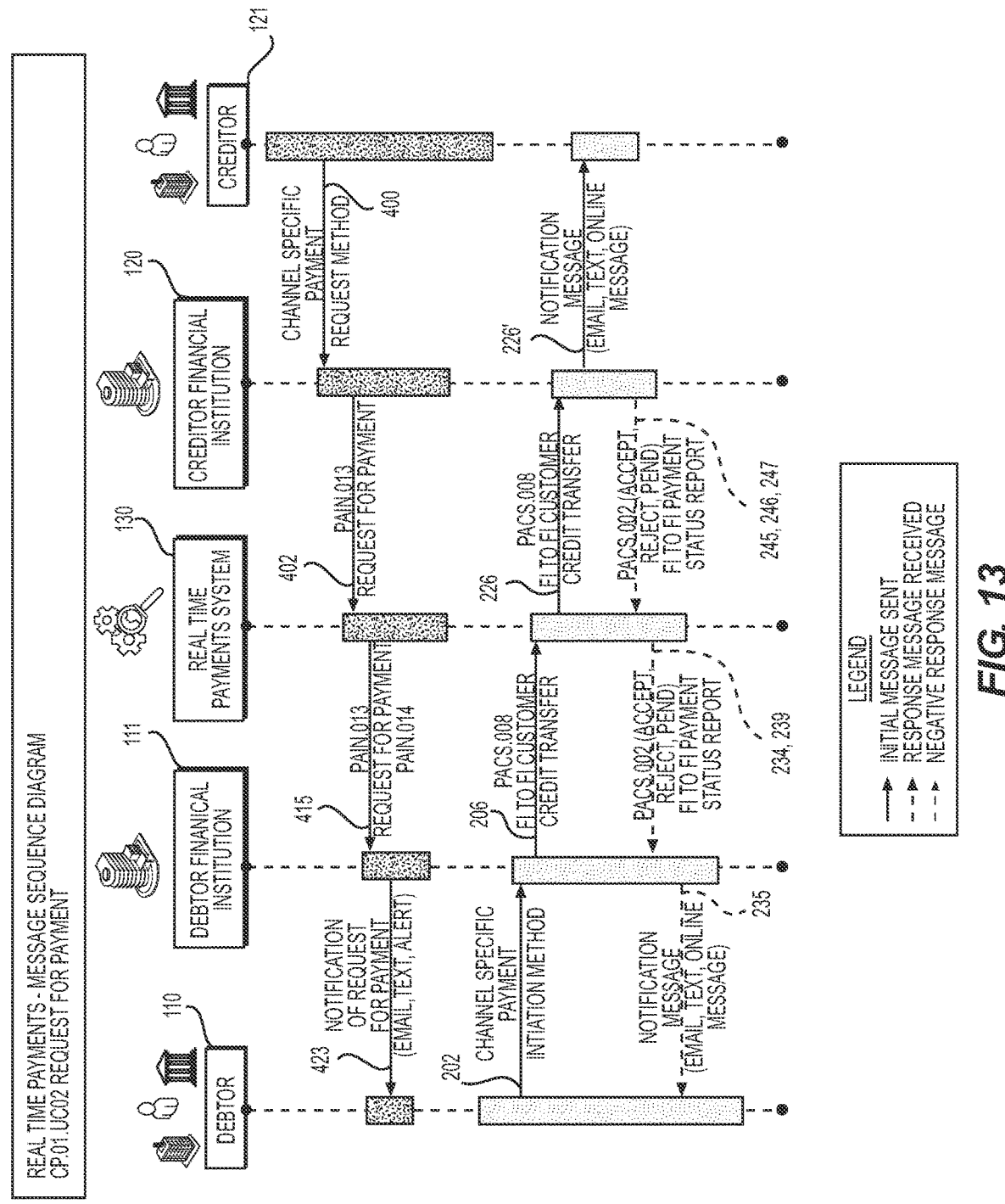
FIG. 13 illustrates a process flow for requesting payment, according to an example embodiment herein.
Figure 14:
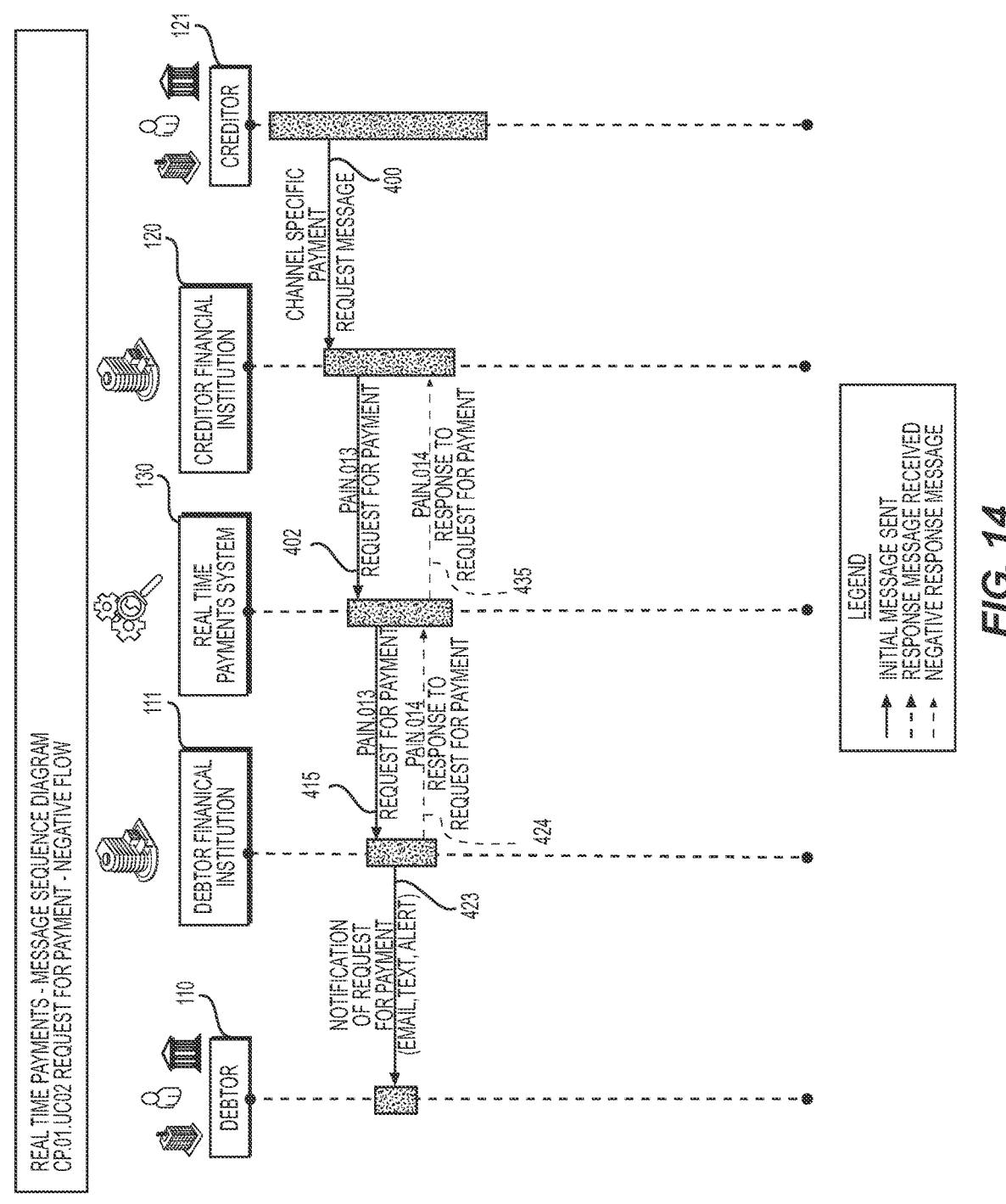
FIG. 14 illustrates another process flow for requesting payment, according to an example embodiment herein.

On the other hand, after step 422 for the case where the "request for payment rejected" message is received from debtor FI 111 in step 421 and processed in step 422, control passes to step 434 where, in one example embodiment, the network 130 determines whether the message received from the debtor FI 111 is correctly formatted. For example, the network 130 checks the message type of the transaction, and validates the format, syntax, and/or structure of the message. That step can be performed in accordance with any suitable techniques. Then, in step 435 the network 130 forwards a reject message to the creditor FI 120 and updates a record of the network 130 to indicate that the request for payment message has been rejected. In step 436 the creditor FI 120 receives the reject message and notifies the creditor station 121 that the request for payment has been rejected. The method then ends in step 415'. FIG. 13 also shows steps 400, 402, 415, and 423 described above, in association with steps 202, 206, 226, 234, 235, 239, 245, 246, 247, and 226' that were described above in connection with FIG. 2. In FIG. 13, step 202 is initiated after the debtor 110 receives a message requesting payment in step 423.

Return of Funds

The method herein provides certainty for receivers. For example, funds are not permitted to be taken back from the receiver. In the case of error, a payer can ability request a return of funds (although in some embodiments there is no obligation to reverse/revoke transaction). This enables parties to complete transactions that would be too risky if payment could be reversed. In one example embodiment, requests for a return of funds refund can require a new transaction to return the funds to the requester, although this example is not limiting.

In example embodiments herein, between a payer and payee, once funds are sent by sender, funds cannot be pulled back without receiver's permission. Between a payer and payer's FI and between a payer's FI and payee's FI, once a payment message is transmitted to the network operator by the sending FI, the message cannot be cancelled or amended. Between a payer's FI and payee's FI, once the payment message is transmitted to the network operator by the sending FI, the sending FI has an obligation to settle the payment (unless receiving FI rejects the payment), and, once settled, the sending FI has no ability to pull back funds, although the receiving FI can reject payment and return funds.

In a credit push scenario, a consumer initiates payment, and, as such, there are no unauthorized debits. Bank are required by regulations to resolve errors related to thefts of account funds, subject to a consumer's responsibility to report the loss or theft of an access device. With respect to errors such as input errors (e.g., transposed account digits), these can be addressed by a process to request the funds from the counterparty and the development of payment features to reduce sending errors.

As an example of a process to request the return of funds sent in error, in one example embodiment, a return can be requested only for a sender error. For example, a receiver may recognize that a payment was made in error, sends a message to the payer that the payment is being returned, the payment is returned to the payer, which recognizes that the payment was made in error. The payer can send a message to the payee indicating that the payment was made in error. The receiver receives the message and can agree to return the funds to the payer. If the receiver does not agree to do so, or otherwise does not send a response, then the payer sends a message via the payer's FI to the receiver's FI asking for the return of funds. All messages reference the universal transaction Id of the original payment.

Figure 5:
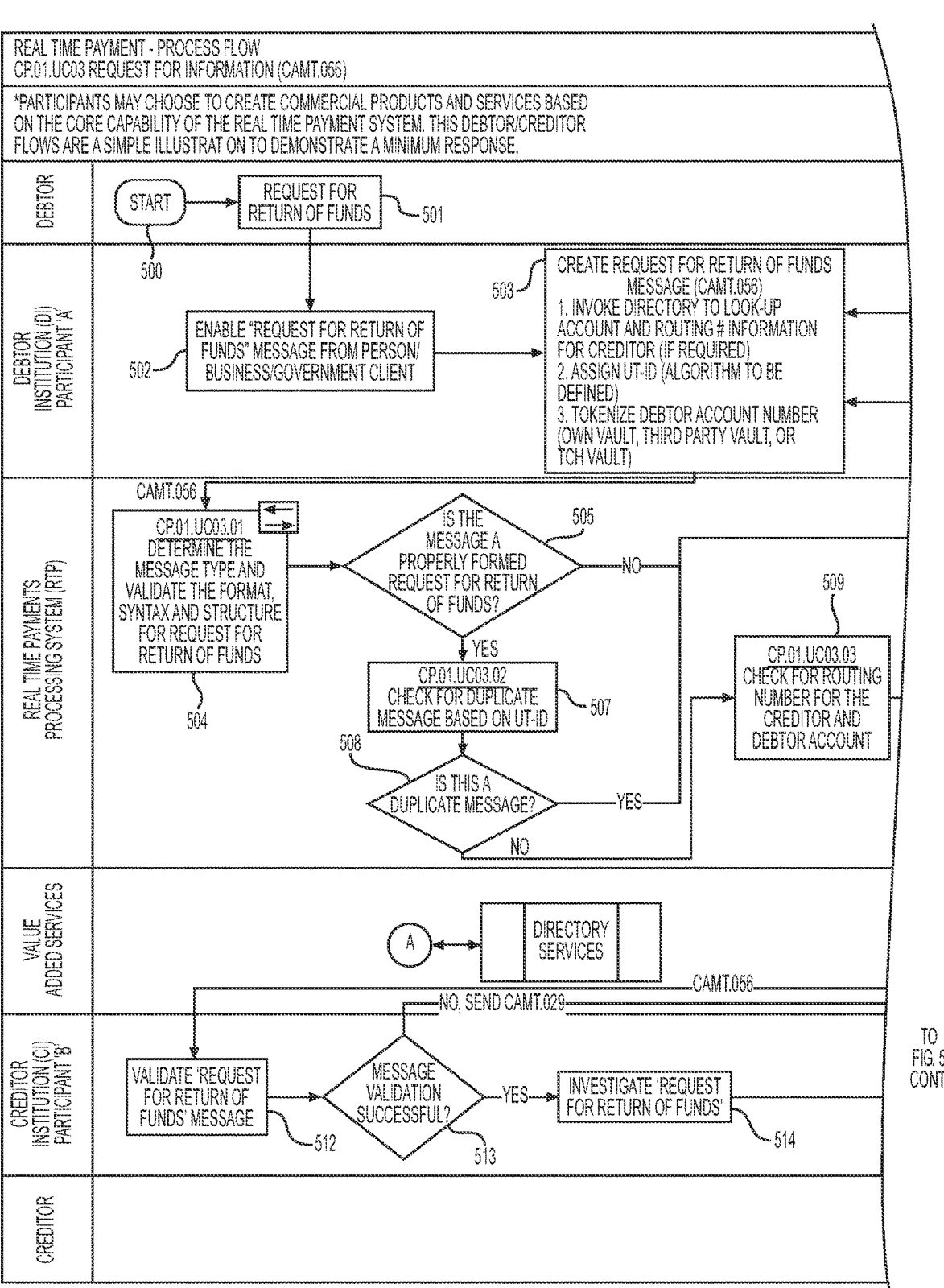
FIG. 5 illustrates a flow diagram of a process for requesting a return of funds, according to an example embodiment herein.
Figure 5:
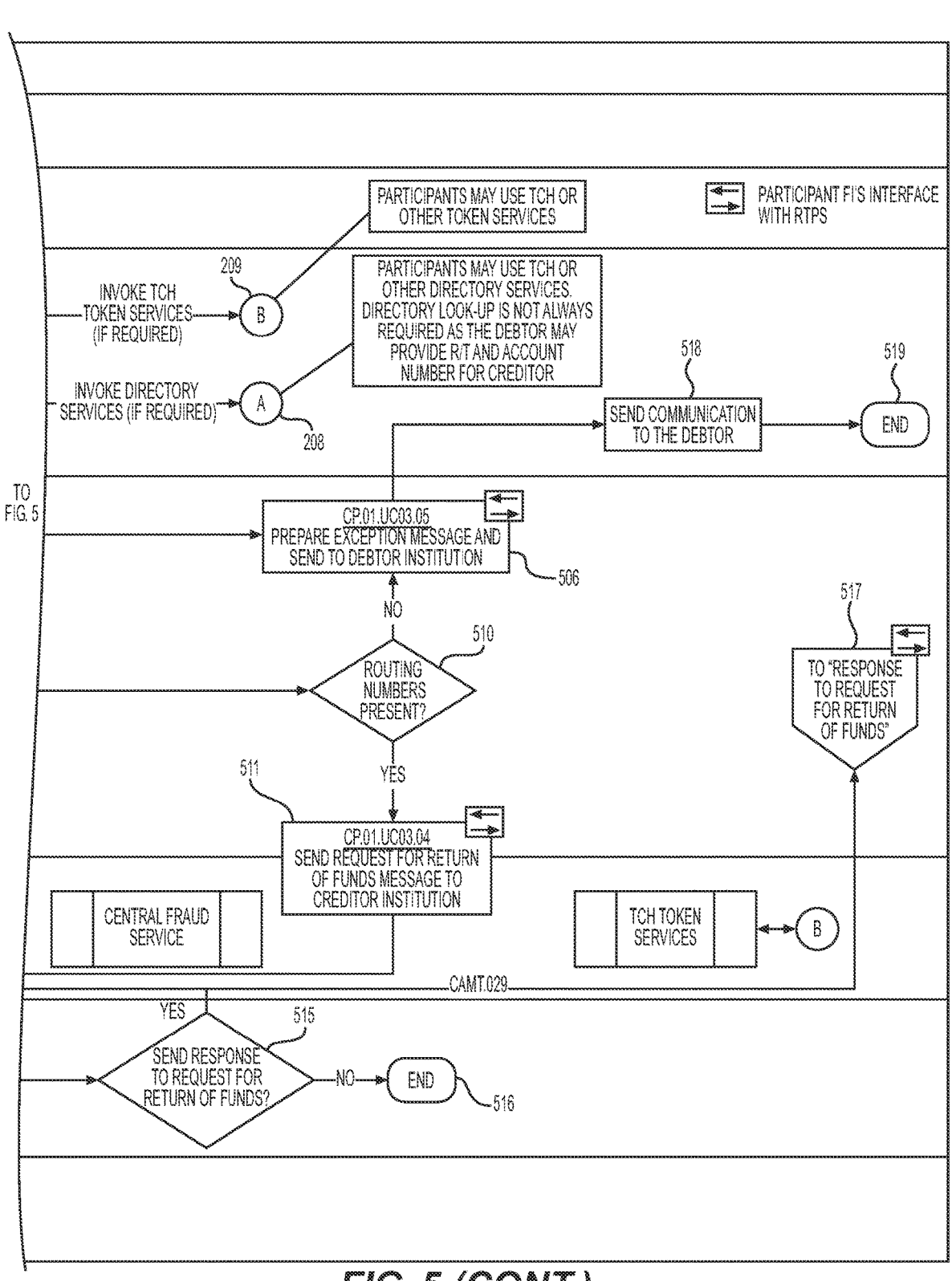

An example aspect of the present application will now be described, with reference to FIG. 5, which shows a flow diagram for requesting a return of funds. This procedure can be useful where, for example, a debtor has paid a creditor perhaps mistakenly, and desires to obtain a return of the funds. The method commences in step 500, and in step 501 the debtor station 110 communicates with debtor FI 111 to request a return of funds from a creditor, such as that associated with creditor station 121. The debtor FI 111 then generates a request for return of funds message in step 502. Then step 503 is performed in a similar manner as step 206 of FIG. 2, except for the newly generated message. Then step 504 is performed in a similar manner as step 210 of FIG. 2 to determine whether the message is correctly formatted. If the message is not correctly formatted ("No" in step 505), then control passes to step 506 which is performed in the same manner as step 216' of FIG. 2. If the message is determined to be correctly formatted ("Yes" in step 505), then control passes to step 507 where the network 130 checks to determine whether the message is duplicative of one already received, based on, for example, whether a UT-ID included in the message was already received. If it is determined that the message is duplicative ("Yes" in step 508), then control passes to step 506 which is performed as described above, After step 506 the network 130 sends a notification to the debtor FI 111 indicating that the request for return of funds failed, and that FI notifies the debtor station 110 (step 518). The method then ends in step 519.

If, on the other hand, the message is determined in step 508 to not be duplicative ("No" in step 508), then control passes to step 509 where the network 130 checks the message to determine whether it includes valid account and routing numbers. If not ("No" in step 510), then control passes to step 506 which is performed in the manner described above. If "Yes" in step 510, then in step 511 the network 130 forwards a request for return of funds message to the creditor FI 120, which then validates the message to check that it is correctly formatted (step 512). If the validation is not successful ("No" in step 513), then a message (e.g., a camt.029 message) indicating that result is provided to ACH network 130 and processing continues in step 517 where, in one example embodiment, the network 130 can notify the debtor FI 111 thereof (which can the notify the station 110 of the same). Additional procedures then can be performed as will be further described with respect to FIG. 6 below.

If, on the other hand, the validation in step 513 is successful, then the creditor FI 120 investigates the situation regarding whether or not the funds should be returned (step 514). If it is decided to respond to the request for return of funds ("Yes" in step 515), then control passes to step 517 where, in one example embodiment, the network 130 can notify the debtor FI 111 of the result of the investigation or that one is being undertaken (the FI 11 also can notify the station 110 of the same). The notification also can provide a message returning the amount requested in the request for return of funds message. Additional procedures can then be performed as will be further described with respect to FIG. 6 below. Otherwise, if "No" in step 515, then the method ends in step 516.

Figure 15:
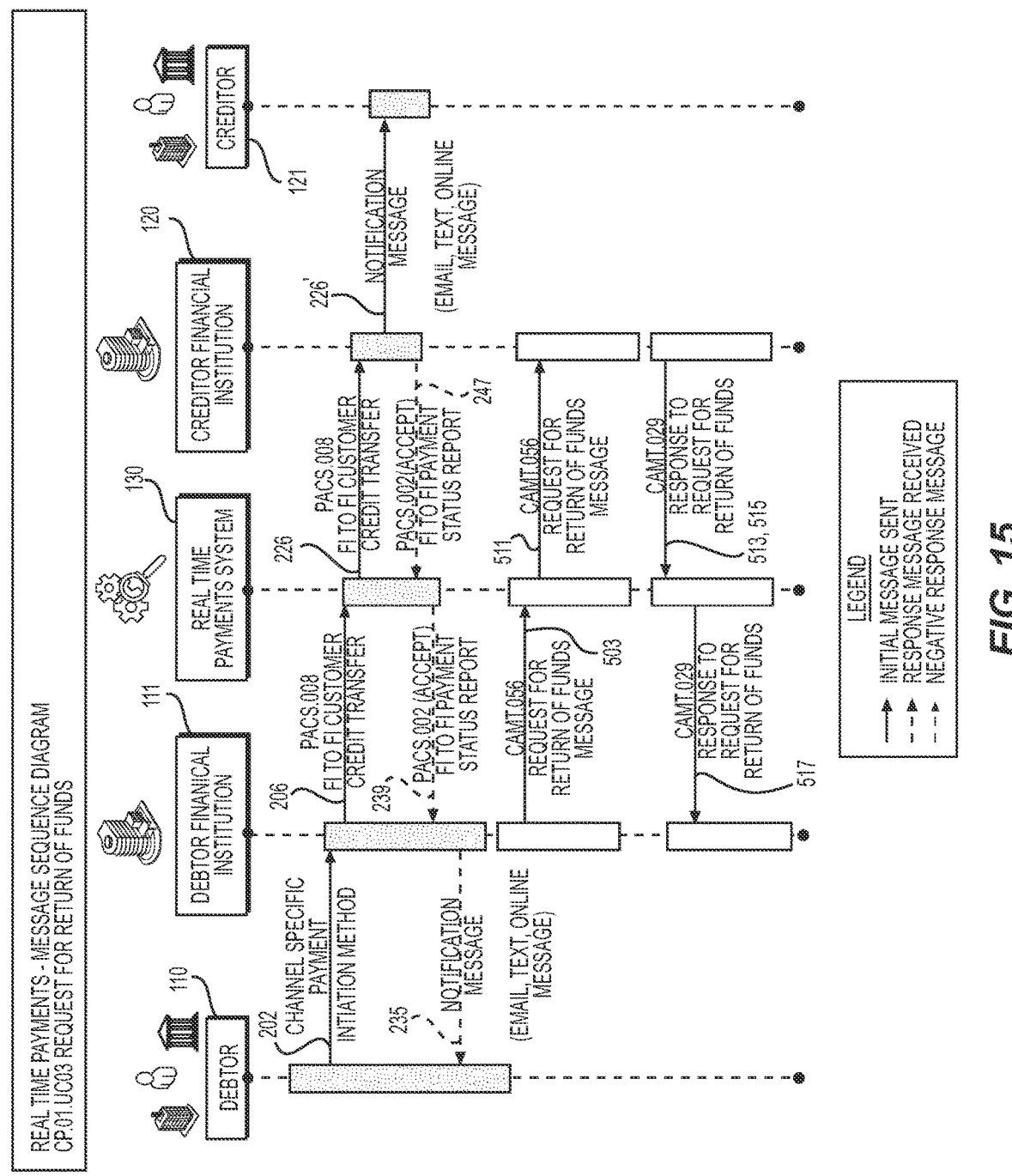
FIG. 15 illustrates a process flow for requesting a return of funds, according to an example embodiment herein.

FIG. 13 also shows procedures for making payments, including steps 202, 206, 226, 226', 235, 239, and 247 that were described above in connection with FIG. 2, and procedures for requesting a return of funds, including steps 503, 511, 513, 515, and 517 described above in connection with FIG. 5, wherein the numbers in FIG. 15 are intended to indicate the messages sent in association with those steps.

Figure 6:
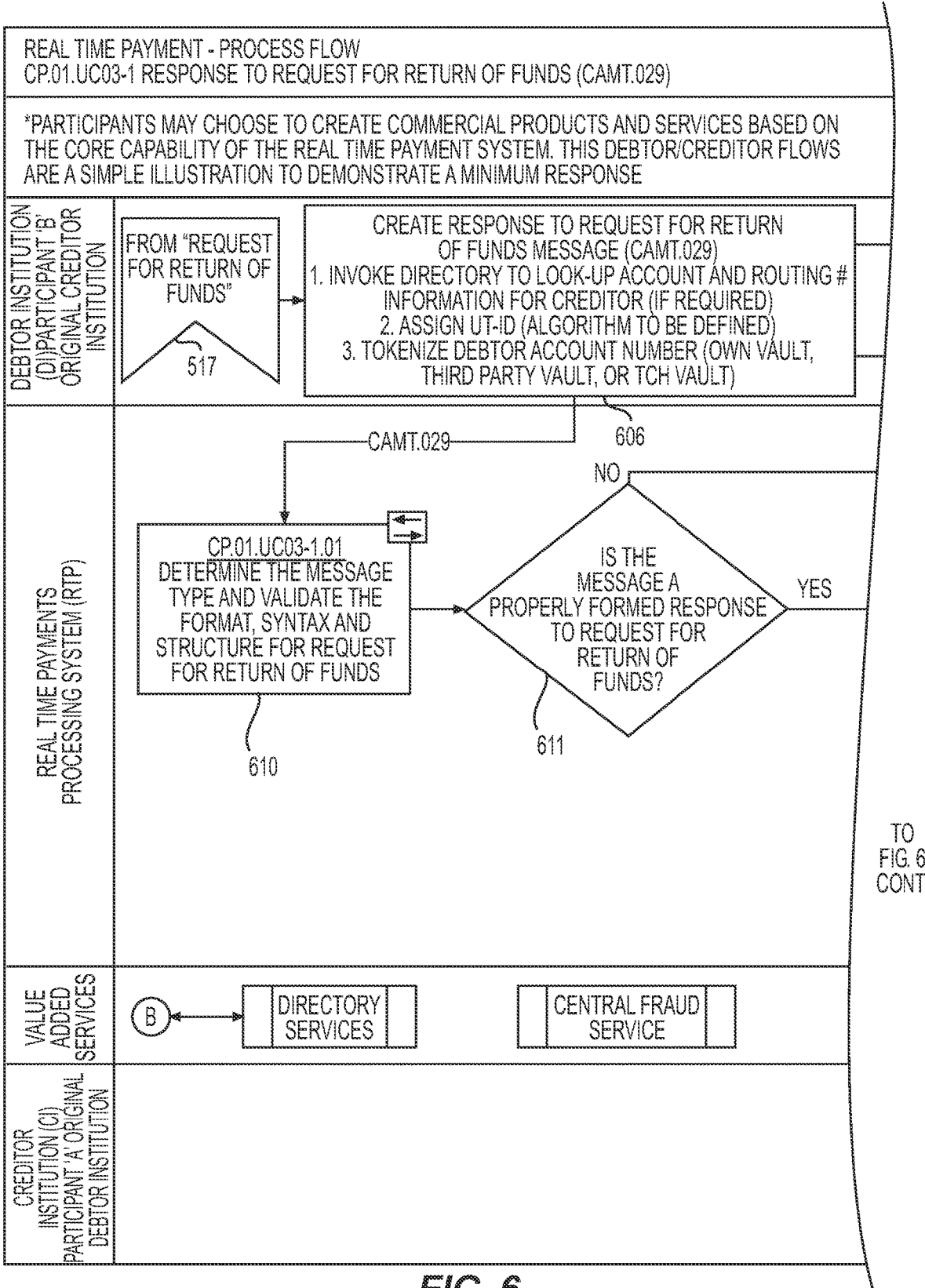
FIG. 6 illustrates a flow diagram of a process for providing a response to a request for return of funds, according to an example embodiment herein.
Figure 6:
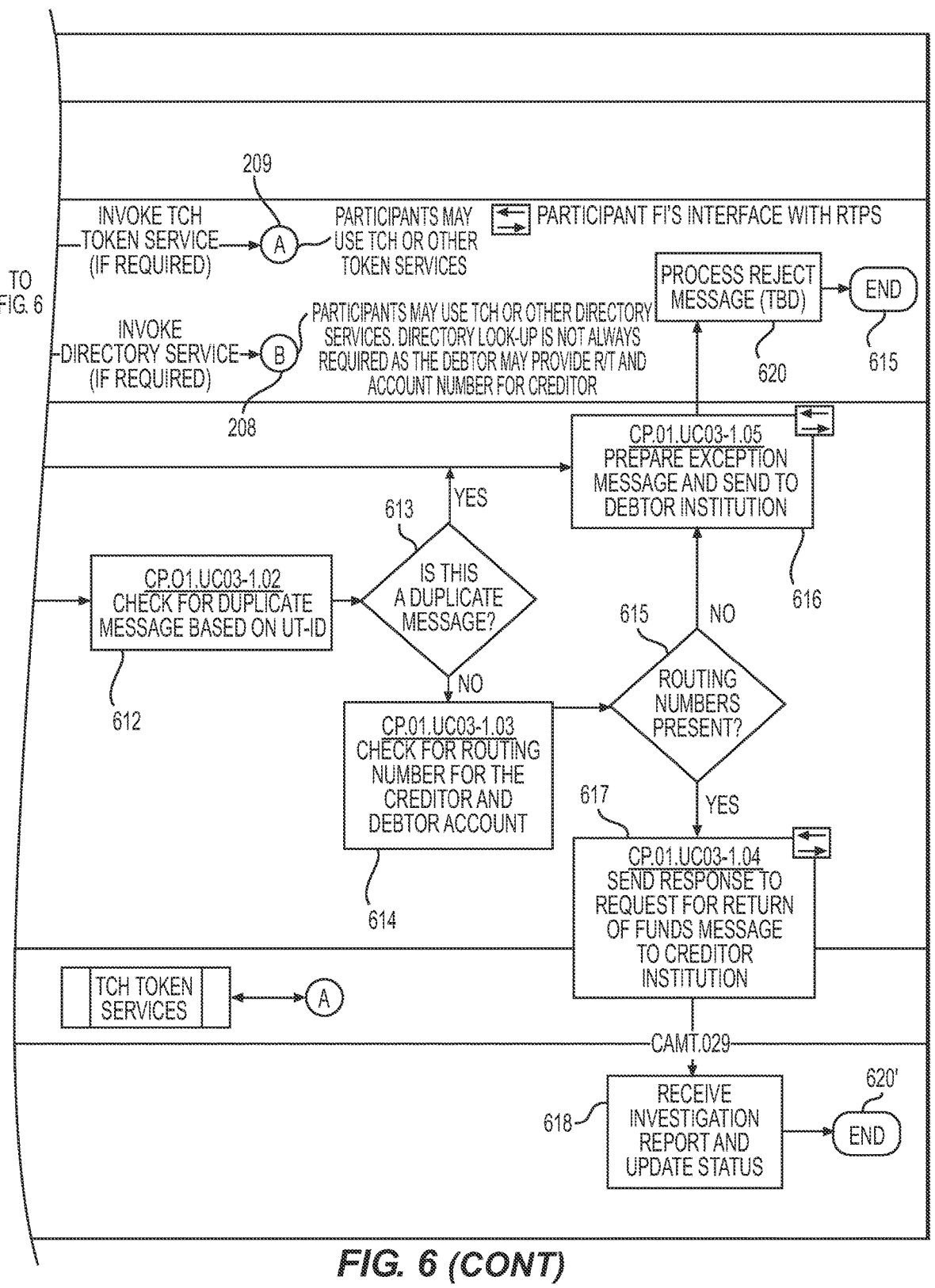

FIG. 6 will now be described. After receiving a message in step 517, the debtor FI 111 generates in step 606 a response to request for return of funds message (e.g., camt.029). In one example embodiment herein, the response includes a BANPC identifier and BRNPC obtained by the FI 111 by accessing the directory to correlate information included in the message received in step 517 to a corresponding BANPC identifier and BRNPC included in the directory (step 208, 209). That obtaining can be performed in a similar manner as described above in connection with step 206 of FIG. 2, but for the response to request for return of funds message.

After step 606 is performed, control passes to step 610 where, in one example embodiment, the network 130 receives the message generated in step 606 from the debtor FI 111 (e.g., in a camt.029 message) and determines whether the transaction is correctly formatted. For example, the network 130 checks the message type of the transaction, and validates the format, syntax, and/or structure of the message. That step can be performed in accordance with any suitable techniques. If it is determined that the message is not properly formatted ("No" in step 611), then control passes to step 616 which is performed to generate an exception message like in step 506 of FIG. 5. That message is then provided to the debtor FI 111 where it is processed (step 620), and then the method ends in step 615. If it is determined that the message is properly formatted ("Yes" in step 611), then control passes to step 612 where the network 130 checks to determine whether the message is duplicative of one already received, based on, for example, whether a UT-ID included in the message was already received. If it is determined that the message is duplicative ("Yes" in step 613), then control passes to step 616, which will be described below. If, on the other hand, the message is determined to not be duplicative ("No" in step 613), then control passes to step 614 where the network 130 checks the message to determine whether it includes valid account and routing numbers. If not ("No" in step 615), then control passes to step 616 which is performed in a manner to be described below. If "Yes" in step 615, then in step 617 the network 130 sends a response to request for return of funds message to the creditor FI 120, which then can investigate the situation relating to the request and updates the status of the request in accordance with the received message and the investigation (step 618). The method ends in step 620'.

Requests for Information

Figure 7:
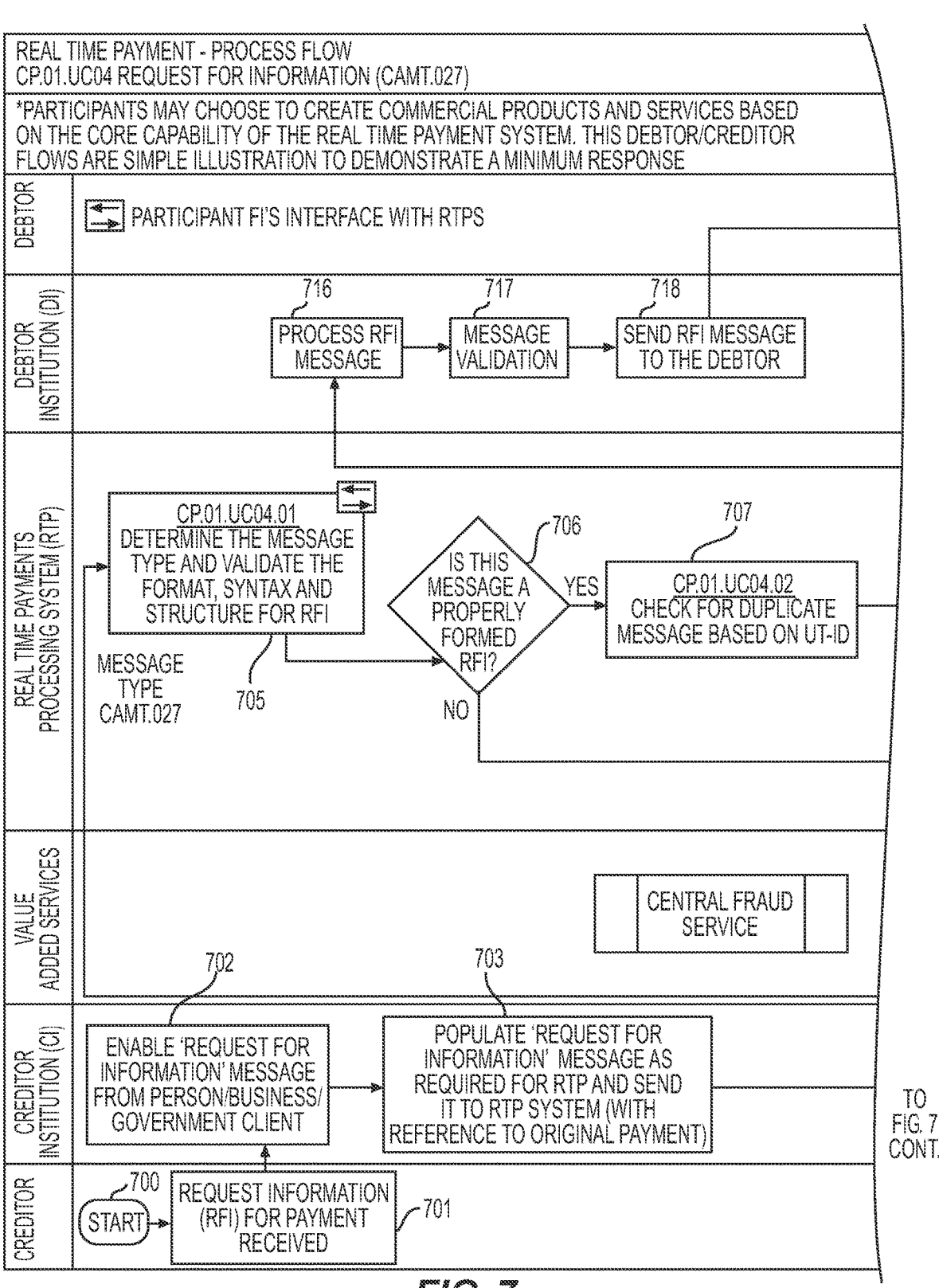
FIG. 7 illustrates a flow diagram of a process for requesting information, in accordance with an example embodiment herein.
Figure 7:
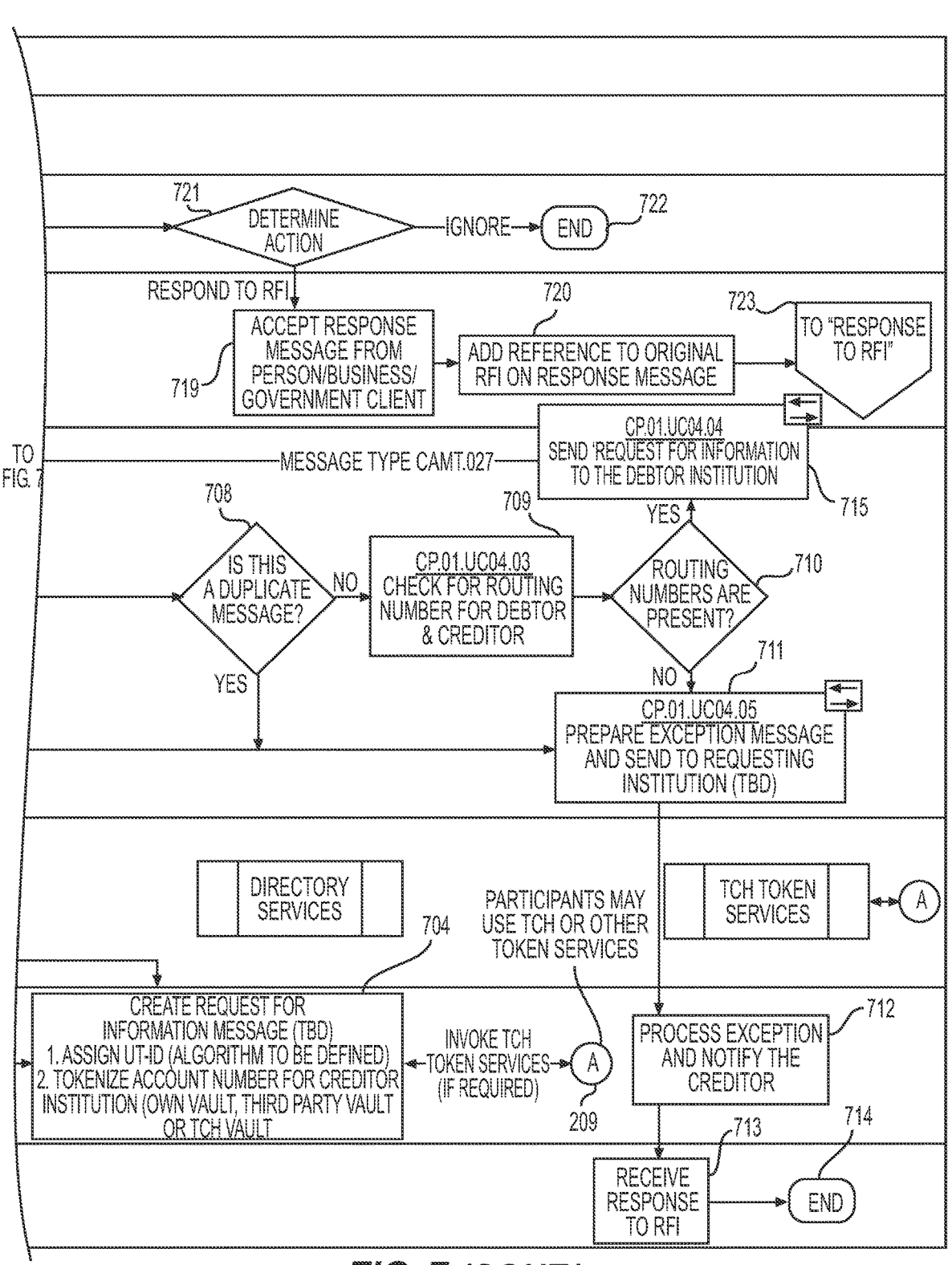

FIG. 7 will now be described. FIG. 7 shows a flow diagram of a procedure enabling a party, such as, for example, a creditor associated with creditor station 121, to request information from an institution association with another party, such as debtor FI 111 associated with debtor station 110, or with debtor station 110 itself. In step 700 the method commences, and creditor station 121 communicates with creditor FI 120 to request information (step 701). In step 702 the creditor FI 120 receives and enables the request, and then in step 703 generates a request for information message. That request may be in association with a specific, original payment, such as one made in the procedure of FIG. 2. In step 704 the request for information message is assigned a UT-ID and tokenization is performed. Step 704 can be performed like step 402 of FIG. 4, in one example embodiment.

In one example embodiment herein, for tokenization a BANPC identifier and BRNPC are obtained by the FI 120 and included in the message. For example, the FI 120 can access a directory to correlate information (e.g., a bank account and routing number) included in the message to a corresponding BANPC identifier and BRNPC included in the directory (step 209). The directory may be included in the FI 120, ACH network 130, or in another part of the system 100, such as at a third party or another element.

After step 704 is performed, control passes to step 705 where, in one example embodiment, the network 130 receives the message generated in step 704 from the creditor FI 120 (e.g., in a camt.027 message) and determines whether the transaction is correctly formatted. For example, the network 130 checks the message type of the transaction, and validates the format, syntax, and/or structure of the message. That step can be performed in accordance with any suitable techniques. If it is determined that the message is not properly formatted ("No" in step 706), then control passes to step 711 where the ACH network 130 generates an exception message and provides it to the creditor FI 120, which then processes the message and notifies (step 712) the creditor station 121 of the exception message (step 713). The method ends in step 714.

Referring again to steps 705 and 706, if it is determined that the message from step 704 is properly formatted ("Yes"

in step 706), then control passes to step 707 where the network 130 checks to determine whether the message is duplicative of one already received, based on, for example, whether a UT-ID included in the message was already received. If it is determined that the message is duplicative ("Yes" in step 708), then control passes to step 711, which is performed as described above. If, on the other hand, the message is determined to not be duplicative ("No" in step 708), then control passes to step 709 where the network 130 checks the message to determine whether it includes valid account and routing numbers. If not ("No" in step 710), then control passes to step 711, which is performed as described above. If "Yes" in step 710, then in step 715 the network 130 sends a request for information message to the debtor FI 111, which then processes the message (step 716) and validates it against predetermined criteria (step 717). The message is then forwarded to the debtor station 110 in step 718, and the debtor station 110 and/or party associated therewith can decide how to address the request for information (step 721). If it is decided to ignore the request, then the method ends in step 722. In the event were the debtor station 110 provides a respond to the request for information, then the debtor FI 111 receives that response (step 719), adds a reference to the message in step 720 to indicate that it is associated with the original request for information message received in step 716, and then control passes through step 723 to FIG. 8, which will be described below.

Figure 8:
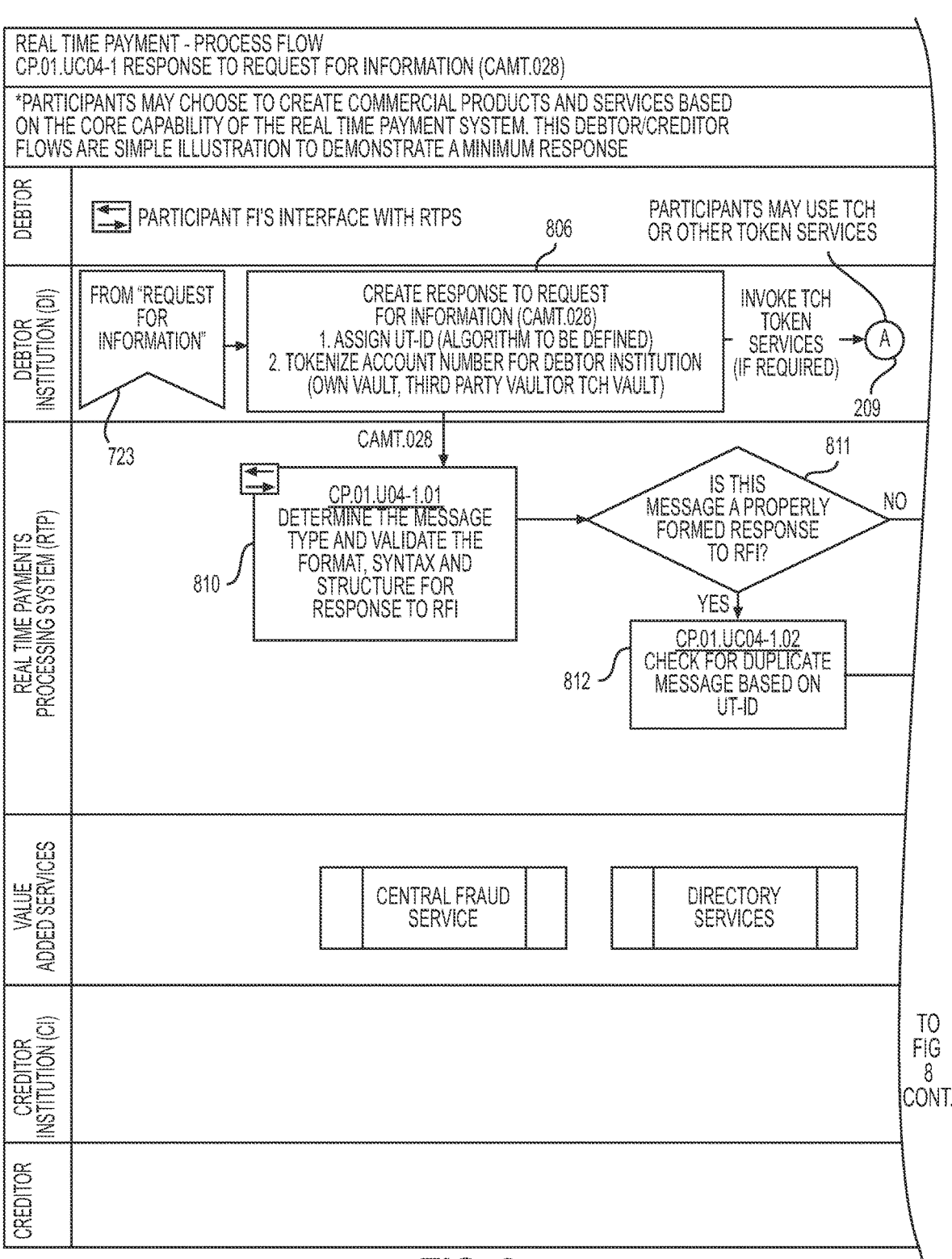
FIG. 8 illustrates a flow diagram of a process for responding to a request for information, in accordance with an example embodiment herein.

FIG. 8 will now be described, and represents a continuance of the procedures from step 723 of FIG. 7. In step 806 a response to request for information message (e.g., camt.028) is generated by the debtor FI 111, based on the message accepted in step 719 and reference added in step 720.

Also, in one example embodiment herein, tokenization is performed wherein a BANPC identifier and BRNPC are obtained by the FI 111 by accessing a directory to correlate information included in the response message (e.g., information identifying the requestor of the request for information) to a corresponding BANPC identifier and BRNPC included in the directory (step 209). The directory may be included in the ACH network 130, in one example embodiment, or in another example, it can be included elsewhere in the system 100, such as at FI 111, a third party, or another element. The obtained BANPC and BRNPC are included in the response message generated in step 806.

After step 806 is performed, control passes to step 810 where, in one example embodiment, the network 130 receives the message generated in step 806 from the debtor FI 111 (e.g., in a camt.028 message) and determines whether the transaction is correctly formatted. For example, the network 130 checks the message type of the transaction, and validates the format, syntax, and/or structure of the message. That step can be performed in accordance with any suitable techniques. If it is determined that the message is not properly formatted ("No" in step 811), then control passes to step 816 where the ACH network 130 generates an exception message and provides it to the debtor FI 111, which then processes the message and notifies (step 820) the debtor station 110 of the exception message. The method ends in step 815.

If performance of step 810 results in a determination that the message is properly formatted ("Yes" in step 811), then control passes to step 812 where the network 130 checks to determine whether the message is duplicative of one already received, based on, for example, whether a UT-ID included in the message was already received. If it is determined that the message is duplicative ("Yes" in step 813), then control passes to step 816, which will be described below. If, on the other hand, the message is determined to not be duplicative ("No" in step 813), then control passes to step 814 where the network 130 checks the message to determine whether it includes valid account and routing numbers. If not ("No" in step 815), then control passes to step 816, which is performed in a manner to be described below. If "Yes" in step 815, then in step 817 the network 130 sends a response to request for return of funds message to the creditor FI 120, which then validates that response against predetermined criteria (step 818) and provides it to the creditor station 121 (step 819). The method ends in step 820.

Figure 9:
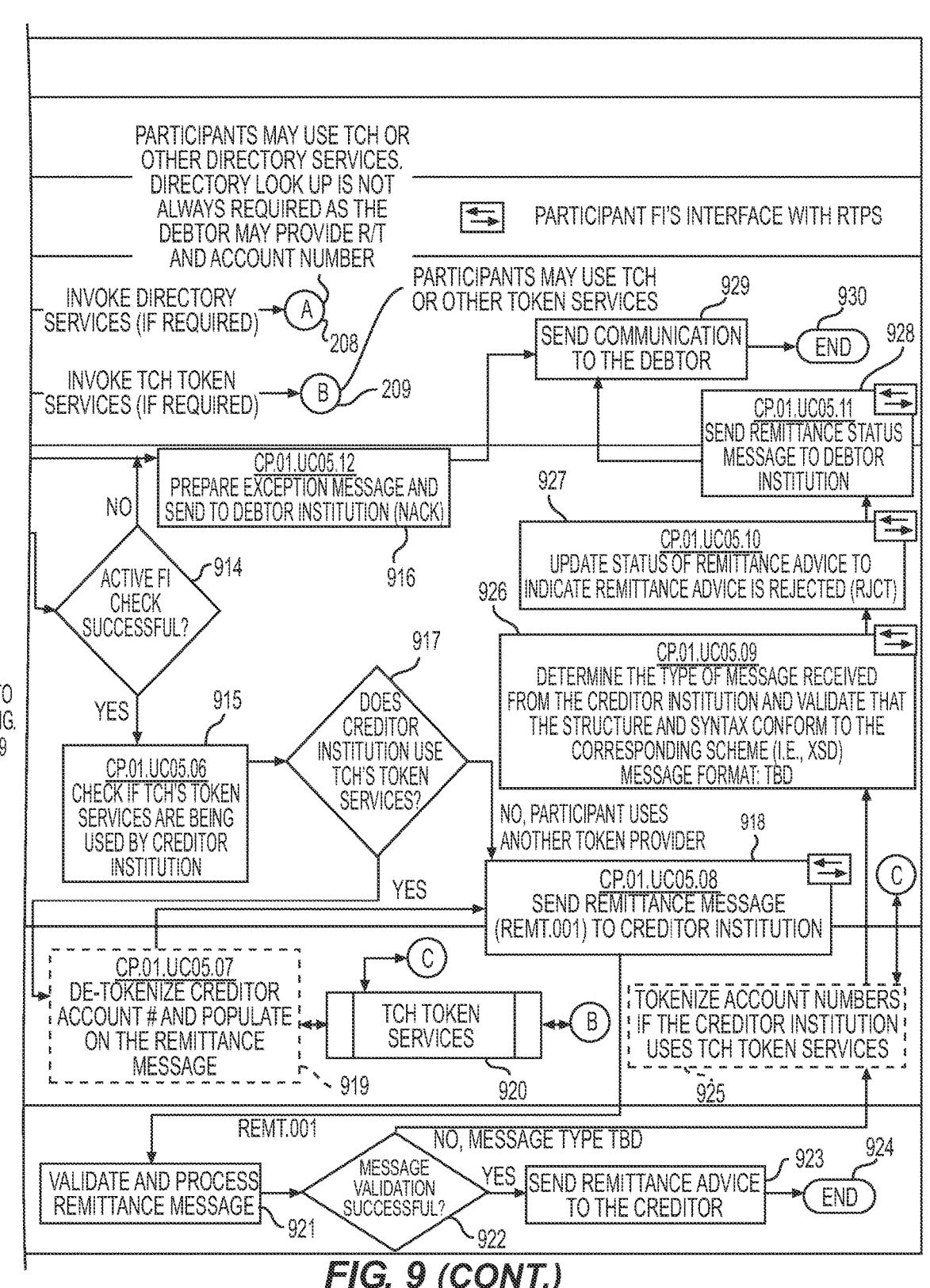
FIG. 9 illustrates a flow diagram of a process for providing remittance advice, in accordance with an example embodiment herein.
Figure 16:
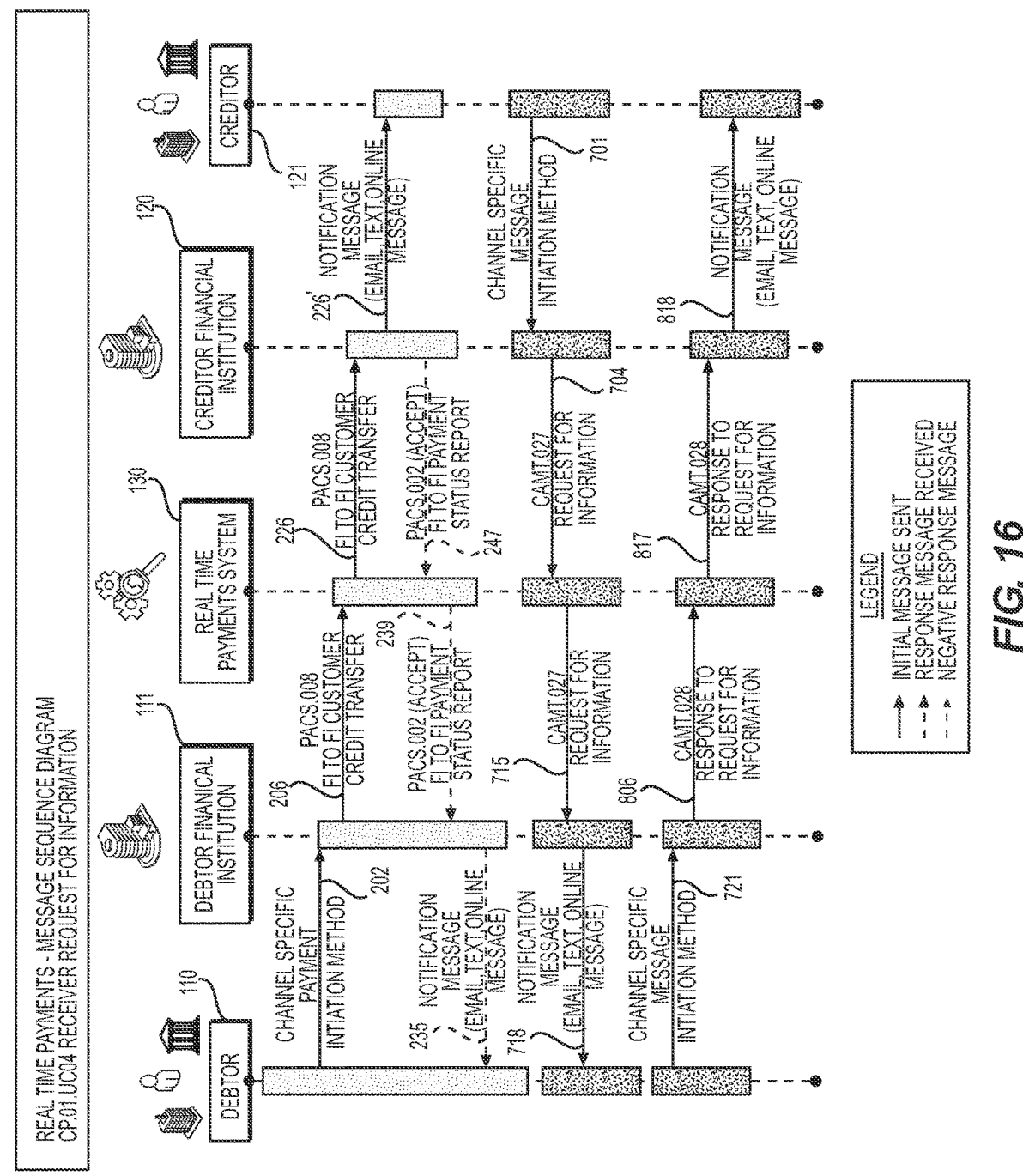
FIG. 16 illustrates a process flow for requesting information, in accordance with an example embodiment herein.

FIG. 16 also shows procedures involved in request for information, in association with those for making payments. For making payment, FIG. 16 further represents steps 202, 206, 226, 226', 235, 239, and 247 that were described above in connection with FIG. 2. With respect to a request for information, FIG. 16 further represents steps 701, 704, 715, 718, and 721 of FIG. 7, and steps 806, 817, and 818 of FIG. 8, wherein the reference numbers in FIG. 16 are intended to indicate the messages sent in association with those steps.
Providing Remittance Advice FIG. 9 will now be described, and shows a procedure for sending remittance advice. In step 900 the method commences and control passes to step 901. That step 901 can include a step like step 201 of FIG. 2, wherein debtor station 110 requests that a payment be made (e.g., a pacs.008 message), and then control passes to step 202 of FIG. 2, where procedures for making a payment are performed as described above, beginning with that step. Also in step 901, the debtor station 110 provides remittance advice (step 901) (in a remt.001 message) to the debtor FI 111, which receives it in step 902 and a generates remittance advice message.

In one example embodiment herein, a BANPC identifier and BRNPC are obtained by the FI 111 by accessing a directory to correlate information included in the remittance advice (e.g., information associated with station 121 and/or FI 120) to a corresponding BANPC identifier and BRNPC included in the directory (step 903, 208, 209). The directory may be included in the ACH network 130, in one example embodiment, or in another example, it can be included elsewhere in the system 100, such as at the FI 111, a third party or another element. The obtained identifiers are included in the remittance advice message, as is an assigned UT-ID. Step 903 can be performed like step 206 of FIG. 2, but for the remittance advice message.

After step 903 is performed, control passes to step 904 where, in one example embodiment, the network 130 receives the message generated in step 904 from the debtor FI 111 (e.g., in a remt.001 message) and determines whether the message is correctly formatted. For example, the network 130 checks the message type, and validates the format, syntax, and/or structure of the message. That step can be performed in accordance with any suitable techniques. If it is determined that the message is not properly formatted ("No" in step 905), then control passes to step 916 which will be described below. If it is determined that the message is properly formatted ("Yes" in step 905), then control passes to step 907 where the network 130 checks to determine whether the message is duplicative of one already received, based on, for example, whether a UT-ID included in the message was already received. If it is determined that the message is duplicative ("Yes" in step 908), then control passes to step 916, which will be described below. If, on the other hand, the message is determined to not be duplicative ("No" in step 908), then control passes to step 909 where the network 130 checks the message to determine whether it includes valid account and routing numbers. If not ("No" in step 910), then control passes to step 916, which is performed in a manner to be described below. If "Yes" in step 910, then in step 911 the network 130 determines whether the debtor FI 111 identified in the message has a capability to receive real time payments (i.e., is "real time enabled") (step 911). If not ("No" in step 912), then control passes to step 916 which is performed in the manner described below. If "Yes" in step 912, then the network 130 makes a determination as to whether the debtor FI 111 or creditor FI 120 have been suspended to participate in electronic payment transactions (step 913). If either of those FIs are determined to be suspended (and thus the check is determined to not be successful) ("No" in step 914), then control passes to step 916. That step 916 will now be described. In step 916, the network 130 generates an exception message (e.g., a NACK message) and forwards it to the debtor FI 111, and then, in step 929 the debtor FI 111 responds by sending the exception message to the debtor station 110 (step 929), whereafter the method then ends in step 930.

If, on the other hand, either of the FIs 111 or 120 is determined not to be suspended (and thus the check is determined to be successful) ("Yes" in step 914), then control passes to step 915 where the network 130 determines whether token services are being employed by the creditor FI 120. If that determination results in a "Yes" decision ("Yes" in step 917), then in step 919 the tokens obtained in step 903 that are aliases of the creditor account and routing numbers are removed from the remittance advice message received from the FI 111 and replaced with their corresponding account and routing numbers (step 919). That step, which can be performed by the value added services 138, in one example embodiment herein, can be performed by invoking a directory (step 920) that may be included in the ACH network 130 or elsewhere in the system 100.

Referring again to steps 915 and 917, if the determination results in a "No" decision ("No" in step 917), then in step 918 the network 130 sends a remittance advice message (e.g., remt.001) to the creditor FI 120, which then processes and validates the message (step 921).

If that message is determined to be valid ("Yes" in step 922) then the remittance advice message is provided to the creditor station 121 (step 923), and then the method ends in step 924. If step 922 results in a determination of "Yes" decision ("Yes" in step 922), then a message indicative thereof (and, in one example, including the remittance advice) is provided by the FI 120 to the value added services 138, and, in step 925 tokenization can be performed by the services 138 to include tokens in the message, corresponding to the debtor FI 111. The inclusion of tokens can be performed in a similar manner as that described above for, by example, step 230 of FIG. 2. The resulting tokenized message is then provided to the network 130 which in step 926 receives the message and determines whether it is correctly formatted. For example, the network 130 checks the message type of the transaction, and validates the format, syntax, and/or structure of the message. That step can be performed in accordance with any suitable techniques. Then in step 927 the network 130 updates a status of the remittance advice to indicate that it is rejected, and sends a remittance status message to the debtor FI 111 (step 928). Thereafter, in step 929 that message is provided to the debtor station 110 and then the method ends (step 930).

Figure 17:
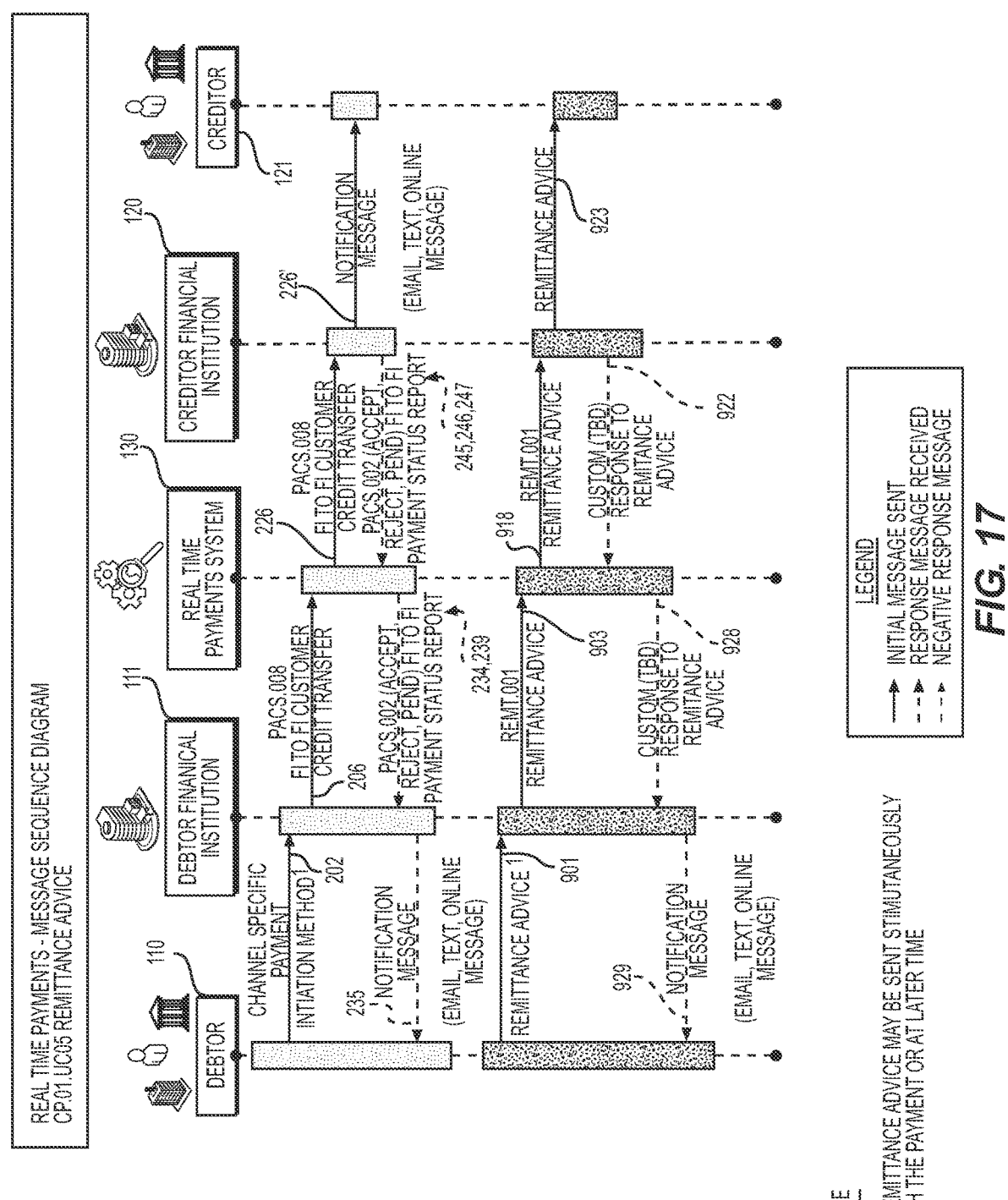
FIG. 17 illustrates a process flow for providing remittance advice, in accordance with an example embodiment herein.

FIG. 17 also shows procedures involved in providing remittance advice, in association with those for making payments. For making payment, FIG. 17 further represents steps 202, 206, 226, 226', 235, 234, 239, 245, 246, and 247 that were described above in connection with FIG. 2. With respect to providing remittance advice, FIG. 17 further represents steps 901, 903, 918, 922, 923, 928, and 929 of FIG. 9, wherein the reference numbers in FIG. 17 are intended to indicate the messages sent in association with those steps.

Payment States

In one example embodiment herein, a payee receives notification of a payment immediately after a payer initiates a transaction, and the payer can receive timely feedback as to the disposition of the payment. This can be useful because it enables the payee to know when a payment has been initiated, and provides an immediate customer experience, even if settlement is done later. Positive notification may serve as proof of payment.

In one example, embodiment, notification can be provided according to a predetermined standard (e.g., always notify a mobile device if available), or the customer can select the method of being notified. Also, the payer can receive immediate notification as to whether the payment was able to be completed immediately, was delayed for review, or was unsuccessful. Notifications preferably include a Universal Transaction Id. Examples of methods of communication with a customer include a text messages, E-mails, online banking website, telephone (e.g., auto dial), etc.

Figure 10:
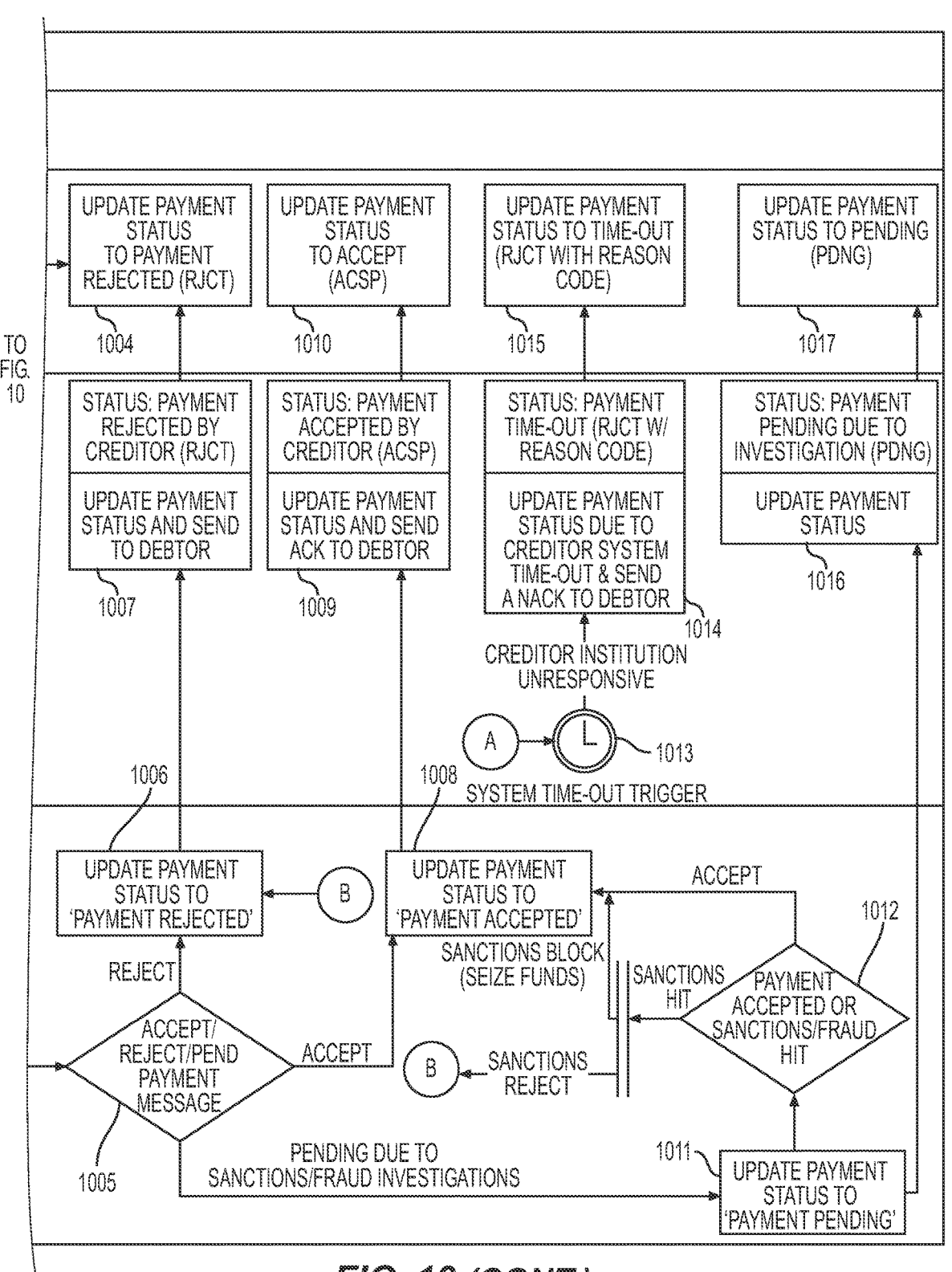
FIG. 10 illustrates a flow diagram of a process for providing status updates, in accordance with an example embodiment herein.

FIG. 10 is a payment state flow diagram which will now be described, according to an example aspect herein. The method starts in step 1000, and in step 1001 a payment message is generated at the debtor FI 111 and forwarded to the ACH network 130 which validates the message in step 1002. For example, the network 130 evaluates the message to determine whether it has a valid message type, whether it includes valid routing information, whether the type of the transaction is supported by the originator FI and/or recipient FI of the message (as identified in the message), whether any of those FIs is suspended from participating in the system 100, whether the various fields in the message include valid information, whether the message complies with business rules, and/or whether the message is a duplicate of one already received. If, based on the evaluation it is determined to reject the payment message (Yes" in step 1002), then in step 1002a a status of the payment message is recorded by the network 130 as being rejected along with the reason for the rejection, and information indicative thereof is provided to the debtor FI 111 which then records that the payment transaction has been rejected (step 1004). If, based on the evaluation in step 1002 it is determined to not reject the payment message ("No" in step 1002), then the payment message is forwarded to the creditor FI 120 by way of the ACH network 130. If the ACH network 130 does not receive a reply in response thereto within a predetermined time period (1003), then control passes through connector A to step 1013 described below. Otherwise, after the creditor FI 120 receives the message and determines whether to accept or reject it (step 1005) (e.g., based on criteria described above for step 1002). If it is determined to reject the message, then in step 1006 the FI 120 records the status of the message as being rejected and provides an indication thereof to the network 130, which also records the status of the message as being rejected and provides an indication thereof to the FI 111 in step 1007. Step 1004 is then performed as described above. In the case where performance of step 1005 results in an acceptance of the payment message, then in step 1008 the FI 120 records the status of the message as being accepted and provides an indication thereof to the network 130, which also records the status of the message as being accepted and provides an indication thereof to the debtor FI 111 (step 1009). In step 1010 the debtor FI 111 records that the payment message is accepted. In the case where performance of step 1005 results in a determination that the payment transaction is pending owing to, e.g., a fraud investigation or sanctions, then in step 1011 the FI 120 records the status of the message as pending, until that status is removed (step 1012), in which case control passes to step 1008 which is performed in the manner described above. In a case where sanctions are applied in step 1012, then control passes through connector B to step 1006 which is performed as described above. On the other hand, if sanctions are blocked (e.g. funds are seized) after step 1012, step 1008 is performed in the above described manner. Also after step 1011 is performed for a case where an investigation is pending, the creditor FI 120 notifies the network 130 that the payment status is pending owing to the investigation (step 1016), and the network 130 makes a record of the same, and notifies the debtor FI 111, which then updates a status of the payment transaction as pending (step 1017).

Step 1013 will now be described. In step 1013 the network 130 responds to a timeout by performing step 1014 where the network 130 records a status of the payment as having a creditor timeout status and notifies the debtor FI 111 of the same. That FI 111 then records the status of the payment to timeout with a rejection and reason therefor (step 1015).

Exception Message Processing

Figure 18:
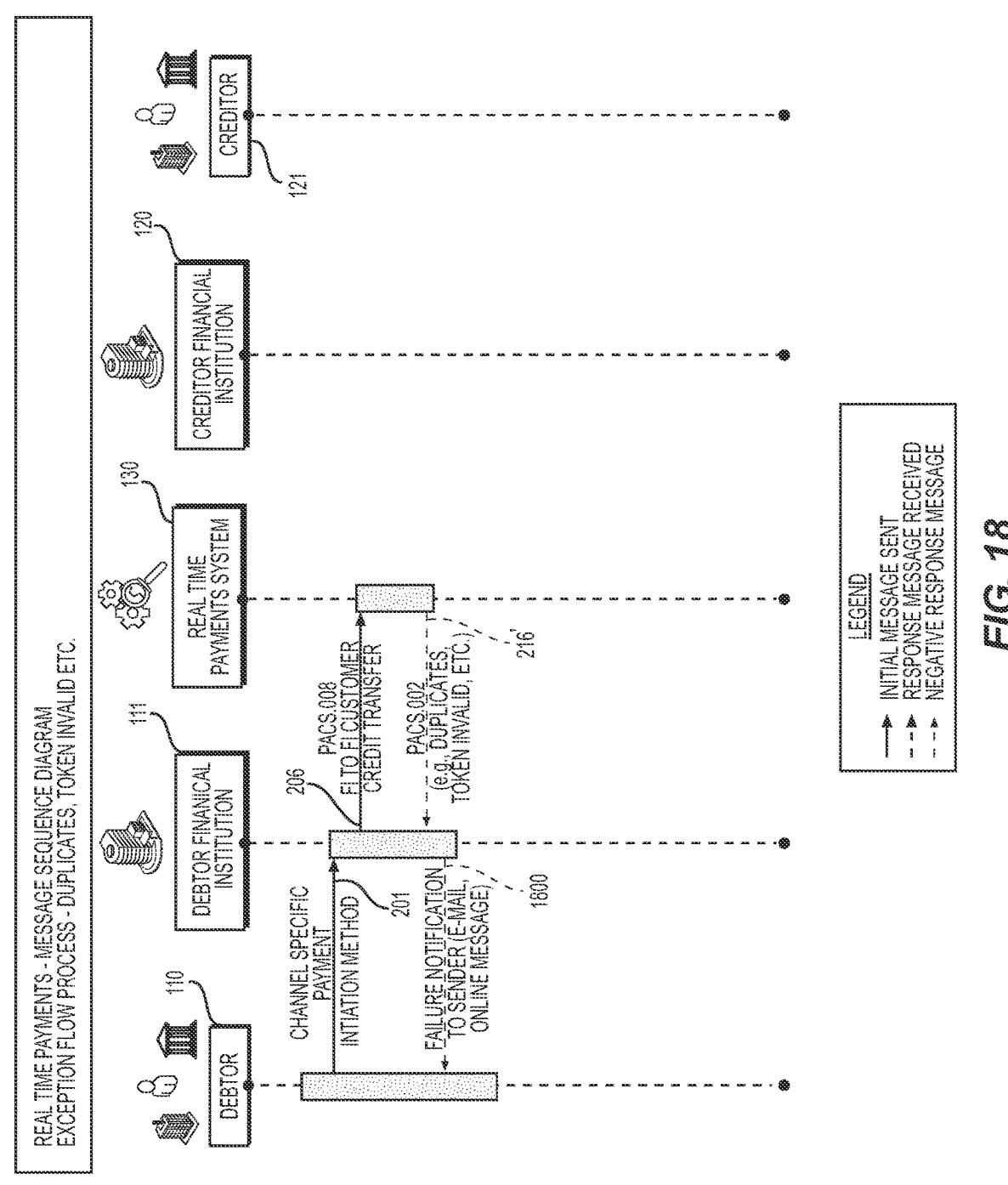
FIG. 18 illustrates a process flow for providing exception messages, in accordance with an example embodiment herein.

As described above, the system 100 generates various types of exception messages in the event that an exception type of message is detected. FIG. 18 is a further representation of a procedure for doing so. For example, that drawing shows steps 201, 206, and 216' as explained above regarding FIG. 2, wherein the exception message generated in step 216' (e.g., a PACS.002 message) is generated in response to the network 130 detecting a duplicate message (e.g., in step 213 of FIG. 2), and/or an invalid token (e.g., step 214 of FIG. 2), and also shows the debtor FI 111 responding to that exception message by providing notification thereof to the debtor station 110 (step 1800) (e.g., in the form of an email, text message, or other type of communication).

Message Types

In an example embodiment herein, robust messaging capability is provided. The payment system supports multiple financial and non-financial message types which can be used to create a variety of transaction flows in support of disparate use cases, and flexible and extensible message formats are employed that are able to adapt to changing needs. This enables payment system flexibility for future needs, provides a platform for product development and innovation, and allows the system to become backward compatible with a network such as the ACH network 130. Messages may be overlaid to provide end-to-end solutions for specific use cases. Extensible messaging includes both financial and non-financial messages, asymmetric products (framework allows FIs to create products independently for senders and receivers), and, within messages there can be fields of data, external links, etc. Messages employed herein also can comply with existing global standard formats (e.g., ISO 20022, ISO 8583, etc.), and have international compatibility (e.g., multi-currency). Related messages can include a Universal Transaction Id which is unique within the payment system for every payment, as well as an identifier of a sending party (if applicable). Example messages include FI to FI messages such as acknowledgements by a receiver, and payment messages. Example FI to end user messages include receiver notification messages, sender notification messages, payment successful messages, sender notification payment rejected messages, and sender notification payment under review messages. Example end user to end user messages include requests for payment (e.g., invoice or message), receipt acknowledged by receiver messages, request for return of funds messages, and agree to return funds messages. Example third party messages include universal transaction IDs, links to external sources, and contingency payment rule messages. Non-payment messages preferably support value-added services and administration. Related messages can be linked into complex transactions. Messages can carry remittance data and references to external data and processes for extended functionality.

ISO 20022 is a harmonized set of XML messaging standards across major financial services domains (Funds Transfer, Cash, Securities, Trade, Card and Foreign Exchange) based on a shared data dictionary and business process model. Messages are available for the complete end-to-end payments chain; i.e., customer to bank, bank to bank, and reporting. Data definitions can be used as the basis for internal communication needs, and the standard can support real-time messaging (e.g., Denmark NETS).

ISO 8583 is a common interface by which financial transaction card originated messages may be interchanged between acquirers and card issuers. Messages in the standard typically contain information about the value of a transaction, where it originated, the card account number, and bank sort code. Message data fields can be customized, and the standard can support real-time messaging. The standard is used by retail banks, and for almost all credit and debit card transactions, including ATMs.

Figure 39:
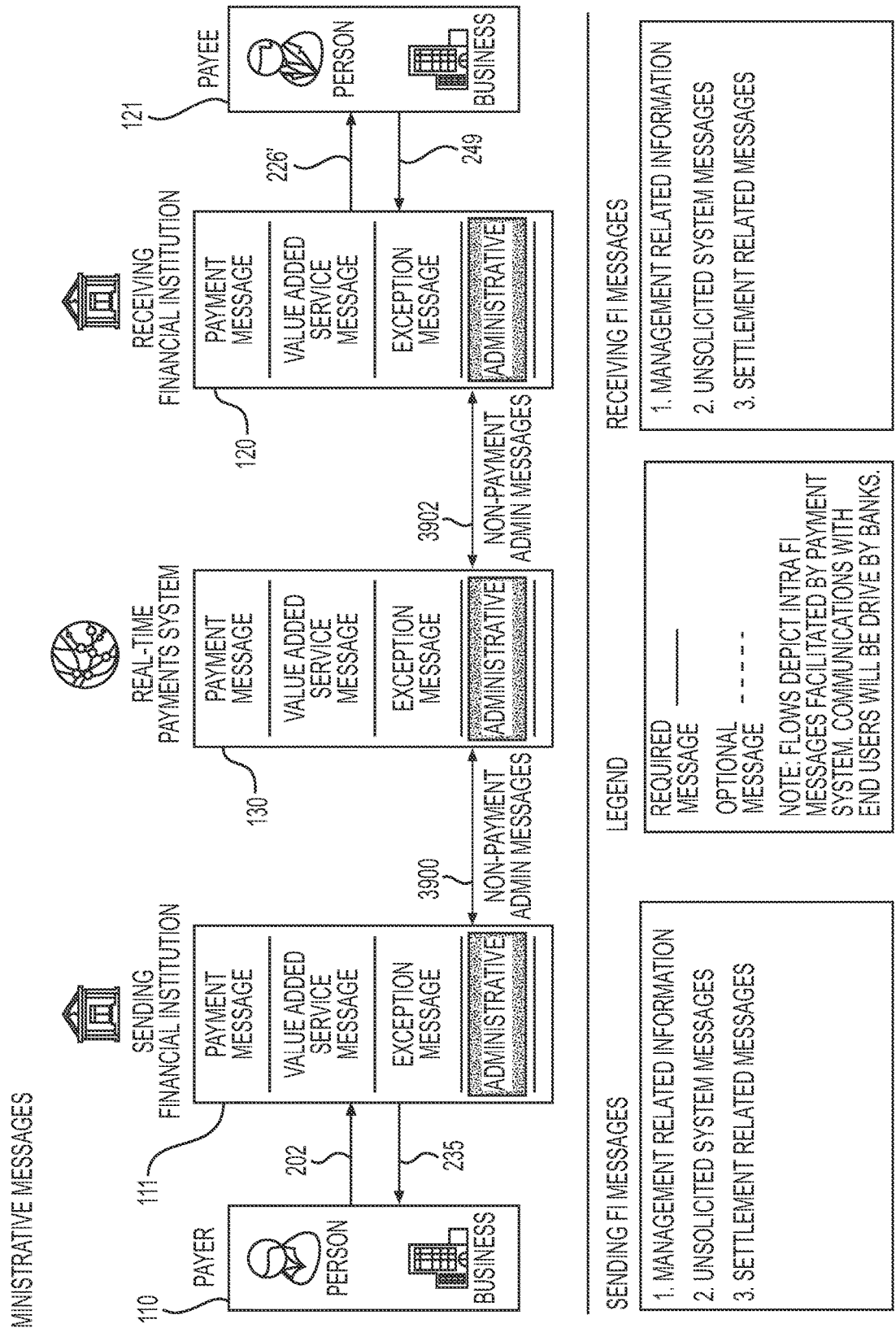
FIG. 39 represents an example of non-payment administrative messages that can be employed in the procedures herein.

As described above, and referring now to FIG. 39, the overall system 100 herein employs various types of non-payment, administrative messages, such as messages 3900 exchanged between the debtor FI 111 and system 130, and messages 3902 exchanged between the system 130 and creditor FI 120. Messages 3900 and 3902 can include, for example, management related information, unsolicited system messages, and settlement related messages. FIGS. 19*b* and 19*d* described show at least some administrative types of messages.

Figure 19A:
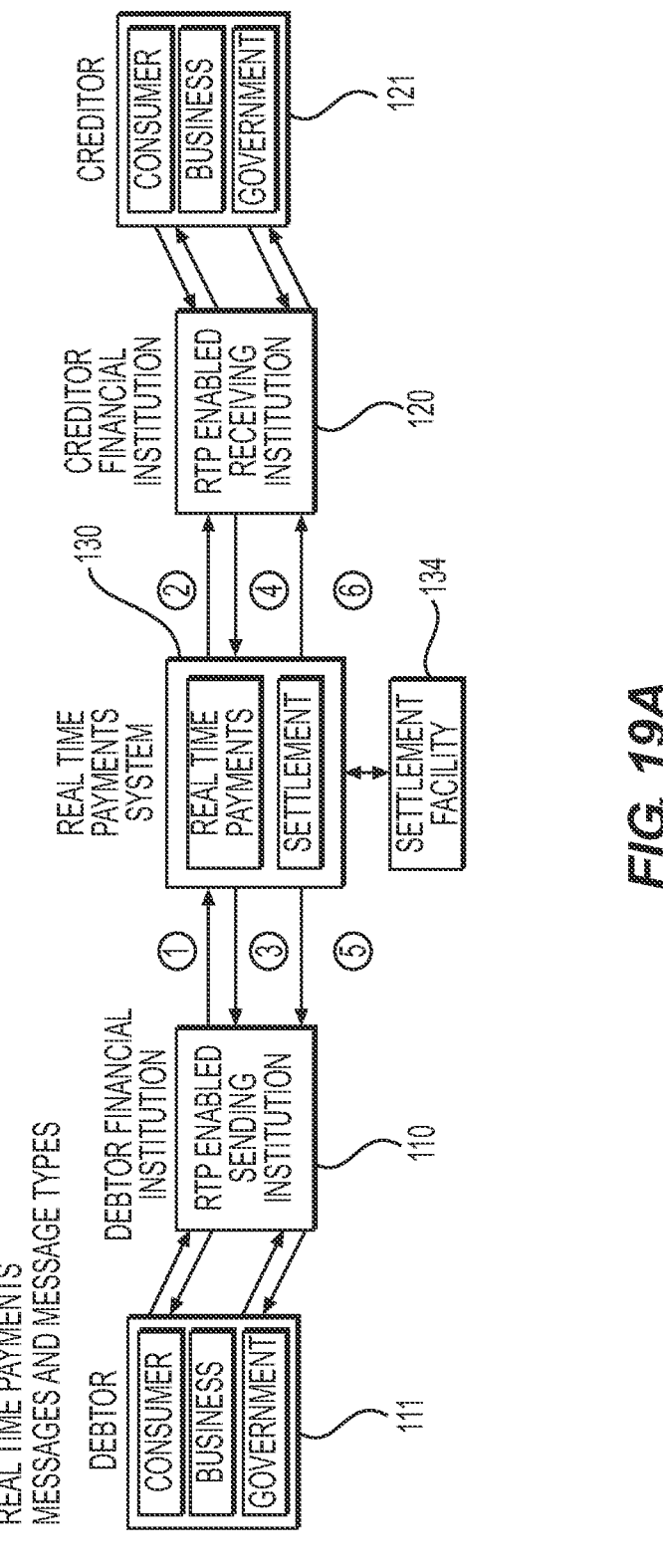
FIGS. 19a and 19c are further diagrams of an example real time payments system according to example embodiments herein.
Figure 19C:
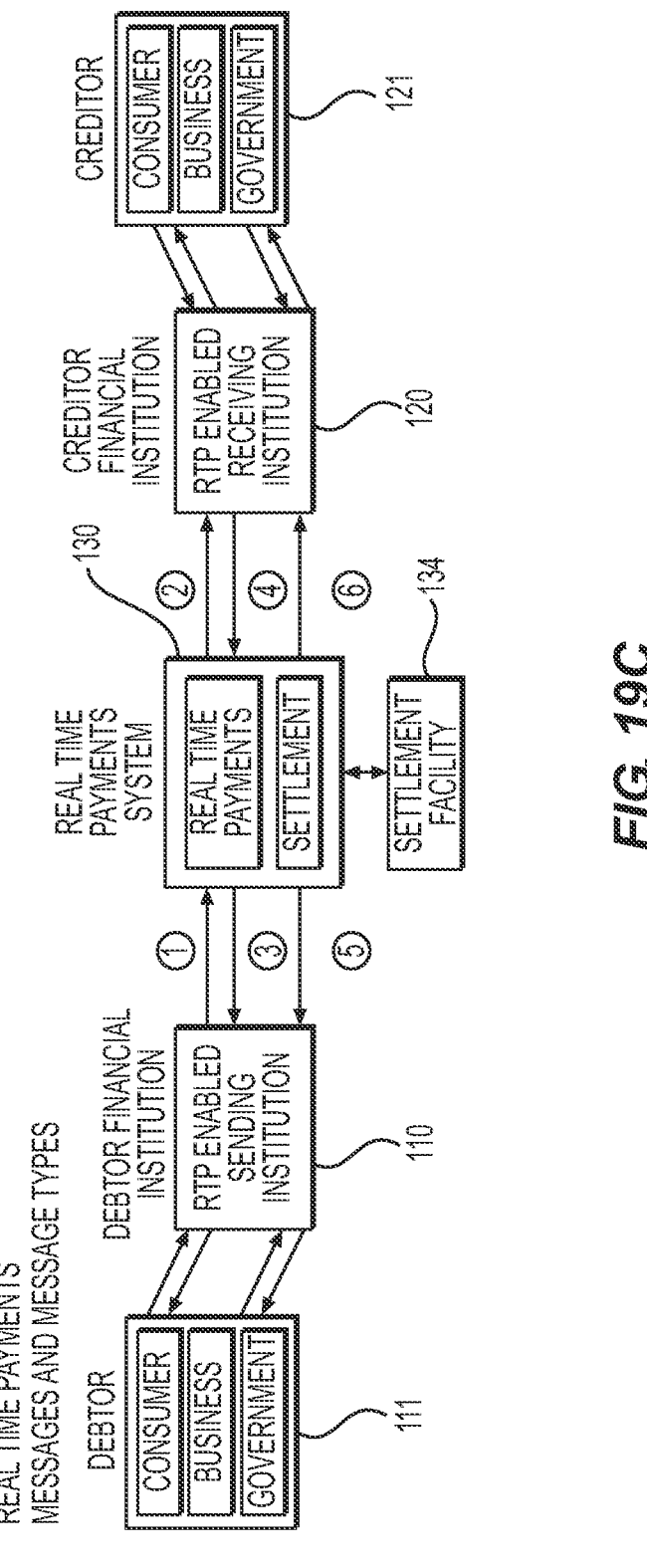
Figure 19D:
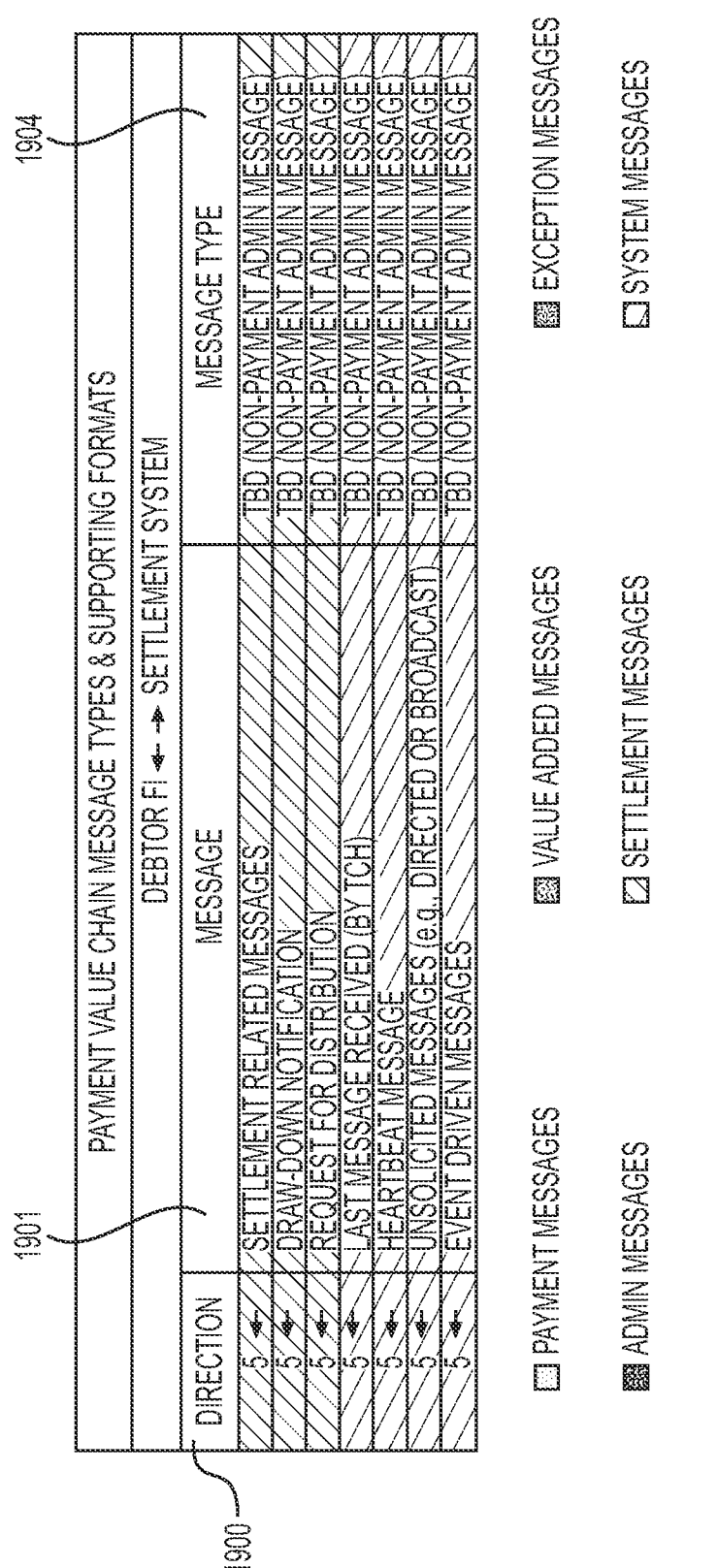
Figure 19D:
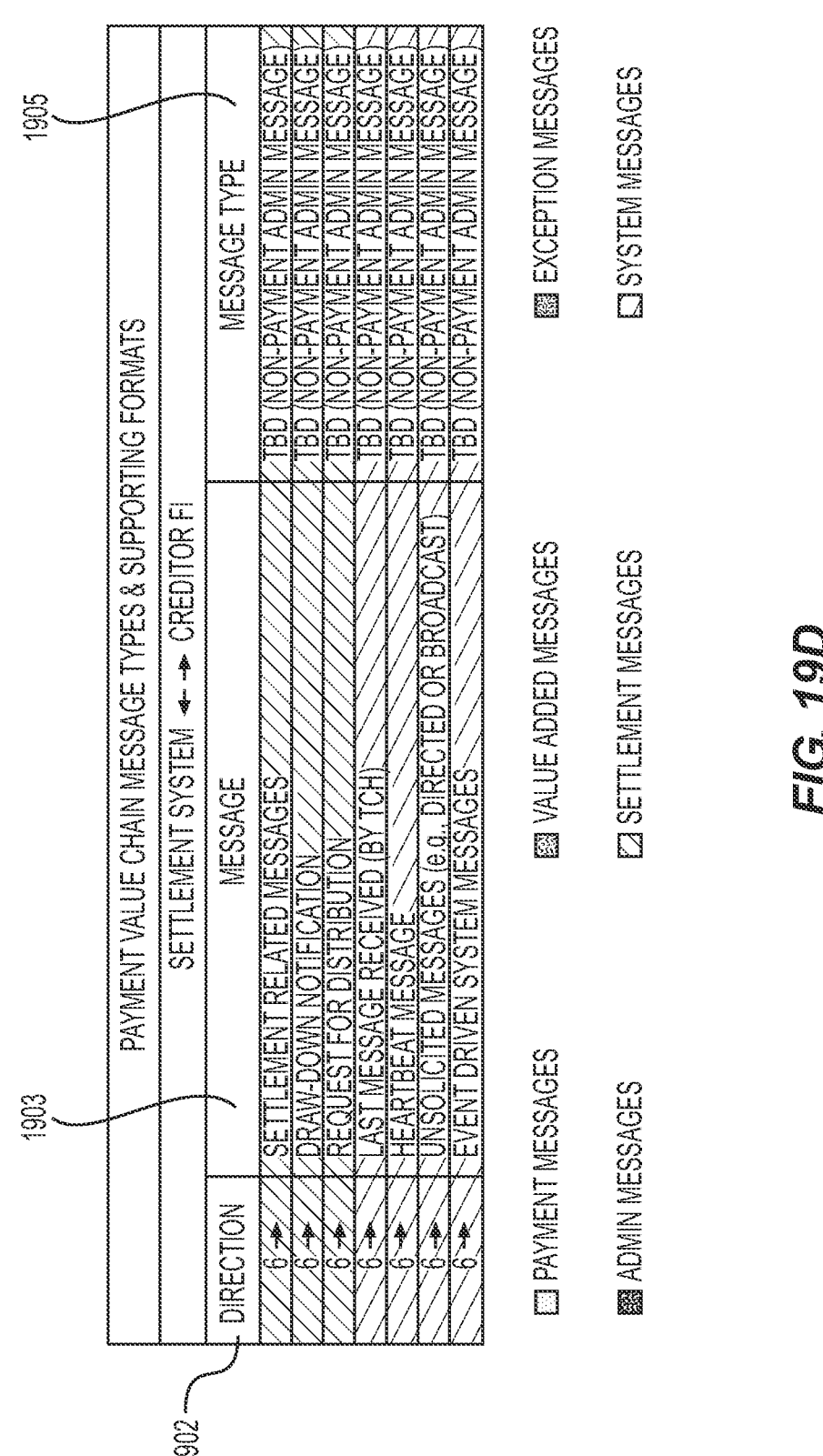

FIGS. 19*a* and 19*c* are another depiction of the system of FIG. 1, including elements 110, 111, 120, 121, 130, and 120, and FIGS. 19*b* and 19*d* shows various messages in columns 1901 and 1903, that are employed in the system according to an example embodiment herein. The types of those messages those messages are indicated in respective columns 1904 and 1905. The "Direction" columns 1900 and 1902 and the numbers shown therein correspond to the same numbers represented in FIG. 19*a* or 19*c*, and the arrows associated with those numbers indicate the direction in which the respective messages travel in the system. The message types under columns 1904 and 1905 also are represented in the various flow diagrams herein. The messages are either, for example, payment messages, value added messages, exception messages, administrative messages, settlement messages, or system messages.

FIGS. 20*a*-20*c* show various message types in columns 2000, ISO codes under column 2001, message names under column 2002, definitions of the message types in column 2003, and an indication in column 2004 of whether the message types relate to an FI, network 130, or both, that are employed in the system according to an example embodiment herein. At least some of the message types of those figures correspond to message types represented in FIGS. 19*b* and 19*d*. The message types of FIG. 20*a*-20*c* are external status reason codes. FIG. 45 shows examples of various types of messages and certain characteristics thereof.

In one example embodiment herein, at least some of the various types of messages employed in the system include at least some of the following types of information:

Universal Transaction ID (i.e., a payment id), a related message ID (e.g., to manage responses and exception messaging), sender identification information, designation of a business/commercial transaction versus a consumer transaction, an indicator of whether a payer wants/accepts a return message (e.g., an acknowledgement, RFI, etc.), a reject reason code, a loyalty indicator (for merchant loyalty programs, coupons, match with POS geo location, etc.), a channel indicator (mobile, web, etc.), a fraud suspect indicator, a Dynamic risk score, a currency indication, a location of bank account(s) (sender and receiver), a foreign designator including country of account domicile, a timestamp, a Geo location indication, and payment amount (for payment instruction messages).

Payment instruction messages can include, for example, remittance fields, and 140 characters, although these examples are not limiting. Administrative Messages Non-payment administrative messages can include, by example, the following: management messages:

transaction volume type messages:

last message sent, and unsolicited system messages:

system outage suspended payments to specific end points settlement related messages settlement cycle started settlement cycle completed settlement cycle outage notice of insufficient funding request for supplemental funding net settlement position potential duplicate message bank indicator to payment system regarding down-time/ issues broadcast message(s)—with capability to send to only a subset of impacted financial institutions summary archival inquiry directory of people at financial institutions unresolved request for payment.

Management Related Information:

transaction volume

Unsolicited System Messages:

system outage.

At least one or more of the following messaging features, types, contents, functions, and characteristics can be employed in the system 100 herein:

real-time transmission of payment and non-payment messages non-payment messages support value-added services and administration all messages include a unique reference ID and sender name related messages can be linked into complex transactions messages can carry remittance data and reference to external data and processes for extended functionality channel indicator (mobile, web, etc.)

currency type of account—sender (e.g. DDA, trust, prepaid)

foreign payment designator including country of account domicile disclosure requirement indicator (e.g., fee disclosure for foreign remittances)

fraud suspect indicator/dynamic risk score (added by network for receiving FIs that use centralized fraud suspect service)

sender discretionary data (optional).

Bulk Messaging

In an example embodiment herein, bulk messages can be employed. By example, low value, urgent payments can be aggregated and sent together for convenience and efficiency (e.g., this can be useful in scenarios such as payments of temporary employee wages, emergency disbursements, etc.). The bulking functionality can be performed at a FI level at the network 130, or in other elements of the system 100.

Payment Scenario Contexts

The methods and system described herein can be employed to conduct real-time payments in many different scenarios. By example, they can be employed in a business to person context, such as, for example, to pay employee wages, emergency payroll, urgent business to consumer contexts (e.g., disaster relief). Other examples may involve high value ad hoc payments such as large, one-time payments (e.g., insurance claims, legal settlements, etc.), or low value ad hoc payments (e.g., small one-time payments (e.g., temporary employee wages, emergency payroll, etc.)). Payments can be made available within a predetermined amount of time (e.g., within minutes, hours, etc.).

FIG. 21 is an example of an application/scenario for the payment system described herein. In this example, a small business (small market entity) 2100 desires to order goods from a supplier 2102. The supplier 2102, by way of its FI 2103, forwards an electronic invoice 2101 to payment system 2104 (which can include, for example, ACH network 130) which then provides a request for payment message 2105 that, in one example embodiment herein includes a link to the invoice, to a FI 2105' associated with the small business 2100. In one example embodiment herein, the message 2105 is received at a cash management workstation 2106. In response to the message, the FI 2105' generates a payment transaction 2108 to pay the amount requested in the invoice 2101 (e.g., the payment transaction 2108 can be generated in response to a request from the buyer 2100 using an online banking platform 2107), and the payment transaction 2108 is provided to the system 2104 and then forwarded to the FI 2103, such as at a real time receivables module 2109. The FI 2105' also can generate a payment notification 2110 which is provided by way of the system 2104 to a logistics integration module 2111 of FI 2103, which then responds by forwarding an acknowledgement (ACK) message 2112 that, in one example embodiment herein, includes a link to shipping information relating to the purchased items. The message 2112 is provided by way of the system 2104 to the FI 2105, where, in the illustrate example, it is received at a mobile banking alert module 2113, which can then notify the buyer 2100 that the payment was acknowledged.

Figure 22:
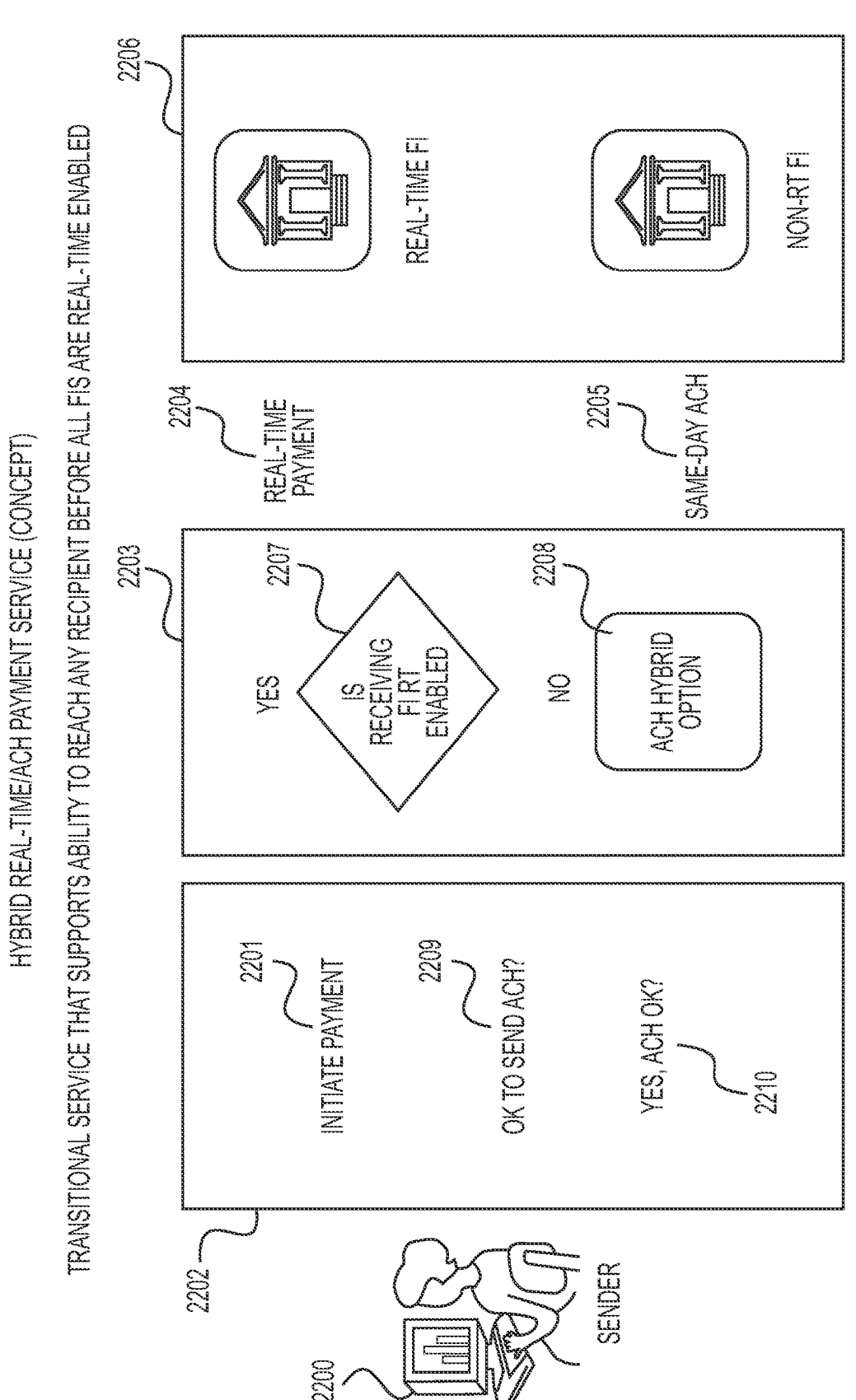
FIG. 22 shows an example of a hybrid real time payment service according to an example scenario herein.

FIG. 22 shows an example of a hybrid real time payment procedure. That procedure determines whether a receiving FI 2206 is subscribed for participating in the real time payment service, and can involve similar procedures such as those relating to steps 429-431 of FIG. 4. In FIG. 22, a sender 2200 initiates a payment transaction 2201 via a FI 2202, which then provides the transaction 2201 to the payment network 2203 (which can include ACH network 130), which then determines whether a receiving FI 2206 identified in the transaction 2201 has subscribed to real time payments service (e.g., this can be performed by correlating an identifier of the FI included in the transaction 2201 with corresponding information stored in the network 2203 indicating whether the receiving FI 2206 is subscribed). If it is determined that the receiving FI 2206 has subscribed to the service ("Yes" in step 2207), then a real time payment transaction 2204 is provided to the FI 2206. On the other hand, in a case where it is determined that the receiving FI 2206 is not subscribed to the service ("No" in step 2207), then a hybrid option 2208 is performed where the network 2203 communicates a message 2209 to the FI 2202 inquiring as to whether the payment transaction 2201 can be forwarded to the receiving FI 2206 via an alternate payment method. Where such a transaction is approved (e.g., this may occur in response to FI 2202 receiving an approval from sender 2200, which is notified of the query by FI 2202), an approval message 2210 is provided from the FI 2202 to the network 2203, which then provides payment message 2205 to the receiving FI 2206 by the alternate method (e.g., in one example this is performed on the same day as when the payment was initiated, using a conventional ACH transaction).

Figure 27:
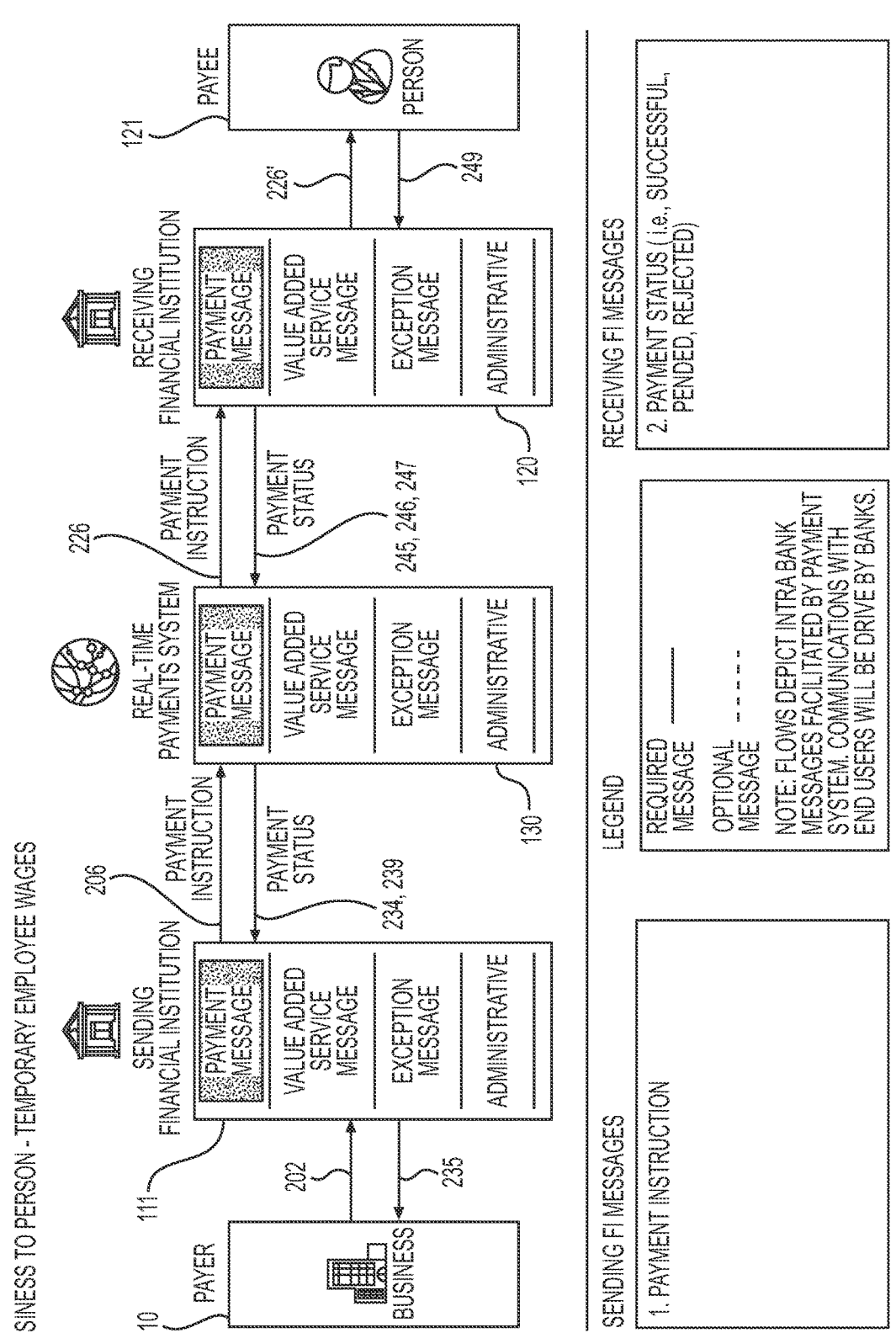
FIG. 27 represents another example of a business to person context, such as a case where a payment is made of a temporary employee's wages, according to an example embodiment herein.

FIG. 23 represents a business 2300 to person 2302 scenario. FIG. 27 represents another example of a business to person context, such as a case where a payment is made of a temporary employee's wages. For example, a payment request like that described above in connection with step 202 of FIG. 2 is provided from a payer station 110 to FI 111 (step 202), which FI 111 then generates a payment instruction in step 206 and provides it to system 130. The system 130 then provides a payment instruction in step 226 to FI 120, which then can notify payee (or creditor) station 121 of the status of the payment (e.g., via text message, email, an online message or other form of communication) (see step 226'). The station 121 can then acknowledge receipt of that notification (step 249) to the FI 120, which then sends to the debtor FI 111 an indication of the payment status (e.g., a rejection or negative status indication in step 245, a pending status indication in step 246, or an accept status indication in step 247). The system 130 then provides an indication of the status (e.g., a rejection in the case of step 234 or an accepted or pending status in the case of step 239) to the FI 111, which can then send an indication of that status to the debtor station 110 (step 235).

Figure 40:
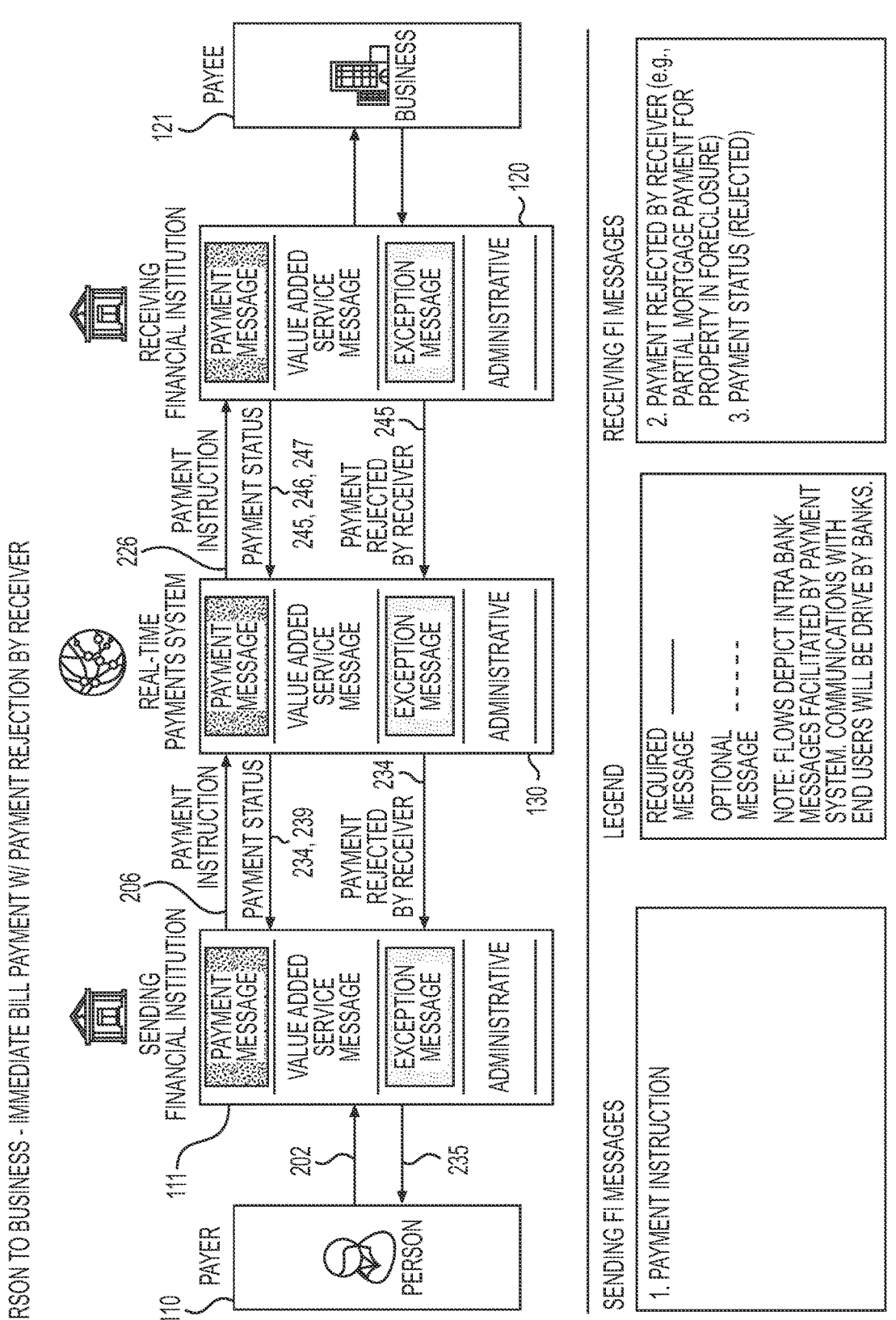
FIG. 40 represents an example process for rejecting a payment.

FIG. 40 shows the same elements as those represented in FIG. 27 (for convenience, those elements are not repeated again here), and also represents a process for rejecting a payment instruction. For example, after deciding to reject a payment instruction (such as in the manner described for step 243 of FIG. 2), the creditor FI 120 issues a payment rejected message to the network 130 in step 245, and the network 130 then forwards that message to the debtor FI 111 in step 234.

Figure 42:
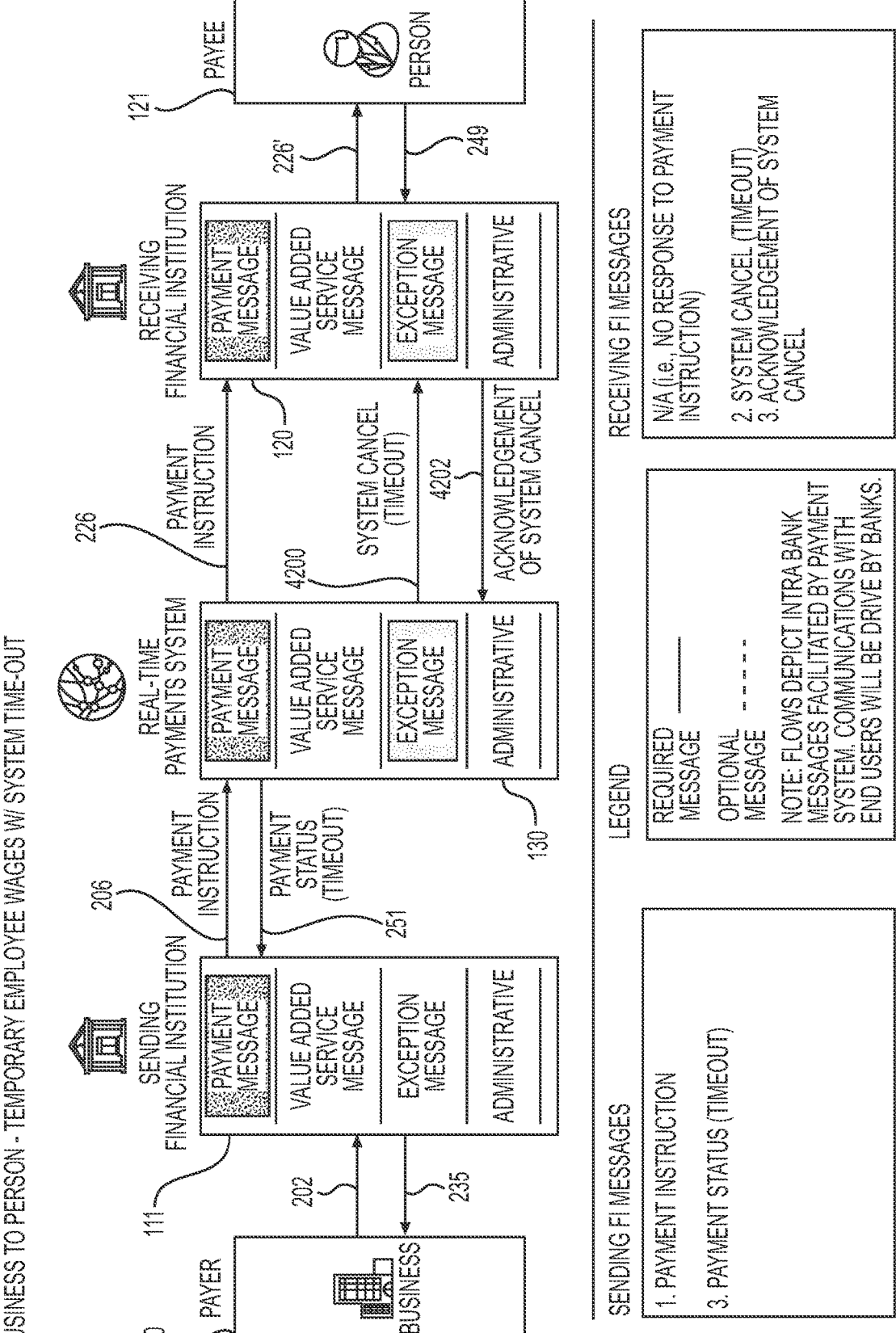
FIG. 42 shows an example where timeouts are employed with regard to payment instructions.

FIG. 42 shows an example where timeouts are employed with regard to payment instructions. This is example shows a business to person scenario in the context of a payment for temporary employee wages (although of course this example is not limiting). This example includes steps 206 and 226 as described above for FIG. 27. After sending the payment instruction in step 226, the ACH network 130 determines that it has not received a response (e.g., such as a pacs.002 or remt.001 message) thereto within a predetermined time period (see, e.g., step 252 of FIG. 2), and thus detects a timeout. As a result, the network 130 forwards a payment status time-out message to the debtor FI 111 (step 251), which then can provide a payment reject message to the debtor station 110. Also in response to detecting the timeout, the network 130 sends a system cancel (timeout) message to the creditor FI 120 (step 4200), which then sends back an acknowledgement of that message to the network 130 in step 4202.

Figure 29:
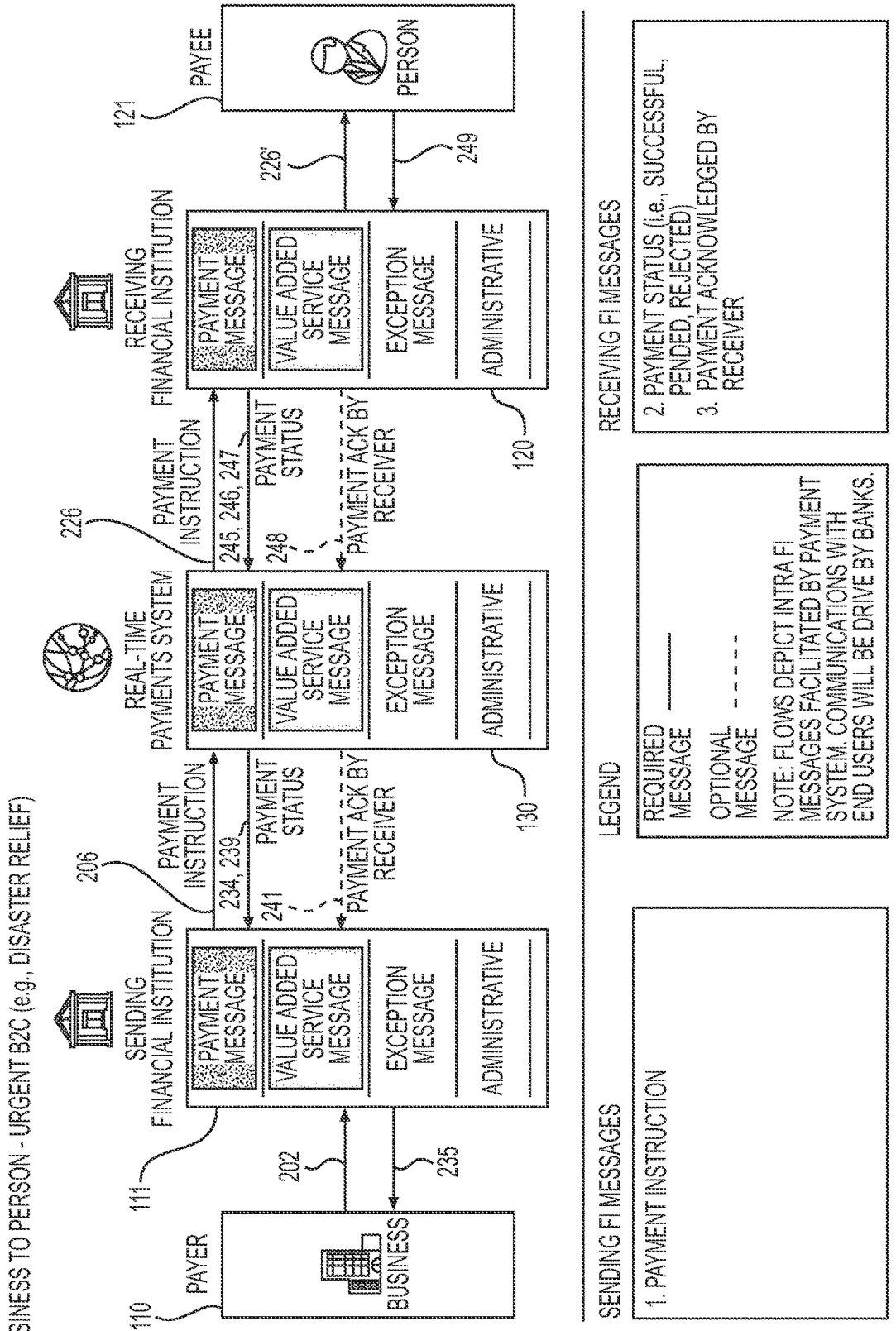
FIG. 29 is an example representation of a business to person scenario, such as, for example, an urgent disaster relief payment process according to an example embodiment herein.

FIG. 29 is another example representation of a business to person scenario, such as, for example, an urgent disaster relief payment process. FIG. 29 shows the same steps as those described above for FIG. 27 (although for convenience they are not further repeated here) for making a payment. In addition, the figure represents that payee station 121 can optionally provide an acknowledgement to the system 130, indicating that the payment instruction provided in step 226 was received (step 248). The system 130 then provides the acknowledgement to the debtor station 110 in step 241. Steps 241 and 248 are like those of FIG. 2.

As another example, the methods and system described herein can be employed to conduct real-time payments in a person to person context. By example only, they can be employed to effect non-commerce payments (e.g., rent payments to a roommate, emergency funds for a family member, etc.), to perform urgent Account-to-Account transfers (e.g., to fund investments or purchases), to pay for informal services (e.g., babysitting, lawn care, etc.), and the like. Payments can be made available within a predetermined amount of time (e.g., within seconds, minutes, etc.). FIG. 24 represents a person 2400 to person 2402 scenario. FIG. 28 also represents a person to person context for non-commerce payments, and shows the same steps as those described above for FIG. 27 (although for convenience they are not further repeated here) for making a payment, but in a person to person context. In addition, the figure represents that payee station 121 can optionally request that the payment be paid, in which case a request for payment is provided from creditor FI 120 to system 130 in step 402, and the system 130 responds by providing a corresponding request for payment to the debtor FI 111 in step 415. Steps 402 and 415 are like those of FIG. 4. Also, the payee station 121 can optionally request information (e.g., inquiring as to an invoice, or the purpose of a payment, etc.), in which case a request for information is provided from creditor FI 120 to system 130 in step 704, and the system 130 responds by providing a corresponding request for information to the debtor FI 111 in step 715. Steps 704 and 715 are like those of FIG. 7. The debtor FI 111 then can provide the requested information in a response in step 806, to the system 130 (step 806), and the system 130 can then provide the information to the creditor FI 120 in step 817. Steps 806 and 817 are like those of FIG. 8.

Figure 30:
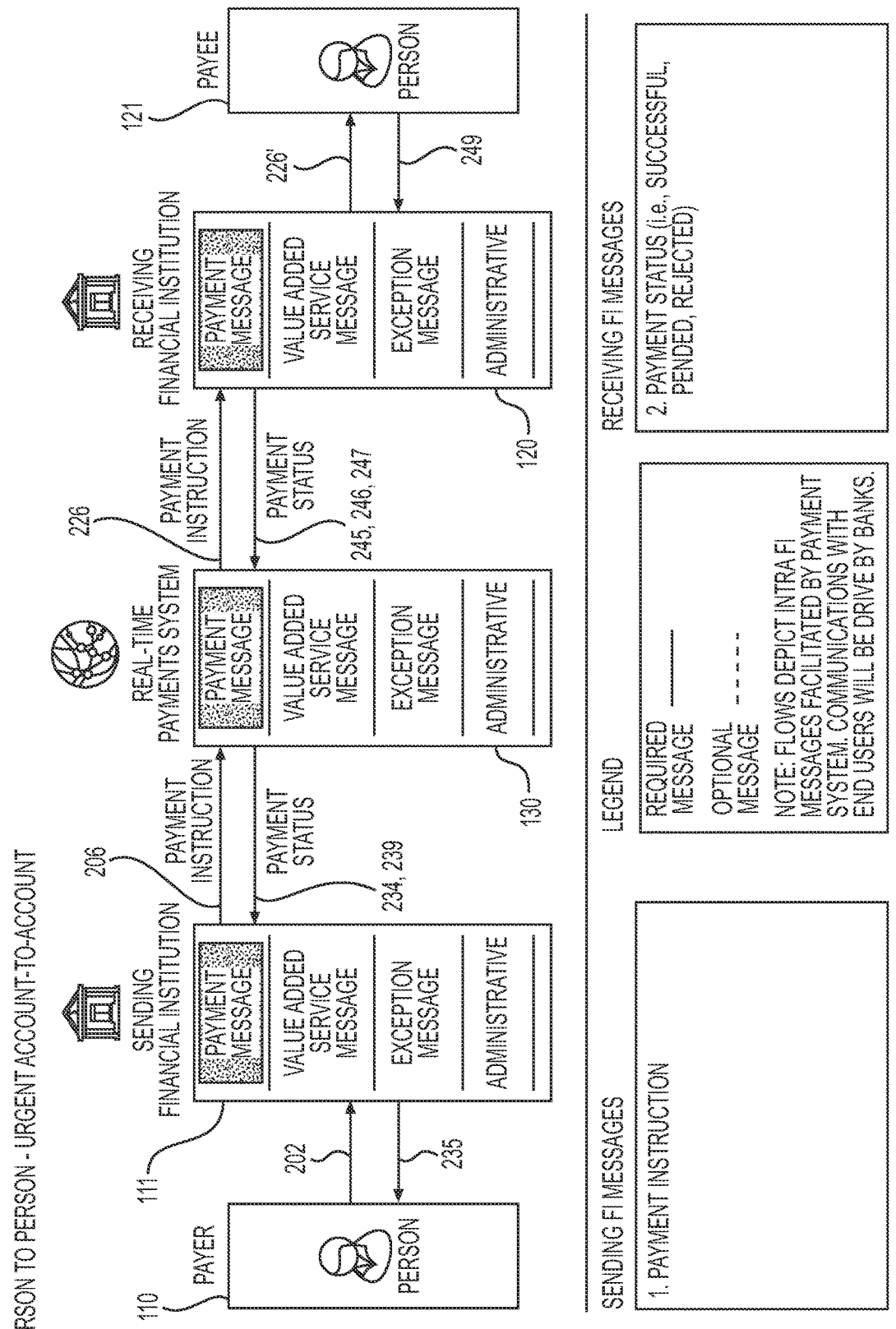
FIG. 30 represents a further example of a person to person context, such as a case where an urgent account-to-account payment is made, according to an example embodiment herein.

FIG. 30 represents a further example of a person to person context, such as a case where an urgent account-to-account payment is made. For example, a payment request like that described above in connection with step 202 of FIG. 2 is provided from a payer station 110 to FI 111 (step 202), which FI 111 then generates a payment instruction in step 206 and provides it to system 130. The system 130 then provides a payment instruction in step 226 to FI 120, which then can notify payee (or creditor) station 121 of the status of the payment (e.g., via text message, email, an online message or other form of communication) (see step 226'). The station 121 can then acknowledge receipt of that notification (step 249) to the FI 120, which then sends to the system 130 an indication of the payment status (e.g., a rejection or negative status indication in step 245, a pending status indication in step 246, or an accept status indication in step 247). The system 130 then provides an indication of the status (e.g., a rejection in the case of step 234 or an accepted or pending status in the case of step 239) to the FI 111, which can then send an indication of that status to the debtor station 110 (step 235).

Figure 32:
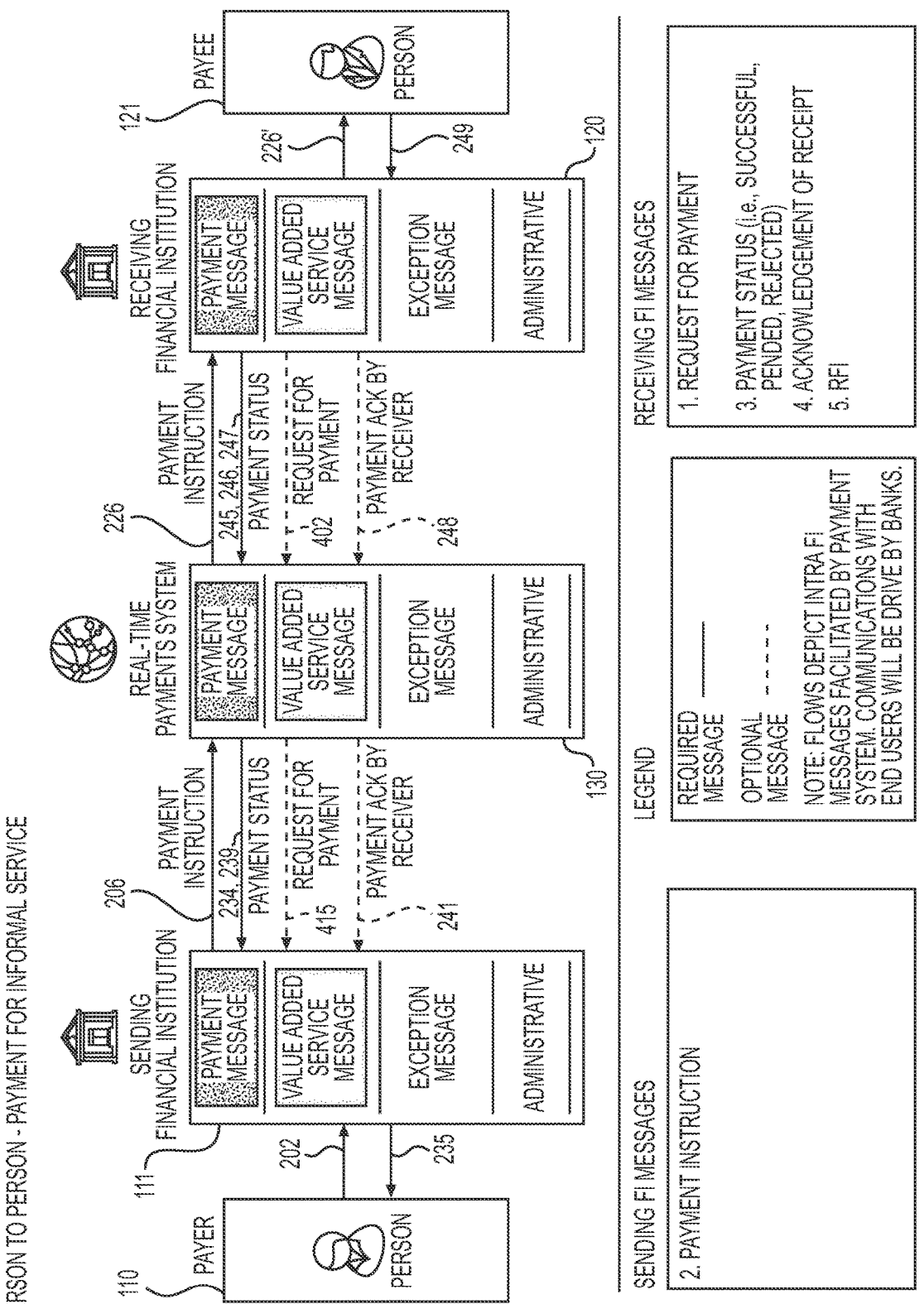
FIG. 32 represents still a further person to person context, such as for payment for an informal service, according to an example embodiment herein.

FIG. 32 represents still a further person to person context, such as for payment for an informal service. FIG. 32 shows the same steps as those described above for FIG. 27 (although for convenience they are not further repeated here) for making a payment, but in a person to person context. In addition, the figure represents that payee station 121 can optionally request that the payment be paid, in which case a request for payment is provided from creditor FI 120 to system 130 in step 402, and the system 130 responds by providing a corresponding request for payment to the debtor FI 111 in step 415. Steps 402 and 415 are like those of FIG. 4. Also, the FI 120 can optionally provide an acknowledgement that the payment was received, to the system 130, in step 248, wherein the system 130 can then provide the acknowledgement to the FI 111 in step 241. Steps 241 and 248 are like those of FIG. 2.

As another example, the methods and system described herein can be employed to conduct real-time payments in a person to business context. By example only, they can be employed to conduct immediate bill payments with acknowledgments or receipts, to perform e-commerce purchases, and the like. Payments in this context may be time critical, such as, for example, stock purchases, emergency bill payments, etc. Payments can be made available within a predetermined amount of time (e.g., within seconds, minutes, or hours, etc.). FIG. 25 represents a person to business scenario.

Figure 33:
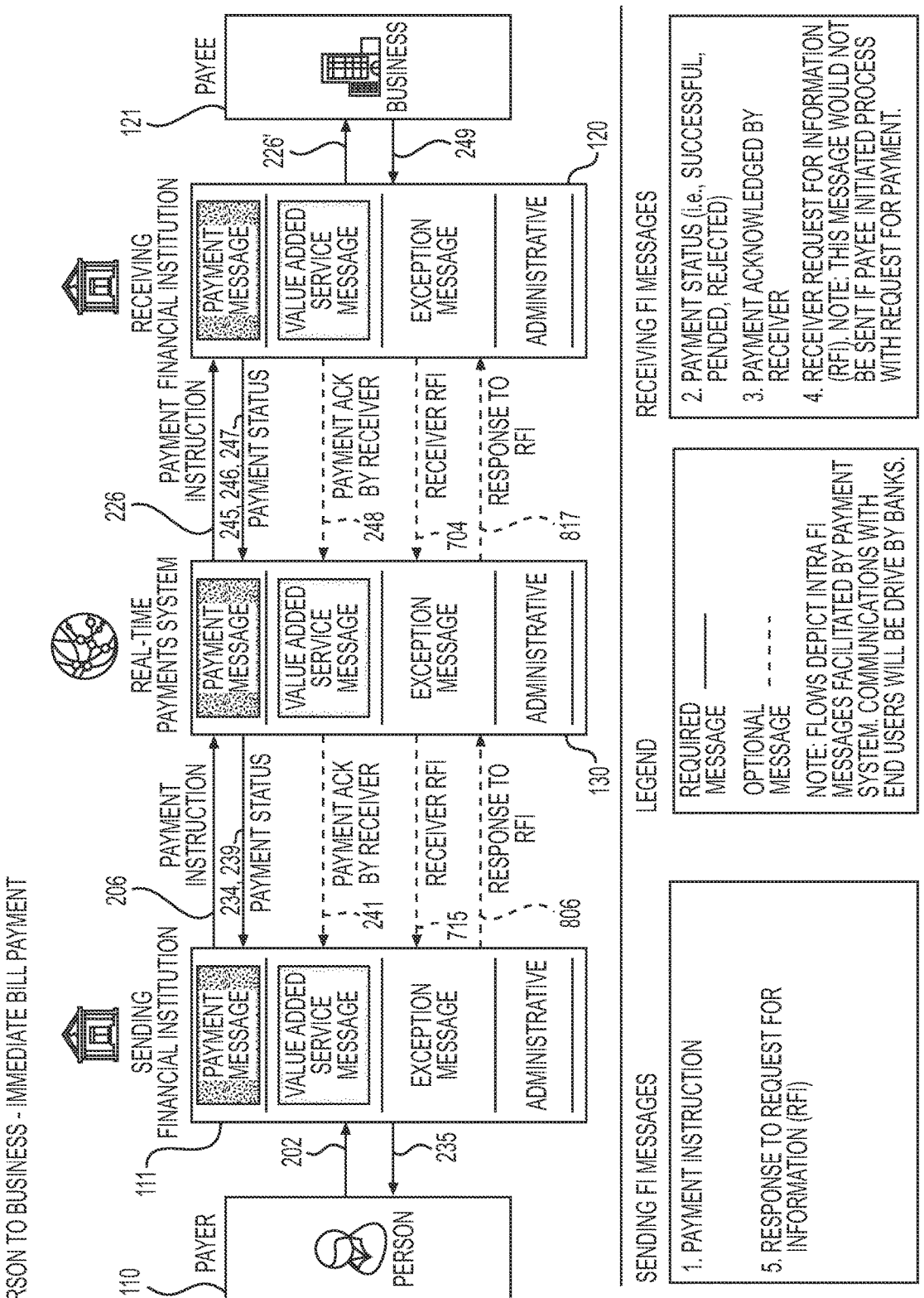
FIG. 33 represents a person to business context, such as for an immediate bill payment, according to an example embodiment herein.

FIG. 33 represents a person to business context, such as for an immediate bill payment. FIG. 33 shows the same steps as those described above for FIG. 27 (although for convenience they are not further repeated here) for making a payment, but in a person to business context. In addition, the figure represents that the FI 120 can optionally provide an acknowledgement that the payment was received, to the system 130, in step 248, wherein the system 130 can then provide the acknowledgement to the FI 111 in step 241. Steps 241 and 248 are like those of FIG. 2. Also, the payee station 121 can optionally request information, in which case a request for information is provided from creditor FI 120 to system 130 in step 704, and the system 130 responds by providing a corresponding request for information to the debtor FI 111 in step 715. Steps 704 and 715 are like those of FIG. 7. The debtor FI 111 then can provide the requested information in a response in step 806, to the system 130 (step 806), and the system 130 can then provide the information to the creditor FI 120 in step 817. Steps 806 and 817 are like those of FIG. 8.

Figure 41:
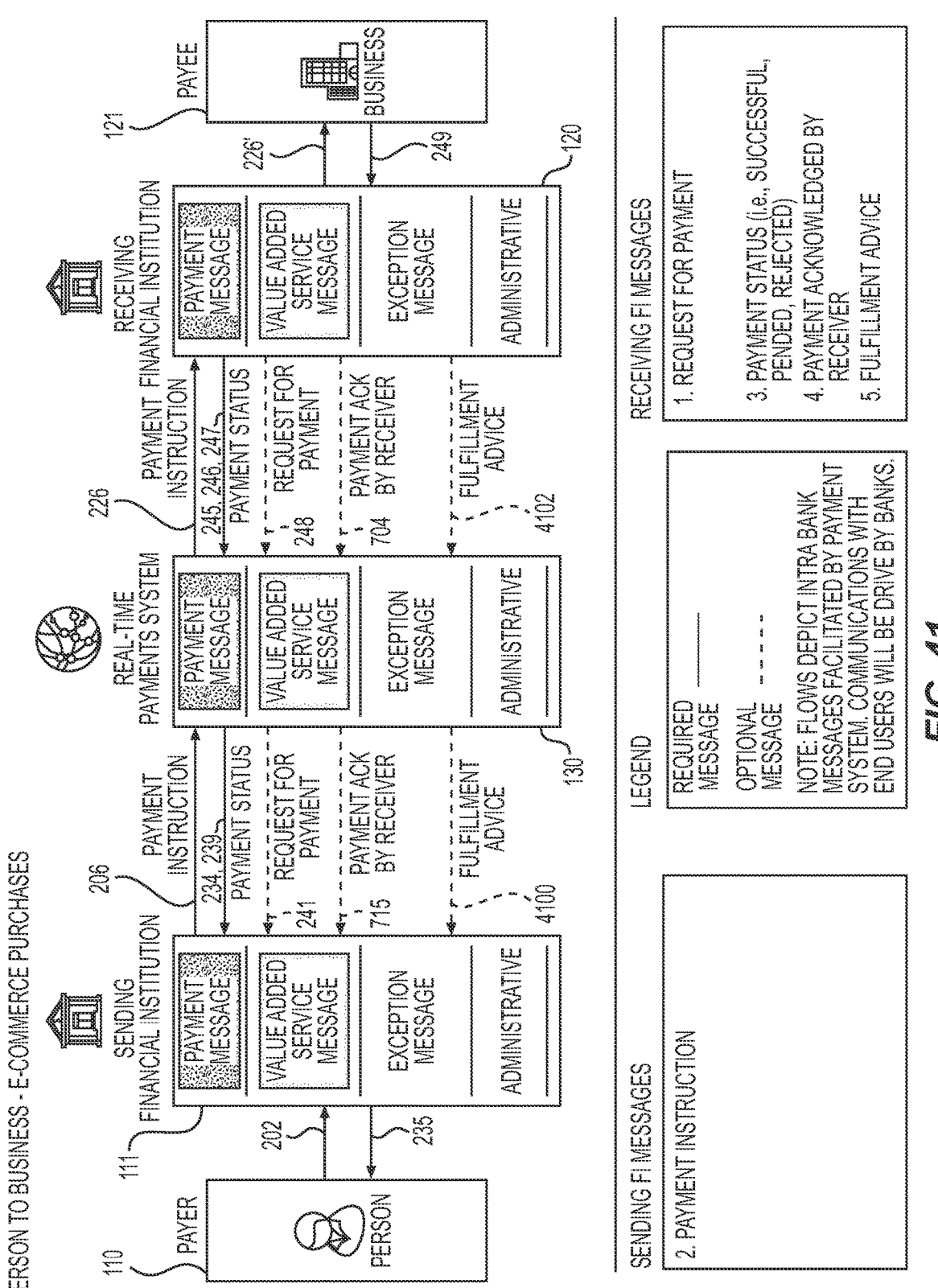
FIG. 41 represents an example process for making an e-commerce payment, and providing fulfillment advice.

FIG. 41 represents another person to business context, such as for an e-commerce payment. FIG. 41 shows the same steps as those described above for FIG. 33 (although for convenience they are not further repeated here) for making a payment. In addition, the figure represents that the creditor FI 120 can provide fulfillment advice to the system 130 (step 4102), and the system 130 can then provide that advice to the debtor FI 111 in step 4100.

In still a further example, the methods and system described herein can be employed to conduct real-time payments in a business to business context. By example only, they can be employed to effect just in time payments to suppliers, to perform immediate bill payments with acknowledgments of receipt, and the like. Payments in this context may be time critical one time payments between businesses, such as, for example, just-in-time supplier payments, emergency bill payments, etc. Payments can be made available within a predetermined amount of time (e.g., within minutes). FIG. 26 represents a business to business scenario.

Figure 34:
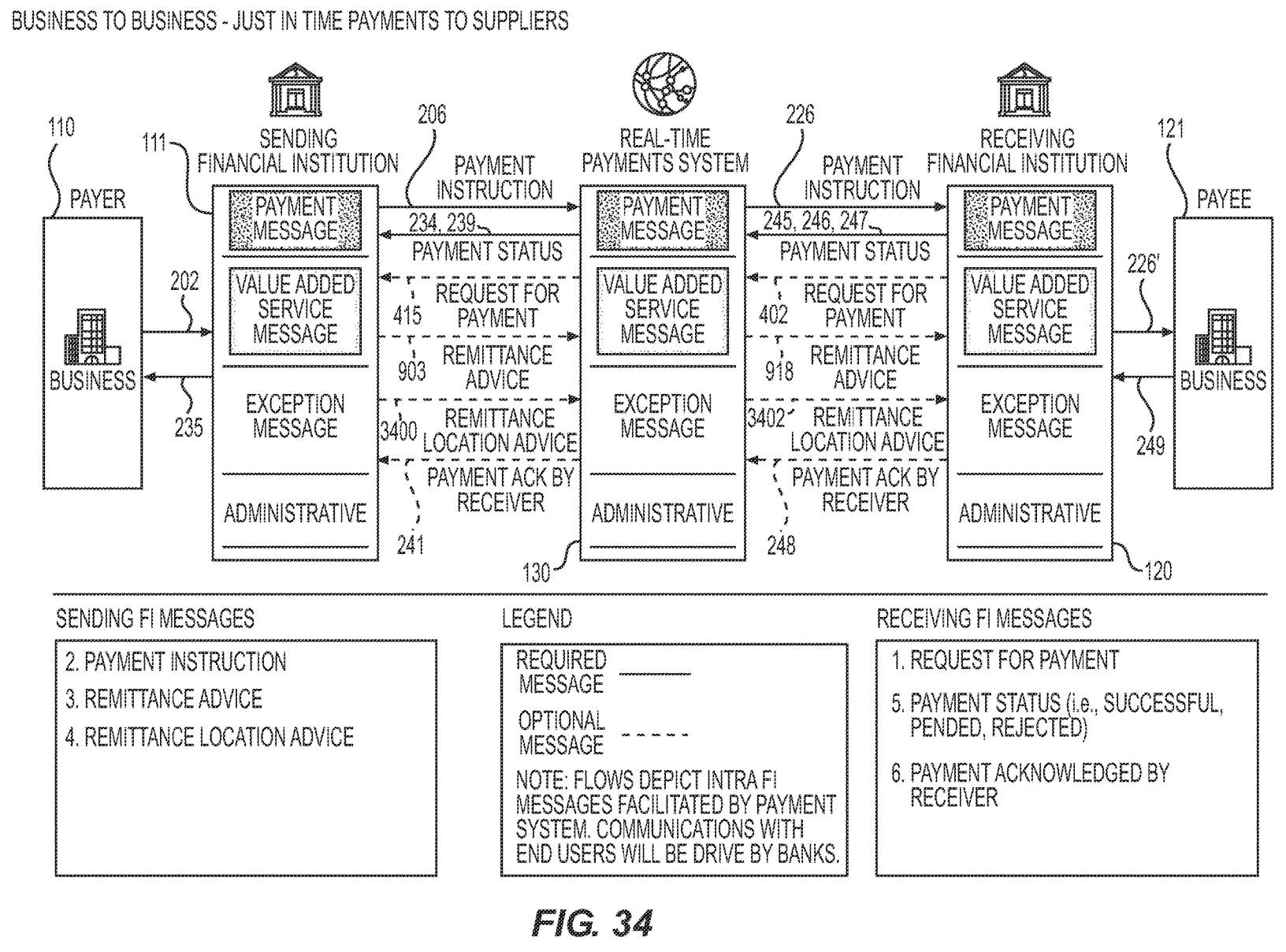

FIG. 34 represents a business to business scenario, such as a just in time payment to a supplier. FIG. 34 shows the same steps as those described above for FIG. 27 (although for convenience they are not further repeated here) for making a payment, but in a business to business context. In addition, the figure represents that payee station 121 can optionally request that the payment be paid, in which case a request for payment is provided from creditor FI 120 to system 130 in step 402, and the system 130 responds by providing a corresponding request for payment to the debtor FI 111 in step 415. Steps 402 and 415 are like those of FIG. 4. Also, the debtor station 110 can optionally provide remittance advice to the system 130 in step 903, and remittance location advice to the system 130 in step 3400. The system 130 forwards remittance advice to the FI 120 in step 918, and also can forward the remittance location advice to the FI 120 in step 3402. Steps 903 and 918 are like those of FIG. 9. Additionally, the creditor FI 120 can provide an acknowledgement of any of the payment, the remittance advice, and/or the remittance location advice, to the system 130 in step 248, in which case the acknowledgement is provided by system 130 to FI 111 (step 241). Steps 241 and 248 are like those of FIG. 2.

Figure 35:
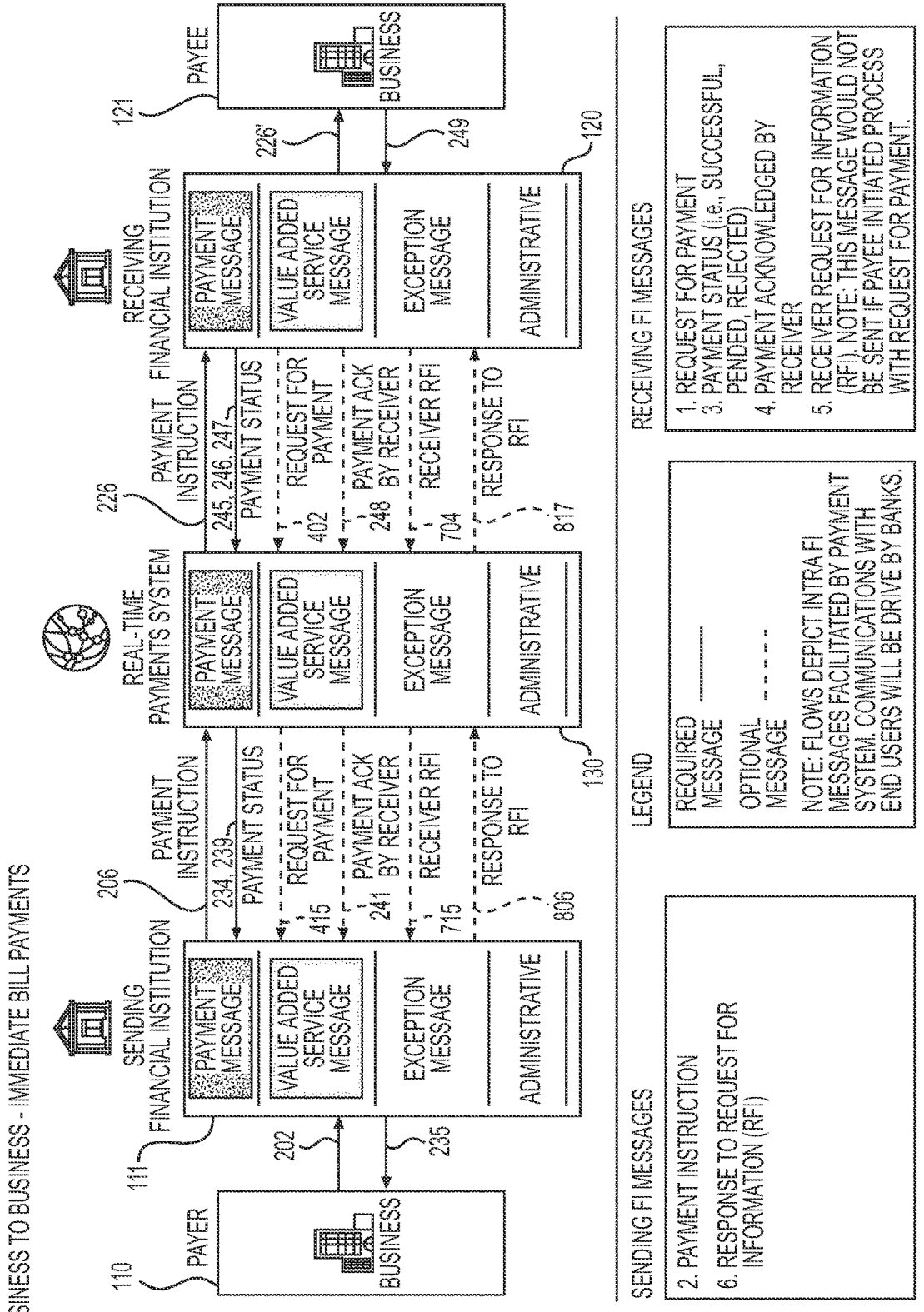
FIG. 35 represents a business to business context, such as for an immediate bill payment, according to an example embodiment herein.

FIG. 35 represents a business to business context, such as for an immediate bill payment. FIG. 35 shows the same steps as those described above for FIG. 27 (although for convenience they are not further repeated here) for making a payment, but in a business to business context. In addition, the figure represents that the FI 120 can optionally provide an acknowledgement that the payment was received, to the system 130, in step 248, wherein the system 130 can then provide the acknowledgement to the FI 111 in step 241. Steps 241 and 248 are like those of FIG. 2. Also, the payee station 121 can optionally request information, in which case a request for information is provided from creditor FI 120 to system 130 in step 704, and the system 130 responds by providing a corresponding request for information to the debtor FI 111 in step 715. Steps 704 and 715 are like those of FIG. 7. The debtor FI 111 then can provide the requested information in a response in step 806, to the system 130 (step 806), and the system 130 can then provide the information to the creditor FI 120 in step 817. Steps 806 and 817 are like those of FIG. 8. Also, in addition, the figure represents that payee station 121 can optionally request that the payment be paid, in which case a request for payment is provided from creditor FI 120 to system 130 in step 402, and the system 130 responds by providing a corresponding request for payment to the debtor FI 111 in step 415. Steps 402 and 415 are like those of FIG. 4.

The system has many additional capabilities, such as those described herein above and others as well. For example, the system 100 herein also can employ anti-spam measures to prevent the sender from broadcasting a massive number of requests to dupe receivers into sending funds. For example, this can be accomplished by charging a fee for all requests for payments. Also, in one example embodiment herein, a sending or receiving FI can be made liable for information in remittance data that may indicate illegal activity (e.g., the remittance data mentions a sanctioned individual or company). Provided that the payment is not being sent or received by a person or entity on an OFAC list, the FI would not be required to block or reject the transaction under OFAC requirements, in one example. The FI may, however, be required to file a suspicious activity report within 30 days if the content of a message indicates a potential relationship to illicit activity.

Figure 36:
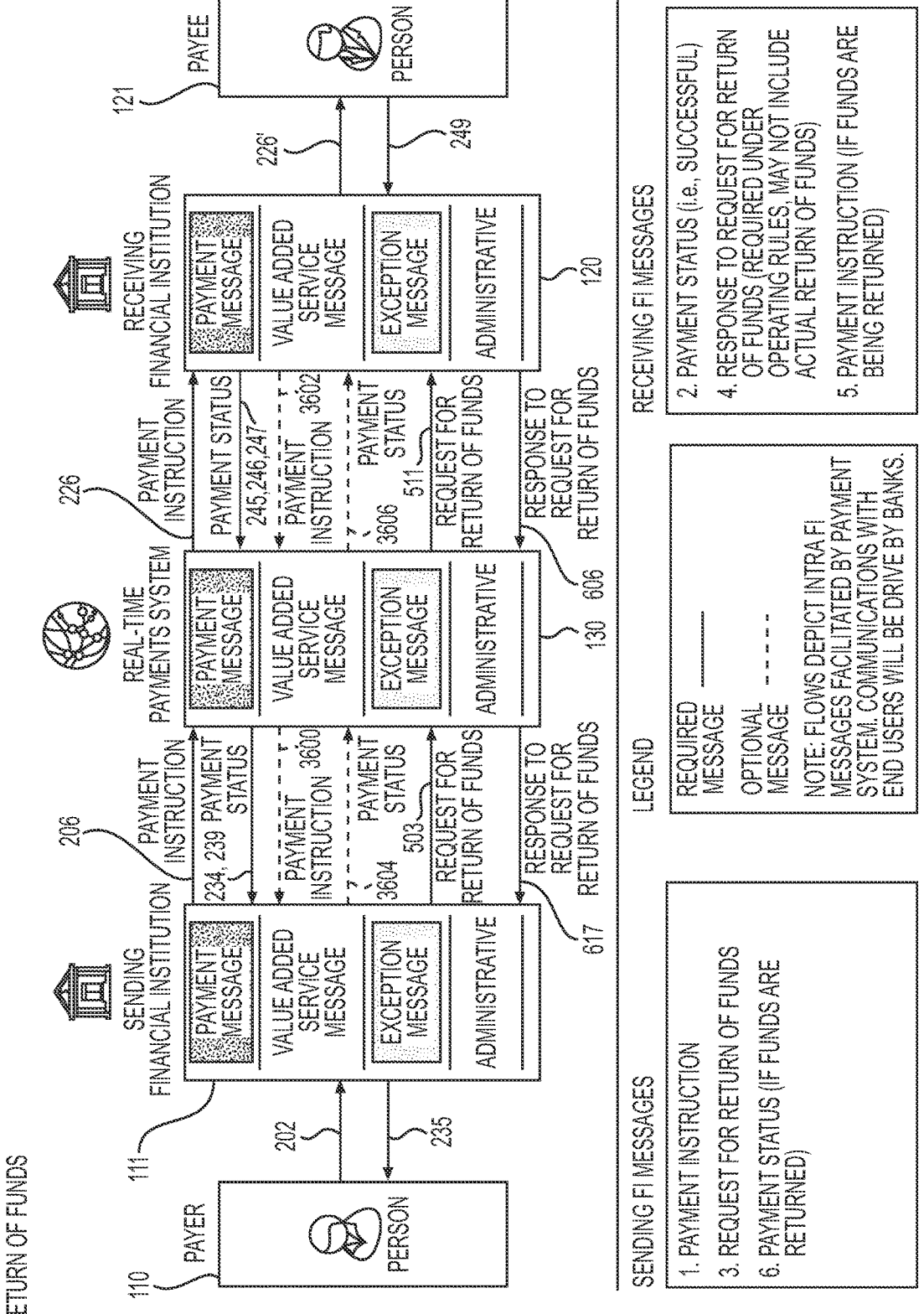
FIG. 36 represents an example of a request for return of funds procedure context, according to an example embodiment herein.

As another example capability of the system 100, as described above, in one example embodiment it has a capability for returning funds that were paid. Referring to FIG. 36, for example, the same steps as those described above for FIG. 27 (although for convenience they are not further repeated here) for making a payment. A return of funds can be requested by the debtor FI 111 to the system 130 (step 503), which requests a return of funds from the creditor FI 120 in step 511. Steps 503 and 511 are like those steps of FIG. 5. The FI 120 can then respond by providing a response to the request in step 606, wherein the response can include the requested funds, a status, and/or an acknowledgement of the request. The response is then provided from the system 130 to the debtor FI 111 in step 617. Also, the creditor FI 120 can provide a return of the requested funds optionally in a separate payment instruction message in step 3602, to the system 130, which then provides the message to the debtor FI 111 in step 3600. In addition, the figure represents that the FI 111 can optionally provide an indication of the status of whether that message was accepted, rejected, or is pending (step 3604), to the system 130, which then provides the indication to the creditor FI 120 in step 3606.

Figure 37:
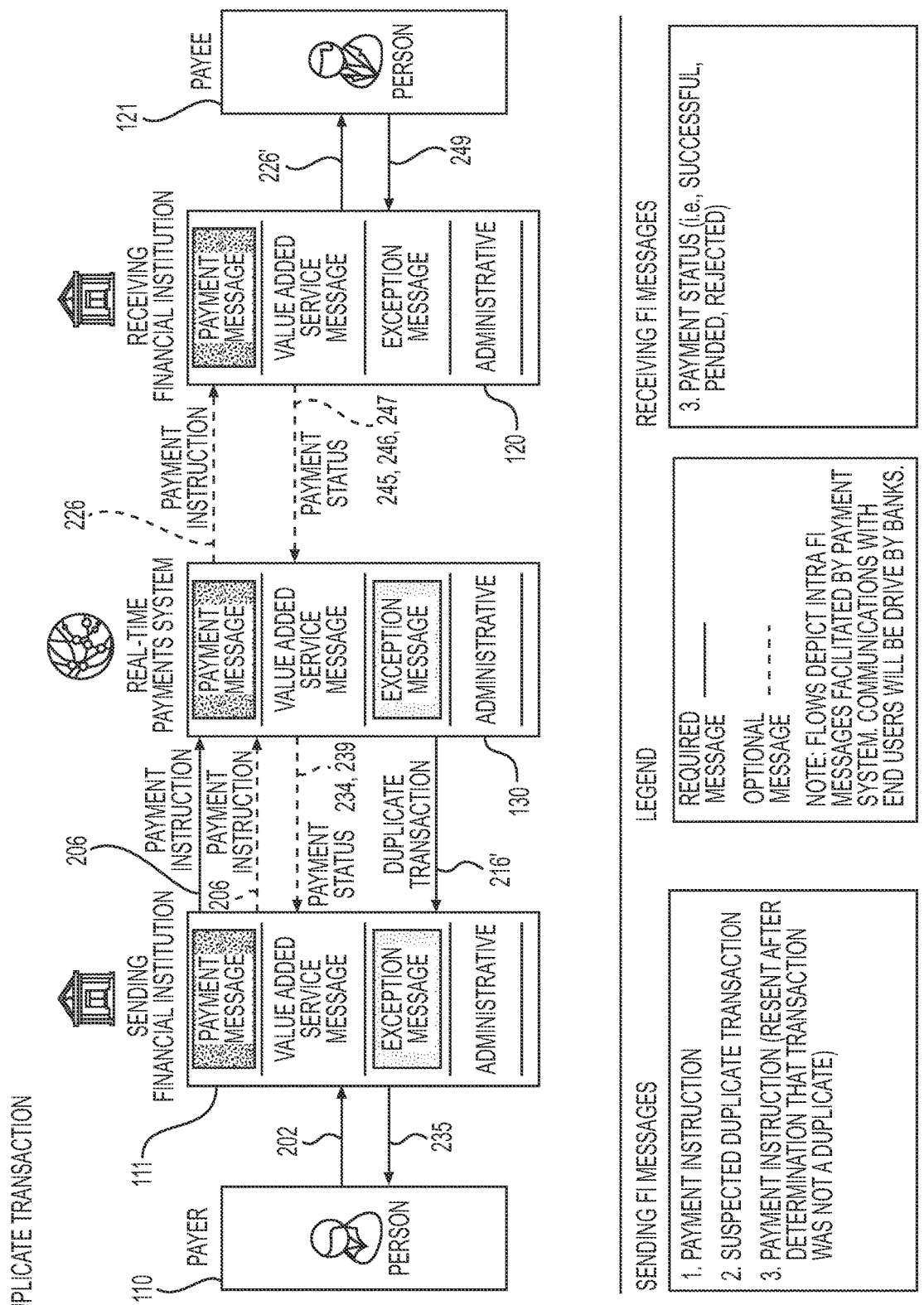
FIG. 37 represents an example process herein for detecting duplicate transactions.

Also, as described above in connection with various flow diagrams, duplicate transactions are detected so they are prevented from being fully processed. FIG. 37 represents an example of such a scenario, wherein the same steps as those described above for FIG. 27 (although for convenience they are not further repeated here) are performed for making a payment. The system 130 responds to receiving a payment instruction sent in step 206 by recognizing that it is a possible duplicate transaction (e.g., such as in steps 212 and 213 of FIG. 2), and forwards an indication to the debtor FI 111 indicative of that detection (step 216'). The debtor FI 111 can then reexamine the transaction, and, if it is determined that the original payment instruction is not duplicative, then the FI 111 can forward another payment instruction (see, e.g., a second instance of step 206 shown in dashed lines), whereafter the method then proceeds therefrom as described above.

Figure 38:
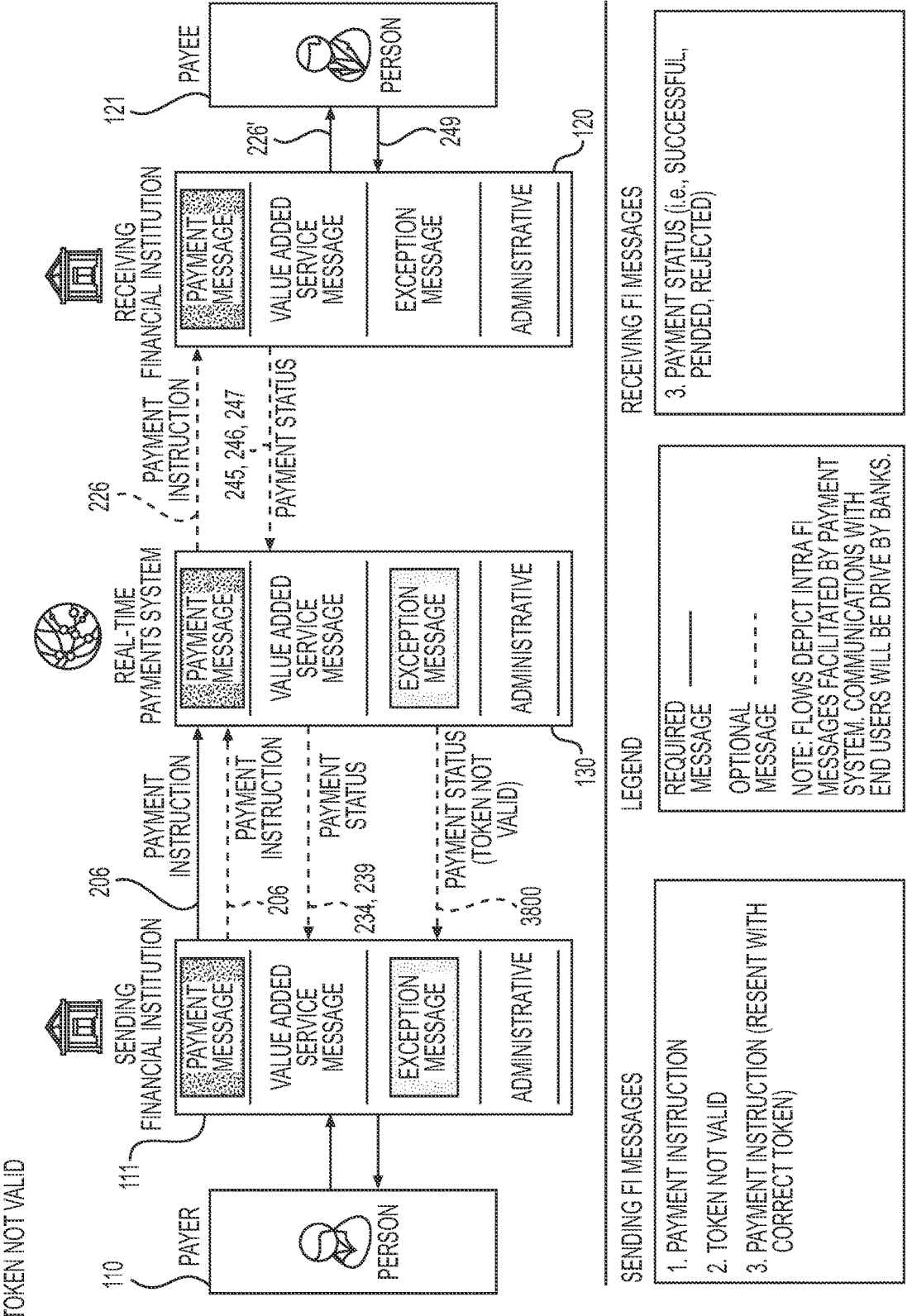
FIG. 38 represents an example process herein for detecting an invalid token.

Also as described above in connection with various flow diagrams, invalid tokens are detected. FIG. 38 represents an example of such a scenario, wherein the same steps as those described above for FIG. 27 (although for convenience they are not further repeated here) are performed for making a payment. The system 130 responds to receiving a payment instruction sent in step 206 by determining whether the instruction includes invalid token(s). For example, that determination can be performed in accordance with steps 214 and 215 of FIG. 2). Where the token(s) is determined to be invalid, then a status message indicating that the token(s) is not valid is provided by the system 130 to FI 111 in step 3800. In one example embodiment, step 3800 can be the same as the exception message step 216' of FIG. 2. The debtor FI 111 can then reexamine the transaction, and include a valid token(s) in another payment instruction (see, e.g., a second instance of step 206 shown in dashed lines), whereafter the method then proceeds therefrom as described above.

Fraud Detection

Figure 31:
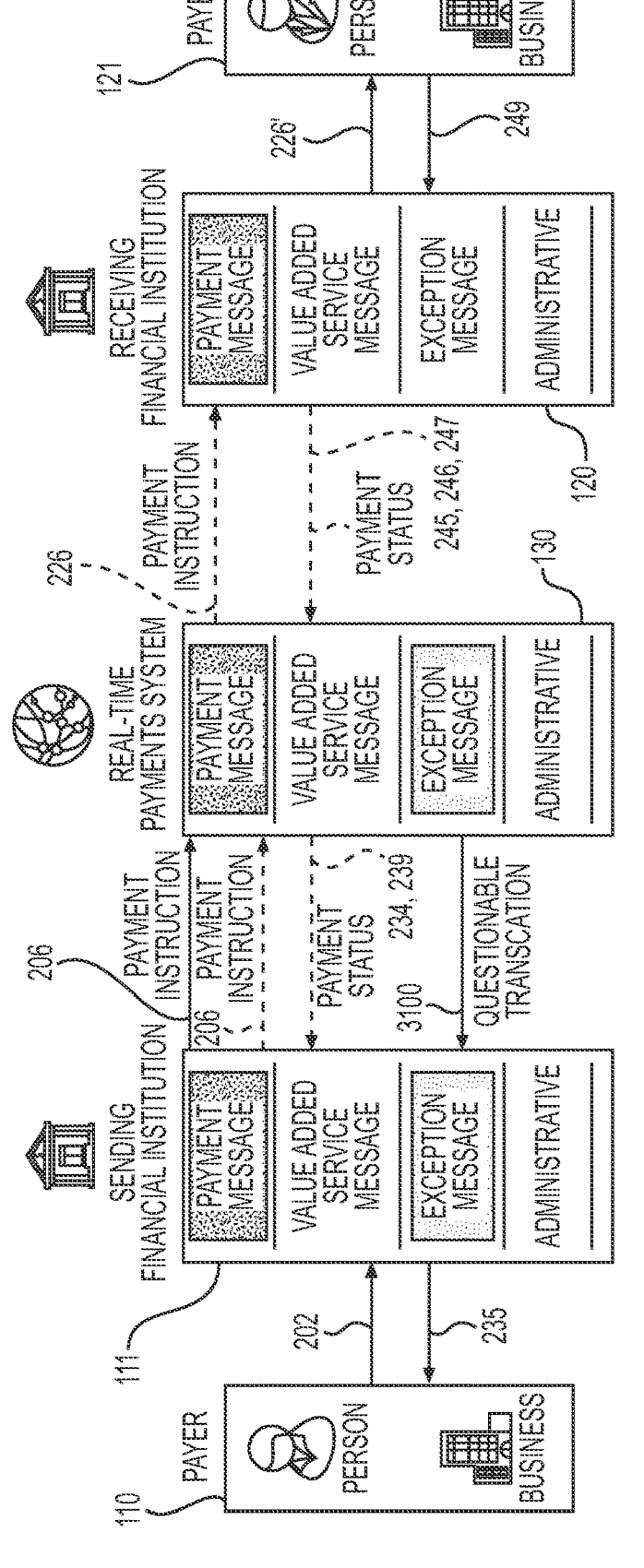
FIG. 31 shows an example fraud detection process, according to an example embodiment herein.

Still another capability of the system herein is fraud detection. FIG. 31 represents an example of such a scenario, wherein the same steps as those described above for FIG. 27 (although for convenience they are not further repeated here) are performed for making a payment. The system 130 responds to receiving a payment instruction sent in step 206 (solid line) by determining whether the instruction is possibly fraudulent. For example, that determination can be performed in accordance with any suitable technique for detecting a fraudulent transaction. Where the payment instruction is determined to be possibly fraudulent, then a status message indicating that the transaction is questionable token(s) is provided by the system 130 to FI 111 in step 3100. The debtor FI 111 can then reexamine the transaction, and can send another payment instruction (see, e.g., a second instance of step 206 shown in dashed lines), such as in a case where the FI 111 determines that the original transaction was not fraudulent. The method then proceeds as described above.

Thus, fraud detection can be performed at a central facility, such as at the system (network) 130, which is in a unique position within the overall system 100 to be able to detect activity between sending and receiving points. For example, the system 130 can evaluate transactions passing therethrough to detect predetermined patterns indicative of possible fraud, in real-time, and can then notify the FIs about the possible fraud so that they can take this into account when, for example, running their own fraud algorithms. The determination can involve a heuristic model, in one example embodiment herein, although other models may be used instead. As an example of a fraud detection, the system 130 can recognize that a single recipient is being sent payment transactions from multiple senders, and that a single sender is sending payment transactions to multiple recipients. If those activities are recognized by the system 130 as being indicative of possible fraudulent activity, then the system 130 can take action such as suspending the transaction and notifying FIs in real-time in the above-described manner.

Real-Time Payments are Useful to Customers

The system 100 is convenient in that it can enable consumers to pay each other directly from their existing accounts using online or mobile banking platforms. The system maintains account data privacy and is easy to use. For example, the system can route payments based on tokens that, in one example, are not used to debit accounts, so that senders and receivers will not need to provide complex, sensitive bank account details to other parties. The system also provides cost savings in that it provides a less costly alternative to costly funds transfers, check cashing services and last-minute bill payments. Additionally, the system provides certainty in that senders and receivers can be provided with immediate notifications of payment, and risks of returned payments are reduced because sending financial institutions can immediately verify sufficient funds. The system also is safe in that sending and receiving financial institutions, which have existing relationships with their customers, are responsible for authentication, in one example embodiment herein. Moreover, the system provides for effective cash management in that is has the ability to send and receive payments immediately, giving customers more control over cash flow, which can be useful for cash-constrained small businesses and consumers.

The system herein also supports superior and safer P2P payments, and provides comprehensive digital payment capability. In the system herein, customers can use their existing bank accounts to send and receive payments, whereas other types of non-bank MSP providers typically require customers to establish new accounts, which can be inconvenient during enrollment. Customers of the system herein can fund directly from their bank accounts, without requiring the sharing of sensitive data to payment recipients and recipient banks. For customers of typical non-bank MSP providers, on the other hand, customers must provide banking credentials, and MSP verification must be effected via, for example, a bank website or payment system. With regard to initiating payments, customers can use their existing bank login information, and bank verification/identification are employed for security, according to one example embodiment herein. For typical non-bank MSP providers, on the other hand, a customer must establish a separate login for MSP payment initiation. As for clearing and settlement, in one example embodiment of the system herein, immediate debit and push credit with real time availability to the payment receiver are provided, essentially in all cases. For typical non-bank MSP providers, on the other hand, a debit card or use of an ACH network may be required to effect external payments. Also, no cash outs are required in the system herein, since funds are transferred directly and immediately to a customer's bank account, whereas in typical MSP systems, customers must pull funds from the MSP account into their bank account, which can take a day or longer to be effected.

Sample Business Requirements

In one example embodiment herein, the system complies with predetermined business requirements. For example, with respect to credit transfers, in one example embodiment all payments originated by a payer are not permitted to be taken back from the receiver, and instead the payer can request the return of a payment made in error. This provides payment certainty for receivers.

The real time payment system herein can provide for 24/7 payments, provides real time access to payment status information for both senders and receivers, and immediate availability of funds for receivers. In one example embodiment herein, one of the business rules is that receiving FIs must be able to accept or reject most payments in seconds, and to resolve exceptions flagged for risk management and compliance review within a reasonable time (e.g., 2 hours). Also, receivers are to have access to funds for accepted payments substantially immediately (i.e., no holds).

Other example business requirements are that there is real time exchange of financial and non-financial messages that support a variety of use cases (i.e., messages are in real time), alias routing (e.g., tokens) is preferably employed (although not necessarily required) to initiate payments instead of account numbers. Also, ISO standard formats and internationally consistent transaction flows preferably are employed, to provide global compatibility, and messages must include all relevant data for risk management and compliance. This supports anti-fraud, anti-money laundering and OFAC/sanctions compliance processes.

For safety, additional business requirements can be employed. For example, in one example there is a system-wide limit on transaction sizes, and sending FIs can set lower limits. A settlement approach that mitigates material risk of loss can be employed. Intra-day net settlement and the use of position limits and pre-funding reduce settlement risk. Additionally, as described above, tokenization of bank account numbers protects account data. FIs that cannot meet a threshold for initiating payments may be able to participate as "receive-only" FIs. Thus, in one example a minimum threshold of security and privacy protection can be required of participating FIs.

In one example embodiment herein, there are certain payment system requirements for participants. For example, participating FIs should have functionality supported by the IT infrastructure of the payment system, and there can be certain operating rules and procedures as well. For example, requirements can be placed on participants in the real-time payment system that are not directly implemented by the IT infrastructure of the payment system. This can be in the form of policies, rules, standards, and service level agreements implemented through payment system governance.

In one example herein, FIs can be required to operate on a 24/7/365 basis, to accept and reject payments automatically on that basis, and to have the ability to perform necessary risk management and compliance functions, such as customer authentication, authorization, regulatory compliance screening, and anti-fraud screening 24/7 (which may be automated or outsourced). FIs also can be required to provide real-time access to payment status information for senders and receivers, so that senders and receivers can have complete, timely information about the status of real-time payments.

FIs also can be required to accept or reject a majority of payments (e.g., 95%+) within seconds, and all payments in a reasonable time, and to make immediate notification of payment to senders and receivers, or provide a channel for senders and receivers to inquire about payment status and receive an immediate response. FIs can be required to integrate accurate real-time payment status inquiry, notification, and feedback into online and mobile banking services.

Receiving FIs can be required to provide immediate availability of funds to recipients on a 24/7/365 basis, or at least make funds available to receivers within seconds for any accepted payment. Payments can be rejected for risk management, or an inability to post or legal compliance. Payments may be held for review for a reasonable time only when necessary for risk management and legal compliance purposes, and after review FIs must accept or reject payments, not withhold availability, in one example requirement.

FIs also can be required to employ limits on transaction value, which can be updated periodically based on objective criteria. Policies and processes can be provided to set sender FI value limits for transactions and to apply them to payment origination, and risk management policies and processes can be employed to accept payments up to a system-wide transaction value limit. FIs can be required to have an ability to identify potential structuring of transactions to avoid transaction limits.

Sending FIs can be required to have policies and processes for handling customer claims for unauthorized transfers and funds sent in error, and receiving FI can be required to have policies and processes for responding to requests to reclaim funds sent in error, and FIs can be required to have processes to request a return of erroneous payments, and an inter-FI process including electronic messaging to support requests for return of funds sent in error.

FIs can be required to create and operate a token vault or outsource it to a third party, integrate tokenization into products and services, and educate customers on tokenization. FIs can be required to have an ability to initiate payments based on an alias instead of an account numbers, and enable senders to initiate payments using an alias for the receiver such as a telephone number or email address, or the like.

FIs can be required to have an approach that mitigates material risk of loss, and a settlement process and legal framework that reduce or eliminate potential for settlement failure. FIs can be required to monitor, manage, and fund settlement pools or net settlement across all settlement windows, develop a process to respond to situations where settlement exposure has reached its limit, use tokens to protect account data, such as a unique code in lieu of an account number that cannot be used to debit the account.

For participating FIs, most security and data protection requirements apply across channels and products, not to a specific payment system, in one example embodiment herein. FIs also can be required to support risk management and regulatory compliance, and to support anti-fraud, anti-money laundering, and OFAC/sanctions compliance processes.

There also may be certain requirements placed on FIs such as, for example, practices and procedures for financial institutions participating in the real-time payment system that are not dictated by payment system requirements and operating rules.

Also in one example embodiment herein, there may be certain operator requirements placed on an operator of the core payments system, above and beyond day to day operation and maintenance of the IT infrastructure of the payment system, such as operator policies and procedures. An operator can be, for example, an entity responsible for operating the system 100, a subset thereof, or the network 100.

An operator can be required to establish limits on the value of transactions cleared through the payment system 100, and rules for a process for revising the transaction value limits (sending FIs can set lower value limits for their customers, and receiving FIs cannot set a transaction limit lower than the system-wide limit, in one example. In one example, there is a $25,000 per transaction initial limit, which can be raised over time.

An operator also can be required to provide data collection and reporting to support future value limit revisions, provide rules and procedures establishing a legal basis for payment finality (e.g., rules do not provide a basis for sending FIs to reclaim funds from receiving FIs for unauthorized payments (only sending FI has obligation to verify payment authorization, in one example)).

An operator can be required to support FI processes that prevent errors in sending payments, and for the transmission of messages requesting a return of funds and responses to such requests. An operator can be required to provide utilities to reduce sending errors (e.g., duplicate checking), operate inter-FI settlement, and establish and manage exposure limits for participating FIs.

An operator also can be required to act as a token services provider (TSP), and support third-party token vaults and FIs acting as their own token vaults, or work with a third party service to do so. An operator can be required also to provide centralized fraud and AML monitoring to complement processes at participating FIs. Additionally, an operator can be required to coordinate with international standards groups and payment system operators in other countries to ensure compatibility with the system 100, and to provide immediate transmission of payment status messages, and real-time access to payment status information to FIs. An operator also can be required to provide centralized fraud and AML monitoring to support receiving FI decision-making.

The network 130 also can have various capabilities, in example embodiments herein. For example, the system can support for frequent intraday net settlement, including evening and weekend settlement, and have an ability to apply limits on settlement exposure on an individual FI basis, including the ability to reject or suspend payments submitted by FIs that have reached their limit, and notify FIs that are approaching limits.

The network 130 also can have an ability to administer a pre-funded settlement pool, an ability to process and route tokenized payments and other messages, and an ability to route payments based on either alias or RT/Account Number. The network 130 also in one example can support any type of character-based alias (not just a telephone number of email address), and have an ability to accommodate an alias registry, registry maintenance, and unambiguous routing for multi-owner accounts and multi-account owners.

The network 130, in one example, also meets standards for data security and privacy protection appropriate for a retail payment market utility, has an ability to reject transactions that exceed a system-wide limit on the value of transactions, an ability to change the value limit, and an ability to establish different limits by type of payment.

Moreover, the network 130 can employ message formats that carry all data required for regulatory compliance, and employ tokenization in a manner that does not obscure data required for risk management and compliance such as anti-fraud, anti-money laundering, and OFAC/sanctions compliance. Message formats and processes can be globally compatible, and in one example are in accordance ISO 20022 message formats. The network 130 also can support real-time delivery of payment status information to and from FIs, including payment messages, and ACK/NAC and disposition messages (success, fail or pending).

Also, various elements of the system 100 may be required, in one example herein, to comply with certain business rules for real-time exchange of financial and non-financial messages that support a variety of use cases. For example, sending FIs can be required to adhere to standard formats and usage rules for payment and non-payment messages, receiving FIs can be required to make all relevant information from payment and non-payment messages available to receivers, and receiving FIs can be required to act on administrative messages. FIs also can be required to create products, services and processes to create, deliver, and respond to payment, non-payment, and administrative messages.

Security

The system herein has robust security capability that limits the ability to initiate payments, non-payment messages, and access to data to only authorized persons or applications. This reduces exposure to fraud or data breaches, and prevents incidents that undermine trust in the payments system. Security can be multi-factor, multi-layered security for immediate payments, and any participating FI should meet minimum access standards based on industry standard security principles.

Preferably, the system herein has mechanisms that limit the ability of unauthorized persons or applications to initiate payments, non-payment messages, and access data, so as to reduce exposure to fraud or data breaches. This can prevent incidents that undermine trust in the payments system. In one example embodiment herein, multi-factor, multi-layered security is provided to protect immediate payments, participating FIs meet minimum access standards based on industry standard security principles. Authentication and payment authorization can be provided. Authentication verifies that a payer is an actual authentic payer and has access to account. Payment authorization verifies that authenticated payer is making a true payment, and provides non-repudiation protection for FIs. Existing authentication standards can be employed, such as, for example, FFIEC guidelines, OCC guidelines, NIST CyberSecurity Framework and various standards, or FISMA. Assessments and certifications also can be employed, such as, for example, SOC1/SOC2 assessments, shared assessment SIG & AUP, ISO27001 certifications, SSAE16 certifications, penetration tests and 3rd party attestations. Authorization ensures that sending financial institutions have taken adequate measures to ensure that every payment submitted to the real-time payment system is duly authorized by an authenticated customer. Authentication provides verification that a payer is whom they claim to be and should have access to an account, and can include multi-factor authentication with secure tokens, or other automated fraud management.

Threats and countermeasures are constantly evolving. As such, it is possible that a static standard may become obsolete. Thus, security involves more than just payments initiation. For example, in a credit push system, the sender's financial institution may be required to verify the identity of the sender. Typically, a sender's FI (particularly in a credit push scenario) is in the best position to verify a sender's identity because of the existing relationship therebetween and "know your customer" obligations. A sending FI generally bears possible liability for unauthorized transactions and therefore has an incentive to employ effective online and mobile banking security.

According to an example embodiment herein, participating FIs should meet a minimum level of security and privacy protection appropriate for a retail payment market utility. The payment system may include FIs that receive but do not send payments.

The system also can have certain operating rules and procedures, such as, for example, rules that reference external security and privacy standards, rules requiring that all FIs meet data protection standards, and that sending FIs meet rigorous standards for sender authentication and payment authorization. Compliance with security and privacy standards preferably is auditable and audited. Security standards do not unnecessarily restrict usability.

With respect to operator requirements, an operator may be required to administer compliance with security and privacy requirements, and, with regard to financial institutions, security and data protection requirements may apply across channels and products, not to a specific payment system.

Tiered Approach to Minimum Requirements Based on Participation

Not all financial initiations may wish to participate in real-time payments at the same level (i.e., some will send and receive real-time payments, while others will only receive). Some institutions will carry greater inherent risk due to participation and volume of payments. In one example embodiment herein, a tiered approach is employed that matches minimum level of requirements with potential for risk within the system. For example, a Tier 2 involves large financial institutions with substantial volume and participating as a sender, and a tier 1 involves small and midsize financial institutions with low to moderate volume and participating as a sender. All Participants in the system may not be sending real-time payments, but may have the capability to receive payments. Tier 2 has a higher level of security, tier 1 has a next, lesser level of security, and the remaining participants may have a lesser level of security.

Minimum requirements for risk control will be associated with the activities that a financial institution is offering and be additive in nature for each increasing level of potential risk. The centralized utility analyzes network level data to identify and report potential fraudulent behavior (e.g., detect anomalous send/receive activity; excessive complaints, etc.). Participating financial institutions should comply with FFIEC guidelines as applied through prudential regulator examination, and to report fraudulent behavior to the operator of the network 130 and/or the sending financial institutions. Participating institutions also should be able to react to alerts from the centralized activity monitoring utility. Participating financial institutions that also send payments also should comply with requirements for all participating financial institutions, have at least a two factor authentication, require registration of customers sending payments, and be able to perform real-time fraud and risk screening for payments being originated. Participating financial institutions that allow customers to make requests for payment should comply with requirements for all participating sending and receiving financial institutions, make warranties and representations that requests for payment are for legitimate purposes, screen and monitor requests for payment initiators, with the ability to identify abusive or fraudulent use, and take corrective actions including suspension of initiator access to the network. Such institutions also should be able to respond to network reports of abuse of requests for payment.

Participating financial institutions that allow for third party payments should comply with requirements for all participating sending and receiving financial institutions that allow customers to initiate requests for payment, make warranties and representations that the third party is abiding by rules for payment origination, apply the same requirements to third party payment services that are applied to financial institutions that send real-time payments and allow requests for payment. Such institutions also should follow FFIEC guidelines regarding third party relationships. The network 130 has an ability to enforce rules against FIs and third parties, including an ability to levy fines and suspend activity on the network. FIs should not allow third parties to originate volume greater than their financial resources can support in the case of third party failure.

Minimum Requirements for all Participating Financial Institutions

Any institution that participates in the system may comply with the following requirements:

1. The organization complies with the following end user authentication requirements: FFIEC guidelines including authentication guidance published in 2005 and its supplement published in 2011.
2. The organization may have 3rd party attestation by having penetration test on an annual basis of their customer authentication platform.
3. The organization may have "Opportunistic TLS" enabled for email communication over the Internet.

Tier 1 Financial Institution Minimum Requirements

In addition to the requirements for all participants in the system, any Tier 1 participants also can be required to meet the following incremental requirements:

1. The organization must have SOC1 and/or SOC2 and/or Shared Assessment AUP and/or ISO27001 certification and/or SSAE16 certification along with penetration test and FFIEC compliance on an annual basis of their customer authentication platform.
2. The organization will retain authentication logs for users who authenticate through their environment prior to acting as sender for at least 60 days.

Tier 2 Financial Institution Minimum Requirements

In addition to the requirements for all participants in the system and Tier 1 requirements, any Tier 2 participants can be required to meet the following incremental requirements:

1. Proof that periodic vulnerability scan is performed on the customer authentication platform.
2. Proof that a SDLC process exists where static and dynamic code analysis is performed on the customer authentication application.

Support for Risk Management and Regulatory Compliance

In one example herein, support for anti-fraud, anti-money laundering and OFAC/sanctions compliance process is provided. For example, payment system requirements may be such that a message format carry all data required for regulatory compliance, and tokenization may be required to not obscure data required for risk management and compliance such as anti-fraud, anti-money laundering and OFAC/sanctions compliance process. Operating rules and procedures may require that a sending FI provide data required for regulatory compliance by a receiving FI, and operator requirements may provide centralized fraud and AML monitoring to complement processes at participating FIs.

Moreover, financial institutions may be required to establish policies and processes to obtain data required for regulatory compliance in the payment initiation process, and automated anti-fraud screening may be required to meet expectation to accept or reject payments in seconds or minutes.

Fraud Prevention and Mitigation

Various types of fraud may happen in a credit push system, such as, for example, an account take over, money mule operations, fraudulently inserted payments, fraudulent solicitations (e.g., spam, phishing, credential stealing malware etc.), or other types of fraud. Fraud detection can be provided at the ACH network, financial institutions, and/or third party processors, and can occur in flight/real time, by post hock analysis and detection, or by holding transaction/message records for analysis.

In one example embodiment herein, anti-fraud functions are performed centrally, such as at the ACH network 130. The network 130 can process data that is central in the system, versus at end points (sending and receiving financial institutions). Patterns of activity that are not apparent at an end point (e.g., money mule operations, network fraud schemes, etc.), can be detected. The network 130 also can be a centralized utility that provides offerings for financial institutions that choose not to perform complete anti-fraud in house, and can perform analytics/business intelligence to support fraud prevention.

Security and Fraud Mitigation

Security and risk management requirements are associated with specific real-time payment activities, such as receiving real-time payments, sending real-time payments, allowing customers to send request for payment messages, providing access to third party payment service providers to send real-time payment, and providing a real-time payment directory service. With the exception of receiving real-time payment, there is no existing framework that can be utilized to define all security requirements for financial institutions offering that service. As such, there is a need to establish a governance process for creating, maintaining, updating, monitoring, and enforcing security requirements.

Example embodiments described herein can mitigate fraud by employing a centralized utility (e.g., ACH network 130) that can analyze network level data to identify and report potential fraudulent behavior to origination and receive points, and enable the exchange of information between financial institutions regarding fraudulent activity. Also, in one example herein, a tiered approach is taken to address threats, based on participation. For example, financial institutions may not participate in real-time payments at the same level (e.g., some may participate at a level where by both can send and receive real-time payments, while others will only receive such payments, and some institutions may carry great inherent risk owing to participation level and volume of payments covered). As such, risk control may be associated with the activities that a financial institution is offering and be additive in nature based on level of participation.

Preferably, the centralized utility (e.g., network 130) that analyzes network level data to identify and report potential fraudulent behavior can detect anomalous sending and receiving activity with alerts to the financial institutions that are impacted, perform velocity checks on origination, receive, and request for payment volumes, and be able to detect patterns that indicate potential network fraud or money mule activity. To address fraud mitigation needs of a real-time system, the centralized utility can analyze network level data to identify and report potential fraudulent behavior to origination and receive points, and serve as a platform to allow for the exchange of information between financial institutions regarding fraudulent activity.

Preferably, the utility also can provide alerts with reason codes upon the detection of anomalous activity for impacted financial institutions, provide access to network data to augment financial institution fraud detection and risk management, and perform fraud analytics to provide regular fraud reporting to participating financial institutions. Also, preferably the utility can track complaints of excessive abuse of request for real time payments and send notification to a receiver's FI, can support the exchange of reported fraud incidents among financial institutions, and can provide payment data elements to support receiving FI risk management, such as by providing data on origination channel and device ID, and accommodating geolocation data for a sender. The utility preferably also can provide data to support sending FI risk management, such as, for example, data specifying an age of receiving accounts.

Participating financial institutions may be required to comply with FFIEC guidelines as applied through a regulator examination, report fraudulent behavior to an entity responsible for the ACH network 130 and/or to sending financial institutions, and react to alerts from a centralized activity monitoring utility.

Participating financial institutions that also send payments also may be required to comply with requirements for all participating financial institutions, have a minimum of two factor authentication (as defined through a real-time payments governance process), require registration of customers sending payments, conduct real-time fraud screening for payments being originated thereby, have a capability to assign risk based sending value limits to customers, and avoid the use of including active hyperlinks (as defined by a real-time payments governance process) in payment and non-payment messages.

Also in one example herein, participating financial institutions that allow customers to make requests for payment must comply with requirements for all participating sending and receiving financial institutions, make warranties and representations that requests for payment are for legitimate purposes, comply with requirements similar to those for origination of ACH debits (determined through a governance process), and financial institutions must be able to respond to network reports of abuse of requests for payment, and have the ability to suspend users' access to the network.

Participating financial institutions that allow for third party payments may be required to comply with requirements for all participating sending and receiving financial institutions that allow customers to initiate requests for payment, provide warranties and representations that the third party is abiding by rules for payment origination, apply the same requirements to third party payment services that are applied to financial institutions that send real-time payments and allow requests for payment (as applicable), and follow FFIEC guidelines regarding third party relationships. Additionally, such financial institutions also should have a capability to enforce rules against FIs and third parties, including an ability to levy fines and suspend activities on the network. The financial institutions also should not allow third parties to originate volumes greater than their financial resources can support in the case of third party failures.

Security measures also can be taken regarding requirements for directory services. As an example, it may be required that a directory service cannot store account information (i.e., it should store tokens only), and have a robust entry maintenance process to ensure that entries are reliable and updated on a timely basis. Ideally, directory services have the ability to allow customers to change their alias affiliation through their registrars, aliases can be registered only in the directory through a financial institution or third party sponsored by a financial institution, and the registrar is responsible for maintaining aliases by providing a process to verify the identity of an alias owner, and by providing warranties and representations that aliases are associated with correct accounts. Preferably, directory access is restricted to financial institutions for the purposes of routing payments (i.e., no direct third party is permitted access to the directory), and industry standard data protection is complied with as it applies to financial institution data processors. Other requirements may include that the directory service must be able to provide the name and address of the receiver to the sending FI to support error prevention, risk management and regulatory compliance (e.g., OFAC screening, AML), and must have a robust entry maintenance process to ensure that entries are reliable and updated on a timely basis.

The payment system herein is useful in that, in one example embodiment herein, it processes credits only versus debits, and thus privacy protection is maintained. A transaction is generated and sent through the ACH network 130 from a sending institution upon that institution receiving instructions from a payer, and only if the payer has sufficient funds available to cover the transaction value and has been duly authenticated (e.g., at the sending financial institution).

The use of a credit "push only" model addresses funds availability and risk management concerns (e.g., insufficient funds, payment authorization, multi-party authentication, PCI, etc.), and offers transparency and control for end users. Any case can be addressed by credit push, such as, for example, a business to person application, a person to person application, a person to business application, and a business to business application. In one, non-limiting example embodiment herein, debits are not employed in the method herein because current debit and credit card payment systems work well for existing debit use cases, and requests for payments followed by credit transfer might be a superior form of debit. A credit transfer system is inherently safer than a payment system that allows a payee to debit a payer. Even if hacked, the amount vulnerable is limited to merely the amount of funds in each account.

In the system herein, a debit capability can be emulated using a request to pay from a payee to a payer, wherein the payee initiates a request for payment from the payer, the payer receives a notification of the request for payment and authorizes a credit transfer to the payee. This approach gives the payer a level of control over the payment process. A credit push only model addresses funds availability and risk management concerns. For example, for a sending institution, there is a risk that a fraudulent transaction is attempted to be initiated by a fraudster. The sending bank can verify that there are sufficient funds available to cover the transaction, and that the payer has authenticated itself. In a debit pull situation, on the other hand, a bank initiating a transaction for a payee does not necessarily know the payer, or whether the payer has funds sufficient to cover a transaction. Also in a debit pull situation, advanced fraud protection mechanisms typically cannot be employed (e.g., transaction analytics, pattern recognition, etc.). Funds also are not made immediately available.

As described above, in one example embodiment the system has the ability to send or receive payments on a 24/7 basis, provides immediate notification to senders and receivers, immediate fund availability to recipients on a 24/7 basis, and employs an extensive set of payment and non-payment messages. The system provides payment certainty for receivers, a process to request the return of erroneous payments, and, in one example embodiment, also employs value limits on transactions updated periodically based on predetermined criteria. Settlement is performed in a manner that mitigates material risk of loss, and preferably tokenization of all account data is employed such that payments can be initiated using an alias accounting/routing number. A threshold level of security can be required to provide privacy protection of all participating financial institutions.

Real-Time Payments—Immediate Availability of Funds for Receivers

In one example embodiment herein, a receiving FI can be required to make payments available immediately to the extent possible, and to comply with all applicable laws (e.g., AML, OFAC) and necessary risk management processes (fraud monitoring). For example, funds can be made available immediately, within seconds, minutes, hours, multiple times daily, at the end of the day, and can be tied to settlement, in some embodiments. Availability exceptions are a small fraction of total payments. This provides consistent expectations for payees and payers, allows for an expanded number of use cases, and limits confusion for payers and payees. Pre-screening transactions at the network level can minimize exceptions (e.g. AML, OFAC, fraud suspects), and notifications can be provided to payees for transactions that cannot be immediately screened.

Transaction Value Limits

In one example embodiment, payment value limits are employed to mitigate risk. For example, a pre-determined value limit on transactions is employed to limit exposure to credit or liquidity risk between sending and receiving banks. This has the advantage of limiting the amount of credit, settlement, and/or liquidity risk, and reduces potential risk from fraud events.

System-wide transaction value limits (e.g., $25,000) can be employed based on risk tolerances of institutions and research into use cases. Sending FIs also may impose limits (e.g., lower limits) per day or per transaction or on some other predetermined basis. In one example, a receiving FI cannot impose a lower limit on its receivers, and there is a process for updating limits based on objective criteria, such as, for example, periodic evaluations (e.g., analyzing transaction data, model settlement risk, survey unmet needs, etc.), and automatic triggers are employed when limits are exceeded (e.g., transaction thresholds, loss rates, or the like). In example embodiments herein, payment transactions can be evaluated at a sending and/or receiving FI, at the ACH network 130, and/or at another element of the system 100, to determine whether a payment amount specified in the transaction equals or exceeds the limit. If the limit is equaled or exceeded, then the evaluating element can provide an alert indicative thereof to the sending and/or receiving FI or another element of the system 100, and, in one example embodiment herein, the transaction is discontinued/not effected.

FIs also may manage sending limits based on, for example, customer segments and use cases, structuring of multiple transactions to circumvent limits, and overall customer activity. In certain countries, certain value limits are employed. For example, Poland employs a limit at $27,500 or 100,000 zt, in Japan transactions over $842,500 or ¥100 million are diverted to real time gross settlement, and in South Africa there is a limit of $430,000 or ZAR 5 Million until 16:00 hr, and $21,500 or ZAR 250,000 during non-business hours. In the UK there is a limit of $155,00 or £100,0001.

Setting a payments limit mitigates exposure to fraud, credit, and liquidity risk while still enabling customers to benefit from real-time payments. A limit on transactions can help prevent minor errors and challenges associated with new systems. A limit also can mitigate credit/liquidity risk for banks and reduce fraud risk. An initial limit of, for example, $25,000 allows most customers to benefit from real-time payments as follows:

P2P transfers: a threshold high enough to cover transfers to family for emergencies, P2B ad-hoc: a limit still covers emergency bill payments. Covers many stock purchases and will cover more as limits migrate over time, B2B ad-hoc: a threshold covers most small business just-in-time supplier payments and some emergency bill payments, but may cover more if the limit migrates over time, B2P ad-hoc high value: a limit covers many insurance claims or legal settlements, but could cover more if the limit migrates over time, B2B ad-hoc low value: a limit covers temporary employee wages and emergency payroll, since they are individual transactions.

Limits can be raised incrementally where deemed appropriate.

Settlement and Settlement Risk Mitigation

Effective settlement risk management mechanism(s) ensure that a payer has funds available to settle a transaction/credit to a payee (e.g., pre-funding or funds not available to payee until after settlement). Such management is useful because it provides improved customer experience in the event of a FI failure, fraud, etc. Such a mechanism decreases a receiving financial institution's risk, and insures overall integrity and trust of the payment system. Settlement cycles can be at predetermined time, such as, e.g., the end of day, multiple times/day, in real-time, etc. Interbank settlement should effectively eliminate material risk to receiving FIs that sending FIs will not meet their obligation to settle. For net settlement systems, there should be reduction of risk associated with unsettled debit positions. Settling more frequently can limit the build up of large unsettled debit positions.

According to an example aspect herein, FI settlement accounts are pre-funded. Prefunding of settlement pools mitigates the risk of unsettled positions. Also, different settlement mechanisms can be employed for large credit worthy FIs versus smaller and non-credit worthy FIs.

There are several models for settlement management that can be considered while balancing funds availability needs.

For example, in a PIN/Debit system, funds in a payer's account are captured immediately, and may become available in a payee account in 2-3 days. Settlement typically occurs one time per day. In Japan, real-time funds availability is provided, as is end of day settlement for non-RTGS payments (over maximum value). In Korea there is immediate fund availability, and deferred net settlement (next day). In India there is real-time funds availability, and end of day net settlement. In China there is funds availability within 20 seconds, and deferred net settlement. Each of those is a daily settlement model.

Multiple per day settlement models also exist. For example, with respect to funds availability, in Chile a receiving bank must respond within 10 seconds, and there are settlements two times per day through RTGS. In Sweden there is near real-time (within 15 seconds) funds availability, and multiple deferred central bank settlements per day. In South Africa funds availability is within 60 seconds, and there is deferred net settlement (hourly during the business day). In Denmark, funds availability is in near real-time (1-10 seconds), and there is Net, intraday settlement. Singapore has near real-time (seconds) funds availability, and deferred settlement 2 times per day (with intention of increasing cycles as system matures). In the United Kingdom for funds availability there is 15 second confirmation, posting within 2 hours, and deferred net settlement, 3 times per day.

Real Time settlement management systems also exist. For example, in Brazil 97% of funds are released in less than one minute, and there is continuous net settlement. In Switzerland there is purported real-time funds availability and real-time settlement. In Mexico funds availability occurs within a maximum of one minute and 5 seconds, end-to-end. Poland has near real-time (seconds) funds availability, and immediate settlement.

In one example embodiment herein, the real-time payment system employs pre-funding of accounts and net settlement, with multiple settlements per day to mitigate the build-up of unsettled positions, although this example is not limiting. Indeed, other types of settlement can be employed, such as, without limitation, any of the types represented in FIG. 44. Settlement can be performed or at least partially be effected by, for example, the settlement facility 134 and or settlement system 133 of FIG. 1.

As pointed out above, settlement herein can employ a hybrid approach to mitigate risk of default, including a pre-funded account and allowance for qualified FIs to carry an unfunded net debit position. Regarding prefunding, financial institutions (e.g., 111 and 120) can deposit a full or partial settlement obligation amount in cash into one or more settlement accounts prior to a clearing, and the pre-funded balance is used to settle net positions at scheduled times. The account(s) can be maintained by, for example, a settlement facility such as facility 134 or service 133, or at another location. With respect to a multilateral net debit cap, in one example herein there is a limit on the net unfunded settlement position for participating FIs across all counterparties, and the net unfunded settlement position is the amount by which the net debit position exceeds an FI's balance in the pre-funded settlement account. Clearing can be suspended when the net unfunded debit position reaches the net debit cap. Also, in one example herein the limit is based on credit risk criteria pre-established through, for example, a governance process. It may happen that an FI may have a zero net debit cap, which means that the FI must pre-fund its entire settlement position. Conversely, if an FI has a zero balance in the pre-funded settlement account, its multilateral net debit cap represents its entire settlement capacity. FIs can deposit funds into the pre-funded settlement account to initiate payments that exceed their net debit cap. Loss-sharing agreements can be employed wherein remaining participants cover losses in the event of a settlement default; for example, a loss sharing formula established through governance process.

FIG. 43 represents an example of the impact on a total settlement capacity 4300 for a FI, in a case where pre-funding is employed in conjunction with a net debit cap, or where only one of those is employed. FIG. 43 shows a situation 4302 where a FI has a pre-funded balance 4305 in a settlement account and a net debit cap 4304, a situation 4306 where a FI has a zero net debit cap and a prefunded balance 4301 in a settlement account, and a situation 4307 where a FI has a zero pre-funded balance and a net debit cap 4303 in a settlement account. Thus, for example, for situation 4302, if the debit allowance 4304 is $1,000,000, and the pre-funded balance 4305 is $1,000,000, and the applicable FI requests settlement in the amount of $2,000,000 or less, then settlement will occur (although the FI may be required to replenish the pre-funded amount). However, assuming the amount of balance 4301 is $1,000,000, settlement for $2,000,000 would not take place in scenario 4306 because the balance is exceeded. Also, assuming the net debit cap 4303 is $1,600,000 in scenario 4307, then a settlement in the amount of $2,000,000 also would not take place because the cap is exceeded. However, settlement for an amount of $1,600,000 or less would take place in scenario 4307.

Figure 46A:
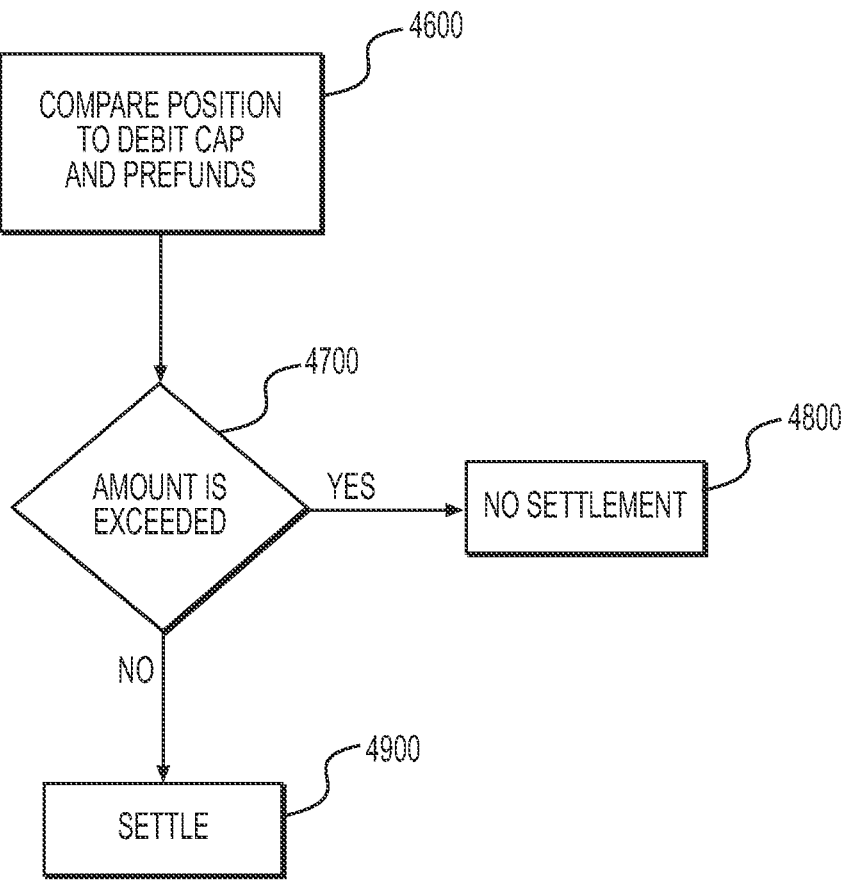
FIG. 46A shows a flow diagram of a settlement procedure according to an example embodiment herein.

Thus, as can be understood in view hereof, and referring to FIG. 46A, a method herein includes the settlement service 133 comparing (step 4600) a financial position of at least one FI (e.g., a position of the FI resulting from conducting transactions, such as, without limitation, payment transactions according to the methods herein) to a combination of a value of a pre-funded balance (if any) in a settlement account and a value of a net debit cap (if any). Also, the service 133 can recognize when an unfunded settlement position has reached a predetermined net debit cap (which can be unilateral and based on a particular FI, or multilateral based on multiple FIs), and then effect settlement multiple times per day in order to reduce the positions below the cap (or it can employ any other settlement mechanism such as those of FIG. 44, to reduce the positions). Thus, if it is determined that the combination of the net debit cap and pre-funded amount is exceeded in step 4700 ("Yes in step 4700), then settlement is suspended (step 4800). Otherwise, if the combination is determined not to be exceeded in step 4700 ("No" in step 4700), then settlement occurs in step 4900. That step can be effected according to any predetermined settlement technique, such as, for example, settlement multiple times per day or using any other suitable settlement technique (e.g., including, without limitation, any of those represented in FIG. 44).

Also, in accordance with an example embodiment herein, in the case of multiple settlements, the frequency thereof can be determined to avoid a predetermined level of unsettled net debit positions on the part of FIs, and to prevent large unfunded positions. For example, the settlement service 133 and/or settlement facility 134 can evaluate whether the unsettled positions of all participating FIs, or a subset thereof, exceeds a predetermined threshold (e.g., 10% of the FIs have unsettled debit positions exceeding a predetermined threshold amount). If the threshold is exceeded, then the service 133 and/or facility 134 can increase the frequency at which settlements occur and/or schedule and conduct one or more additional settlements that were not previously scheduled. In the event losses occur owing to one or more FIs not funding their unfunded positions in time, then the losses can be shared (funded) between multiple FIs, based on predetermined criteria.

Funding Agent

When a transaction between two participants is placed onto the Automated Clearinghouse (ACH) network 130 to effect a real-time payment, a position for each of the participants is recorded by the settlement services system 133. Upon the transaction clearing, one participant is debited and the other is credited. At that point the transaction has settled. A participant that is funding the prefunded balance account with a balance is referred to herein as a funding participant. To back up the settlement of the transaction the participant's funding agent is required to deposit monies in a joint account owned jointly by one or more funding agents and one or more funding participants. In some embodiments, a funding participant is a participant that has become a party to the prefunded balance account agreement with a bank that holds the prefunded balance account and that (i) requests and receives disbursements from the prefunded balance account, as permitted by operating rules, to its account and (ii) if the participant is a sending participant, prefunds for itself in accordance with the applicable participation rules and/or operating rules.

A funding agent is a depository institution that (i) has become a party to a prefunded balance account agreement and (ii) serves as an agent to one or more non-funding participants to (A) provide the prefunded requirement and supplemental funding on behalf of such non-funding participant and (B) request disbursements as permitted by operating rules for each of its non-funding participants. More generally, a funding agent funds and manages a participant's positions in the real-time payments network, e.g., ACH network 130, on behalf of the participant (e.g., adding liquidity or subtracting liquidity).

Settlement in a real-time payment system network such as ACH network 130 is effectuated through entries on a ledger and fully backed by the balance in a prefunded balance account, thereby making settlement the practical equivalent of settlement in central bank money. Participants can fund ledger positions and receive disbursement of excess network liquidity through, e.g., FedWire® funds transfers. The Fed-Wire® funds transfer system is a real-time gross settlement system of central bank money used by Federal Reserve banks to transfer funds electronically between member participants. While the prefunded balance account is with, e.g., a Federal Reserve bank, the positions are held on the ACH network 130 (e.g., in settlement services system 133). In addition, the transfer of funds is ultimately controlled by the settlement services system 133 component of the ACH network 130.

Each participant has a position on the ACH network 130. However, participants have the need to manage their positions on the ACH network 130 and their prefunded balance. Some participants may not have the ability to effectively manage their own position on the ACH network 130 or their prefunded balance because the balance is constantly changing, making their accounts difficult to maintain, track and administer their positions.

According to some embodiments, a funding agent facilitates the liquidity of the participation of members in network 130.

Figure 46B:
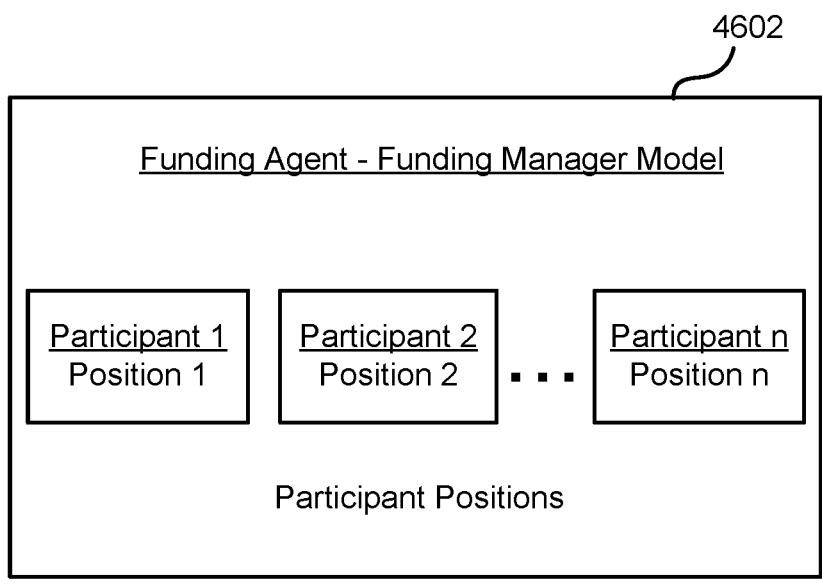
FIG. 46B illustrates a funding agent model according to an example embodiment herein.

FIG. 46B illustrates a funding agent model according to an example embodiment of the present invention. In this embodiment, the funding agent model is a funding manager model 4602. Under the funding manager model 4602, each participant, participant 1, participant 2, . . . , participant n, has its own prefunded position, position 1, position 2, . . . , position n, which is individually stored and tracked (e.g., updated) by settlement services system 133. A prefunded position reflects the liquidity of the participant (i.e. an amount of funds to which they have access in a prefunded balance account). In the funding manager model, the individual positions of prefunded participants are funded one for one. That is, the position of each participant is backed by collateral. For example, the position of each participant can be backed dollar for dollar with collateral. The funding manager type funding agent is managing the individual positions of the participants and the funding agent has provided sufficient prefunded balance to cover a payment for each of the non-funding participants.

Prior to processing each credit transfer made by a participant, settlement services system 133 checks the position of each participant and determines if the participant has sufficient liquidity to make a payment. If the participant does not have sufficient liquidity to make the payment it can increase its position. A participant can only increase its position by either receiving credit transfers or providing initial or supplemental funding into the prefunded balance account, such as via a FedWire® system. It should be understood that other mechanisms for one FI to move liquidity to another FI can be used and still be within the scope of the invention, such as Payments Clearing and Settlement (PACS) which is an XML messages used between banks that is defined in the ISO 20022 standard (e.g., via PACS.009 messaging). In an example implementation, each initial or supplemental funding wire communication includes an identifier of the participant referred to as a participant identifier (ID). The participant ID is a prestored identifier that is used to ensure the supplemental funding wire is applied properly. As described above, under the funding manager model 4602, the funding manager (i.e., funding agent) must provide sufficient prefunded balance to cover the funding position of each non-funding participant.

Figure 46C:
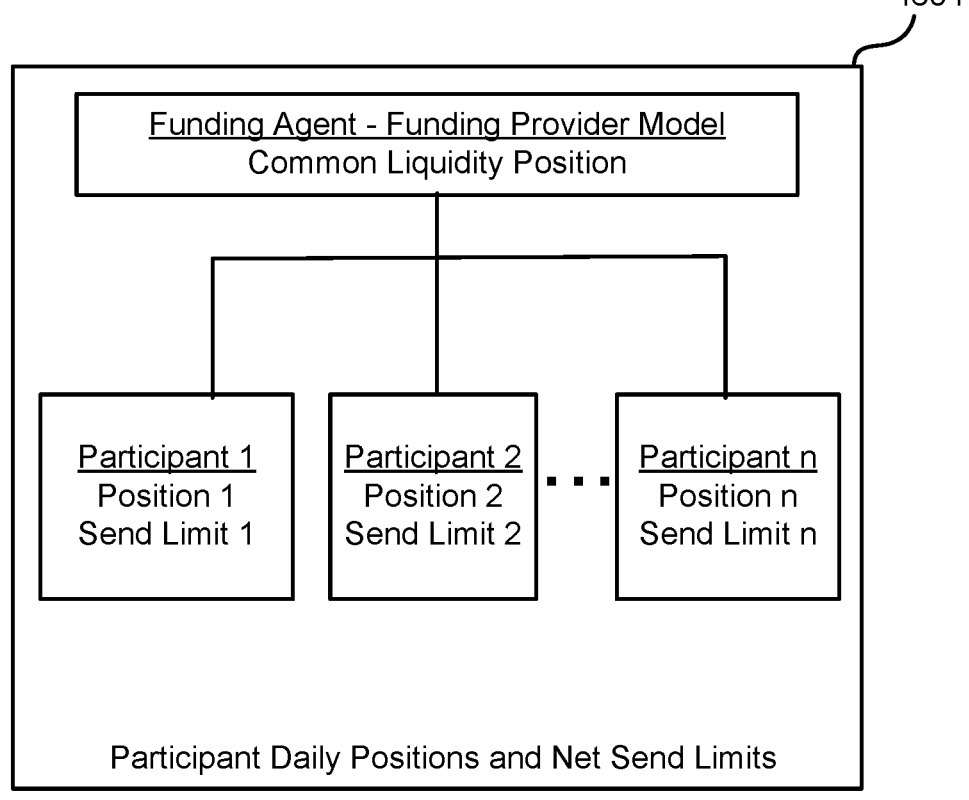
FIG. 46C illustrates a funding agent model according to an example embodiment herein.

FIG. 46C illustrates a funding agent model according to an example embodiment of the present invention. In this embodiment, the funding agent model is a funding provider model 4604. A linked participant is a non-funding participant that is linked to a funding agent through the settlement services system 133 such that the participant can leverage a current prefunded position of the funding agent. As will be described in more detail below, in some embodiments, a further determination can be made as to whether a tracking position of a participant will breach a tracking position limit (TPL), e.g., set by the funding agent for the participant, if the transaction would otherwise be approved. If a breach would occur, the transaction can be rejected. This prevents a participant from attempting to use more funds from the aggregated pool of funds (funding agents CPP) than it was allocated.

A tracking position is a position associated with a linked participant that is checked upon every transaction to ensure that the linked participant has sufficient access to liquidity to cover a transaction amount. More details as to how a determination is performed on each transaction between participants to determine if the linked participant has sufficient liquidity to cover a transaction amount are described in more detail below.

Under the funding provider model 4604, also referred to as a full funding agent solution, each participant, participant 1, participant 2, . . . , participant n, will still have its own position (position 1, position 2, . . . , position n, correspondingly). However, the settlement services system 133 can distinctly maintain and track multiple positions of participants against one current prefunded position owned by the funding agent and representative of the liquidity of the funding agent.

Figure 46D:
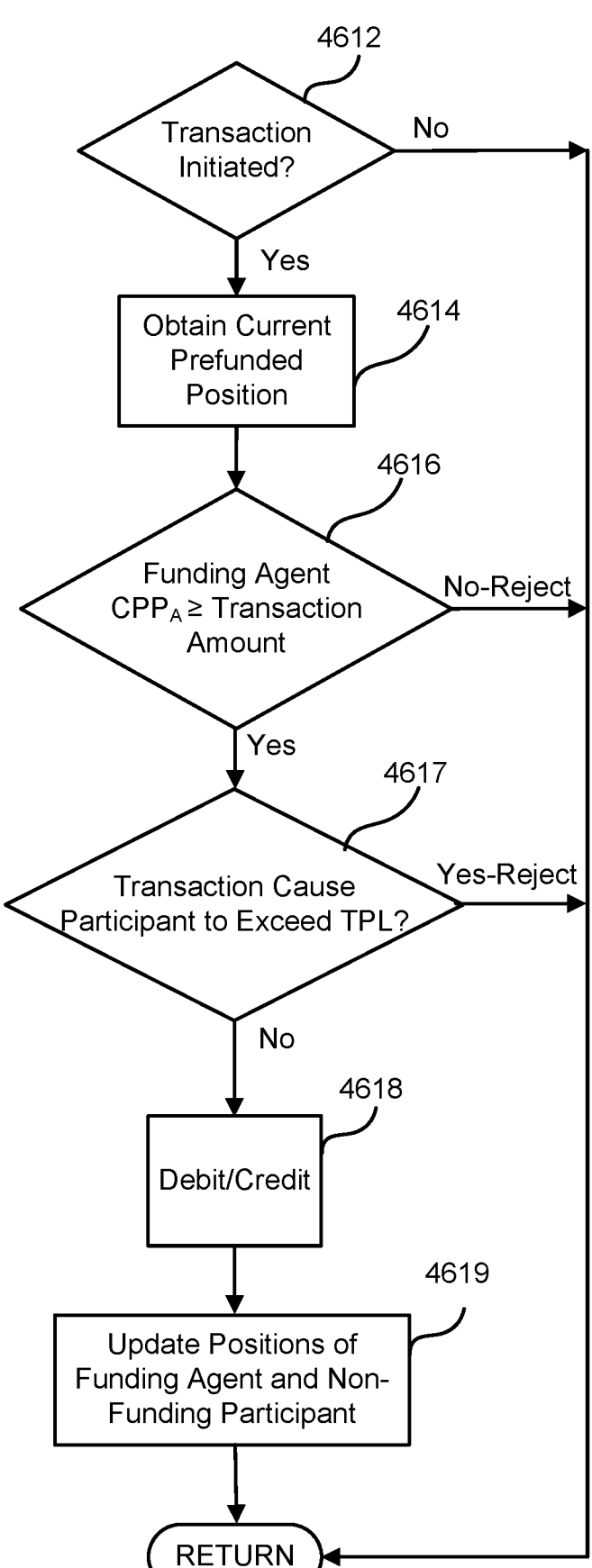
FIG. 46D illustrates a flow diagram of a process for monitoring and updating positions associated with funding agents and its non-funding participants, according to an example embodiment herein.

FIG. 46D illustrates a flow diagram of a process 4610 for monitoring and updating positions associated with funding agents and its non-funding participants, according to an example embodiment herein. A current prefunded position is a prefunded position of a funding agent or funding participant at a moment in time, calculated according to Equation 1 as follows:

$$\text{Current Prefunded Position=Opening Prefunded Position+Net Position+supplemental funding+disbursements,} \quad (1)$$

where the net position is the sum of all credit transfers sent and accepted or accepted without posting and all credit transfers received and accepted or accepted without posting by a funding participant or a linked participant. As described above, a linked participant is a non-funding participant that is linked to a funding agent through the settlement services system 133 such that the participant can leverage a current prefunded position of the funding agent.

Generally, a current prefunded position (CPP) of the funding agent is obtained and checked. The CPP position is affected by a) the opening prefunded position/balance of funding agent, b) activities of the funding agent (e.g., supplemental funding and disbursements made by the funding agent), and c) net position. The settlement services system 133 will make a determination whether the CPP of the funding agent is greater than a transaction amount. If the CPP of the funding agent is not greater than the transaction amount, then it will reject the transaction. If the CPP of the funding agent is greater than the transaction amount then it will approve the transaction if the transaction would otherwise be approved.

Referring still to FIG. 46D, in step 4612, a determination is made whether a transaction has been initiated by a linked participant. As used herein a transaction is also referred to as an unsettled financial position of the linked participant, for example where a linked participant is the debtor. Upon a determination in step 4612 that a transaction has been initiated by a linked participant, in step 4614 settlement services system 133 obtains the current prefunded position (CPP) of the funding agent. The CPP is continuously updated. For example, the current prefunded position of the funding agent will change when the funding agent submits an initial or supplemental funding successfully initiates a disbursement request that is executed or when a linked participant whose position is tracked against the current prefunded position of the funding agent sends or receives credit transfers. In some embodiments, if a credit transfer is sent between two participants that are both supported by the same funding agent, the individual tracking positions of the linked participants will change, but the current prefunded position of the funding agent will not.

The funding agent will have its own current prefunded position, minimum prefunded requirement, and watermarks, similar to how a self-funded position of a participant is managed and tracked.

In turn, a determination is made at step 4616 whether the funding agent CPP is greater than or equal to a transaction amount of the transaction determined to be initiated at step 4612. If a determination is made at step 4616 that the funding agent CPP is less than the transaction amount the transaction is rejected. If a determination is made at step 4616 that the funding agent CPP is greater than or equal to the transaction amount then at step 4617 a determination is made whether executing the amount of the transaction would cause the participant to exceed its tracking position limit (TPL). If a determination is made at step 4617 that executing the amount of the transaction would not cause the tracking position of the participant to exceed the tracking position limit of the participant, the transaction is approved. If a determination is made at step 4617 that executing the amount of the transaction would cause the tracking position of the participant to exceed the tracking position limit of the participant, then the transaction is rejected. It should be understood that steps 4616 and 4617 can be performed in reverse order and still be within the scope of the invention. The transaction must be within the funding agent CPP and the non-funding participant TPL. If a determination is made that the transaction is within the funding agent CPP and non-funding participant TPL (as per steps 4616 and 4617) then the transaction (e.g., credit transfer sent by a linked participant to another participant) will be approved by the settlement services system 133 if the transaction would otherwise be approved, as shown in step 4618. The positions are updated for both a funding agent prefunded position and the individual positions of the non-funding participant(s), as shown in step 4619.

The added functionality that the full funding agent mechanism of the settlement services system 133 brings is that each linked participant will have its individual position, (i.e., the "tracking position" of the participant) tracked against the overall current prefunded position of that funding agent.

The performance of the one or more actions enables enhanced and automated tracking of the current prefunded position of a funding agent and the individual positions of the linked participants which increases the capacity of the available funds to participants and has the added effect of stabilizing the network by reducing, for example, the number of communication transmissions required to notify the various operators of rejections because such rejections will be minimized. Moreover, fewer transactions will fail because there is less demand on liquidity as a result of the improved ACH network 130, particularly by use of the a settlement system 133 to manage the positions of participants. This means that the other data which is used to check against the positions of the participants according to the processes described herein are of enhanced relevance and are received, output and stored at significantly improved rates with fewer rejections. In other words, aspects of the embodiments described herein provide throughput and processing of data and speed of data selection in the ACH network 130 that is significantly enhanced. The data which is automatically received, processed and output according to the processes described herein can thus be pre-emptively obtained and stored within a computer, or transmitted to the computer, such that the selected data is immediately accessible and relevant to a local user of the computer.

Figure 46E:
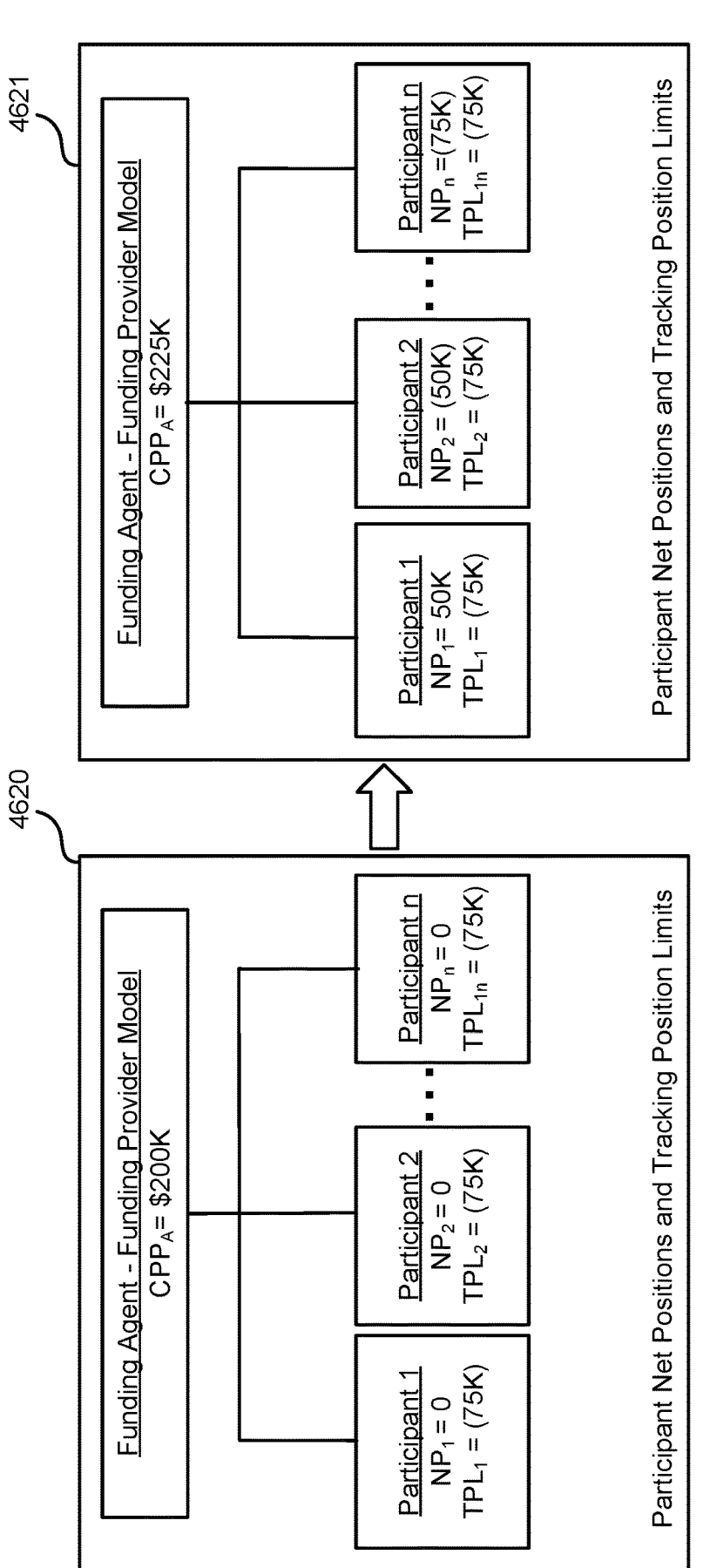
FIG. 46E illustrates example implementations of a funding agent model according to an example embodiment herein.

FIG. 46E illustrates example implementations of the funding agent model in accordance with an example embodiment of the present invention. Particularly with respect to the funding provider model. If, for example, a funding agent under the funding provider model has a current prefunded position (CPPA) of $200,000 at the start of a reconciliation window at which time each participant (participant 1, participant 2, . . . , participant n), has a tracking position (TP$_1$, TP$_2$, . . . , TP$_n$) of $0, absent any other controls, each participant who is linked to the funding agent will have access to that $200,000 of liquidity. Any credit transfer sent by any linked participant that would cause the current prefunded position (CPPA) of the funding agent to drop below $0 will be rejected by the settlement services system 133, as described above with respect to step 4616 of FIG. 46D.

In some embodiments, funding agents have the ability to manage access by each participant to the current prefunded position of the funding agent. In addition, the funding agent can set (and update at any time) a tracking position limit for each linked participant. Referring again to FIG. 46E, as such, even though the funding agent may have a current prefunded position of $200,000, if participant 2 has been given a tracking position limit (TPL) of $(75,000) and the tracking position of that participant is $(50,000), that participant must only have access to $25,000 more of the current prefunded position of the funding agent. The funding agent may decide to increase (or decrease) the tracking position limit of the participant at any time, which would in turn provide the participant with access to additional (or less) liquidity from the current prefunded position of the funding agent.

Funding Agent Setup

In an example implementation, a funding agent can be created or managed through a management portal either through a web browser running on a station connected to the network of the funding agent or settlement services system 133 via ACH network 130 or other software loaded onto a station that is in communication with the funding agent network or settlement services system 133 via ACH network). The funding agent that has been created can be edited and managed through the management portal as well. Funding agent attributes, include but not limited to:

Funding Agent Name

Funding Agent ID (e.g., a unique ID for the funding agent)

Fed Account ID (e.g., a nine-digit routing and transit number owned by the funding agent at a Federal Reserve Bank—the destination account for any Disbursement Request initiated by the funding agent)

Beneficiary Account ID (e.g., 35 alphanumeric characters used to allow the funding agent to easily identify how to apply funds to the appropriate position, e.g., inbound wire)

Prefunded Requirement (e.g., limits the permitted amount of a disbursement request; prefunded requirement change notification can be sent to funding agent when this value is changed by a system operator) Watermark Format (absolute or percentage, functionality will work the same as for a participant, but at the funding agent level)

Low Watermark (functionality will work the same as for a participant, but at the funding agent level)

High Watermark (functionality will work the same as for a participant, but at the funding agent level)

Maximum Tracking Position Limit Multiple (limits the sum of the tracking position limit of all linked participants using a funding agent to a multiple of the minimum prefunded requirement of the funding agent)

In some embodiments, the watermark format and values for a funding agent have no impact or restriction on the watermark format or values for a linked participant.

Once a funding agent is entered into the settlement services system 133 via the Automated Clearinghouse (ACH) network 130 (e.g., by, for example, an operator of the ACH network 130), it will have a default current prefunded position, for example, of $0. In some embodiments, the funding agent can create watermarks and set the TPL thereafter.

Funding In and Out of an Account

Figure 46F:
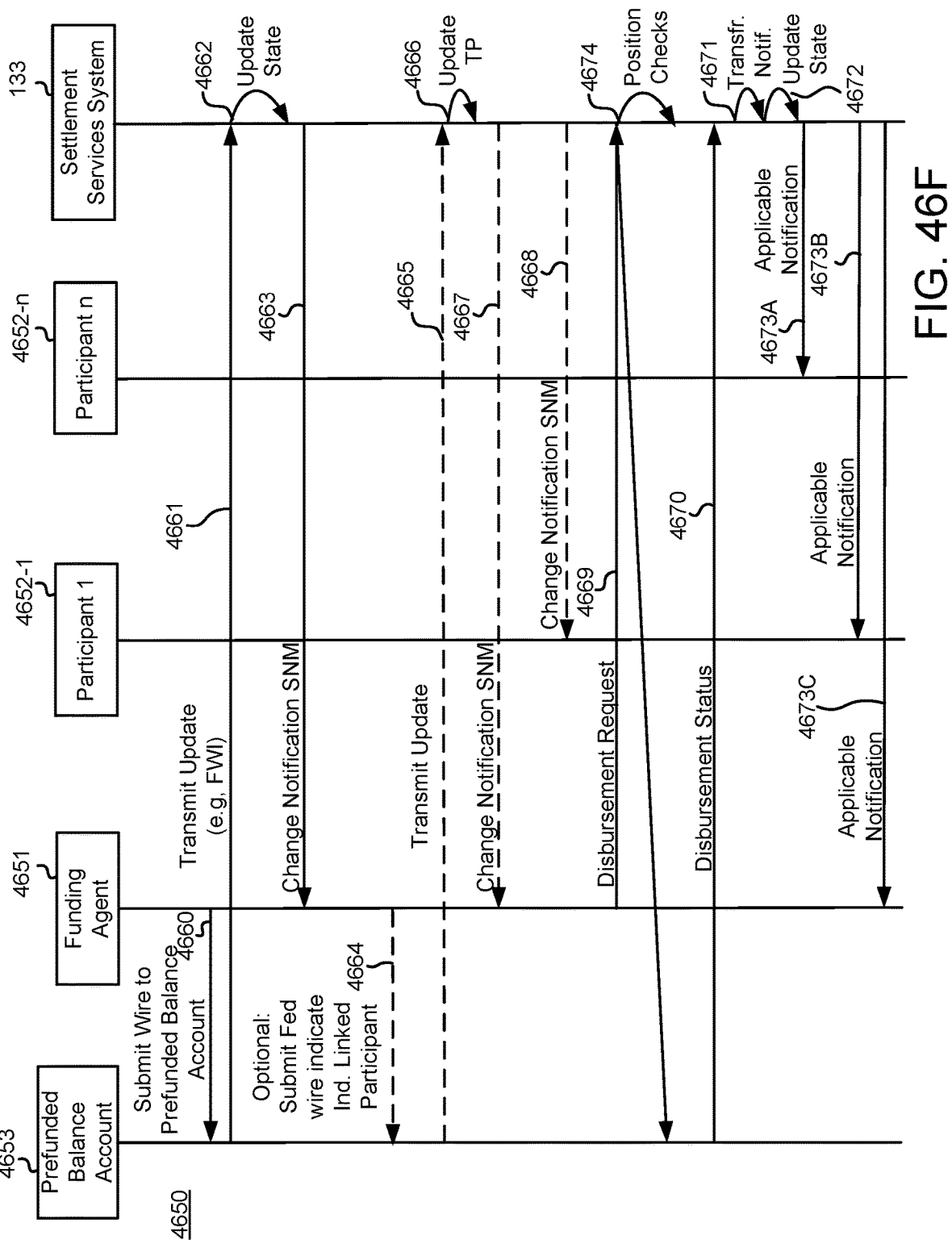
FIG. 46F is a system flow diagram illustrating funding into and out of accounts of participants and a funding agent according to an example embodiment herein.

FIG. 46F is a system flow diagram 4650 illustrating funding into and out of accounts of participants 4652 (participant 1 4652-1, . . . , participant 4652-*n*), and a prefunded balance account 4653 of a funding agent 4651 according to an example embodiment herein. In step 4660, a funding agent can add funds to its current prefunded position by submitting a wire to the prefunded balance account 4653 in the same way that participants can submit initial and supplemental funding wires. When a prefunded balance account receives an initial or supplemental funding request from a FedWire user interface (FWI) with a valid funding agent ID included in the request, an update of the prefunded balance account will be transmitted to the settlement service system 133 via the ACH network 130, as shown in step 4661. In turn, in step 4662, the settlement service system 133 will update its state, for example, by topping up the current prefunded position of the funding agent by an amount of the request. Following successful completion of the initial or supplemental funding request, the settlement service system 133 will send a prefunded balance change notification system notification message ("SNM") to the funding agent via ACH network 130, as shown in step 4663.

Each funding agent has the ability to optionally indicate a single participant for which a supplemental funding is being submitted, as shown in step 4664. If a participant is indicated, at step 4665 the participant ID is sent from the FWI to the settlement services system 133 via the real-time payments system 130 so that the position of the participant in the settlement services system 133 can be incremented by the amount of the initial or supplemental funding.

The update to the tracking position (TP) for a linked participant is depicted in step 4666. In addition to the update (step 4666) to the tracking position of the linked participant, the current prefunded position of the funding agent is increased by the amount of the request. Following successful completion of the initial or supplemental funding request, real-time payments system 130 will send a prefunded balance change notification SNM (e.g., via ACH network 130) to the funding agent, as shown in step 4667.

The linked participant will also receive a prefunded balance change notification SNM (e.g., via ACH network 130) in this case to notify the linked participant that its tracking position has been updated, as shown in step 4668.

A funding agent can also issue a disbursement through the settlement services system 133, as shown in step 4669. A funding agent has the ability to withdraw funds from its current prefunded position up to the value of the minimum prefunded requirement of the funding agent. A funding agent user with the proper permissions can request a disbursement through a management portal of the real-time payments system 130 in the same way a disbursement request is handled for a participant. A disbursement request causes the settlement services system 133 to perform checks on the positions of the funding agent and the participant associated with the disbursement, as shown in step 4674. The funding agent account ID and beneficiary account ID are passed in the disbursement request to the FWI. Settlement services system 133 will receive the disbursement status as shown in step 4670. Following successful completion of a disbursement request, real-time payments system 130 will send a prefunded balance change notification SNM to the funding agent, as indicated by step 4673C.

Each funding agent has the ability to optionally indicate a single participant for which a disbursement is being executed. If a participant is indicated, the participant ID is sent to FWI for inclusion in the wire to the participant. In addition to the current prefunded position of the funding agent being decremented, upon successful completion of the disbursement request, the participant tracking position is decremented by the amount of the disbursement request (applicable to each participant). Following successful completion of the disbursement request, settlement services system 133 (via real-time payments system 130) sends a prefunded balance change notification SNM to the funding agent as indicated by step 4673C. The linked participant receives an SNM in this case to notify the linked participant that its tracking position has been updated, as indicated by step 4673B or 4673A as the case may be.

Each disbursement will update both the tracking position of the linked participant and the current prefunded position of the funding agent automatically, as shown in step 4672.

A system operator with the appropriate permissions can execute a drawdown on behalf of a funding agent. This functionality is available for a participant as well.

A system operator with the appropriate permissions can perform a manual adjustment for a current prefunded position of a funding agent. This functionality is available for a participant's position as well.

Funding Agent—Transaction Processing

A funding agent can have a current prefunded position according to equation 1 described above, where net position is the sum of the net positions of the linked participants of the funding agent. For clarity, all supplemental funding and disbursements performed by the funding agent, whether or not a participant ID of a linked participant is included, will impact the current prefunded position of the funding agent.

Each transaction sent or receive by any linked participant will update the net position of the funding agent. For transactions sent between linked participants using the same funding agent, the net position will not change. Each participant using a funding agent (linked participant) will have a tracking position which is the net position (sum of transactions sent and ACTC (AcceptedTechnicalValidation: Authentication and syntactical and semantical validation are successful) or ACWP (Accepted without Posting: Payment instruction included in the credit transfer is accepted without being posted to the creditor customer's account) and transactions received and ACTC or ACWP) of the individual participant for the current reconciliation window plus any initial or supplemental funding and disbursement requests.

For each transaction sent/received and accepted or accepted without posting by any participant using a funding agent, the tracking position of the participant is decremented/incremented accordingly and recorded in the settlement services system 133. Each transaction will also result in the current prefunded position of the funding agent increasing/decreasing in the same amount as the tracking position of the linked participant, unless the transaction is between two linked participants using the same funding agent.

Each credit transfer will update both the tracking position of the linked participant and the current prefunded position of the funding agent automatically. Information or updated information on the settlement services system is made available to these updates by the corresponding participants and funding agent (e.g., in the form of a notification or providing access to the information stored in the settlement services system 133). If either of these updates fails, the credit transfer will not be completed by the system. Such a scenario will generate an alert indicating that describes the specific failure condition whether the tracking position could not be updated or the current prefunded position could not be updated. For a participant using a funding agent, transaction processing logic must be updated such that the system permits a payment to be sent to a creditor FI if: 1. the funding agent of the debtor FI has sufficient funds in its current prefunded position to cover the amount of the payment; and 2. The tracking position of the debtor FI will not breach the FA configured tracking position limit for the participant.

If for any given transaction, the current prefunded position of the funding agent is not sufficient to cover the transaction, real-time payments system 130 will reject the message with a reason code indicating that the funding agent did not have funds to cover the transaction (also referred to as a "new reason code").

If for any given transaction, the tracking position of the participant would breach the tracking position limit for the participant, real-time payments system 130 will reject the message with a reason code indicating that the participant did not have funds to cover the transaction (also referred to as an "existing reason code").

In some embodiments, the funding agent will receive an SNM notifying the funding agent of the reject due to their insufficient liquidity. In some embodiments, an SNM will be sent to both the participant and the funding agent to notify the relevant parties of the failure.

Funding agent can obtain its current prefunded position in near real-time. This can be achieved in multiple ways. For example, 1. the funding agent will have access to a funding agent dashboard that includes information regarding the opening balance of the funding agent, the current prefunded position of the funding agent, and the net position of the funding agent. Additionally, a list of liquidity related alerts of the linked participant (e.g. low watermark breach warning, available prefunded balance warning, etc.) and summary information on the current day's credit transfer activity will be displayed on the FA dashboard; and 2. funding agent will have access to a near-real time feed of transaction information for transactions performed by linked participants.

In some embodiments, application programming interfaces (APIs) can be used to allow the funding agent to obtain real time balances machine to machine instead of having to log on to a console or rely solely on alerts.

If a transaction causes the current prefunded position of the funding agent to fall below its low watermark, real-time payments system 130 can send a watermark notification to the funding agent to notify the funding agent of the event.

If a transaction causes the current prefunded position of the funding agent to rise above its high watermark following a low watermark breach, real-time payments system 130 sends a watermark notification to the funding agent to notify the funding agent of the event.

If a transaction causes a tracking position of a participant to fall below the low watermark of the participant, real-time payments system 130 sends a watermark notification to the participant and the funding agent. If a transaction causes a tracking position of the participant to rise above the high watermark of the participant following a low watermark breach of the participant, real-time payments system 130 sends a watermark notification to the participant and the funding agent.

Funding Agent Access to Participant Information and Controls for Participant Position In some embodiments, a funding agent has the ability to view the tracking position of each linked participant at any given point in time. A funding agent also has the ability to extract and download a file (and/or use an API call) that includes each tracking position of each linked participant at any point in time.

A funding agent also has the ability to configure the tracking position of each linked participant to reset to zero at the beginning of each reconciliation window or to remain at the closing tracking position from the previous reconciliation window.

Funding Agent Management of Participant

In some embodiments, the tracking position of individual participants linked to a funding agent cannot be manually adjusted by the funding agent. This tracking position will only be impacted by sending/receiving transactions; when a funding agent initiates a disbursement request or supplemental funding that indicates a specific participant to which the request applies; or at the beginning of a reconciliation window if the participant is in "reset" tracking mode.

A funding agent also has the ability to set a tracking position limit for each linked participant. The tracking position limit will serve as a limit to how much below zero a single participant's tracking position can fall before transactions are rejected. In an example implementation, the tracking position limit of each participant will be set, as a default, at $25,000. A funding agent may change the tracking position limit at any time to any value greater than or equal to $0. A funding agent cannot set the tracking position limit such that the linked participant is required to hold a positive tracking position in the system.

In some embodiments, the sum of all of the tracking position limits of the linked participants of a funding agent divided by the minimum prefunded requirement of the funding agent will not exceed the tracking position limit multiple of a funding agent.

In some embodiments, a funding agent is not permitted to extend a tracking position limit of a participant to an amount that would put the funding agent out of compliance with this rule.

In an example implementation, when a system operator updates a tracking position limit multiple of a funding agent, real-time payments system 130 notifies the funding agent by transmitting an SNM. For example, the funding agent will receive notification (via an SNM) if a change is made to the STL or SITL.

Reconciliation and Reporting

At the end of each reconciliation window, the tracking position of each linked participant will be reset to zero (unless otherwise indicated by the funding agent). In some embodiments, the funding agent can evaluate each of current tracking position limit of its participant and adjust each tracking position limit accordingly.

At the end of each reconciliation window, the funding agent will receive an SNM with a summary of the information for its current prefunded position during the previous reconciliation window. Volumes and values in the report are the sum of all transactions sent and received by all linked participants. In some embodiments, each linked participant will receive an SNM related to its tracking position as per existing functionality.

In some embodiments, the funding agent will receive standard reconciliation reports (e.g. detailed reconciliation report) and daily reports (e.g., volume and value report, reject report, etc.) related to each linked participant and also to the current prefunded position as a whole of the funding agent.

In addition, a funding agent can receive a summary level report (looks like participant reconciliation report, but with multiple entries, one per linked participant) that shows the funding agent's opening and closing positions, all successful supplemental funding and disbursement requests, and the net position, supplemental funding and disbursement requests associated with each linked participant.

Funding Agent Account Reconciliation Report—Details for all Participant Activity and Funding Activity In some embodiments, a funding agent can receive a new report (called the tracking position summary report) at the end of each reconciliation window that includes a row for each linked participant and the following information:

Participant ID

Closing Tracking Position

Minimum Tracking Position during reconciliation window

Maximum Tracking Position during reconciliation window

Minimum Value of Tracking Position Limit

Maximum Value of Tracking Position Limit

Closing Value of Tracking Position Limit

Closing Dif. (where Dif=Closing Tracking Position− Closing Tracking Position Limit)

Minimum dif. (where Minimum Dif is the minimum difference between Tracking Position and Tracking Position Limit during the current reconciliation window)

Maximum dif. (where maximum Dif is the maximum difference between Tracking Position and Tracking Position Limit during the current reconciliation window)

Time of Minimum dif.

System Operator Management of Funding Agent

In some embodiments, a system operator with the proper privileges can be authorized to manually adjust a tracking position of a participant similarly to how the system operator can adjust a current prefunded position of the participant. In some embodiments, preferably, any manual adjustment to a tracking position of a participant must not also update the current prefunded position of a funding agent.

In some embodiments, a system operator has the ability to manually adjust the current prefunded position of a funding agent similarly to how a system operator can adjust a current prefunded position of a participant.

In some embodiments a system operator has the ability to create/manage users of the real-time payments system 130 management portal for the funding agent.

A system operator has the ability to set a tracking position limit (TPL) multiple on each funding agent. The TPL multiple limits the overall TPL that the funding agent can set for all of its participants. The TPL multiple is compared to the sum of the TPL of the linked participant divided by the minimum prefunded requirement of the funding agent. Preferably the sum of the tracking position limits of the participants tracking position limits divided by the minimum prefunded requirement of the funding agent should not exceed the TPL multiple. Also, in some embodiments, preferably a funding agent is not be permitted to set a TPL to an amount that would allow the funding agent to be out of compliance with this rule. If the TPL multiple is adjusted downward such that the funding agent is out of compliance with an applicable rule, the funding agent is required to adjust its linked participant's TPLs to come back into compliance with the rule. An alert is communicated to the system operator which can be cleared when the funding agent comes back into compliance with the TPL multiple rule. Transaction processing should continue as normal while the funding agent is out of compliance with the TPL multiple rule.

Tokenization

Regarding tokenization, that involves use of a unique code that can only be used to post transactions to an account. It can be useful because a payer does not receive a payee's account data, there is no need for a PCI-type of security for a payer. Tokens are safe even if exposed in a cyber attack. Also, mass payment fraud is more difficult to execute.

Tokenization can be provided in a dynamic versus static manner. Tokenization is a preferred approach to secure mobile and e-commerce payments using credit and debit cards. Tokenization substitutes a limited-use random number (secure digital token) for a customer's account number so that the sensitive information remains safe. Even if compromised, the token is of limited or no use to cyber-criminals. Tokenization as used in the example embodiments herein can involve various aspects. For example, one is a dynamic token, in which the token for each transaction is unique rendering the token itself unusable for any other transaction. Another is a static token, wherein the same token is used for multiple transactions, but may be restricted to prevent unauthorized use (e.g., credit only, single merchant). Still another is a domain restriction, that provides further fraud reduction by limiting token use to a certain digital wallet, merchant, channel (e.g., e-commerce), amount, transaction type (e.g. credit or debit) or expiration date. For a token vault, bank (or multi-bank) vaults create tokens, perform customer authentication and provision tokens to digital wallets or directories.

Regarding directory services, by virtue of the directory and use of tokens, senders can initiate payments using an alias (e.g., a phone number, email, or other code, etc.) which is used to retrieve bank routing information from a database. As such, receivers do not need to provide account numbers to senders, and senders do not assume a risk of holding receivers account numbers.

Optional Travel Rule Requirements

Various elements of the system 100 may be required, in one example herein, to comply with certain travel-related rules. For example, a financial institution can be required to include in a transmittal order for any funds for a transfer of $3,000 or more, the following:

a name of the transmitter (the party requesting the transfer), and, if the payment is ordered from an account, the account number of the transmittor an address of the transmittor an amount of the transmittal order a date of the transmittal order an identity of the recipient's financial institution.

A transmittor's financial institution can receive with the transmittal order (from the transmittor):

a name and address of the recipient an account number of the recipient any other specific identifier of the recipient either the name and address or the numerical identifier of the transmittor's financial institution.

Travel rules may apply in B2B transactions, for example.

It also generally applies to bill payments initiated by a business. Such rules can be subject to certain exceptions, such as an "electronic funds transfer" governed by Regulation E (i.e., a transfer that a consumer initiates from his or her account), and situations where both the transmitter and the recipient (i.e., the beneficial recipient of the funds) are any of the following:

a domestic bank;

a wholly owned domestic subsidiary of a domestic bank;

a domestic broker or dealer in securities;

a wholly owned domestic subsidiary of a domestic broker or dealer in securities;

a domestic futures commission merchant or an introducing broker in commodities;

a wholly owned domestic subsidiary of a domestic futures commission merchant or an introducing broker in commodities;

the United States;

a Federal agency or instrumentality;

a state or local government;

a state or local agency or instrumentality; or a domestic mutual fund.

The real-time payment system herein is a platform for financial institutions to develop novel, compelling, and commercially viable products and services for their customers. The system is adaptable to meet the changing needs associated with market expectations and risk environments that are prone to change over time. The system supports robust, flexible data models and message types and has an architecture that supports modular service integration. In one example embodiment herein, the system has global compatibility, and, consistent with domestic U.S. requirements, the system adheres to widely used global standards (e.g., ISO 20022) and the processes/conventions used by real-time payment systems in other countries to facility future interoperability, and to ease the implementation burden for multi-national banks and companies.

As described above, the real-time system 100 herein, in one example embodiment, employs "Credit Push" payments where customers can send payments directly from their existing accounts, providing greater customer engagement and transparency than alternative payment services. The system 100 also, in one example, employs standard but extensible message formats, and supports independent product development by financial institutions through powerful, flexible standards while ensuring that the overall end-to-end process is consistent and reliable. Real-time messaging also is provided with "bank-grade" security, in that is provided financial institutions with tools to create a superior customer experience in applications such as mobile banking, P2P transfers, bill payments, just-in-time B2B transactions, etc. The system 100 also uses integrated tokenization and directory services to eliminate need for customers to share sensitive account information or know routing details of recipients. The system 100 thus is fundamentally safer, more-convenient, and more-capable than existing payment systems.

In the foregoing description, example aspects are described with reference to several example embodiments. Accordingly, the specification should be regarded as illustrative, rather than restrictive. Similarly, the figures illustrated in the drawings, which highlight the functionality and advantages of the example embodiments, are presented for example purposes only. The architecture of the example embodiments is sufficiently flexible and configurable, such that it may be utilized (and navigated) in ways other than those shown in the accompanying figures.

Software embodiments may be provided as a sequence of instructions, or software, which may be stored on an article of manufacture, e.g., a computer-readable medium having instructions. The instructions on the computer-readable medium may be used to program a computer system or other electronic device. The computer-readable medium may include, but is not limited to, floppy diskettes, optical disks, CD-ROMs, and magneto-optical disks or other types of media suitable for storing electronic instructions.

The techniques described herein, when performed using a computer system, are not limited to any particular software configuration. They may find applicability in any computing or processing environment. The terms "computer-readable medium" and "memory" refer to any medium that is capable of storing, encoding, or transmitting a sequence of instructions for execution by a computer system and that causes the computer system to perform any technique described herein. Furthermore, it is common in the art to speak of software, in one form or another (e.g., program, procedure, process, application, logic, and so on) as taking an action or causing a result. Such expressions are merely a shorthand way of stating that the execution of the software by a computer system causes the processor to perform an action to produce a result. In other embodiments, functions performed by software can instead be performed by hardcoded modules, and thus the example embodiments herein are not limited only for use with stored software programs. In addition, it is not necessary that processes described herein be performed with a computer system, and instead they can be performed, in whole or in part, by a human operator.

It should be noted that, although described in the context of a healthcare billing and payment environment, the scope of the invention is not limited for use in that environment only, and also can be used for transactions involving other environments as well, including, for example and without limitation, any suitable type of environment involving bill presentment and payment.

Although example aspects have been described in certain specific embodiments, many additional modifications and variations would be apparent to those skilled in the art. It thus should be understood that the example embodiments may be practiced in ways other than those specifically described. Again, the present example embodiments should be considered in all respects as illustrative and not restrictive.

What is claimed is:

1. A method for conducting a real time payment, comprising:

creating a funding agent using a computing device in communication with an automated clearinghouse network;

linking each of a plurality of participants to the funding agent via the automated clearinghouse network, each of the plurality of participants having a tracking account position, wherein linking each of the plurality of participants to the funding agent includes:

storing prefund position information data and tracking position information data of each of the plurality of participants within a settlement services system, responsive to a credit transfer from a linked participant, automatically updating the prefund position information data and the tracking position information data that is stored in the settlement services system, providing, from the settlement services system, the prefund position information data and the tracking position information data to a funding agent dashboard for display in real time, determining, by the settlement services system, that an update of a tracking position information for a linked participant failed because a notification from the linked participant was not received, based on determining that the update failed, halting the credit transfer received from the linked participant, and generating an alert indicating the tracking position information could not be updated;

receiving a request for payment over the automated clearinghouse network, the payment to be made from a linked debtor institution participant to a linked creditor institution participant, wherein each of the linked debtor institution participant and the linked creditor institution participant is one of the plurality of participants linked to the funding agent;

checking debtor funds of a debtor availability at the linked debtor institution participant, wherein the payment is rejected if the debtor funds availability is less than the received request for payment;

determining whether the linked creditor institution participant uses tokenization services by comparing a message from the linked debtor institution with a bank routing number pseudo-code (BRNPC);

responsive to determining the linked creditor institution participant uses tokenization services based on the BRNPC matching an entry in a list of routing numbers designated by the automated clearinghouse network and the message with the BRNPC is a tokenized message:

determining, by the automated clearinghouse network, the tokenized message is in an invalid format including checking a format, syntax, and structure of the message, and responsive to determining the tokenized message is in an invalid format:

generating a first exception message, and transmitting the first exception message to the linked debtor institution participant for processing to display at a computing device of the debtor;

determining whether the linked debtor institution participant is enabled for send payment capability and whether the linked creditor institution participant is capable of receiving payment, determining whether the request for payment qualifies for being processed in real time by:

determining whether the linked creditor institution participant is enabled for making real time payments;

determining whether the payment request amount is less than a predetermined individual payment maximum; and determining whether the payment request amount is less than a predetermined transaction value set by the linked debtor institution participant, wherein, if any of the determining steps fail, rejecting the requested payment;

if the requested payment is rejected:

generating a reason code indicating the reason for the payment;

transmitting a message to the linked debtor institution participant including the reason code; and terminating the payment request; and if the requested payment is accepted:

updating a net settlement position for the linked debtor institution participant and the linked creditor institution participant based on the payment request amount;

transmitting a payment instruction message to the linked creditor institution participant;

in response to receiving the transmitted payment instruction, processing, at the linked creditor institution participant, the received request for payment in real time;

sending a payment acknowledgement message from the linked creditor institution participant to the linked debtor institution participant;

sending a payment status message to the computing device of the debtor; and in response to sending the payment status message to the linked debtor institution participant, transmitting a system notification message (SNM) to the linked debtor institution participant notifying the linked debtor institution participant that its tracking position has been updated and to the funding agent notifying the funding agent that its prefunded balance has changed.

2. The method of claim 1, wherein sending the payment status message to the computing device of the debtor further comprises providing notification to the debtor of the debtor's updated funds availability.

3. The method of claim 1, wherein rejecting the requested payment comprises composing and transmitting to the debtor a payment reject message.

4. The method of claim 3, further comprising:

determining a reject reason code for rejecting the requested payment;

updating the payment status message to payment rejected, including the determined reject reason code; and transmitting the payment status message to the computing device of the debtor.

5. The method of claim 1, wherein determining that the request for payment qualifies for being processed in real time further comprises:

invoking a debtor directory to access debtor account and routing information;

invoking a creditor directory to access a creditor account number;

determining whether debtor account information, debtor routing information, and the creditor account number are valid;

determining whether the linked debtor institution participant is enabled for send payment capability and whether the linked creditor institution participant is capable of receiving payment; and if the debtor account information is not valid, if the debtor routing information is not valid, if the creditor account number is not valid, if the linked debtor institution participant is not enabled for send payment capability, or if the linked creditor institution participant is not capable of receiving payment:

preparing a second exception message;

transmitting the second exception message to the linked debtor institution participant; and rejecting the payment.

6. The method of claim 1, further comprising:

determining whether the linked debtor institution participant is suspended from sending the real time payment;

determining whether the linked creditor institution participant is suspended from receiving the real time payment; and if either the linked debtor institution participant or the linked creditor institution participant is suspended from sending or receiving the real time payment:

composing a second exception message;

transmitting the second exception message to the linked debtor institution participant; and rejecting the payment.

7. The method of claim 4, further comprising:

determining whether the linked creditor institution participant utilizes token clearing house services; and if the linked creditor institution participant is determined to utilize the token clearing house services:

tokenizing a debtor account number within debtor account information;

utilizing token clearing house token services to de-tokenize the debtor account number; and populating the payment instruction message with the de-tokenized debtor account number.

8. The method of claim 1, further comprising:

receiving, at the linked creditor institution participant, a request from a debtor for a second credit transfer;

invoking, at the linked creditor institution participant, a directory lookup to find a debtor account and routing information;

determining whether debtor account information and debtor routing information are valid;

determining whether the linked creditor institution participant is enabled for a send payment capability; and if the debtor account information and the debtor routing information are valid and if the linked creditor institution participant is enabled for the send payment capability:

composing and transmitting a remittance message to the linked creditor institution participant;

determining whether the remittance message is valid; and if the remittance message is determined to be valid, sending a remittance advice to the linked creditor institution participant.

9. The method of claim 8, further comprising:

determining whether the linked debtor institution participant or the linked creditor institution participant is suspended from sending or receiving the real time payment; and if either the linked debtor institution participant or the linked creditor institution participant is suspended from sending or receiving the real time payment:

composing a second exception message; and transmitting the second exception message to the linked debtor institution participant.

10. The method of claim 1, further comprising:

receiving a request for a return of funds;

invoking, at the linked debtor institution participant, a directory lookup to find a debtor account and debtor routing information;

invoking, at the linked creditor institution participant, a directory lookup to find a creditor routing number;

composing a message for the return of funds, the message including debtor account information, the debtor routing information, and the creditor routing number;

validating the return of funds message;

if the return of funds message is valid, transmitting the return of funds message to the linked creditor institution participant; and if the return of funds message is not valid, composing a second exception message and transmitting the second exception message to the linked debtor institution participant.

11. The method of claim 1, further comprising:

receiving a request for information regarding a received payment;

invoking, at the linked debtor institution participant, a directory lookup to find debtor routing information;

invoking, at the linked creditor institution participant, a directory lookup to find a creditor routing number;

creating a request for information message, the message including the debtor routing information and the creditor routing number;

validating the information request message;

if the information request message is valid:

transmitting the information request message to the linked debtor institution participant;

composing a response to the information request message; and transmitting the response to the information request message to the linked creditor institution participant; and if the information request message is not valid:

composing a second exception message and transmitting the second exception message to the debtor.

12. A system for conducting a real-time payment, comprising:

a memory storing a computer program; and a computer processor, operating under control of the program stored in the memory, to:

create a funding agent using a computing device in communication with an automated clearinghouse network;

link each of a plurality of participants to the funding agent via the automated clearinghouse network, each of the plurality of participants having a tracking account position, wherein link each of the plurality of participants to the funding agent includes:

store prefund position information data and tracking position information data of each of the plurality of participants within a settlement services system, responsive to a credit transfer from a linked participant, automatically updating the prefund position information data and the tracking position information data that is stored in the settlement services system, provide, from the settlement services system, the prefund position information data and the tracking position information data to a funding agent dashboard for display in real time, determine, by the settlement services system, that an update of a tracking position information for a linked participant failed because a notification from the linked participant was not received, based on a determination that the update failed, halt the credit transfer received from the linked participant, and generate an alert indicating the tracking position information could not be updated;

receive a request for payment over the automated clearinghouse network, the payment to be made from a linked debtor institution participant to a linked creditor institution participant;

check debtor funds availability at the linked debtor institution participant, wherein the payment is rejected if the debtor funds availability is less than the received request for payment;

determine whether the linked creditor institution participant uses tokenization services by comparing a message from the linked debtor institution with a bank routing number pseudo-code (BRNPC);

responsive to a determination the linked creditor institution participant uses tokenization services based on the BRNPC matching an entry in a list of routing numbers designated by the automated clearinghouse network and the message with the BRNPC is a tokenized message:

determine, by the automated clearinghouse network, the tokenized message is in an invalid format including checking a format, syntax, and structure of the message, and responsive to a determination the tokenized message is in an invalid format:

generate a first exception message, and transmit the first exception message to the linked debtor institution participant for processing to display at a computing device of the debtor;

determine whether the request for payment qualifies for being processed in real time by:

determining whether the linked creditor institution participant is enabled for making real time payments;

determining whether the payment request amount is less than a predetermined individual payment maximum; and determining whether the payment request amount is less than a predetermined transaction value set by the linked debtor institution participant, wherein, if any of the determining steps fail, rejecting the requested payment;

if the requested payment is rejected:

generating a reason code indicating the reason for rejecting the payment;

transmitting a message to the linked debtor institution participant including the reason code; and terminating the payment request; and if the requested payment is rejected:

update a net settlement position for the linked debtor institution participant and the linked creditor institution participant based on the payment request amount;

transmit a payment instruction message to the linked creditor institution participant;

in response to receiving the transmitted payment instruction, process, at the linked creditor institution participant, the received request for payment in real time;

send a payment acknowledgement message from the linked creditor institution participant to the linked debtor institution participant; and send a payment status message to a computing device of the debtor; and in response to sending the payment status message to the computing device of debtor, transmitting a system notification message (SNM) to the computing device of the debtor notifying the debtor that its tracking position has been updated and to the funding agent notifying the funding agent that its prefunded balance has changed.

13. The method of claim 1, further comprising:

receiving a request for return of funds message from the linked debtor institution participant, the request for return of funds message requesting that an amount of payment be returned to the linked debtor institution participant;

forwarding the request for return of funds message to the linked creditor institution participant to request the linked creditor institution participant to return the amount of the payment; and generating a payment transaction message including the routing number for the linked creditor institution participant and a bank account number for the creditor, wherein the payment transaction message is forwarded based on at least the routing number for the linked creditor institution participant.

14. The system of claim 12, wherein the computer processor further operates to:

receive an electronic request for return of funds message from the linked debtor institution participant, the electronic request for return of funds message requesting that an amount of payment be returned to the linked debtor institution participant; and forward, the electronic request for return of funds message to the linked creditor institution participant to request the linked creditor institution participant to return the amount of the payment.

15. The system of claim 12, wherein the computer processor further operates to:

receive at least one of a pending status message, an accepted status message, and a rejected status message from the linked creditor institution participant, in relation to a payment transaction message.

16. The system of claim 15, wherein each of the messages includes a unique transaction identifier.

17. The system of claim 12, wherein the computer processor further operates to:

receive a request for information message from the linked creditor institution participant and forwarding that message to the linked debtor institution participant, the request for information message requesting that the linked creditor institution participant be provided with predetermined information; and receive, from the linked debtor institution participant, a responsive message to the request for information message, and forwarding the responsive message to the linked creditor institution participant, the responsive message including the predetermined information.

18. The system of claim 12, wherein the computer processor further operates to:

receive a remittance advice message including remittance advice from the linked debtor institution participant and forwarding the remittance advice message to the linked creditor institution participant.

19. The system of claim 18, wherein the computer processor further operates to:

compare an unsettled financial position of the linked debtor institution participant to a combination of a value of a pre-funded balance in a settlement account and a value of a net debit cap; and determine whether to perform a financial settlement based on a result of the comparing.

20. The system of claim 19, wherein the computer processor further operates to:

perform the financial settlement where it is determined that the unsettled financial position of the linked debtor institution participant is not greater than the combination.

21. The method of claim 1, wherein the first exception message is a PACS.002 message.

\* \* \* \* \*